(12) United States Patent
Breed

(10) Patent No.: US 7,983,817 B2
(45) Date of Patent: Jul. 19, 2011

(54) METHOD AND ARRANGEMENT FOR OBTAINING INFORMATION ABOUT VEHICLE OCCUPANTS

(75) Inventor: David S. Breed, Boonton Township, Morris County, NJ (US)

(73) Assignee: Automotive Technologies Internatinoal, Inc., Denville, NJ (US)

( * ) Notice: Subject to any disclaimer, the term of this patent is extended or adjusted under 35 U.S.C. 154(b) by 1108 days.

(21) Appl. No.: 11/025,501

(22) Filed: Jan. 3, 2005

(65) Prior Publication Data

US 2005/0131607 A1 Jun. 16, 2005

Related U.S. Application Data

(63) Continuation-in-part of application No. 10/940,881, filed on Sep. 13, 2004, which is a continuation-in-part of application No. 10/931,288, filed on Aug. 31, 2004, and a continuation-in-part of application No. 10/413,426, filed on Apr. 14, 2003, and a continuation-in-part of application No. 10/302,105, filed on Nov. 22, 2002, now Pat. No. 6,772,057, and a continuation-in-part of application No. 10/116,808, filed on Apr. 5, 2002, now Pat. No. 6,856,873, which is a continuation-in-part of application No. 09/838,919, filed on Apr. 20, 2001, now Pat. No. 6,442,465, which is a continuation-in-part of application No. 09/765,559, filed on Jan. 19, 2001, now Pat. No. 6,553,296, which is a continuation-in-part of application No. 09/476,255, filed on Dec. 30, 1999, now Pat. No. 6,324,453, said application No. 09/838,919 is a continuation-in-part of application No. 09/389,947, filed on Sep. 3, 1999, now Pat. No. 6,393,133, which is a continuation-in-part of application No. 09/200,614, filed on Nov. 30, 1998, now Pat. No. 6,141,432, which is a continuation of application No. 08/474,786, filed on Jun. 7, 1995, now Pat. No. 5,845,000, said application No. 10/116,808 is a continuation-in-part of application No. 09/925,043, filed on Aug. 8, 2001, now Pat. No. 6,507,779.

(60) Provisional application No. 60/114,507, filed on Dec. 31, 1998.

(51) Int. Cl.
*B60R 21/015* (2006.01)

(52) U.S. Cl. ........ 701/45; 348/243; 382/103; 250/578.1; 367/137

(58) Field of Classification Search ............... 701/45; 280/735; 340/436; 362/4, 11, 19, 29, 488, 362/490; 382/278, 103, 224; 180/268; 348/243; 250/578.1; 367/137; *B60R 21/015*
See application file for complete search history.

(56) References Cited

U.S. PATENT DOCUMENTS 4,573,784 A * 3/1986 Suzuki ......................... 396/101
(Continued)

OTHER PUBLICATIONS

"3D Shape Recovery and Registration Based on the Projection of Non-Coherent Structured Light" by Roberto Rodella and Giovanna Sansoni, INFM and Dept. of Electronics for the Automation, University of Brescia, Via Branze 38, 1-25123 Brescia—Italy.

(Continued)

*Primary Examiner* — Tuan C To
(74) *Attorney, Agent, or Firm* — Brian Roffee

(57) ABSTRACT

Arrangement and method for obtaining information about a vehicle occupant in a compartment of the vehicle in which a light source is mounted in the vehicle, structured light is projected into an area of interest in the compartment, rays of light forming the structured light originating from the light source, reflected light is detected at an image sensor at a position different than the position from which the structured light is projected, and the reflected light is analyzed relative to the projected structured light to obtain information about the area of interest. The structured light is designed to appear as if it comes from a source of light (virtual or actual) which is at a position different than the position of the image sensor.

28 Claims, 65 Drawing Sheets

U.S. PATENT DOCUMENTS

| | | | | |
|---|---|---|---|---|
| 4,625,329 | A | * | 11/1986 | Ishikawa et al. ............. 382/104 |
| 4,632,543 | A | | 12/1986 | Endo |
| 4,745,469 | A | | 5/1988 | Waldecker |
| 4,797,824 | A | * | 1/1989 | Sugiyama et al. ............. 701/49 |
| 4,852,934 | A | * | 8/1989 | Yasuda et al. ................. 296/64 |
| 4,864,629 | A | * | 9/1989 | Deering ....................... 382/216 |
| 4,867,570 | A | | 9/1989 | Sorimachi |
| 4,899,218 | A | | 2/1990 | Waldecker |
| 4,919,497 | A | * | 4/1990 | Kaes ......................... 303/119.2 |
| 4,948,258 | A | | 8/1990 | Caimi |
| 4,954,962 | A | | 9/1990 | Evans, Jr. |
| 5,003,166 | A | | 3/1991 | Girod |
| 5,040,116 | A | | 8/1991 | Evans, Jr. |
| 5,054,918 | A | | 10/1991 | Downing |
| 5,111,401 | A | | 5/1992 | Everett, Jr. |
| 5,298,732 | A | * | 3/1994 | Chen ......................... 250/203.4 |
| 5,314,037 | A | | 5/1994 | Shaw |
| 5,330,226 | A | * | 7/1994 | Gentry et al. ................ 280/735 |
| 5,335,288 | A | | 8/1994 | Faulkner |
| 5,355,118 | A | * | 10/1994 | Fukuhara ..................... 340/435 |
| 5,381,236 | A | * | 1/1995 | Morgan ....................... 356/609 |
| 5,411,289 | A | * | 5/1995 | Smith et al. .................. 280/735 |
| 5,490,069 | A | * | 2/1996 | Gioutsos et al. ............... 701/45 |
| 5,531,472 | A | * | 7/1996 | Semchena et al. ........... 280/735 |
| 5,585,625 | A | * | 12/1996 | Spies ........................... 250/221 |
| 5,602,425 | A | * | 2/1997 | Wilhelmi et al. ............ 307/10.1 |
| 5,675,419 | A | | 10/1997 | Van Den Bergh |
| 5,691,693 | A | * | 11/1997 | Kithil ........................... 340/439 |
| 5,761,326 | A | * | 6/1998 | Brady et al. ................. 382/103 |
| 5,929,980 | A | | 7/1999 | Yamaguchi |
| 6,049,747 | A | | 4/2000 | Nakajima |
| 6,198,998 | B1 | | 3/2001 | Farmer |
| 6,229,913 | B1 | | 5/2001 | Nayar |
| 6,252,240 | B1 | | 6/2001 | Gillis |
| 6,285,778 | B1 | * | 9/2001 | Nakajima et al. ............ 382/104 |
| 6,298,311 | B1 | | 10/2001 | Griffin |
| 6,441,363 | B1 | | 8/2002 | Cook, Jr. |
| 6,754,370 | B1 | | 6/2004 | Hall-Holt |
| 6,781,676 | B2 | | 8/2004 | Wallace |

OTHER PUBLICATIONS

"A Low-Cost Range Finder using a Visually Located, Structured Light Source", R.B. Fisher, A.P. Ashbrook, C. Robertson, N. Werghi, Division of Informatics, Edinburgh University 5 Forrest Hill, Edinburgh EH1 2QL/.

F. Lersale, J. Lequellec, M. Devy, "Relaxation vs. Maximal Cliques Search for Projected Beams Labeling in a Structured Light Sensor", Proceedings of the International Conference on Pattern Recognition, 2000 IEEE.

D. Caspi, N. Kiryati, and J. Shamir, "Range Imaging With Adaptive Color Structured Light", IEEE Transactions on Pattern Analysis and Machine Intelligence, vol. 20, No. 5, May 1998.

V. Ramesh, M. Greiffenhagen, S. Boverie, A. Giratt, Real-Time Surveillance and Monitoring for Automotive Applications, SAE 2000-01-0347.

* cited by examiner

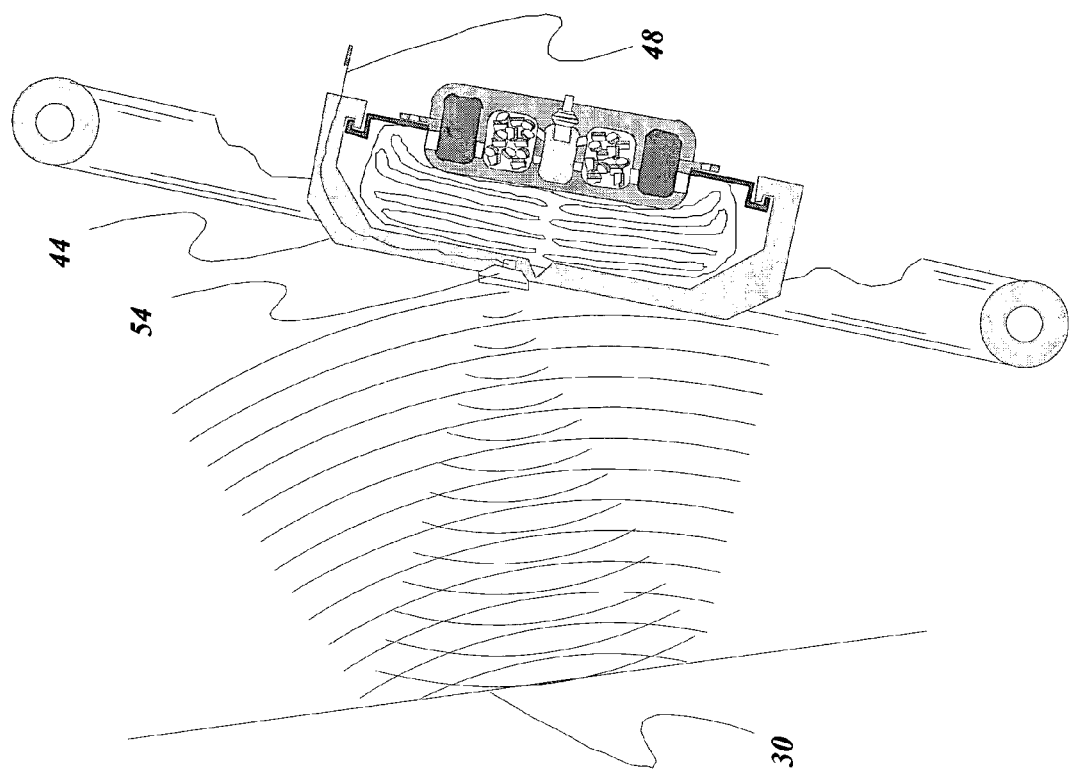

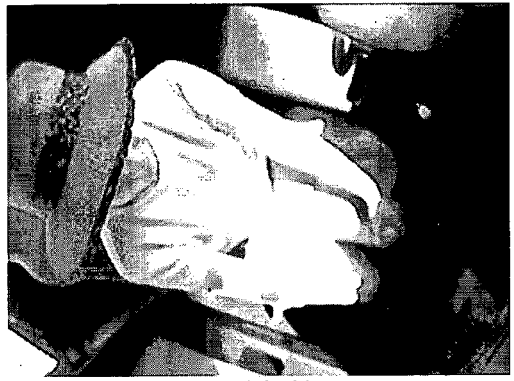
(1) The original image.
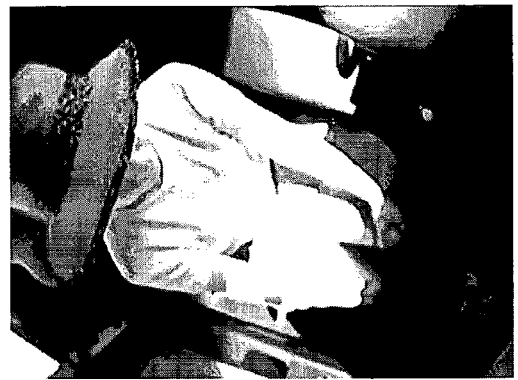
(2) Result from contrast enhancement.
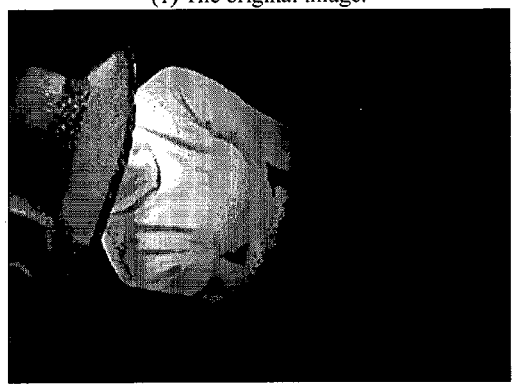
(3) Result from pixel transfer filter.
(4) Result from morphological operator (H-dome) followed by contrast enhancement.
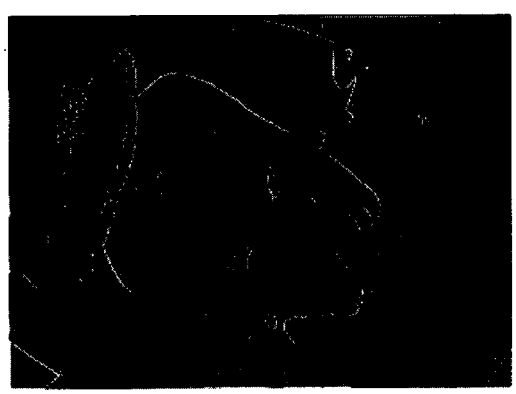
(5) Result from 3×3 Laplacian filter.
(6) Result from 3×3 Gaussian filter followed by max Kirsch filter, binarization, and morphological erosion.
FIG. 41

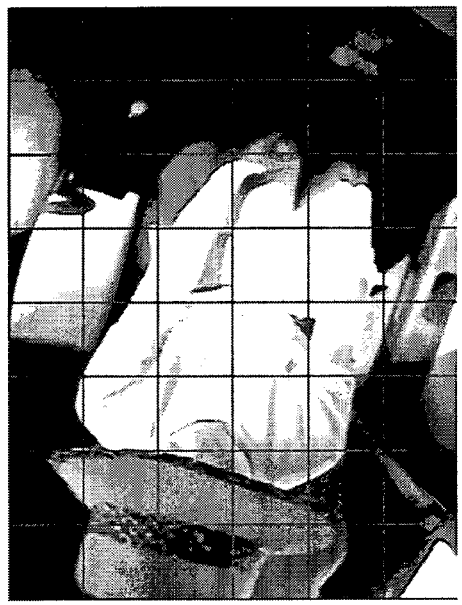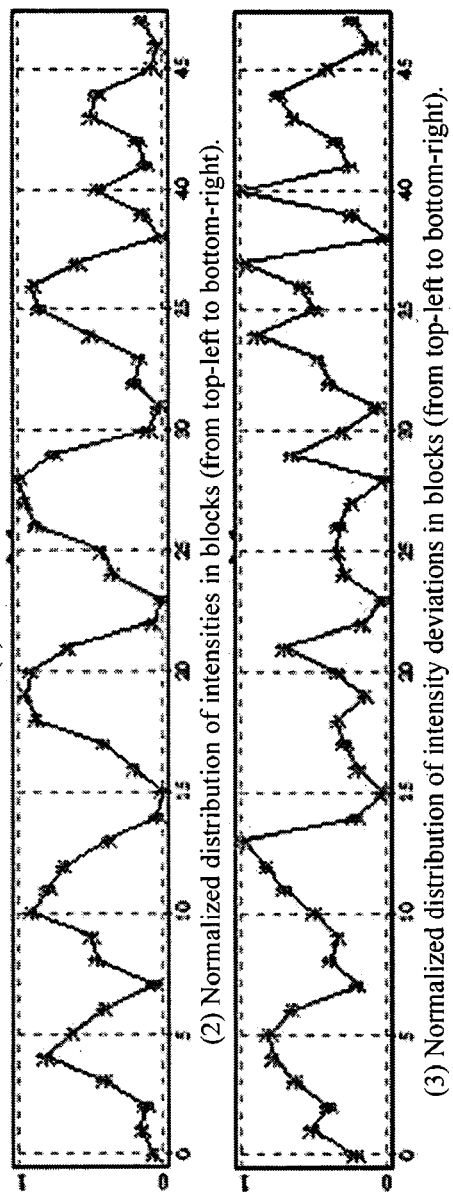
FIG. 45

| Vehicle Configuration | Occupant | Child Restraint | Lighting Condition |
|---|---|---|---|
| •Seat track position<br>•Seatback recline position<br>•Other interior fixture configurations (such console, glove box, seatbelt, etc.) | •Height<br>•Weight<br>•Clothing<br>•Hair and facial hair<br>•Skin tone<br>•Seating position<br>•Personal objects | •NHTSA FMVSS208 approved 11 rear-facing child restraints, 7 forward-facing child restraints, and 4 booster seats. | •Nighttime condition<br>•Sunlight at different time of the day and/or different vehicle orientation<br>•Dome light<br>•Door light<br>•Headlight from other vehicle |

FIG. 46

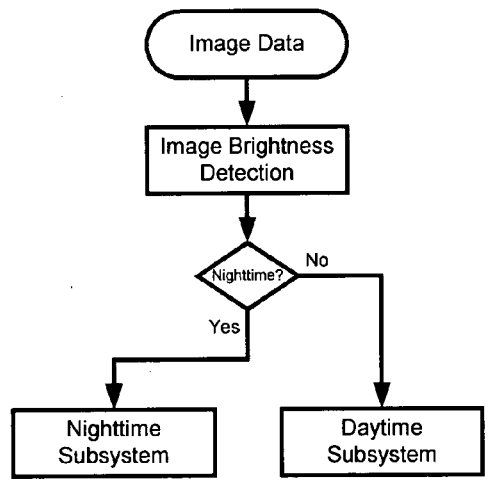

FIG. 47

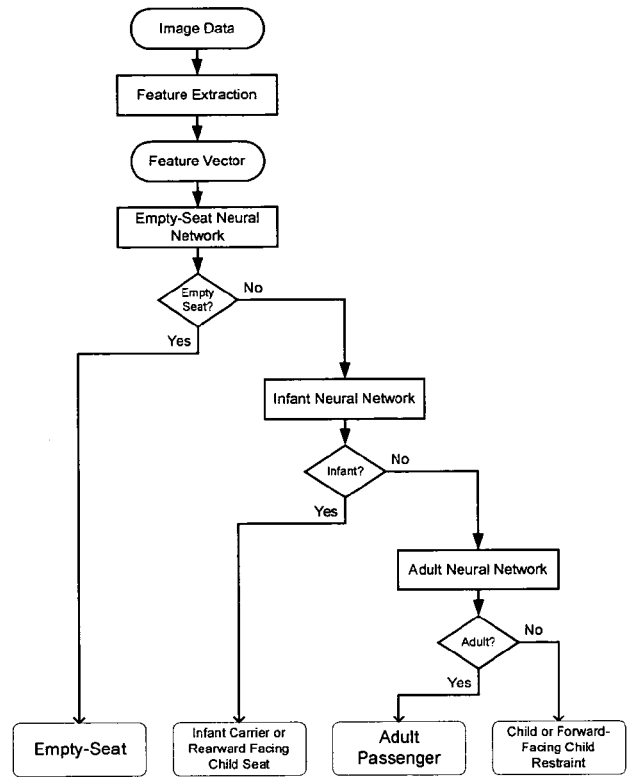
(1) Architecture #1.
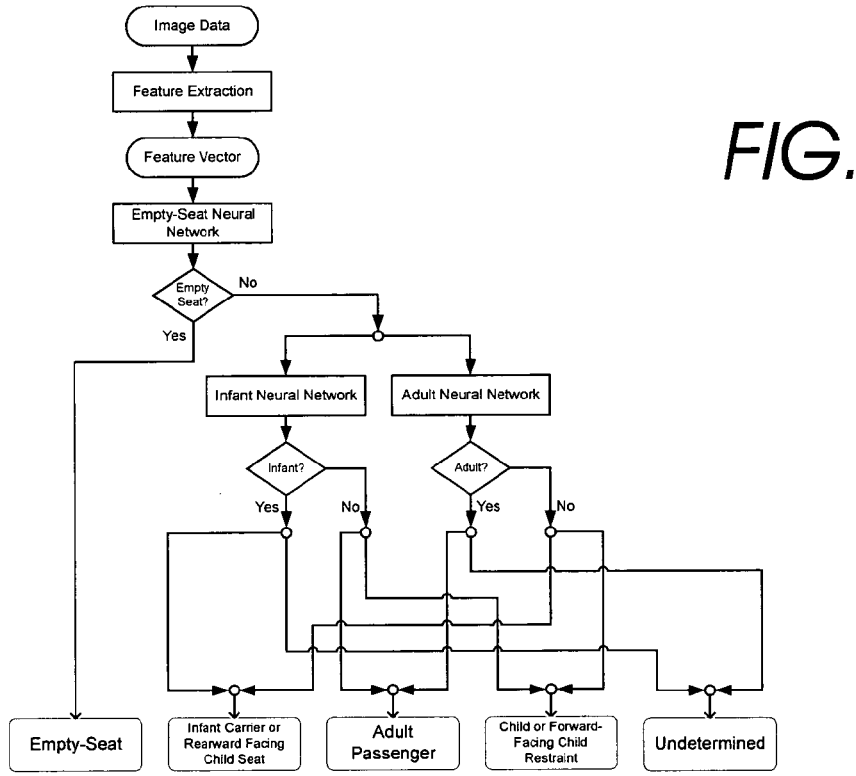
(2) Architecture #2.
FIG. 48

| Empty-Seat State | The system starts from Empty-Seat State, and returns to Empty-Seat State every time when the incoming classification becomes empty-seat. |
|---|---|
| Transition State | The system is allowed to change classification freely in Transition State. |
| Revoking State | Classification change is more restricted in Revoking State. The system is allowed to change classification only if the new classification lasts longer than the old one. |
| Classified State | In classified State, classification change is either prohibited, or allowed only after the new classification has lasted for a very very long time. |

FIG. 52

| Path #1 | The system moves from Empty-Seat State to Transition State if the incoming classification is not empty-seat. The system moves from Transition State to Empty-Seat State if the incoming classification becomes empty-seat. |
|---|---|
| Path #2 | The system moves from Transition State to Revoking State if the incoming classification lasts more than certain amount of time ($T_1$) without toggling. |
| Path #3 | The system moves from Revoking State to Empty-Seat State if the incoming classification becomes empty-seat. |
| Path #4 | The system moves from Revoking State to Classified State if the incoming classification lasts more than certain amount of time ($T_2$) without toggling. Usually $T_2 \gg T_1$. |
| Path #5 | The system moves from Classified State to Empty-Seat State if the incoming classification becomes empty-seat. |

FIG. 53

| Adult | Child and Forward-Facing Child Restraint | Infant Carrier and Rearward-Facing Child Seat | Empty Seat |
|---|---|---|---|
| 37.24% | 21.60% | 35.43% | 5.73% |

FIG. 54

|  |  | Empty-Seat Network | Infant Network | Adult Network |
|---|---|---|---|---|
| Network Name | | R174ES05 | R174RS01 | R174AD02 |
| Network Structure | | 300×3×1 | 300×10×7×1 | 300×15×10×1 |
| Success Rate | Adult | 99.97% | 98.85% | 97.80% |
| | Child & FFCS | 98.50% | 99.47% | 98.57% |
| | Infant Carrier & RFCS | 100% | 99.43% | 98.93% |
| | Empty Seat | 99.98% | 100% † | 99.60% |

FIG. 55

|  |  | Classified As | | | | |
|---|---|---|---|---|---|---|
|  |  | Adult | Child & FFCS | Infant Carrier & RFCS | Empty Seat | Undetermined |
| Target Class | Adult | 96.97% | 1.86% | 0.33% | 0.03% | 0.81% |
| | Child & FFCS | 1.43% | 96.55% | 0.52% | 1.50% | 0% |
| | Infant Carrier & RFCS | 0.17% | 0.40% | 98.53% | 0% | 0.90% |
| | Empty Seat | 0.02% | 0% | 0% | 99.98% | 0% |

FIG. 56

| Adult | Child and Forward-Facing Child Restraint | Infant Carrier and Rearward-Facing Child Seat | Empty Seat |
|---|---|---|---|
| 33.33% | 13.33% | 33.33% | 20.00% |

FIG. 57

|  |  | Empty-Seat Network | Adult Network |
|---|---|---|---|
| Network Name | | R172ES01 | R172CS03 |
| Network Structure | | 340×7×5×1 | 340×20×15×1 |
| Success Rate | Empty Seat | 99.32% | — |
| | Adult | 99.09% | 98.20% |
| | Child & Child Restraint | 99.44% | 99.27% |

FIG. 58

|  |  | Classified As | | |
|---|---|---|---|---|
|  |  | Empty Seat | Adult | Child & Child Restraint |
| Target Class | Empty Seat | 99.32% | 0.67% | 0.01% |
| | Adult | 0.91% | 97.74% | 1.35% |
| | Child & Child Restraint | 0.56% | 0.69% | 98.75% |

FIG. 59

METHOD AND ARRANGEMENT FOR OBTAINING INFORMATION ABOUT VEHICLE OCCUPANTS

CROSS REFERENCE TO RELATED APPLICATIONS

This application is:
1. a continuation-in-part of U.S. patent application Ser. No. 10/116,808 filed Apr. 5, 2002 which is:
   a. a continuation-in-part of U.S. patent application Ser. No. 09/838,919 filed Apr. 20, 2001, now U.S. Pat. No. 6,442,465, which is:
      1) a continuation-in-part of U.S. patent application Ser. No. 09/765,559 filed Jan. 19, 2001, now U.S. Pat. No. 6,553,296, which is a continuation-in-part of U.S. patent application Ser. No. 09/476,255 filed Dec. 30, 1999, now U.S. Pat. No. 6,324,453, which claims priority under 35 U.S.C. §119(e) of U.S. provisional patent application Ser. No. 60/114,507 filed Dec. 31, 1998; and
      2) a continuation-in-part of U.S. patent application Ser. No. 09/389,947 filed Sep. 3, 1999, now U.S. Pat. No. 6,393,133, which is a continuation-in-part of U.S. patent application Ser. No. 09/200,614, filed Nov. 30, 1998, now U.S. Pat. No. 6,141,432, which is a continuation of U.S. patent application Ser. No. 08/474,786 filed Jun. 7, 1995, now U.S. Pat. No. 5,845,000;
   b. a continuation-in-part of U.S. patent application Ser. No. 09/925,043 filed Aug. 8, 2001, now U.S. Pat. No. 6,507,779, which is a continuation-in-part of U.S. patent application Ser. No. 09/765,559 filed Jan. 19, 2001, now U.S. Pat. No. 6,553,296, and a continuation-in-part of U.S. patent application Ser. No. 09/389,947 filed Sep. 3, 1999, now U.S. Pat. No. 6,393,133;
2. a continuation-in-part of U.S. patent application Ser. No. 10/413,426 filed Apr. 14, 2003 which is:
   a. a continuation-in-part of U.S. patent application Ser. No. 10/116,808 filed Apr. 5, 2002, the history of which is set forth above; and
   b. a continuation-in-part of U.S. patent application Ser. No. 10/302,105 filed Nov. 22, 2002, now U.S. Pat. No. 6,772,057, which is a continuation-in-part of U.S. patent application Ser. No. 10/116,808 filed Apr. 5, 2002, the history of which is set forth above;
3. a continuation-in-part of U.S. patent application Ser. No. 10/931,288 filed Aug. 31, 2004, which is:
   a. a continuation-in-part of U.S. patent application Ser. No. 10/413,426 filed Apr. 14, 2003, the history of which is set forth above; and
   b. a continuation-in-part of U.S. patent application Ser. No. 10/116,808 filed Apr. 5, 2002, the history of which is set forth above; and
4. a continuation-in-part of U.S. patent application Ser. No. 10/940,881 filed Sep. 13, 2004 which is:
   a. a continuation-in-part of U.S. patent application Ser. No. 10/931,288 filed Aug. 31, 2004, the history of which is set forth above;
   b. a continuation-in-part of U.S. patent application Ser. No. 10/413,426 filed Apr. 14, 2003, the history of which is set forth above; and
   c. a continuation-in-part of U.S. patent application Ser. No. 10/116,808 filed Apr. 5, 2002, the history of which is set forth above.

All of the above-referenced applications are incorporated by reference herein.

FIELD OF THE INVENTION

The present invention relates generally to methods and arrangements for obtaining information about an occupying item of a seat, in particular, a seat in an automotive vehicle, which information may be used for controlling a vehicular system, subsystem or component.

BACKGROUND OF THE INVENTION

All of the patents, patent applications, technical papers and other references referenced below are incorporated herein by reference in their entirety unless stated otherwise. In additional, extensive disclosure of vehicle occupant sensing is found in U.S. patent application Ser. No. 10/940,881, incorporated by reference herein. Only particularly pertinent background is set forth below.

Optics

Optics can be used in several configurations for monitoring the interior of a passenger compartment or exterior environment of an automobile. In one known method, a laser optical system uses a GaAs infrared laser beam to momentarily illuminate an object, occupant or child seat, in the manner as described and illustrated in FIG. 8 of U.S. Pat. No 5,829,782. The receiver can be a charge-coupled device or CCD or a CMOS imager to receive the reflected light. The laser can either be used in a scanning mode, or, through the use of a lens, a cone of light can be created which covers a large portion of the object. In these configurations, the light can be accurately controlled to only illuminate particular positions of interest within or around the vehicle. In the scanning mode, the receiver need only comprise a single or a few active elements while in the case of the cone of light, an array of active elements is needed. The laser system has one additional significant advantage in that the distance to the illuminated object can be determined as disclosed in U.S. Pat. No. 563,462. When a single receiving element is used, a PIN or avalanche diode is preferred.

In a simpler case, light generated by a non-coherent light emitting diode (LED) device is used to illuminate the desired area. In this case, the area covered is not as accurately controlled and a larger CCD or CMOS array is required. Recently, the cost of CCD and CMOS arrays has dropped substantially with the result that this configuration may now be the most cost-effective system for monitoring the passenger compartment as long as the distance from the transmitter to the objects is not needed. If this distance is required, then the laser system, a stereographic system, a focusing system, a combined ultrasonic and optic system, or a multiple CCD or CMOS array system as described herein is required. Alternately, a modulation system such as used with the laser distance system can be used with a CCD or CMOS camera and distance determined on a pixel by pixel basis.

The optical systems described herein are also applicable for many other sensing applications both inside and outside of the vehicle compartment such as for sensing crashes before they occur as described in U.S. Pat. No. 5,829,782, for a smart headlight adjustment system and for a blind spot monitor (also disclosed in U.S. patent application Ser. No. 09/851,362).

Ultrasonics and Optics

The laser systems described above are expensive due to the requirement that they be modulated at a high frequency if the distance from the airbag to the occupant, for example, is to be measured. Alternately, modulation of another light source, such as an LED, can be done and the distance measurement accomplished using a CCD or CMOS array on a pixel by pixel basis, as discussed below.

Both laser and non-laser optical systems in general are good at determining the location of objects within the two-dimensional plane of the image and a pulsed laser radar system in the scanning mode can determine the distance of each part of the image from the receiver by measuring the time of flight such as through range gating techniques. Distance can also be determined by using modulated electromagnetic radiation and measuring the phase difference between the transmitted and received waves. It is also possible to determine distance with a non-laser system by focusing, or stereographically if two spaced-apart receivers are used and, in some cases, the mere location in the field of view can be used to estimate the position relative to the airbag, for example. Finally, a recently developed pulsed quantum well diode laser also provides inexpensive distance measurements as discussed in U.S. Pat. No. 6,324,453.

Acoustic systems are additionally quite effective at distance measurements since the relatively low speed of sound permits simple electronic circuits to be designed and minimal microprocessor capability is required. If a coordinate system is used where the z-axis is from the transducer to the occupant, acoustics are good at measuring z dimensions while simple optical systems using a single CCD or CMOS arrays are good at measuring x and y dimensions. The combination of acoustics and optics, therefore, permits all three measurements to be made from one location with low cost components as discussed in commonly assigned U.S. Pat. No. 5,845,000 and U.S. Pat. No. 5,835,613, One example of a system using these ideas is an optical system which floods the passenger seat with infrared light coupled with a lens and a receiver array, e.g., CCD or CMOS array, which receives and displays the reflected light and an analog to digital converter (ADC) which digitizes the output of the CCD or CMOS and feeds it to an Artificial Neural Network (ANN) or other pattern recognition system for analysis. This system uses an ultrasonic transmitter and receiver for measuring the distances to the objects located in the passenger seat. The receiving transducer feeds its data into an ADC and from there, the converted data is directed into the ANN. The same ANN can be used for both systems thereby providing full three-dimensional data for the ANN to analyze. This system, using low cost components, will permit accurate identification and distance measurements not possible by either system acting alone. If a phased array system is added to the acoustic part of the system, the optical part can determine the location of the driver's ears, for example, and the phased array can direct a narrow beam to the location and determine the distance to the occupant's ears.

Adaptation

The adaptation of an occupant sensor system to a vehicle is the subject of a great deal of research and its own extensive body of knowledge as will be disclosed below. There is not believed to be any significant prior art in the field with the possible exception of the descriptions of sensor fusion methods in the Corrado et al. patents discussed above.

Mounting Locations for and Quantity of Transducers

There is little in the literature discussed herein concerning the mounting of cameras or other imagers or transducers in the vehicle other than in the current assignee's patents referenced above. Where camera mounting is mentioned, the general locations chosen are the instrument panel, roof or headliner, A-Pillar or rear view mirror assembly. Virtually no discussion is provided as to the methodology for choosing a particular location except in the current assignee's patents.

Single Camera, Dual Camera with Single Light Source

Farmer et al. (U.S. Pat. No. 6,005,958) describes a method and system for detecting the type and position of a vehicle occupant utilizing a single camera unit. The single camera unit is positioned at the driver or passenger side A-pillar in order to generate data of the front seating area of the vehicle. The type and position of the occupant is used to optimize the efficiency and safety in controlling deployment of an occupant protection device such as an air bag.

A single camera is, naturally, the least expensive solution but suffers from the problem that there is no easy method of obtaining three-dimensional information about people or objects in the passenger compartment. A second camera can be added, but to locate the same objects or features in the two images by conventional methods is computationally intensive unless the two cameras are close together. If they are close together, however, then the accuracy of the three dimensional information is compromised. Also, if they are not close together, then the tendency is to add separate illumination for each camera. An alternate solution is to use two cameras located at different positions in the passenger compartment and a single lighting source. This source can be located adjacent to one camera to minimize the installation sites. Since the LED illumination is now more expensive than the imager, the cost of the second camera does not add significantly to the system cost. The correlation of features can then be done using pattern recognition systems such as neural networks.

Two cameras also provide a significant protection from blockage and one or more additional cameras, with additional illumination, can be added to provide almost complete blockage protection.

Location of the Transducers

The only prior art for occupant sensor location for airbag control is White et al. and Mattes et al. discussed above. Both place their sensors below or on the instrument panel. The first disclosure of the use of cameras for occupant sensing is believed to appear in the current assignee's above-referenced patents. The first disclosure of the location of a camera anywhere and especially above the instrument panel such as on the A-pillar, roof or rear view mirror assembly also is believed to appear in the current assignee's above-referenced patents.

Corrado U.S. Pat. No. 6,318,697 discloses the placement of a camera onto a special type of rear view mirror. DeLine U.S. Pat. No. 6,124,886 also discloses the placement of a video camera on a rear view mirror for sending pictures using visible light over a cell phone. The general concept of placement of such a transducer on a mirror, among other places, is believed to have been first disclosed in commonly assigned U.S. RE 37,736 which also first discloses the use of an IR camera and IR illumination that is either co-located or located separately from the camera.

3D Cameras

Stereo

European Patent Application No. EP0885782A1 describes a purportedly novel motor vehicle control system including a pair of cameras which operatively produce first and second images of a passenger area. A distance processor determines the distances that a plurality of features in the first and second images are from the cameras based on the amount that each feature is shifted between the first and second images. An analyzer processes the determined distances and determines the size of an object on the seat. Additional analysis of the distance also may determine movement of the object and the rate of movement. The distance information also can be used to recognize predefined patterns in the images and thus identify objects. An air bag controller utilizes the determined object characteristics in controlling deployment of the air bag.

Simoncelli in U.S. Pat. No. 5,703,677 discloses an apparatus and method using a single lens and single camera with a pair of masks to obtain three-dimensional information about a scene.

A paper entitled "Sensing Automobile Occupant Position with Optical Triangulation" by W. Chappelle, Sensors, December 1995, describes the use of optical triangulation techniques for determining the presence and position of people or rear-facing infant seats in the passenger compartment of a vehicle in order to guarantee the safe deployment of an air bag. The paper describes a system called the "Takata Safety Shield" which purportedly makes high-speed distance measurements from the point of air bag deployment using a modulated infrared beam projected from an LED source. Two detectors are provided, each consisting of an imaging lens and a position-sensing detector.

A paper entitled "An Interior Compartment Protection System based on Motion Detection Using CMOS Imagers" by S. B. Park et al., 1998 IEEE International Conference on Intelligent Vehicles, describes a purportedly novel image processing system based on a CMOS image sensor installed at the car roof for interior compartment monitoring including theft prevention and object recognition. One disclosed camera system is based on a CMOS image sensor and a near infrared NIR) light emitting diode (LED) array.

Krumm (U.S. Pat. No. 5,983,147) describes a system for determining the occupancy of a passenger compartment including a pair of cameras mounted so as to obtain binocular stereo images of the same location in the passenger compartment. A representation of the output from the cameras is compared to stored representations of known occupants and occupancy situations to determine which stored representation the output from the cameras most closely approximates. The stored representations include that of the presence or absence of a person or an infant seat in the front passenger seat.

The use of stereo systems for occupant sensing was first described by the current assignee in RE 37,736, U.S. Pat. No. 5,845,000, U.S. Pat. No. 5,835,613, U.S. Pat. No. 6,186,537, and U.S. Pat. No. 5,848,802 among others.

Distance by Focusing

A mechanical focusing system, such as used on some camera systems, can determine the initial position of an occupant but is currently too slow to monitor his/her position during a crash or even during pre-crash braking. Although the example of an occupant is used here as an example, the same or similar principles apply to objects exterior to the vehicle. This is a result of the mechanical motions required to operate the lens focusing system, however, methods do exist that do not require mechanical motions. By itself, it cannot determine the presence of a rear facing child seat or of an occupant but when used with a charge-coupled or CMOS device plus some infrared illumination for vision at night, and an appropriate pattern recognition system, this becomes possible. Similarly, the use of three-dimensional cameras based on modulated waves or range-gated pulsed light methods combined with pattern recognition systems are now possible based on the teachings of the inventions disclosed herein and the commonly assigned patents and patent applications referenced above.

U.S. Pat. No. 6,198,998 to Farmer discloses a single IR camera mounted on the A-Pillar where a side view of the contents of the passenger compartment can be obtained. A sort of three-dimensional view is obtained by using a narrow depth of focus lens and a de-blurring filter. IR is used to illuminate the volume and the use of a pattern on the LED to create a sort of structured light is also disclosed. Pattern recognition by correlation is also discussed.

U.S. Pat. No. 6,229,134 to Nayar et al. is an excellent example of the determination of the three-dimensional shape of an object using active blurring and focusing methods. The use of structured light is also disclosed in this patent. The method uses illumination of the scene with a pattern and two images of the scene are sensed with different imaging parameters.

A distance measuring system based on focusing is described in U.S. Pat. No. 5,193,124 and U.S. Pat. No. 5,231,443 (Subbarao) that either be used with a mechanical focusing system or with two cameras, the latter of which would be fast enough to allow tracking of an occupant during pre-crash braking and perhaps even during a crash depending on the field of view that is analyzed. Although the Subbarao patents provide a good discussion of the camera focusing art, it is a more complicated system than is needed for practicing the instant inventions. In fact, a neural network can also be trained to perform the distance determination based on the two images taken with different camera settings or from two adjacent CCD's and lens having different properties as the cameras disclosed in Subbarao making this technique practical for the purposes herein. Distance can also be determined by the system disclosed in U.S. Pat. No. 5,003,166 (Girod) by spreading or defocusing a pattern of structured light projected onto the object of interest. Distance can also be measured by using time of flight measurements of the electromagnetic waves or by multiple CCD or CMOS arrays as is a principle teaching of at least one of the inventions disclosed herein.

Dowski, Jr. in U.S. Pat. No. 5,227,890 provides an automatic focusing system for video cameras which can be used to determine distance and thus enable the creation of a three-dimensional image.

A good description of a camera focusing system is found in G. Zorpette, "Focusing in a flash", Scientific American, August 2000.

In each of these cases, regardless of the distance measurement system used, a trained pattern recognition system, as defined above, can be used to identify and classify, and in some cases to locate, the illuminated object and its constituent parts.

Illumination

Infrared light

In a passive infrared system, as described in Corrado referenced above, for example, a detector receives infrared radiation from an object in its field of view, in this case the vehicle occupant, and determines the presence and temperature of the occupant based on the infrared radiation. The occupant sensor system can then respond to the temperature of the occupant, which can either be a child in a rear facing child seat or a normally seated occupant, to control some other system. This technology could provide input data to a pattern recognition system but it has limitations related to temperature.

The sensing of the child could pose a problem if the child is covered with blankets, depending on the IR frequency used. It also might not be possible to differentiate between a rear facing child seat and a forward facing child seat. In all cases, the technology can fail to detect the occupant if the ambient temperature reaches body temperature as it does in hot climates. Nevertheless, for use in the control of the vehicle climate, for example, a passive infrared system that permits an accurate measurement of each occupant's temperature is useful. Prior art systems are mostly limited to single pixel devices. Use of an IR imager removes many of the problems listed above and is believed to be novel to the inventions disclosed herein.

In a laser optical system, an infrared laser beam is used to momentarily illuminate an object, occupant or child seat in the manner as described, and illustrated in FIG. 8, of Breed et al. (U.S. Pat. No. 5,653,462). In some cases, a CCD or a CMOS device is used to receive the reflected light. In other cases, when a scanning laser is used, a pin or avalanche diode or other photo detector can be used. The laser can either be used in a scanning mode, or, through the use of a lens, a cone of light, swept line of light, or a pattern or structured light can be created which covers a large portion of the object. Additionally, one or more LEDs can be used as a light source. Also, triangulation can be used in conjunction with an offset scanning laser to determine the range of the illuminated spot from the light detector. Various focusing systems also can have applicability in some implementations to measure the distance to an occupant. In most cases, a pattern recognition system, as defined herein, is used to identify, ascertain the identity of and classify, and can be used to locate, and determine the position of, the illuminated object and/or its constituent parts.

Optical systems generally provide the most information about the object and at a rapid data rate. Their main drawback is cost which is usually above that of ultrasonic or passive infrared systems. As the cost of lasers and imagers has now come down, this system is now competitive. Depending on the implementation of the system, there may be some concern for the safety of the occupant if a laser light can enter the occupant's eyes. This is minimized if the laser operates in the infrared spectrum particularly at the "eye-safe" frequencies.

Another important feature is that the brightness of the point of light from the laser, if it is in the infrared part of the spectrum and if a filter is used on the receiving detector, can overpower the reflected sun's rays with the result that the same classification algorithms can be made to work both at night and under bright sunlight in a convertible. An alternative approach is to use different algorithms for different lighting conditions.

Although active and passive infrared light has been disclosed in the prior art, the use of a scanning laser, modulated light, filters, trainable pattern recognition etc. is believed to have been first disclosed by the current assignee in the above-referenced patents.

Structured Light

U.S. Pat. No. 5,003,166 provides an excellent treatise on the use of structured light for range mapping of objects in general. It does not apply this technique for automotive applications and in particular for occupant sensing or monitoring inside or outside of a vehicle. The use of structured light in the automotive environment and particularly for sensing occupants is believed to have been first disclosed by the current assignee in the above-referenced patents.

U.S. Pat. No. 6,049,757 to Nakajima et al. describes structured light in the form of bright spots that illuminate the face of the driver to determine the inclination of the face and to issue a warning if the inclination is indicative of a dangerous situation. In the current assignee's patents, structured light is disclosed to obtain a determination of the location of an occupant and/or his or her parts. This includes the position of any part of the occupant including the occupant's face and thus the invention of this patent is believed to be anticipated by the current assignee's patents referenced above.

U.S. Pat. No. 6,298,311 to Griffin et al. repeats much of the teachings of the early patents of the current assignee. A plurality of IR beams are modulated and directed in the vicinity of the passenger seat and used through a photosensitive receiver to detect the presence and location of an object in the passenger seat, although the particular pattern recognition system is not disclosed. The pattern of IR beams used in this patent is a form of structured light.

Structured light is also discussed in numerous technical papers for other purposes than vehicle interior or exterior monitoring including: (1) "3D Shape Recovery and Registration Based on the Projection of Non-Coherent Structured Light" by Roberto Rodella and Giovanna Sansoni, INFM and Dept. of Electronics for the Automation, University of Brescia, Via Branze 38, 1-25123 Brescia-Italy; (2) "A Low-Cost Range Finder using a Visually Located, Structured Light Source", R. B. Fisher, A. P. Ashbrook, C. Robertson, N. Werghi, Division of Informatics, Edinburgh University, 5 Forrest Hill, Edinburgh EH1 2QL; (3) F. Lerasle, J. Lequellec, M Devy, "Relaxation vs. Maximal Cliques Search for Projected Beams Labeling in a Structured Light Sensor", Proceedings of the International Conference on Pattern Recognition, 2000 IEEE; and (4) D. Caspi, N. Kiryati, and J. Shamir, "Range Imaging With Adaptive Color Structured Light", IEEE Transactions on Pattern Analysis and Machine Intelligence, Vol. 20, No. 5, May 1998.

Recently, a paper has been published that describes a structured light camera system disclosed years ago by the current assignee: V. Ramesh, M. Greiffenhagen, S. Boverie, A. Giratt, "Real-Time Surveillance and Monitoring for Automotive Applications", SAE 2000-01-0347.

Definitions

Preferred embodiments of the invention are described below and unless specifically noted, it is the applicants' intention that the words and phrases in the specification and claims be given the ordinary and accustomed meaning to those of ordinary skill in the applicable art(s). If the applicants intend any other meaning, they will specifically state they are applying a special meaning to a word or phrase.

Likewise, applicants' use of the word "function" here is not intended to indicate that the applicants seek to invoke the special provisions of 35 U.S.C. §112, sixth paragraph, to define their invention. To the contrary, if applicants wish to invoke the provisions of 35 U.S.C. § 112, sixth paragraph, to define their invention, they will specifically set forth in the claims the phrases "means for" or "step for" and a function, without also reciting in that phrase any structure, material or act in support of the function. Moreover, even if applicants invoke the provisions of 35 U.S.C. §112, sixth paragraph, to define their invention, it is the applicants' intention that their inventions not be limited to the specific structure, material or acts that are described in the preferred embodiments herein. Rather, if applicants claim their inventions by specifically invoking the provisions of 35 U.S.C. § 112, sixth paragraph, it is nonetheless their intention to cover and include any and all structure, materials or acts that perform the claimed function, along with any and all known or later developed equivalent structures, materials or acts for performing the claimed function.

"Pattern recognition" as used herein will generally mean any system which processes a signal that is generated by an object (e.g., representative of a pattern of returned or received impulses, waves or other physical property specific to and/or characteristic of and/or representative of that object) or is modified by interacting with an object, in order to determine to which one of a set of classes that the object belongs. Such a system might determine only that the object is or is not a member of one specified class, or it might attempt to assign the object to one of a larger set of specified classes, or find that it is not a member of any of the classes in the set. The signals processed are generally a series of electrical signals coming from transducers that are sensitive to acoustic (ultrasonic) or electromagnetic radiation (e.g., visible light, infrared radiation, capacitance or electric and/or magnetic fields), although other sources of information are frequently included. Pattern recognition systems generally involve the creation of a set of rules that permit the pattern to be recognized. These rules can be created by fuzzy logic systems, statistical correlations, or through sensor fusion methodologies as well as by trained pattern recognition systems such as neural networks, combination neural networks, cellular neural networks or support vector machines.

A trainable or a trained pattern recognition system as used herein generally means a pattern recognition system that is taught to recognize various patterns constituted within the signals by subjecting the system to a variety of examples. The most successful such system is the neural network used either singly or as a combination of neural networks. Thus, to generate the pattern recognition algorithm, test data is first obtained which constitutes a plurality of sets of returned waves, or wave patterns, or other information radiated or obtained from an object (or from the space in which the object will be situated in the passenger compartment, i.e., the space above the seat) and an indication of the identify of that object. A number of different objects are tested to obtain the unique patterns from each object. As such, the algorithm is generated, and stored in a computer processor, and which can later be applied to provide the identity of an object based on the wave pattern being received during use by a receiver connected to the processor and other information. For the purposes here, the identity of an object sometimes applies to not only the object itself but also to its location and/or orientation in the passenger compartment. For example, a rear facing child seat is a different object than a forward facing child seat and an out-of-position adult can be a different object than a normally seated adult. Not all pattern recognition systems are trained systems and not all trained systems are neural networks. Other pattern recognition systems are based on fuzzy logic, sensor fusion, Kalman filters, correlation as well as linear and non-linear regression. Still other pattern recognition systems are hybrids of more than one system such as neural-fuzzy systems.

The use of pattern recognition, or more particularly how it is used, is important to many embodiments of the instant invention. In the above-cited prior art, except that assigned to the current assignee, pattern recognition which is based on training, as exemplified through the use of neural networks, is not mentioned for use in monitoring the interior passenger compartment or exterior environments of the vehicle in all of the aspects of the invention disclosed herein. Thus, the methods used to adapt such systems to a vehicle are also not mentioned.

A pattern recognition algorithm will thus generally mean an algorithm applying or obtained using any type of pattern recognition system, e.g., a neural network, sensor fusion, fuzzy logic, etc.

To "identify" as used herein will generally mean to determine that the object belongs to a particular set or class. The class may be one containing, for example, all rear facing child seats, one containing all human occupants, or all human occupants not sitting in a rear facing child seat, or all humans in a certain height or weight range depending on the purpose of the system. In the case where a particular person is to be recognized, the set or class will contain only a single element, i.e., the person to be recognized.

To "ascertain the identity of" as used herein with reference to an object will generally mean to determine the type or nature of the object (obtain information as to what the object is), i.e., that the object is an adult, an occupied rear facing child seat, an occupied front facing child seat, an unoccupied rear facing child seat, an unoccupied front facing child seat, a child, a dog, a bag of groceries, a car, a truck, a tree, a pedestrian, a deer etc.

An "object" in a vehicle or an "occupying item" of a seat may be a living occupant such as a human or a dog, another living organism such as a plant, or an inanimate object such as a box or bag of groceries or an empty child seat.

A "rear seat" of a vehicle as used herein will generally mean any seat behind the front seat on which a driver sits. Thus, in minivans or other large vehicles where there are more than two rows of seats, each row of seats behind the driver is considered a rear seat and thus there may be more than one "rear seat" in such vehicles. The space behind the front seat includes any number of such rear seats as well as any trunk spaces or other rear areas such as are present in station wagons.

An "optical image" will generally mean any type of image obtained using electromagnetic radiation including X-ray, ultraviolet, visual, infrared, terahertz and radar radiation.

In the description herein on anticipatory sensing, the term "approaching" when used in connection with the mention of an object or vehicle approaching another will usually mean the relative motion of the object toward the vehicle having the anticipatory sensor system. Thus, in a side impact with a tree, the tree will be considered as approaching the side of the vehicle and impacting the vehicle. In other words, the coordinate system used in general will be a coordinate system residing in the target vehicle. The "target" vehicle is the vehicle that is being impacted. This convention permits a general description to cover all of the cases such as where (i) a moving vehicle impacts into the side of a stationary vehicle, (ii) where both vehicles are moving when they impact, or (iii) where a vehicle is moving sideways into a stationary vehicle, tree or wall.

"Vehicle" as used herein includes any container that is movable either under its own power or using power from another vehicle. It includes, but is not limited to, automobiles, trucks, railroad cars, ships, airplanes, trailers, shipping containers, barges, etc. The term "container" will frequently be used interchangeably with vehicle however a container will generally mean that part of a vehicle that separate from and in some cases may exist separately and away from the source of motive power. Thus, a shipping container may exist in a shipping yard and a trailer may be parked in a parking lot without the tractor. The passenger compartment or a trunk of an automobile, on the other hand, are compartments of a container that generally only exists attaches to the vehicle chassis that also has an associated engine for moving the vehicle. Note, a container can have one or a plurality of compartments.

"Out-of-position" as used for an occupant will generally mean that the occupant, either the driver or a passenger, is sufficiently close to an occupant protection apparatus (airbag) prior to deployment that he or she is likely to be more seriously injured by the deployment event itself than by the accident. It may also mean that the occupant is not positioned appropriately in order to attain the beneficial, restraining effects of the deployment of the airbag. As for the occupant being too close to the airbag, this typically occurs when the occupant's head or chest is closer than some distance, such as about 5 inches, from the deployment door of the airbag module. The actual distance where airbag deployment should be suppressed depends on the design of the airbag module and is typically farther for the passenger airbag than for the driver airbag.

"Dynamic out-of-position" refers to the situation where a vehicle occupant, either driver or passenger, is in position at a point in time prior to an accident but becomes out-of-position, (that is, too close to the airbag module so that he or she could be injured or killed by the deployment of the airbag) prior to the deployment of the airbag due to pre-crash braking or other action which causes the vehicle to decelerate prior to a crash.

"Transducer" or "transceiver" as used herein will generally mean the combination of a transmitter and a receiver. In come cases, the same device will serve both as the transmitter and receiver while in others two separate devices adjacent to each other will be used. In some cases, a transmitter is not used and in such cases transducer will mean only a receiver. Transducers include, for example, capacitive, inductive, ultrasonic, electromagnetic (antenna, CCD, CMOS arrays), electric field, weight measuring or sensing devices. In some cases, a transducer will be a single pixel either acting alone, in a linear or an array of some other appropriate shape. In some cases, a transducer may comprise two parts such as the plates of a capacitor or the antennas of an electric field sensor. Sometimes, one antenna or plate will communicate with several other antennas or plates and thus for the purposes herein, a transducer will be broadly defined to refer, in most cases, to any one of the plates of a capacitor or antennas of a field sensor and in some other cases, a pair of such plates or antennas will comprise a transducer as determined by the context in which the term is used.

"Adaptation" as used here will generally represent the method by which a particular occupant or object sensing system is designed and arranged for a particular vehicle model. It includes such things as the process by which the number, kind and location of various transducers are determined. For pattern recognition systems, it includes the process by which the pattern recognition system is designed and then taught or made to recognize the desired patterns. In this connection, it will usually include (1) the method of training when training is used, (2) the makeup of the databases used, testing and validating the particular system, or, in the case of a neural network, the particular network architecture chosen, (3) the process by which environmental influences are incorporated into the system, and (4) any process for determining the pre-processing of the data or the post processing of the results of the pattern recognition system. The above list is illustrative and not exhaustive. Basically, adaptation includes all of the steps that are undertaken to adapt transducers and other sources of information to a particular vehicle to create the system that accurately identifies and/or determines the location of an occupant or other object in a vehicle.

For the purposes herein, a "neural network" is defined to include all such learning systems including cellular neural networks, support vector machines and other kernel-based learning systems and methods, cellular automata and all other pattern recognition methods and systems that learn. A "combination neural network" as used herein will generally apply to any combination of two or more neural networks as most broadly defined that are either connected together or that analyze all or a portion of the input data. "Neural network" can also be defined as a system wherein the data to be processed is separated into discrete values which are then operated on and combined in at least a two-stage process and where the operation performed on the data at each stage is in general different for each of the discrete values and where the operation performed is at least determined through a training process. The operation performed is typically a multiplication by a particular coefficient or weight and by different operation, therefore is meant in this example, that a different weight is used for each discrete value.

A "morphological characteristic" will generally mean any measurable property of a human such as height, weight, leg or arm length, head diameter, skin color or pattern, blood vessel pattern, voice pattern, finger prints, iris patterns, etc.

A "wave sensor" or "wave transducer" is generally any device which senses either ultrasonic or electromagnetic waves. An electromagnetic wave sensor, for example, includes devices that sense any portion of the electromagnetic spectrum from ultraviolet down to a few hertz. The most commonly used kinds of electromagnetic wave sensors include CCD and CMOS arrays for sensing visible and/or infrared waves, millimeter wave and microwave radar, and capacitive or electric and/or magnetic field monitoring sensors that rely on the dielectric constant of the object occupying a space but also rely on the time variation of the field, expressed by waves as defined below, to determine a change in state.

A "CCD" will be generally defined to include all devices, including CMOS arrays, APS arrays, focal plane arrays, QWIP arrays or equivalent, artificial retinas and particularly HDRC arrays, which are capable of converting light frequencies, including infrared, visible and ultraviolet, into electrical signals. The particular CCD array used for many of the applications disclosed herein is implemented on a single chip that is less than two centimeters on a side. Data from the CCD array is digitized and sent serially to an electronic circuit containing a microprocessor for analysis of the digitized data. In order to minimize the amount of data that needs to be stored, initial processing of the image data takes place as it is being received from the CCD array, as discussed in more detail elsewhere herein. In some cases, some image processing can take place on the chip such as described in the Kage et al. artificial retina article referenced above.

The "windshield header" as used herein generally includes the space above the front windshield including the first few inches of the roof.

A "sensor" as used herein can be a single receiver or the combination of two transducers (a transmitter and a receiver) or one transducer which can both transmit and receive.

The "headliner" is the trim which provides the interior surface to the roof of the vehicle and the A-pillar is the roof-supporting member which is on either side of the windshield and on which the front doors are hinged.

An "occupant protection apparatus" is any device, apparatus, system or component which is actuatable or deployable or includes a component which is actuatable or deployable for the purpose of attempting to reduce injury to the occupant in the event of a crash, rollover or other potential injurious event involving a vehicle.

As used herein, a diagnosis of the "state of the vehicle" generally means a diagnosis of the condition of the vehicle with respect to its stability and proper running and operating condition. Thus, the state of the vehicle could be normal when the vehicle is operating properly on a highway or abnormal when, for example, the vehicle is experiencing excessive angular inclination (e.g., two wheels are off the ground and the vehicle is about to rollover), the vehicle is experiencing a crash, the vehicle is skidding, and other similar situations. A diagnosis of the state of the vehicle could also be an indication that one of the parts of the vehicle, e.g., a component, system or subsystem, is operating abnormally.

As used herein, an "occupant restraint device" generally includes any type of device which is deployable in the event of a crash involving the vehicle for the purpose of protecting an occupant from the effects of the crash and/or minimizing the potential injury to the occupant. Occupant restraint devices thus include frontal airbags, side airbags, seatbelt tensioners, knee bolsters, side curtain airbags, externally deployable airbags and the like.

As used herein, a "part" of the vehicle generally includes any component, sensor, system or subsystem of the vehicle such as the steering system, braking system, throttle system, navigation system, airbag system, seatbelt retractor, air bag inflation valve, air bag inflation controller and airbag vent valve, as well as those listed below in the definitions of "component" and "sensor".

As used herein, a "sensor system" generally includes any of the sensors listed below in the definition of "sensor" as well as any type of component or assembly of components which detect, sense or measure something.

The term "gage" or "gauge" is used herein interchangeably with the terms "sensor" and "sensing device".

OBJECTS AND SUMMARY OF THE INVENTION

It is an object of the present invention to provide new and improved are methods and arrangements for obtaining information about an object in a vehicle. This determination is used in various methods and arrangements for, for example, controlling occupant protection devices in the event of a vehicle crash and/or adjusting various vehicle components.

It is a further object of the invention to use structured light in the methods and arrangements of the type described above and in particular to determine the distance to an object from a transducer.

In order to achieve these objects and others, a method for obtaining information about a vehicle occupant in a compartment of the vehicle in accordance with the invention comprises mounting a light source in the vehicle, projecting structured light into an area of interest in the compartment, rays of light forming the structured light originating from the light source, detecting reflected light at an image sensor at a position different than the position from which the structured light is projected, and analyzing the reflected light relative to the projected structured light to obtain information about the area of interest. Although the rays of light ultimately originate from the source of light, the structured light is designed to appear as if it comes from a source of light (virtual or actual) which is at a position different than the position of the image sensor. Thus, either the light source is spaced apart from the image sensor or when the light source and image sensor are collocated, a mechanism is employed to create the appearance of a virtual light source different than the actual light source and which is spaced apart from the light source and image sensor. When the image sensor is at a different position than the light source, they can be arranged such that a line between the image sensor and the area of interest is at an angle of about 20° to about 45° to a line between the location from which the structured light is projected and the area of interest.

The light source may be mounted in a dashboard, instrument panel or ceiling of the vehicle. A pattern, e.g., a pattern of dots of light spaced apart from one another, lines spaced apart from one another to create alternatingly black and white lines, etc., may be imposed in the projected structured light.

In some methods, at least one structured light pattern is projected from the light source into the area of interest in the compartment and the light pattern is modified to create a virtual light source different than the light source. The structured light pattern may be created by interposing a first filter in front of the actual light source and arranging a second filter similar to the first filter between the area of interest and the image sensor.

Analysis of the reflected light relative to the transmitted light may entail determining a distance between the light source and at least a part of an object occupying at least a part of the area of interest.

The structured light may be formed by polarizing the rays of light from the light source so that different parts of the area of interest are illuminated with light having different polarization.

In addition, the structured light can be formed by imposing spatial patterns on the rays of light from the light source such that the time domain is used to identify particular transmission angles with particular reflections.

An arrangement for obtaining information about an occupant in a compartment in a vehicle includes a light source for generating structured light which is directed into an area of interest in the compartment, an image sensor for detecting reflected light from the area of interest, the image sensor being arranged at a position different than the position from which the structured light is projected, and analysis means for analyzing the reflected light relative to the projected structured light to obtain information about the area of interest. The same enhancements to the method described above can be applied to the arrangement in accordance with the invention. For example, a mechanism can be provided to modify rays of light generated by said light source to cause a projection of structured light into the area of interest in the compartment. This mechanism may be a first filter interposed in front of said light source and optionally a second filter similar to said first filter arranged between the area of interest and said image sensor. Alternatively, the mechanism may be design to polarize the rays of light from said light source so that different parts of the area of interest are illuminated with light having different polarization, or be designed to impose spatial patterns on the rays of light from said light source such that the time domain is used to identify particular transmission angles with particular reflections.

An arrangement for obtaining information about a vehicle occupant within the vehicle in accordance with the invention comprises a transmission unit for transmitting a structured pattern of light, e.g., polarized light, a geometric pattern of dots, lines etc., into a portion of the passenger compartment in which the occupant is likely to be situated, an array arranged to receive an image of the portion of the passenger compartment, and a processor coupled to the array for analyzing the image of the portion of the passenger compartment to obtain information about the occupant. The transmission unit and array are proximate but not co-located one another and the information obtained about the occupant is a distance from the location of the transmission unit and the array. The processor obtains the information about the occupant utilizing a pattern recognition technique. The information about of the occupant can be used in conjunction with a reactive component, system or subsystem so that the processor controls the reactive component, system or subsystem based on the determination of the occupant presence, type and/or position. For example, if the reactive component, system or subsystem is an airbag assembly including at least one airbag, the processor controls one or more deployment parameters of the airbag(s).

BRIEF DESCRIPTION OF THE DRAWINGS

The following drawings are illustrative of embodiments of the system developed or adapted using the teachings of at least one of the inventions disclosed herein and are not meant to limit the scope of the invention as encompassed by the claims. In particular, the illustrations below are frequently limited to the monitoring of the front passenger seat for the purpose of describing the system. Naturally, the invention applies as well to adapting the system to the other seating positions in the vehicle and particularly to the driver and rear passenger positions.

FIG. 13 is a cross section view of a steering wheel and airbag module assembly showing a preferred mounting location of an ultrasonic wave generator and receiver.

FIG. 28A is an enlarged view of the section 28A in FIG. 28.

FIG. 29A is an enlarged view of the section designated 29A in FIG. 29.

FIG. 29B is an enlarged view of the section designated 29B in FIG. 29A.

FIG. 41 shows single camera optical examples using pre-processing filters.

FIG. 45 shows single camera optical example explaining the use of feature vector generated from distribution of average intensities and deviations.

FIG. 46 is a table of issues that may affect the image data.

FIG. 47 is a flow chart of the use of two subsystems for handling different lighting conditions.

FIG. 48 shows two flow charts of the use of two modular subsystems consisting of 3 neural networks.

FIG. 52 is a table of definitions of the four internal states.

FIG. 53 is a table of the paths between the four internal states.

FIG. 54 is a table of the distribution of the nighttime database.

FIG. 55 is a table of the success rates of the nighttime neural networks.

FIG. 56 is a table of the performance of the nighttime subsystem.

FIG. 57 is a table of the distribution of the daytime database.

FIG. 58 is a table of the success rates of the daytime neural networks.

FIG. 59 is a table of the performance of the daytime subsystem.

DETAILED DESCRIPTION OF THE PREFERRED EMBODIMENTS

Note whenever a patent or literature is referred to below it is to be assumed that all of that patent or literature is to be incorporated by reference in its entirety to the extent the disclosure of these reference is necessary. Also note that although many of the examples below relate to a particular vehicle, an automobile, the invention is not limited to any particular vehicle and is thus applicable to all relevant vehicles including shipping containers and truck trailers and to all compartments of a vehicle including, for example, the passenger compartment and the trunk of an automobile or truck.

1. General Occupant Sensors

Figure 1:
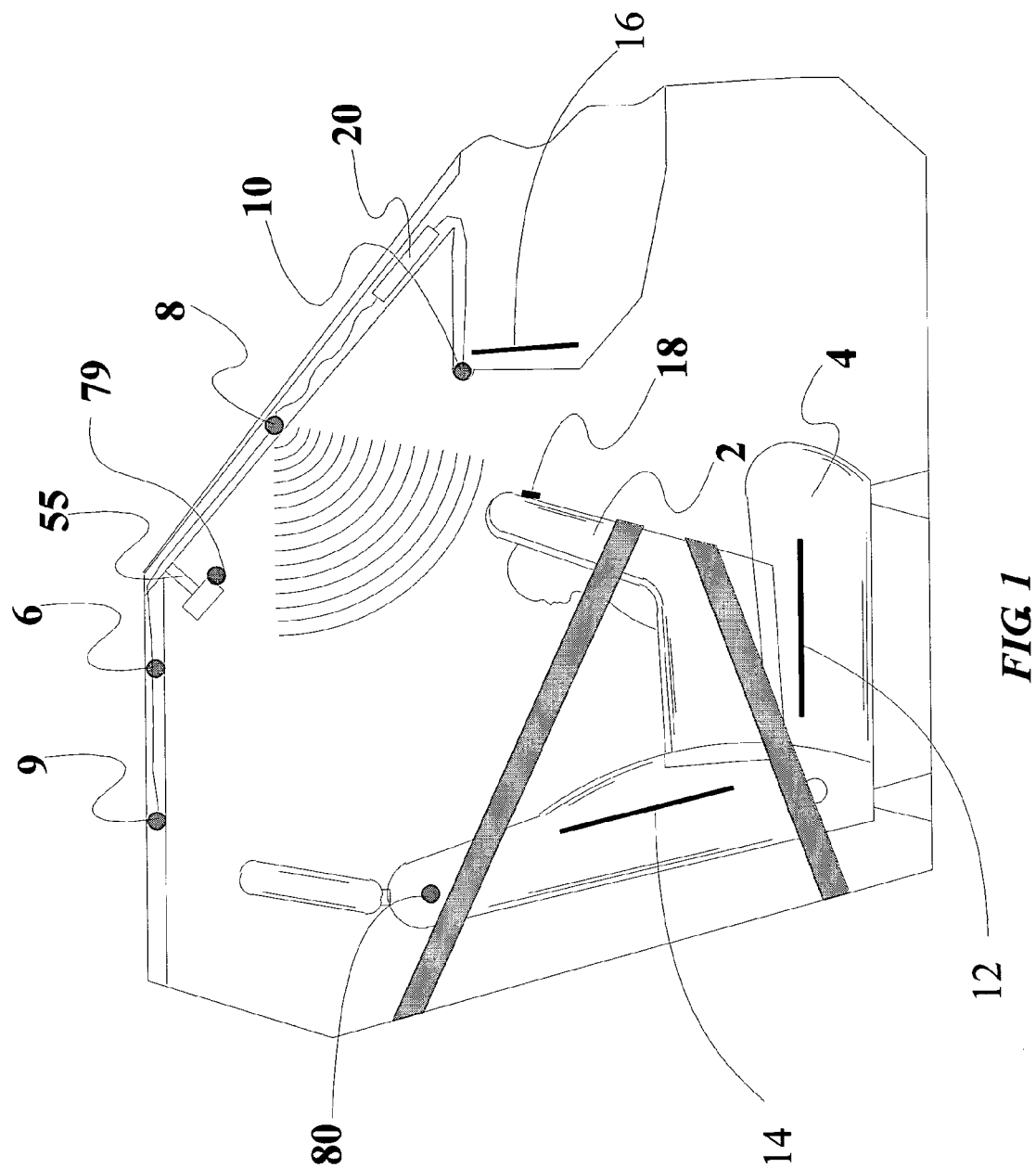
FIG. 1 is a side view with parts cutaway and removed of a vehicle showing the passenger compartment containing a rear facing child seat on the front passenger seat and a preferred mounting location for an occupant and rear facing child seat presence detector including an antenna field sensor and a resonator or reflector placed onto the forward most portion of the child seat.

Referring to the accompanying drawings, FIG. 1 is a side view, with parts cutaway and removed of a vehicle showing the passenger compartment, or passenger container, containing a rear facing child seat 2 on a front passenger seat 4 and a preferred mounting location for a first embodiment of a vehicle interior monitoring system in accordance with the invention. The interior monitoring system is capable of detecting the presence of an object, occupying objects such as a box, an occupant or a rear facing child seat 2, determining the type of object, determining the location of the object, and/or determining another property or characteristic of the object. A property of the object could be the orientation of a child seat, the velocity of an adult and the like. For example, the vehicle interior monitoring system can determine that an object is present on the seat, that the object is a child seat and that the child seat is rear-facing. The vehicle interior monitoring system could also determine that the object is an adult, that he is drunk and that he is out of position relative to the airbag.

In this embodiment, three transducers 6, 8 and 10 are used alone, or, alternately in combination with one or more antenna near field monitoring sensors or transducers, 12, 14 and 16, although any number of wave-transmitting transducers or radiation-receiving receivers may be used. Such transducers or receivers may be of the type that emit or receive a continuous signal, a time varying signal or a spatial varying signal such as in a scanning system and each may comprise only a transmitter which transmits energy, waves or radiation, only a receiver which receives energy, waves or radiation, both a transmitter and a receiver capable of transmitting and receiving energy, waves or radiation, an electric field sensor, a capacitive sensor, or a self-tuning antenna-based sensor, weight sensor, chemical sensor, motion sensor or vibration sensor, for example.

One particular type of radiation-receiving receiver for use in the invention receives electromagnetic waves and another receives ultrasonic waves.

In an ultrasonic embodiment, transducer 8 can be used as a transmitter and transducers 6 and 10 can be used as receivers. Naturally, other combinations can be used such as where all transducers are transceivers (transmitters and receivers). For example, transducer 8 can be constructed to transmit ultrasonic energy toward the front passenger seat, which is modified, in this case by the occupying item of the passenger seat, i.e., the rear facing child seat 2, and the modified waves are received by the transducers 6 and 10, for example. A more common arrangement is where transducers 6, 8 and 10 are all transceivers. Modification of the ultrasonic energy may constitute reflection of the ultrasonic energy as the ultrasonic energy is reflected back by the occupying item of the seat. The waves received by transducers 6 and 10 vary with time depending on the shape of the object occupying the passenger seat, in this case the rear facing child seat 2. Each different occupying item will reflect back waves having a different pattern. Also, the pattern of waves received by transducer 6 will differ from the pattern received by transducer 10 in view of its different mounting location. This difference generally permits the determination of location of the reflecting surface (i.e., the rear facing child seat 2) through triangulation. Through the use of two transducers 6, 10, a sort of stereographic image is received by the two transducers and recorded for analysis by processor 20, which is coupled to the transducers 6, 8, 10, e.g., by wires or wirelessly. This image will differ for each object that is placed on the vehicle seat and it will also change for each position of a particular object and for each position of the vehicle seat. Elements 6, 8, 10, although described as transducers, are representative of any type of component used in a wave-based analysis technique. Also, although the example of an automobile passenger compartment has been shown, the same principle can be used for monitoring the interior of any vehicle including in particular shipping containers and truck trailers.

Wave-type sensors as the transducers 6, 8, 10 as well as electric field sensors 12, 14, 16 are mentioned above. Electric field sensors and wave sensors are essentially the same from the point of view of sensing the presence of an occupant in a vehicle. In both cases, a time varying electric field is disturbed or modified by the presence of the occupant. At high frequencies in the visual, infrared and high frequency radio wave region, the sensor is based on its capability to sense a change of wave characteristics of the electromagnetic field, such as amplitude, phase or frequency. As the frequency drops, other characteristics of the field are measured. At still lower frequencies, the occupant's dielectric properties modify parameters of the reactive electric field in the occupied space between or near the plates of a capacitor. In this latter case, the sensor senses the change in charge distribution on the capacitor plates by measuring, for example, the current wave magnitude or phase in the electric circuit that drives the capacitor. These measured parameters are directly connected with parameters of the displacement current in the occupied space. In all cases, the presence of the occupant reflects, absorbs or modifies the waves or variations in the electric field in the space occupied by the occupant. Thus, for the purposes of at least one of the inventions disclosed herein, capacitance, electric field or electromagnetic wave sensors are equivalent and although they are all technically "field" sensors they will be considered as "wave" sensors herein. What follows is a discussion comparing the similarities and differences between two types of field or wave sensors, electromagnetic wave sensors and capacitive sensors as exemplified by Kithil in U.S. Pat. No. 5,702,634.

An electromagnetic field disturbed or emitted by a passenger in the case of an electromagnetic wave sensor, for example, and the electric field sensor of Kithil, for example, are in many ways similar and equivalent for the purposes of at least one of the inventions disclosed herein. The electromagnetic wave sensor is an actual electromagnetic wave sensor by definition because they sense parameters of an electromagnetic wave, which is a coupled pair of continuously changing electric and magnetic fields. The electric field here is not a static, potential one. It is essentially a dynamic, rotational electric field coupled with a changing magnetic one, that is, an electromagnetic wave. It cannot be produced by a steady distribution of electric charges. It is initially produced by moving electric charges in a transmitter, even if this transmitter is a passenger body for the case of a passive infrared sensor.

In the Kithil sensor, a static electric field is declared as an initial material agent coupling a passenger and a sensor (see Column 5, lines 5–7: "The proximity sensor 12 each function by creating an electrostatic field between oscillator in and detector output loop 56, which is affected by presence of a person near by, as a result of capacitive coupling, . . . "). It is a potential, non-rotational electric field. It is not necessarily coupled with any magnetic field. It is the electric field of a capacitor. It can be produced with a steady distribution of electric charges. Thus, it is not an electromagnetic wave by definition but if the sensor is driven by a varying current, then it produces a quasistatic electric field in the space between/ near the plates of the capacitor.

Kithil declares that his capacitance sensor uses a static electric field. Thus, from the consideration above, one can conclude that Kithil's sensor cannot be treated as a wave sensor because there are no actual electromagnetic waves but only a static electric field of the capacitor in the sensor system. However, this is not believed to be the case. The Kithil system could not operate with a true static electric field because a steady system does not carry any information. Therefore, Kithil is forced to use an oscillator, causing an alternate current in the capacitor and a reactive quasi-static electric field in the space between the capacitor plates, and a detector to reveal an informative change of the sensor capacitance caused by the presence of an occupant (see FIG. 7 and its description). In this case, the system becomes a "wave sensor" in the sense that it starts generating an actual time-varying electric field that certainly originates electromagnetic waves according to the definition above. That is, Kithil's sensor can be treated as a wave sensor regardless of the shape of the electric field that it creates, a beam or a spread shape.

As follows from the Kithil patent, the capacitor sensor is likely a parametric system where the capacitance of the sensor is controlled by the influence of the passenger body. This influence is transferred by means of the near electromagnetic field (i.e., the wave-like process) coupling the capacitor electrodes and the body. It is important to note that the same influence takes place with a real static electric field also, that is in absence of any wave phenomenon. This would be a situation if there were no oscillator in Kithil's system. However, such a system is not workable and thus Kithil reverts to a dynamic system using time-varying electric fields.

Thus, although Kithil declares that the coupling is due to a static electric field, such a situation is not realized in his system because an alternating electromagnetic field ("quasi-wave") exists in the system due to the oscillator. Thus, his sensor is actually a wave sensor, that is, it is sensitive to a change of a wave field in the vehicle compartment. This change is measured by measuring the change of its capacitance. The capacitance of the sensor system is determined by the configuration of its electrodes, one of which is a human body, that is, the passenger inside of and the part which controls the electrode configuration and hence a sensor parameter, the capacitance.

The physics definition of "wave" from Webster's Encyclopedic Unabridged Dictionary is: "11. Physics. A progressive disturbance propagated from point to point in a medium or space without progress or advance of the points themselves, . . . ". In a capacitor, the time that it takes for the disturbance (a change in voltage) to propagate through space, the dielectric and to the opposite plate is generally small and neglected but it is not zero. As the frequency driving the capacitor increases and the distance separating the plates increases, this transmission time as a percentage of the period of oscillation can become significant. Nevertheless, an observer between the plates will see the rise and fall of the electric field much like a person standing in the water of an ocean. The presence of a dielectric body between the plates causes the waves to get bigger as more electrons flow to and from the plates of the capacitor. Thus, an occupant affects the magnitude of these waves which is sensed by the capacitor circuit. Thus, the electromagnetic field is a material agent that carries information about a passenger's position in both Kithil's and a beam-type electromagnetic wave sensor.

For ultrasonic systems, the "image" recorded from each ultrasonic transducer/receiver, is actually a time series of digitized data of the amplitude of the received signal versus time. Since there are two receivers, two time series are obtained which are processed by the processor 20. The processor 20 may include electronic circuitry and associated, embedded software. Processor 20 constitutes one form of generating means in accordance with the invention which generates information about the occupancy of the passenger compartment based on the waves received by the transducers 6, 8, 10.

When different objects are placed on the front passenger seat, the images from transducers 6, 8, 10 for example, are different but there are also similarities between all images of rear facing child seats, for example, regardless of where on the vehicle seat it is placed and regardless of what company manufactured the child seat. Alternately, there will be similarities between all images of people sitting on the seat regardless of what they are wearing, their age or size. The problem is to find the "rules" which differentiate the images of one type of object from the images of other types of objects, e.g., which differentiate the occupant images from the rear facing child seat images. The similarities of these images for various child seats are frequently not obvious to a person looking at plots of the time series and thus computer algorithms are developed to sort out the various patterns. For a more detailed discussion of pattern recognition see U.S. RE Pat. 37260 to Varga et al.

The determination of these rules is important to the pattern recognition techniques used in at least one of the inventions disclosed herein. In general, three approaches have been useful, artificial intelligence, fuzzy logic and artificial neural networks (including cellular and modular or combination neural networks and support vector machines—although additional types of pattern recognition techniques may also be used, such as sensor fusion). In some implementations of at least one of the inventions disclosed herein, such as the determination that there is an object in the path of a closing window as described below, the rules are sufficiently obvious that a trained researcher can sometimes look at the returned signals and devise a simple algorithm to make the required determinations. In others, such as the determination of the presence of a rear facing child seat or of an occupant, artificial neural networks can be used to determine the rules. One such set of neural network software for determining the pattern recognition rules is available from the International Scientific Research, Inc. of Panama City, Panama.

Electromagnetic energy based occupant sensors exist that use many portions of the electromagnetic spectrum. A system based on the ultraviolet, visible or infrared portions of the spectrum generally operate with a transmitter and a receiver of reflected radiation. The receiver may be a camera or a photo detector such as a pin or avalanche diode as described in detail in above-referenced patents and patent applications. At other frequencies, the absorption of the electromagnetic energy is primarily used and at still other frequencies the capacitance or electric field influencing effects are used. Generally, the human body will reflect, scatter, absorb or transmit electromagnetic energy in various degrees depending on the frequency of the electromagnetic waves. All such occupant sensors are included herein.

In an embodiment wherein electromagnetic energy is used, it is to be appreciated that any portion of the electromagnetic signals that impinges upon, surrounds or involves a body portion of the occupant is at least partially absorbed by the body portion. Sometimes, this is due to the fact that the human body is composed primarily of water, and that electromagnetic energy of certain frequencies is readily absorbed by water. The amount of electromagnetic signal absorption is related to the frequency of the signal, and size or bulk of the body portion that the signal impinges upon. For example, a torso of a human body tends to absorb a greater percentage of electromagnetic energy than a hand of a human body.

Thus, when electromagnetic waves or energy signals are transmitted by a transmitter, the returning waves received by a receiver provide an indication of the absorption of the electromagnetic energy. That is, absorption of electromagnetic energy will vary depending on the presence or absence of a human occupant, the occupant's size, bulk, surface reflectivity, etc. depending on the frequency, so that different signals will be received relating to the degree or extent of absorption by the occupying item on the seat. The receiver will produce a signal representative of the returned waves or energy signals which will thus constitute an absorption signal as it corresponds to the absorption of electromagnetic energy by the occupying item in the seat.

One or more of the transducers 6, 8, 10 can also be image-receiving devices, such as cameras, which take images of the interior of the passenger compartment. These images can be transmitted to a remote facility to monitor the passenger compartment or can be stored in a memory device for use in the event of an accident, i.e., to determine the status of the occupant(s) of the vehicle prior to the accident. In this manner, it can be ascertained whether the driver was falling asleep, talking on the phone, etc.

A memory device for storing images of the passenger compartment, and also for receiving and storing any other information, parameters and variables relating to the vehicle or occupancy of the vehicle, may be in the form a standardized "black box" (instead of or in addition to a memory part in a processor 20). The IEEE Standards Association is currently beginning to develop an international standard for motor vehicle event data recorders. The information stored in the black box and/or memory unit in the processor 20, can include the images of the interior of the passenger compartment as well as the number of occupants and the health state of the occupant(s). The black box would preferably be tamper-proof and crash-proof and enable retrieval of the information after a crash.

Transducer 8 can also be a source of electromagnetic radiation, such as an LED, and transducers 6 and 10 can be CMOS, CCD imagers or other devices sensitive to electromagnetic radiation or fields. This "image" or return signal will differ for each object that is placed on the vehicle seat, or elsewhere in the vehicle, and it will also change for each position of a particular object and for each position of the vehicle seat or other movable objects within the vehicle. Elements 6, 8, 10, although described as transducers, are representative of any type of component used in a wave-based or electric field analysis technique, including, e.g., a transmitter, receiver, antenna or a capacitor plate.

Transducers 12, 14 and 16 can be antennas placed in the seat and instrument panel, or other convenient location within the vehicle, such that the presence of an object, particularly a water-containing object such as a human, disturbs the near field of the antenna. This disturbance can be detected by various means such as with Micrel parts MICREF102 and MICREF104, which have a built-in antenna auto-tune circuit. Note, these parts cannot be used as is and it is necessary to redesign the chips to allow the auto-tune information to be retrieved from the chip.

Other types of transducers can be used along with the transducers 6, 8, 10 or separately and all are contemplated by at least one of the inventions disclosed herein. Such transducers include other wave devices such as radar or electronic field sensing systems such as described in U.S. Pat. No. 5,366,241, U.S. Pat. No. 5,602,734, U.S. Pat. No. 5,691,693, U.S. Pat. No. 5,802,479, U.S. Pat. No. 5,844,486, U.S. Pat. No. 6,014,602, and U.S. Pat. No. 6,275,146 to Kithil, and U.S. Pat. No. 5,948,031 to Rittmueller. Another technology, for example, uses the fact that the content of the near field of an antenna affects the resonant tuning of the antenna. Examples of such a device are shown as antennas 12, 14 and 16 in FIG. 1. By going to lower frequencies, the near field range is increased and also at such lower frequencies, a ferrite-type antenna could be used to minimize the size of the antenna. Other antennas that may be applicable for a particular implementation include dipole, microstrip, patch, Yagi etc. The frequency transmitted by the antenna can be swept and the (VSWR) voltage and current in the antenna feed circuit can be measured. Classification by frequency domain is then possible. That is, if the circuit is tuned by the antenna, the frequency can be measured to determine the object in the field.

Figure 2:
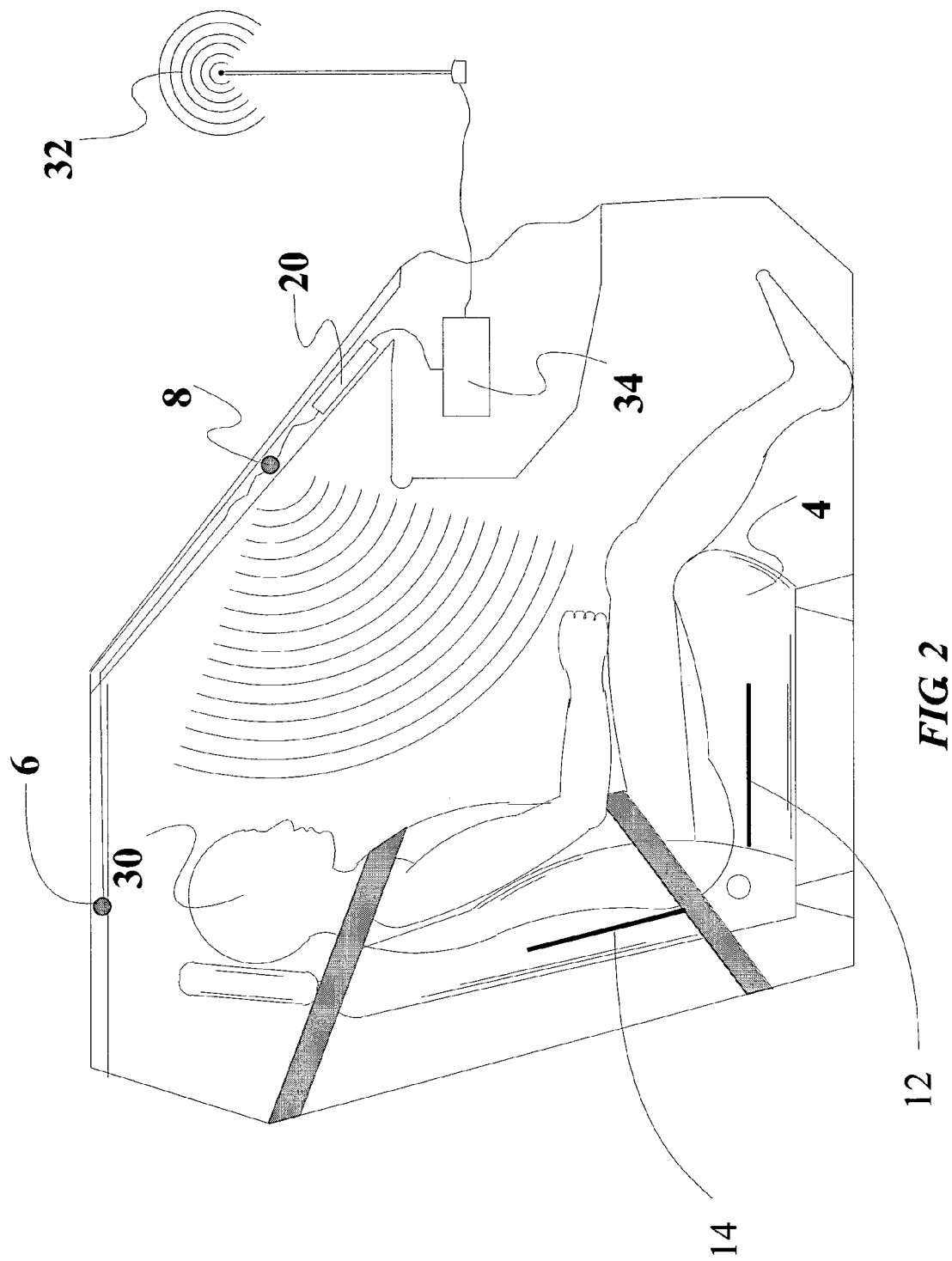
FIG. 2 is a side view with parts cutaway and removed showing schematically the interface between the vehicle interior monitoring system of at least one of the inventions disclosed herein and the vehicle cellular or other telematics communication system including an antenna field sensor.

An alternate system is shown in FIG. 2, which is a side view showing schematically the interface between the vehicle interior monitoring system of at least one of the inventions disclosed herein and the vehicle cellular or other communication system 32, such as a satellite based system such as that supplied by Skybitz, having an associated antenna 34. In this view, an adult occupant 30 is shown sitting on the front passenger seat 4 and two transducers 6 and 8 are used to determine the presence (or absence) of the occupant on that seat 4. One of the transducers 8 in this case acts as both a transmitter and receiver while the other transducer 6 acts only as a receiver. Alternately, transducer 6 could serve as both a transmitter and receiver or the transmitting function could be alternated between the two devices. Also, in many cases, more that two transmitters and receivers are used and in still other cases, other types of sensors, such as weight, chemical, radiation, vibration, acoustic, seatbelt tension sensor or switch, heartbeat, self tuning antennas (12, 14), motion and seat and seatback position sensors, are also used alone or in combination with the transducers 6 and 8. As is also the case in FIG. 1, the transducers 6 and 8 are attached to the vehicle embedded in the A-pillar and headliner trim, where their presence is disguised, and are connected to processor 20 that may also be hidden in the trim as shown or elsewhere. Naturally, other mounting locations can also be used and, in most cases, preferred as disclosed in Varga et. al. (U.S. RE Pat. 37,260).

The transducers 6 and 8 in conjunction with the pattern recognition hardware and software described below enable the determination of the presence of an occupant within a short time after the vehicle is started. The software is implemented in processor 20 and is packaged on a printed circuit board or flex circuit along with the transducers 6 and 8. Similar systems can be located to monitor the remaining seats in the vehicle, also determine the presence of occupants at the other seating locations and this result is stored in the computer memory, which is part of each monitoring system processor

20. Processor 20 thus enables a count of the number of occupants in the vehicle to be obtained by addition of the determined presence of occupants by the transducers associated with each seating location, and in fact, can be designed to perform such an addition. Naturally, the principles illustrated for automobile vehicles are applicable by those skilled in the art to other vehicles such as shipping containers or truck trailers and to other compartments of an automotive vehicle such as the vehicle trunk.

For a general object, transducers 6, 8, 9, 10 can also be used to determine the type of object, determine the location of the object, and/or determine another property or characteristic of the object. A property of the object could be the orientation of a child seat, the velocity of an adult and the like. For example, the transducers 6, 8, 9, 10 can be designed to enable a determination that an object is present on the seat, that the object is a child seat and that the child seat is rear-facing.

The transducers 6 and 8 are attached to the vehicle buried in the trim such as the A-pillar trim, where their presence can be disguised, and are connected to processor 20 that may also be hidden in the trim as shown (this being a non-limiting position for the processor 20). The A-pillar is the roof support pillar that is closest to the front of the vehicle and which, in addition to supporting the roof, also supports the front windshield and the front door. Other mounting locations can also be used. For example, transducers 6, 8 can be mounted inside the seat (along with or in place of transducers 12 and 14), in the ceiling of the vehicle, in the B-pillar, in the C-pillar and in the doors. Indeed, the vehicle interior monitoring system in accordance with the invention may comprise a plurality of monitoring units, each arranged to monitor a particular seating location. In this case, for the rear seating locations, transducers might be mounted in the B-pillar or C-pillar or in the rear of the front seat or in the rear side doors. Possible mounting locations for transducers, transmitters, receivers and other occupant sensing devices are disclosed in the above-referenced patent applications and all of these mounting locations are contemplated for use with the transducers described herein.

The cellular phone or other communications system 32 outputs to an antenna 34. The transducers 6, 8, 12 and 14 in conjunction with the pattern recognition hardware and software, which is implemented in processor 20 and is packaged on a printed circuit board or flex circuit along with the transducers 6 and 8, determine the presence of an occupant within a few seconds after the vehicle is started, or within a few seconds after the door is closed. Similar systems located to monitor the remaining seats in the vehicle, also determine the presence of occupants at the other seating locations and this result is stored in the computer memory which is part of each monitoring system processor 20.

Periodically and in particular in the event of an accident, the electronic system associated with the cellular phone system 32 interrogates the various interior monitoring system memories and arrives at a count of the number of occupants in the vehicle, and optionally, even makes a determination as to whether each occupant was wearing a seatbelt and if he or she is moving after the accident. The phone or other communications system then automatically dials the EMS operator (such as 911 or through a telematics service such as OnStar®) and the information obtained from the interior monitoring systems is forwarded so that a determination can be made as to the number of ambulances and other equipment to send to the accident site, for example. Such vehicles will also have a system, such as the global positioning system, which permits the vehicle to determine its exact location and to forward this information to the EMS operator. Other systems can be implemented in conjunction with the communication with the emergency services operator. For example, a microphone and speaker can be activated to permit the operator to attempt to communicate with the vehicle occupant(s) and thereby learn directly of the status and seriousness of the condition of the occupant(s) after the accident.

Thus, in basic embodiments of the invention, wave or other energy-receiving transducers are arranged in the vehicle at appropriate locations, trained if necessary depending on the particular embodiment, and function to determine whether a life form is present in the vehicle and if so, how many life forms are present and where they are located etc. To this end, transducers can be arranged to be operative at only a single seating location or at multiple seating locations with a provision being made to eliminate a repetitive count of occupants. A determination can also be made using the transducers as to whether the life forms are humans, or more specifically, adults, child in child seats, etc. As noted herein, this is possible using pattern recognition techniques. Moreover, the processor or processors associated with the transducers can be trained to determine the location of the life forms, either periodically or continuously or possibly only immediately before, during and after a crash. The location of the life forms can be as general or as specific as necessary depending on the system requirements, i.e., a determination can be made that a human is situated on the driver's seat in a normal position (general) or a determination can be made that a human is situated on the driver's seat and is leaning forward and/or to the side at a specific angle as well as the position of his or her extremities and head and chest (specifically). The degree of detail is limited by several factors, including, for example, the number and position of transducers and training of the pattern recognition algorithm(s).

In addition to the use of transducers to determine the presence and location of occupants in a vehicle, other sensors could also be used. For example, a heartbeat sensor which determines the number and presence of heartbeat signals can also be arranged in the vehicle, which would thus also determine the number of occupants as the number of occupants would be equal to the number of heartbeat signals detected. Conventional heartbeat sensors can be adapted to differentiate between a heartbeat of an adult, a heartbeat of a child and a heartbeat of an animal. As its name implies, a heartbeat sensor detects a heartbeat, and the magnitude and/or frequency thereof, of a human occupant of the seat, if such a human occupant is present. The output of the heartbeat sensor is input to the processor of the interior monitoring system. One heartbeat sensor for use in the invention may be of the types as disclosed in McEwan (U.S. Pat. No. 5,573,012 and U.S. Pat. No. 5,766,208). The heartbeat sensor can be positioned at any convenient position relative to the seats where occupancy is being monitored. A preferred location is within the vehicle seatback.

An alternative way to determine the number of occupants is to monitor the weight being applied to the seats, i.e., each seating location, by arranging weight sensors at each seating location which might also be able to provide a weight distribution of an object on the seat. Analysis of the weight and/or weight distribution by a predetermined method can provide an indication of occupancy by a human, an adult or child, or an inanimate object.

Another type of sensor which is not believed to have been used in an interior monitoring system previously is a micropower impulse radar (MIR) sensor which determines motion of an occupant and thus can determine his or her heartbeat (as evidenced by motion of the chest). Such an MIR sensor can be arranged to detect motion in a particular area in which the occupant's chest would most likely be situated or could be coupled to an arrangement which determines the location of the occupant's chest and then adjusts the operational field of the MIR sensor based on the determined location of the occupant's chest. A motion sensor utilizing a micro-power impulse radar (MIR) system as disclosed, for example, in McEwan (U.S. Pat. No. 5,361,070), as well as many other patents by the same inventor.

Motion sensing is accomplished by monitoring a particular range from the sensor as disclosed in that patent. MIR is one form of radar which has applicability to occupant sensing and can be mounted at various locations in the vehicle. It has an advantage over ultrasonic sensors in that data can be acquired at a higher speed and thus the motion of an occupant can be more easily tracked. The ability to obtain returns over the entire occupancy range is somewhat more difficult than with ultrasound resulting in a more expensive system overall. MIR has additional advantages in lack of sensitivity to temperature variation and has a comparable resolution to about 40 kHz ultrasound. Resolution comparable to higher frequency ultrasound is also possible. Additionally, multiple MIR sensors can be used when high speed tracking of the motion of an occupant during a crash is required since they can be individually pulsed without interfering with each through time division multiplexing.

An alternative way to determine motion of the occupant(s) is to monitor the weight distribution of the occupant whereby changes in weight distribution after an accident would be highly suggestive of movement of the occupant. A system for determining the weight distribution of the occupants could be integrated or otherwise arranged in the seats such as the front seat 4 of the vehicle and several patents and publications describe such systems.

More generally, any sensor which determines the presence and health state of an occupant can also be integrated into the vehicle interior monitoring system in accordance with the invention. For example, a sensitive motion sensor can determine whether an occupant is breathing and a chemical sensor can determine the amount of carbon dioxide, or the concentration of carbon dioxide, in the air in the passenger compartment of the vehicle which can be correlated to the health state of the occupant(s). The motion sensor and chemical sensor can be designed to have a fixed operational field situated where the occupant's mouth is most likely to be located. In this manner, detection of carbon dioxide in the fixed operational field could be used as an indication of the presence of a human occupant in order to enable the determination of the number of occupants in the vehicle. In the alternative, the motion sensor and chemical sensor can be adjustable and adapted to adjust their operational field in conjunction with a determination by an occupant position and location sensor which would determine the location of specific parts of the occupant's body, e.g., his or her chest or mouth. Furthermore, an occupant position and location sensor can be used to determine the location of the occupant's eyes and determine whether the occupant is conscious, i.e., whether his or her eyes are open or closed or moving.

The use of chemical sensors can also be used to detect whether there is blood present in the vehicle, for example, after an accident. Additionally, microphones can detect whether there is noise in the vehicle caused by groaning, yelling, etc., and transmit any such noise through the cellular or other communication connection to a remote listening facility (such as operated by OnStar®).

Figure 3:
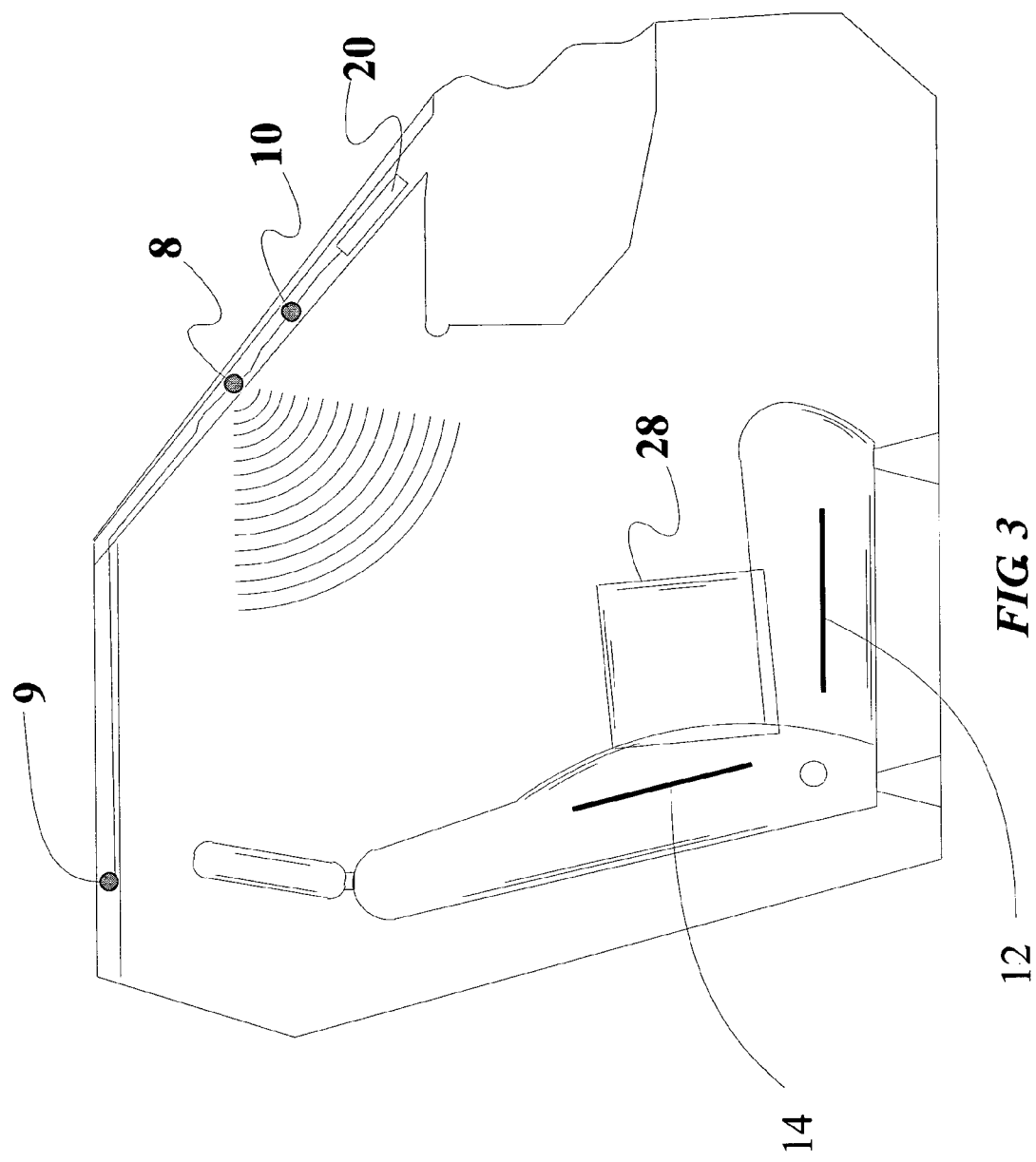
FIG. 3 is a side view with parts cutaway and removed of a vehicle showing the passenger compartment containing a box on the front passenger seat and a preferred mounting location for an occupant and rear facing child seat presence detector and including an antenna field sensor.

In FIG. 3, a view of the system of FIG. 1 is illustrated with a box 28 shown on the front passenger seat in place of a rear facing child seat. The vehicle interior monitoring system is trained to recognize that this box 28 is neither a rear facing child seat nor an occupant and therefore it is treated as an empty seat and the deployment of the airbag or other occupant restraint device is suppressed. For other vehicles, it may be that just the presence of a box or its motion or chemical or radiation effluents that are desired to be monitored. The auto-tune antenna-based system 12, 14 is particularly adept at making this distinction particularly if the box 28 does not contain substantial amounts of water. Although a simple implementation of the auto-tune antenna system is illustrated, it is of course possible to use multiple antennas located in the seat 4 and elsewhere in the passenger compartment and these antenna systems can either operate at one or a multiple of different frequencies to discriminate type, location and/or relative size of the object being investigated. This training can be accomplished using a neural network or modular neural network with the commercially available software. The system assesses the probability that the box 28 is a person, however, and if there is even the remotest chance that it is a person, the airbag deployment is not suppressed. The system is thus typically biased toward enabling airbag deployment.

In cases where different levels of airbag inflation are possible, and there are different levels of injury associated with an out of position occupant being subjected to varying levels of airbag deployment, it is sometimes possible to permit a depowered or low level airbag deployment in cases of uncertainty. If, for example, the neural network has a problem distinguishing whether a box or a forward facing child seat is present on the vehicle seat, the decision can be made to deploy the airbag in a depowered or low level deployment state. Other situations where such a decision could be made would be when there is confusion as to whether a forward facing human is in position or out-of-position.

Neural networks systems frequently have problems in accurately discriminating the exact location of an occupant especially when different-sized occupants are considered. This results in a gray zone around the border of the keep out zone where the system provides a weak fire or weak no fire decision. For those cases, deployment of the airbag in a depowered state can resolve the situation since an occupant in a gray zone around the keep out zone boundary would be unlikely to be injured by such a depowered deployment while significant airbag protection is still being supplied.

Electromagnetic or ultrasonic energy can be transmitted in three modes in determining the position of an occupant, for example. In most of the cases disclosed above, it is assumed that the energy will be transmitted in a broad diverging beam which interacts with a substantial portion of the occupant or other object to be monitored. This method can have the disadvantage that it will reflect first off the nearest object and, especially if that object is close to the transmitter, it may mask the true position of the occupant or object. It can also reflect off many parts of the object where the reflections can be separated in time and processed as in an ultrasonic occupant sensing system. This can also be partially overcome through the use of the second mode which uses a narrow beam. In this case, several narrow beams are used. These beams are aimed in different directions toward the occupant from a position sufficiently away from the occupant or object such that interference is unlikely.

A single receptor could be used provided the beams are either cycled on at different times or are of different frequencies. Another approach is to use a single beam emanating from a location which has an unimpeded view of the occupant or object such as the windshield header in the case of an automobile or near the roof at one end of a trailer or shipping container, for example. If two spaced apart CCD array receivers are used, the angle of the reflected beam can be determined and the location of the occupant can be calculated. The third mode is to use a single beam in a manner so that it scans back and forth and/or up and down, or in some other pattern, across the occupant, object or the space in general. In this manner, an image of the occupant or object can be obtained using a single receptor and pattern recognition software can be used to locate the head or chest of the occupant or size of the object, for example. The beam approach is most applicable to electromagnetic energy but high frequency ultrasound can also be formed into a narrow beam.

A similar effect to modifying the wave transmission mode can also be obtained by varying the characteristics of the receptors. Through appropriate lenses or reflectors, receptors can be made to be most sensitive to radiation emitted from a particular direction. In this manner, a single broad beam transmitter can be used coupled with an array of focused receivers, or a scanning receiver, to obtain a rough image of the occupant or occupying object.

Figure 5:
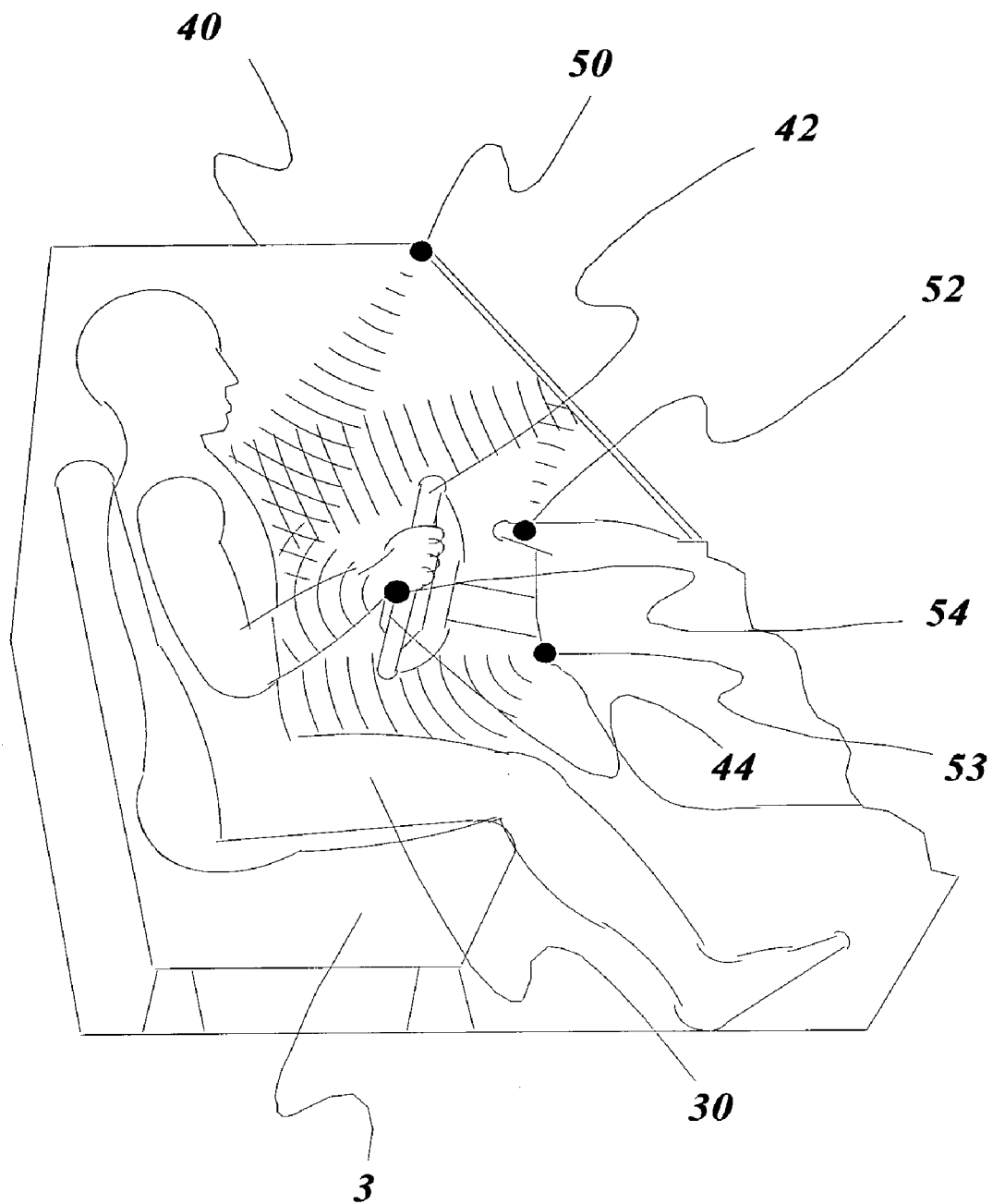
FIG. 5 is a side view, with certain portions removed or cut away, of a portion of the passenger compartment of a vehicle showing several preferred mounting locations of occupant position sensors for sensing the position of the vehicle driver.

Each of these methods of transmission or reception could be used, for example, at any of the preferred mounting locations shown in FIG. 5.

Figure 7:
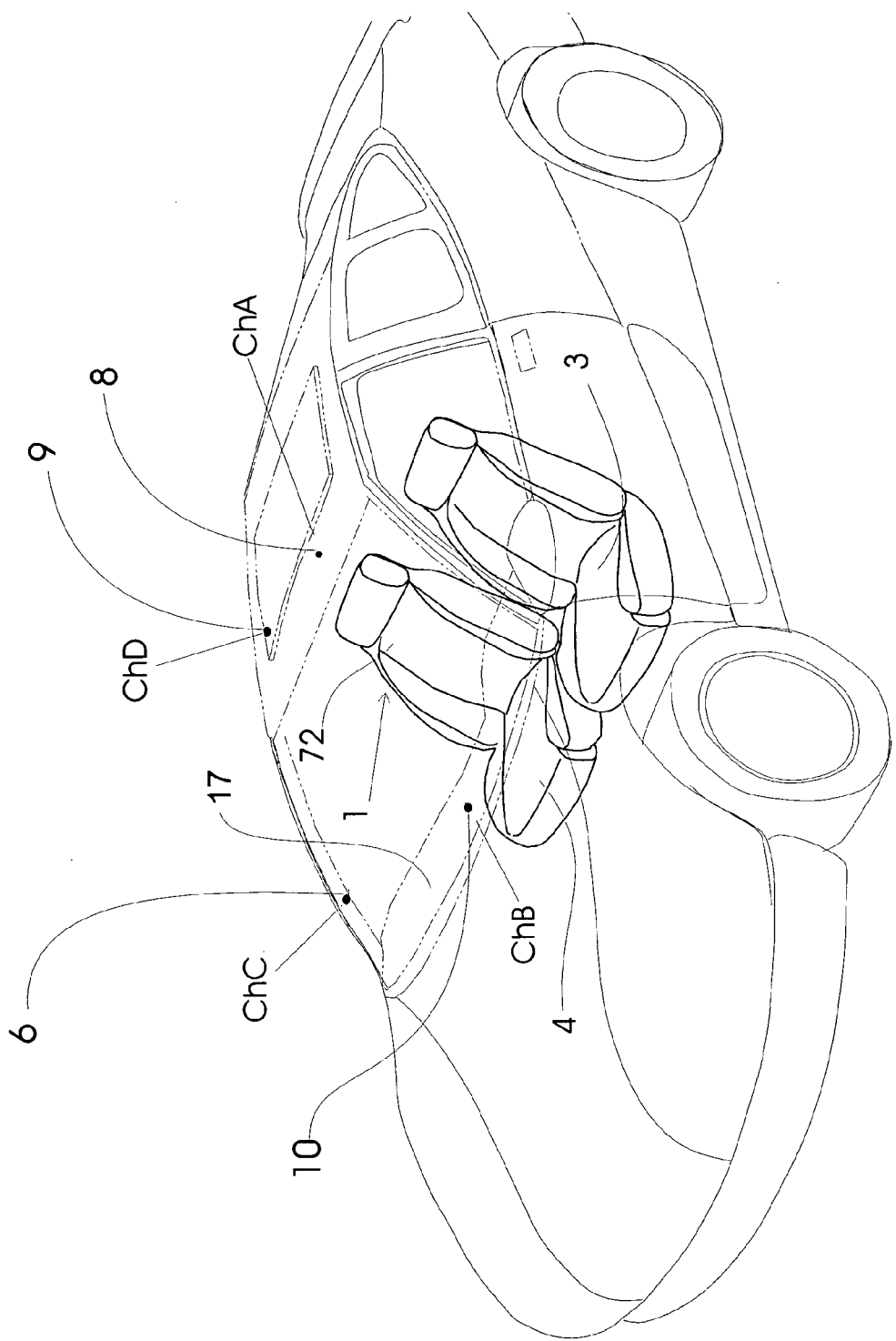
FIG. 7 is a perspective view of a vehicle showing the position of the ultrasonic or electromagnetic sensors relative to the driver and front passenger seats.

As shown in FIG. 7, there are provided four sets of wave-receiving sensor systems 6, 8, 9, 10 mounted within the passenger compartment of an automotive vehicle. Each set of sensor systems 6, 8, 9, 10 comprises a transmitter and a receiver (or just a receiver in some cases), which may be integrated into a single unit or individual components separated from one another. In this embodiment, the sensor system 6 is mounted on the A-Pillar of the vehicle. The sensor system 9 is mounted on the upper portion of the B-Pillar. The sensor system 8 is mounted on the roof ceiling portion or the headliner. The sensor system 10 is mounted near the middle of an instrument panel 17 in front of the driver's seat 3.

The sensor systems 6, 8, 9, 10 are preferably ultrasonic or electromagnetic, although sensor systems 6, 8, 9, 10 can be any other type of sensors which will detect the presence of an occupant from a distance including capacitive or electric field sensors. Also, if the sensor systems 6, 8, 9, 10 are passive infrared sensors, for example, then they may only comprise a wave-receiver. Recent advances in Quantum Well Infrared Photodetectors by NASA show great promise for this application. See "Many Applications Possible For Largest Quantum Infrared Detector", Goddard Space Center News Release Feb. 27, 2002.

The Quantum Well Infrared Photodetector is a new detector which promises to be a low-cost alternative to conventional infrared detector technology for a wide range of scientific and commercial applications, and particularly for sensing inside and outside of a vehicle. The main problem that needs to be solved is that it operates at 76 degrees Kelvin (−323 degrees F.). Chips are being developed capable of cooling other chips economically. It remains to be seen if these low temperatures can be economically achieved.

A section of the passenger compartment of an automobile is shown generally as 40 in FIGS. 8A–8E. A driver 30 of the vehicle sits on a seat 3 behind a steering wheel 42, which contains an airbag assembly 44. Airbag assembly 44 may be integrated into the steering wheel assembly or coupled to the steering wheel 42. Five transmitter and/or receiver assemblies 49, 50, 51, 52 and 54 are positioned at various places in the passenger compartment to determine the location of various parts of the driver, e.g., the head, chest and torso, relative to the airbag and to otherwise monitor the interior of the passenger compartment. Monitoring of the interior of the passenger compartment can entail detecting the presence or absence of the driver and passengers, differentiating between animate and inanimate objects, detecting the presence of occupied or unoccupied child seats, rear-facing or forward-facing, and identifying and ascertaining the identity of the occupying items in the passenger compartment. Naturally, a similar system can be used for monitoring the interior of a truck, shipping container or other containers.

A processor such as control circuitry 20 is connected to the transmitter/receiver assemblies 49, 50, 51, 52, 54 and controls the transmission from the transmitters, if a transmission component is present in the assemblies, and captures the return signals from the receivers, if a receiver component is present in the assemblies. Control circuitry 20 usually contains analog to digital converters (ADCs) or a frame grabber or equivalent, a microprocessor containing sufficient memory and appropriate software including, for example, pattern recognition algorithms, and other appropriate drivers, signal conditioners, signal generators, etc. Usually, in any given implementation, only three or four of the transmitter/receiver assemblies would be used depending on their mounting locations as described below. In some special cases, such as for a simple classification system, only a single or sometimes only two transmitter/receiver assemblies are used.

A portion of the connection between the transmitter/receiver assemblies 49, 50, 51, 52, 54 and the control circuitry 20, is shown as wires. These connections can be wires, either individual wires leading from the control circuitry 20 to each of the transmitter/receiver assemblies 49, 50, 51, 52, 54 or one or more wire buses or in some cases, wireless data transmission can be used.

The location of the control circuitry 20 in the dashboard of the vehicle is for illustration purposes only and does not limit the location of the control circuitry 20. Rather, the control circuitry 20 may be located anywhere convenient or desired in the vehicle.

It is contemplated that a system and method in accordance with the invention can include a single transmitter and multiple receivers, each at a different location. Thus, each receiver would not be associated with a transmitter forming transmitter/receiver assemblies. Rather, for example, with reference to FIG. 8A, only element 51 could constitute a transmitter/receiver assembly and elements 49, 50, 52 and 54 could be receivers only.

On the other hand, it is conceivable that in some implementations, a system and method in accordance with the invention include a single receiver and multiple transmitters. Thus, each transmitter would not be associated with a receiver forming transmitter/receiver assemblies. Rather, for example, with reference to FIG. 8A, only element 51 would constitute a transmitter/receiver assembly and elements 49, 50, 52, 54 would be transmitters only.

One ultrasonic transmitter/receiver as used herein is similar to that used on modern auto-focus cameras such as manufactured by the Polaroid Corporation. Other camera auto-focusing systems use different technologies, which are also applicable here, to achieve the same distance to object determination. One camera system manufactured by Fuji of Japan, for example, uses a stereoscopic system which could also be used to determine the position of a vehicle occupant providing there is sufficient light available. In the case of insufficient light, a source of infrared light can be added to illuminate the driver. In a related implementation, a source of infrared light is reflected off of the windshield and illuminates the vehicle occupant. An infrared receiver 56 is located attached to the rear view mirror assembly 55, as shown in FIG. 8E. Alternately, the infrared can be sent by the device 50 and received by a receiver elsewhere. Since any of the devices shown in these figures could be either transmitters or receivers or both, for simplicity, only the transmitted and not the reflected wave fronts are frequently illustrated.

When using the surface of the windshield as a reflector of infrared radiation (for transmitter/receiver assembly and element 52), care must be taken to assure that the desired reflectivity at the frequency of interest is achieved. Mirror materials, such as metals and other special materials manufactured by Eastman Kodak, have a reflectivity for infrared frequencies that is substantially higher than at visible frequencies. They are thus candidates for coatings to be placed on the windshield surfaces for this purpose.

Figure 12A:
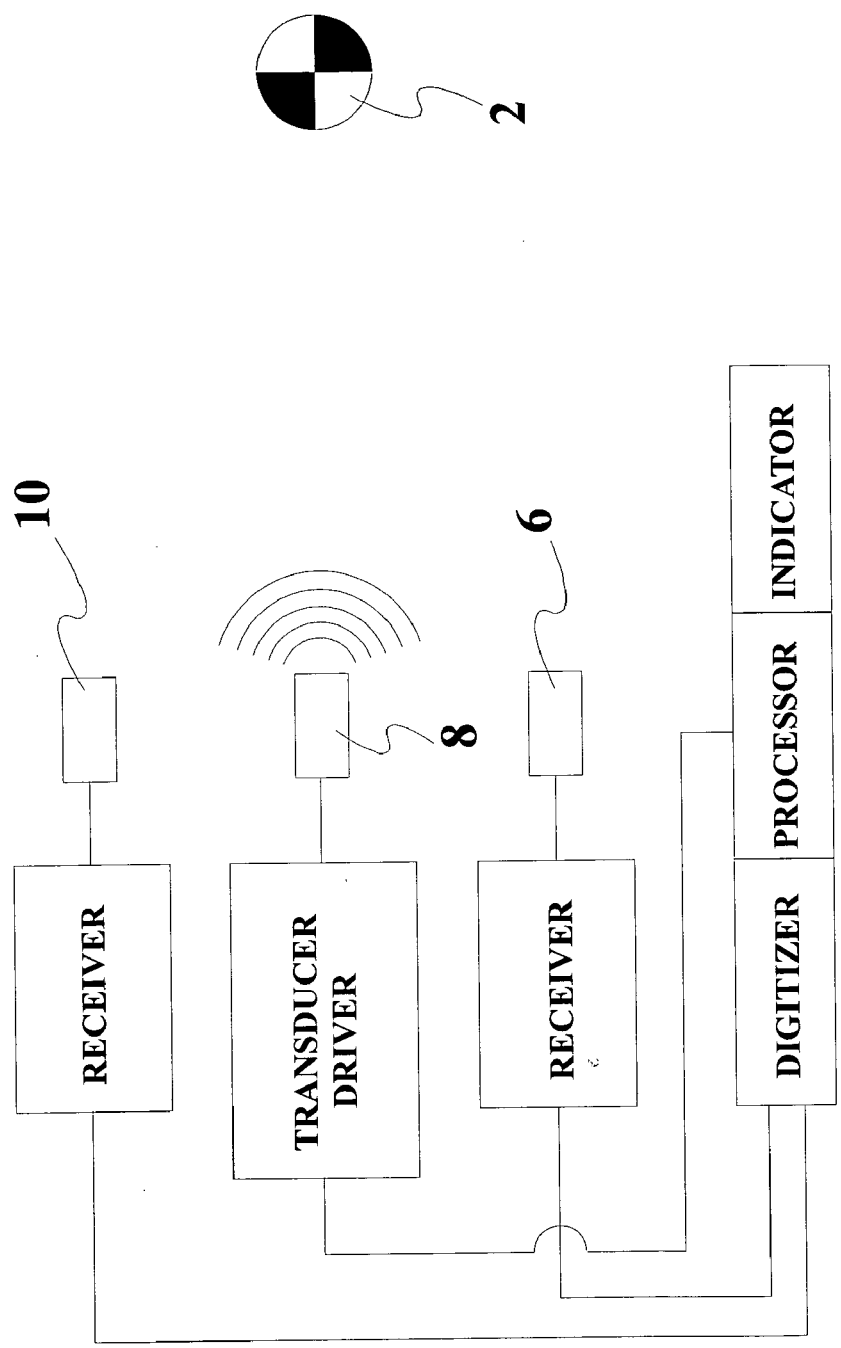
FIG. 12A is a functional block diagram of the ultrasonic imaging system illustrated in FIG. 1 using a microprocessor, DSP or field programmable gate array (FGPA).
Figure 12B:
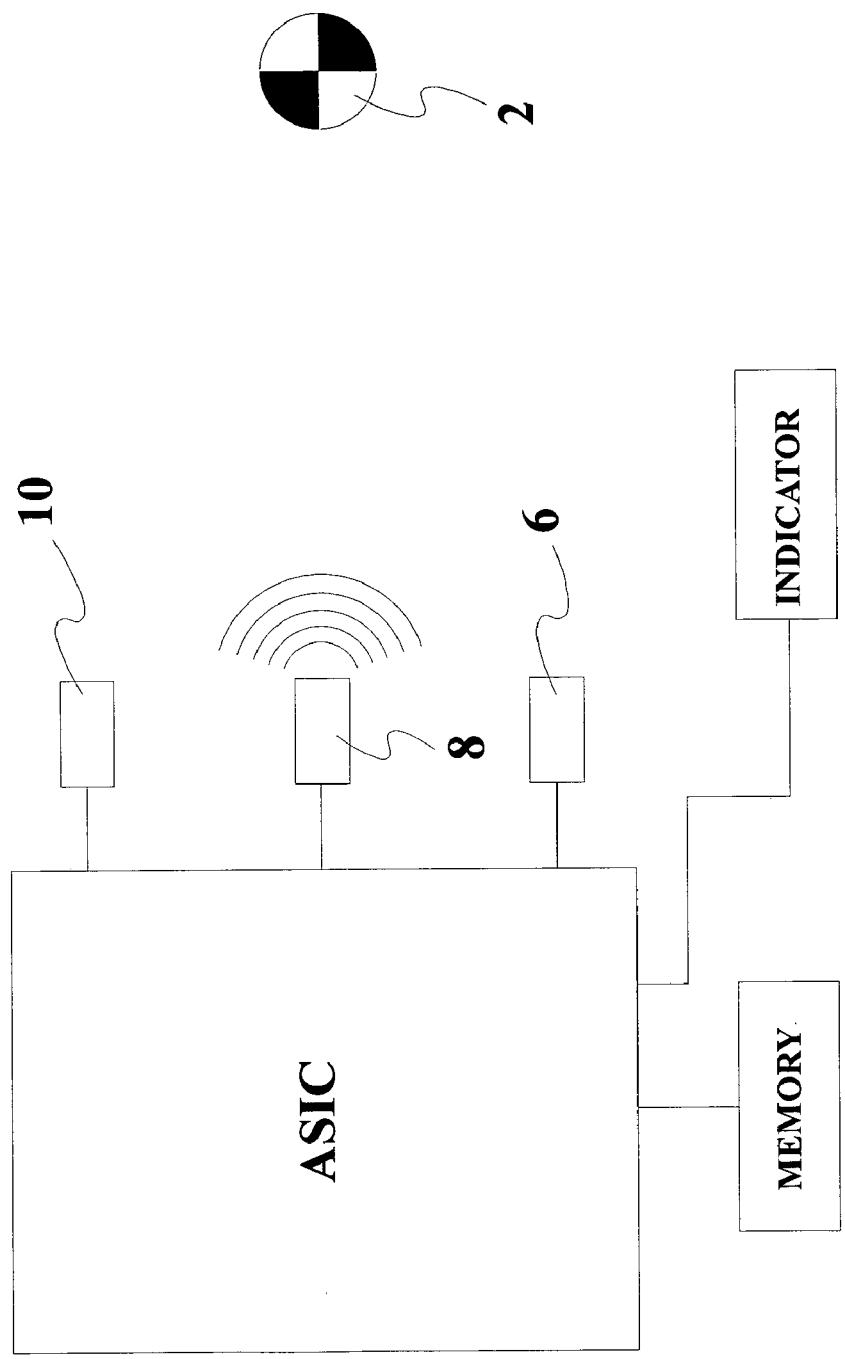
FIG. 12B is a functional block diagram of the ultrasonic imaging system illustrated in FIG. 1 using an application specific integrated circuit (ASIC).
Figure 14:
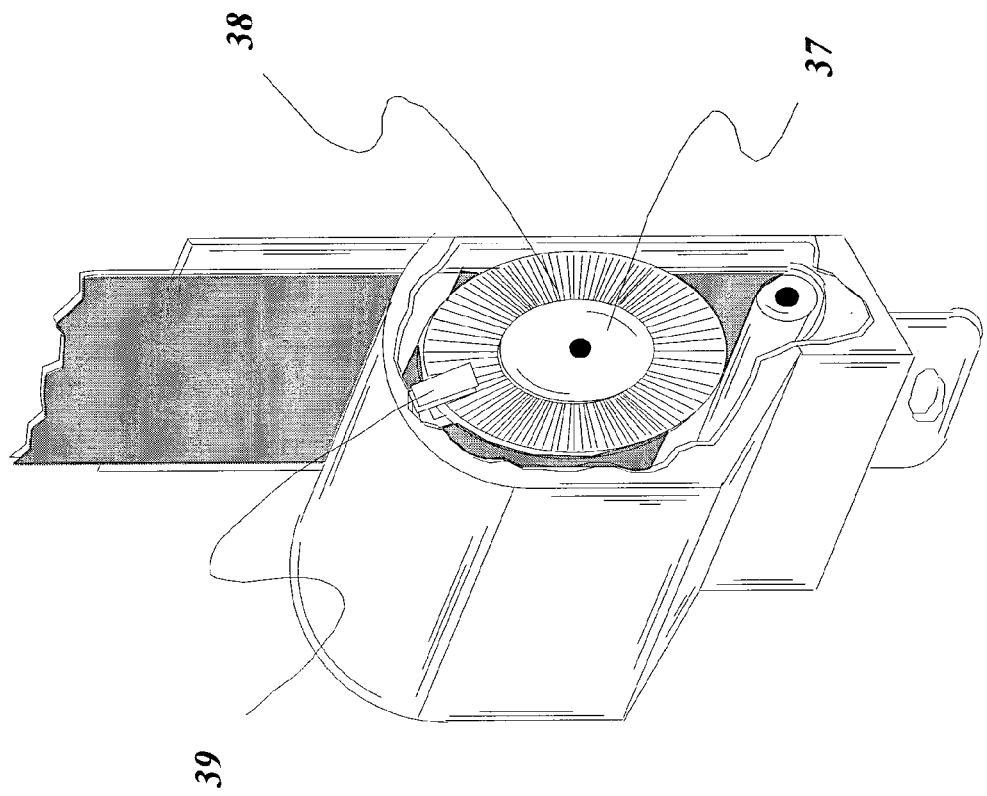
FIG. 14 is a partial cutaway view of a seatbelt retractor with a spool out sensor utilizing a shaft encoder.

There are two preferred methods of implementing the vehicle interior monitoring system of at least one of the inventions disclosed herein, a microprocessor system and an application specific integrated circuit system (ASIC). Both of these systems are represented schematically as 20 herein. In some systems, both a microprocessor and an ASIC are used. In other systems, most if not all of the circuitry is combined onto a single chip (system on a chip). The particular implementation depends on the quantity to be made and economic considerations. A block diagram illustrating the microprocessor system is shown in FIG. 12A which shows the implementation of the system of FIG. 1. An alternate implementation of the FIG. 1 system using an ASIC is shown in FIG. 12B. In both cases, the target, which may be a rear facing child seat, is shown schematically as 2 and the three transducers as 6, 8, and 10. In the embodiment of FIG. 12A, there is a digitizer coupled to the receivers 6, 10 and the processor, and an indicator coupled to the processor. In the embodiment of FIG. 12B, there is a memory unit associated with the ASIC and also an indicator coupled to the ASIC.

The position of the occupant may be determined in various ways including by receiving and analyzing waves from a space in a passenger compartment of the vehicle occupied by the occupant, transmitting waves to impact the occupant, receiving waves after impact with the occupant and measuring time between transmission and reception of the waves, obtaining two or three-dimensional images of a passenger compartment of the vehicle occupied by the occupant and analyzing the images with an optional focusing of the images prior to analysis, or by moving a beam of radiation through a passenger compartment of the vehicle occupied by the occupant. The waves may be ultrasonic, radar, electromagnetic, passive infrared, and the like, and capacitive in nature. In the latter case, a capacitance or capacitive sensor may be provided. An electric field sensor could also be used.

Deployment of the airbag can be disabled when the determined position is too close to the airbag.

The rate at which the airbag is inflated and/or the time in which the airbag is inflated may be determined based on the determined position of the occupant.

Another method for controlling deployment of an airbag comprises the steps of determining the position of an occupant to be protected by deployment of the airbag and adjusting a threshold used in a sensor algorithm which enables or suppresses deployment of the airbag based on the determined position of the occupant. The probability that a crash requiring deployment of the airbag is occurring may be assessed and analyzed relative to the threshold whereby deployment of the airbag is enabled only when the assessed probability is greater than the threshold. The position of the occupant can be determined in any of the ways mentioned above.

A system for controlling deployment of an airbag comprises determining means for determining the position of an occupant to be protected by deployment of the airbag, sensor means for assessing the probability that a crash requiring deployment of the airbag is occurring, and circuit means coupled to the determining means, the sensor means and the airbag for enabling deployment of the airbag in consideration of the determined position of the occupant and the assessed probability that a crash is occurring. The circuit means are structured and arranged to analyze the assessed probability relative to a pre-determined threshold whereby deployment of the airbag is enabled only when the assessed probability is greater than the threshold. Further, the circuit means are arranged to adjust the threshold based on the determined position of the occupant. The determining means may any of the determining systems discussed above.

One method for controlling deployment of an airbag comprises a crash sensor for providing information on a crash involving the vehicle, a position determining arrangement for determining the position of an occupant to be protected by deployment of the airbag and a circuit coupled to the airbag, the crash sensor and the position determining arrangement and arranged to issue a deployment signal to the airbag to cause deployment of the airbag. The circuit is arranged to consider a deployment threshold which varies based on the determined position of the occupant. Further, the circuit is arranged to assess the probability that a crash requiring deployment of the airbag is occurring and analyze the assessed probability relative to the threshold whereby deployment of the airbag is enabled only when the assessed probability is greater than the threshold.

In another implementation, the sensor algorithm may determine the rate that gas is generated to affect the rate that the airbag is inflated. In all of these cases the position of the occupant is used to affect the deployment of the airbag either as to whether or not it should be deployed at all, the time of deployment or as to the rate of inflation.

1.1 Ultrasonics 1.1.1 General

The maximum acoustic frequency that is practical to use for acoustic imaging in the systems is about 40 to 160 kilohertz (kHz). The wavelength of a 50 kHz acoustic wave is about 0.6 cm which is too coarse to determine the fine features of a person's face, for example. It is well understood by those skilled in the art that features which are much smaller than the wavelength of the irradiating radiation cannot be distinguished. Similarly, the wavelength of common radar systems varies from about 0.9 cm (for 33 GHz K band) to 133 cm (for 225 MHz P band) which are also too coarse for person-identification systems.

Referring now to FIGS. 5 and 13–17, a section of the passenger compartment of an automobile is shown generally as 40 in FIG. 5. A driver of a vehicle 30 sits on a seat 3 behind a steering wheel 42 which contains an airbag assembly 44. Four transmitter and/or receiver assemblies 50, 52, 53 and 54 are positioned at various places in or around the passenger compartment to determine the location of the head, chest and torso of the driver 30 relative to the airbag assembly 44. Usually, in any given implementation, only one or two of the transmitters and receivers would be used depending on their mounting locations as described below.

FIG. 5 illustrates several of the possible locations of such devices. For example, transmitter and receiver 50 emits ultrasonic acoustical waves which bounce off the chest of the driver 30 and return. Periodically, a burst of ultrasonic waves at about 50 kilohertz is emitted by the transmitter/receiver and then the echo, or reflected signal, is detected by the same or different device. An associated electronic circuit measures the time between the transmission and the reception of the ultrasonic waves and determines the distance from the transmitter/receiver to the driver 30 based on the velocity of sound.

This information can then be sent to a microprocessor that can be located in the crash sensor and diagnostic circuitry which determines if the driver 30 is close enough to the airbag assembly 44 that a deployment might, by itself, cause injury to the driver 30. In such a case, the circuit disables the airbag system and thereby prevents its deployment. In an alternate case, the sensor algorithm assesses the probability that a crash requiring an airbag is in process and waits until that probability exceeds an amount that is dependent on the position of the driver 30. Thus, for example, the sensor might decide to deploy the airbag based on a need probability assessment of 50%, if the decision must be made immediately for a driver 30 approaching the airbag, but might wait until the probability rises to 95% for a more distant driver. Although a driver system has been illustrated, the passenger system would be similar.

Alternate mountings for the transmitter/receiver include various locations on the instrument panel on either side of the steering column such as 53 in FIG. 5. Also, although some of the devices herein illustrated assume that for the ultrasonic system, the same device is used for both transmitting and receiving waves, there are advantages in separating these functions, at least for standard transducer systems. Since there is a time lag required for the system to stabilize after transmitting a pulse before it can receive a pulse, close measurements are enhanced, for example, by using separate transmitters and receivers. In addition, if the ultrasonic transmitter and receiver are separated, the transmitter can transmit continuously, provided the transmitted signal is modulated such that the received signal can be compared with the transmitted signal to determine the time it takes for the waves to reach and reflect off of the occupant.

Many methods exist for this modulation including varying the frequency or amplitude of the waves or pulse modulation or coding. In all cases, the logic circuit which controls the sensor and receiver must be able to determine when the signal which was most recently received was transmitted. In this manner, even though the time that it takes for the signal to travel from the transmitter to the receiver, via reflection off of the occupant or other object to be monitored, may be several milliseconds, information as to the position of the occupant is received continuously which permits an accurate, although delayed, determination of the occupant's velocity from successive position measurements. Other modulation methods that may be applied to electromagnetic radiations include TDMA, CDMA, noise or pseudo-noise, spatial, etc.

Conventional ultrasonic distance measuring devices must wait for the signal to travel to the occupant or other monitored object and return before a new signal is sent. This greatly limits the frequency at which position data can be obtained to the formula where the frequency is equal to the velocity of sound divided by two times the distance to the occupant. For example, if the velocity of sound is taken at about 1000 feet per second, occupant position data for an occupant or object located one foot from the transmitter can only be obtained every 2 milliseconds which corresponds to a frequency of about 500 Hz. At a three-foot displacement and allowing for some processing time, the frequency is closer to about 100 Hz.

This slow frequency that data can be collected seriously degrades the accuracy of the velocity calculation. The reflection of ultrasonic waves from the clothes of an occupant or the existence of thermal gradients, for example, can cause noise or scatter in the position measurement and lead to significant inaccuracies in a given measurement. When many measurements are taken more rapidly, as in the technique described here, these inaccuracies can be averaged and a significant improvement in the accuracy of the velocity calculation results.

The determination of the velocity of the occupant need not be derived from successive distance measurements. A potentially more accurate method is to make use of the Doppler Effect where the frequency of the reflected waves differs from the transmitted waves by an amount which is proportional to the occupant's velocity. In one embodiment, a single ultrasonic transmitter and a separate receiver are used to measure the position of the occupant, by the travel time of a known signal, and the velocity, by the frequency shift of that signal. Although the Doppler Effect has been used to determine whether an occupant has fallen asleep, it has not previously been used in conjunction with a position measuring device to determine whether an occupant is likely to become out of position, i.e., an extrapolated position in the future based on the occupant's current position and velocity as determined from successive position measurements, and thus in danger of being injured by a deploying airbag, or that a monitored object is moving. This combination is particularly advantageous since both measurements can be accurately and efficiently determined using a single transmitter and receiver pair resulting in a low cost system.

One problem with Doppler measurements is the slight change in frequency that occurs during normal occupant velocities. This requires that sophisticated electronic techniques and a low Q receiver should be utilized to increase the frequency and thereby render it easier to measure the velocity using the phase shift. For many implementations, therefore, the velocity of the occupant is determined by calculating the difference between successive position measurements.

The following discussion will apply to the case where ultrasonic sensors are used although a similar discussion can be presented relative to the use of electromagnetic sensors such as active infrared sensors, taking into account the differences in the technologies. Also, the following discussion will relate to an embodiment wherein the seat is the front passenger seat, although a similar discussion can apply to other vehicles and monitoring situations.

Figure 9:
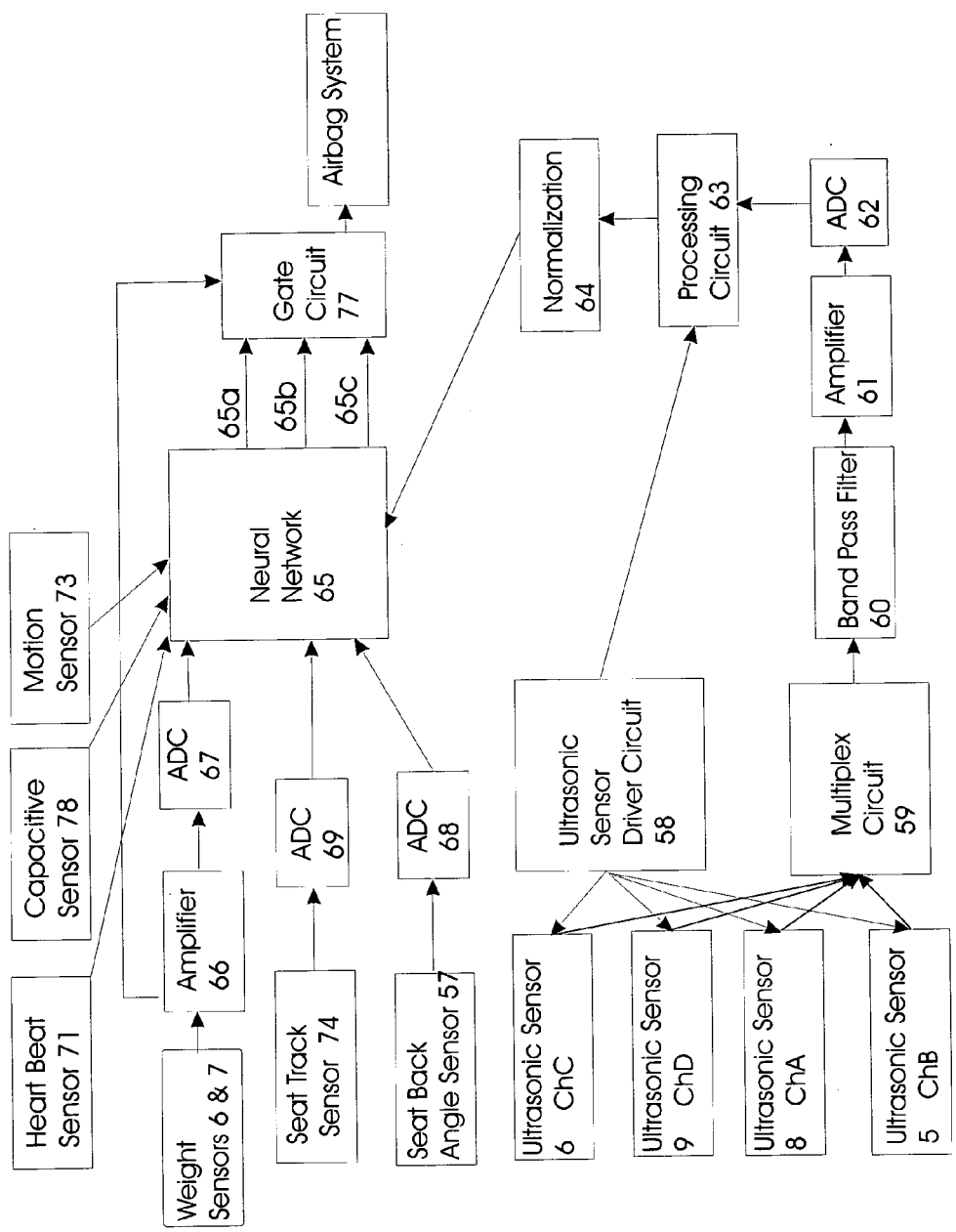
FIG. 9 is a circuit diagram of the seated-state detecting unit of the present invention.

The ultrasonic or electromagnetic sensor systems, 6, 8, 9 and 10 in FIG. 7 can be controlled or driven, one at a time or simultaneously, by an appropriate driver circuit such as ultrasonic or electromagnetic sensor driver circuit 58 shown in FIG. 9. The transmitters of the ultrasonic or electromagnetic sensor systems 6, 8, 9 and 10 transmit respective ultrasonic or electromagnetic waves toward the seat 4 and transmit pulses (see FIG. 10(*c*)) in sequence at times t1, t2, t3 and t4 (t4>t3>t2>t1) or simultaneously (t1=t2=t3=t4). The reflected waves of the ultrasonic or electromagnetic waves are received by the receivers ChA–ChD of the ultrasonic or electromagnetic sensors 6, 8, 9 and 10. The receiver ChA is associated with the ultrasonic or electromagnetic sensor system 8, the receiver ChB is associated with the ultrasonic or electromagnetic sensor system 5, the receiver ChD is associated with the ultrasonic or electromagnetic sensor system 6, and the receiver ChD is associated with the ultrasonic or electromagnetic sensor system 9.

Figures 10A, 10B, 10C:
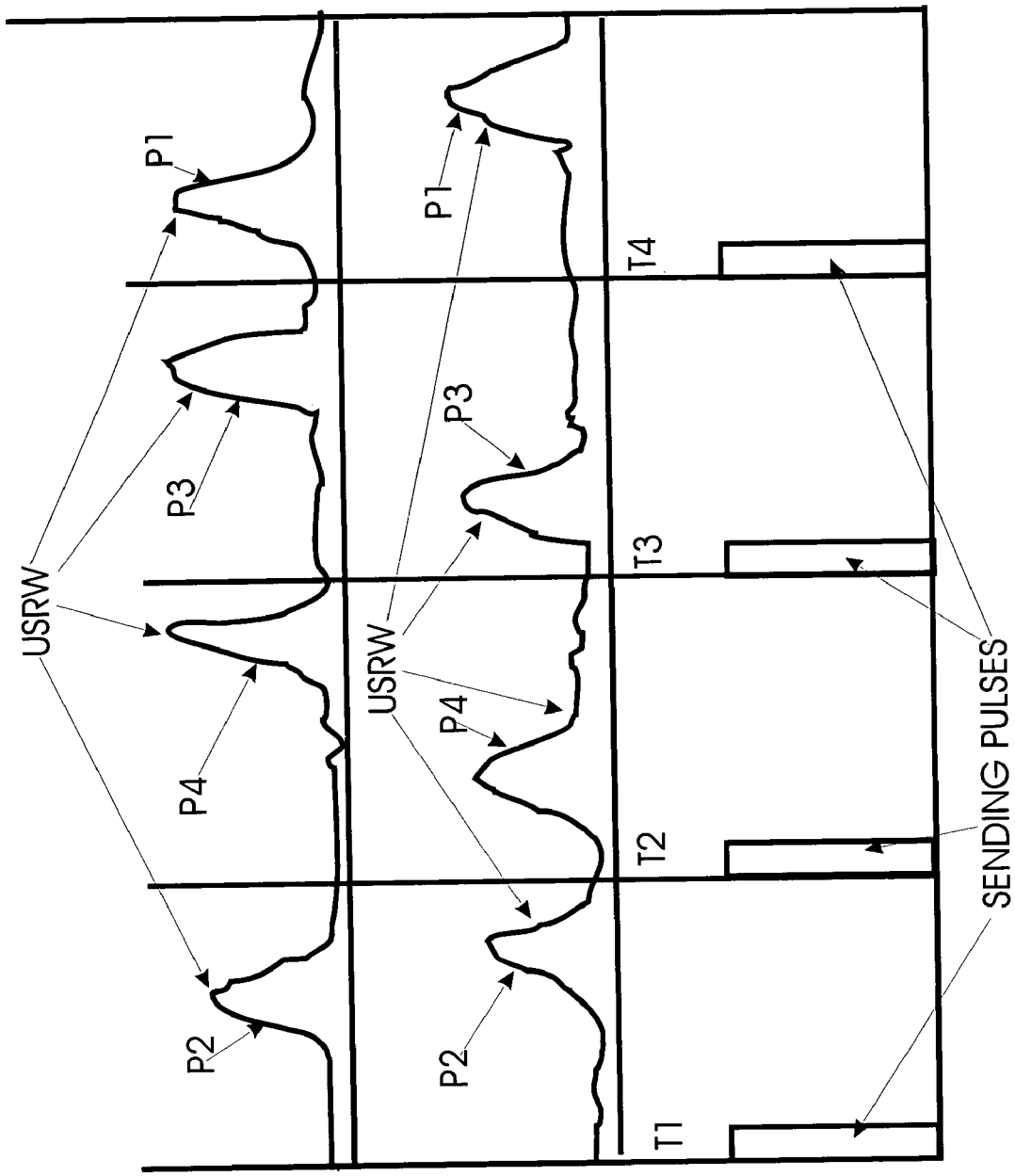
FIGS. 10(a), 10(b) and 10(c) are each a diagram showing the configuration of the reflected waves of an ultrasonic wave transmitted from each transmitter of the ultrasonic sensors toward the passenger seat, obtained within the time that the reflected wave arrives at a receiver, FIG. 10(a) showing an example of the reflected waves obtained when a passenger is in a normal seated-state, FIG. 10(b) showing an example of the reflected waves obtained when a passenger is in an abnormal seated-state (where the passenger is seated too close to the instrument panel), and FIG. 10(c) showing a transmit pulse.

FIGS. 10(*a*) and 10(*b*) show examples of the reflected ultrasonic waves USRW that are received by receivers ChA–ChD. FIG. 10(*a*) shows an example of the reflected wave USRW that is obtained when an adult sits in a normally seated space on the passenger seat 4, while FIG. 10(*b*) shows an example of the reflected wave USRW that are obtained when an adult sits in a slouching state (one of the abnormal seated-states) in the passenger seat 4.

Figure 6:
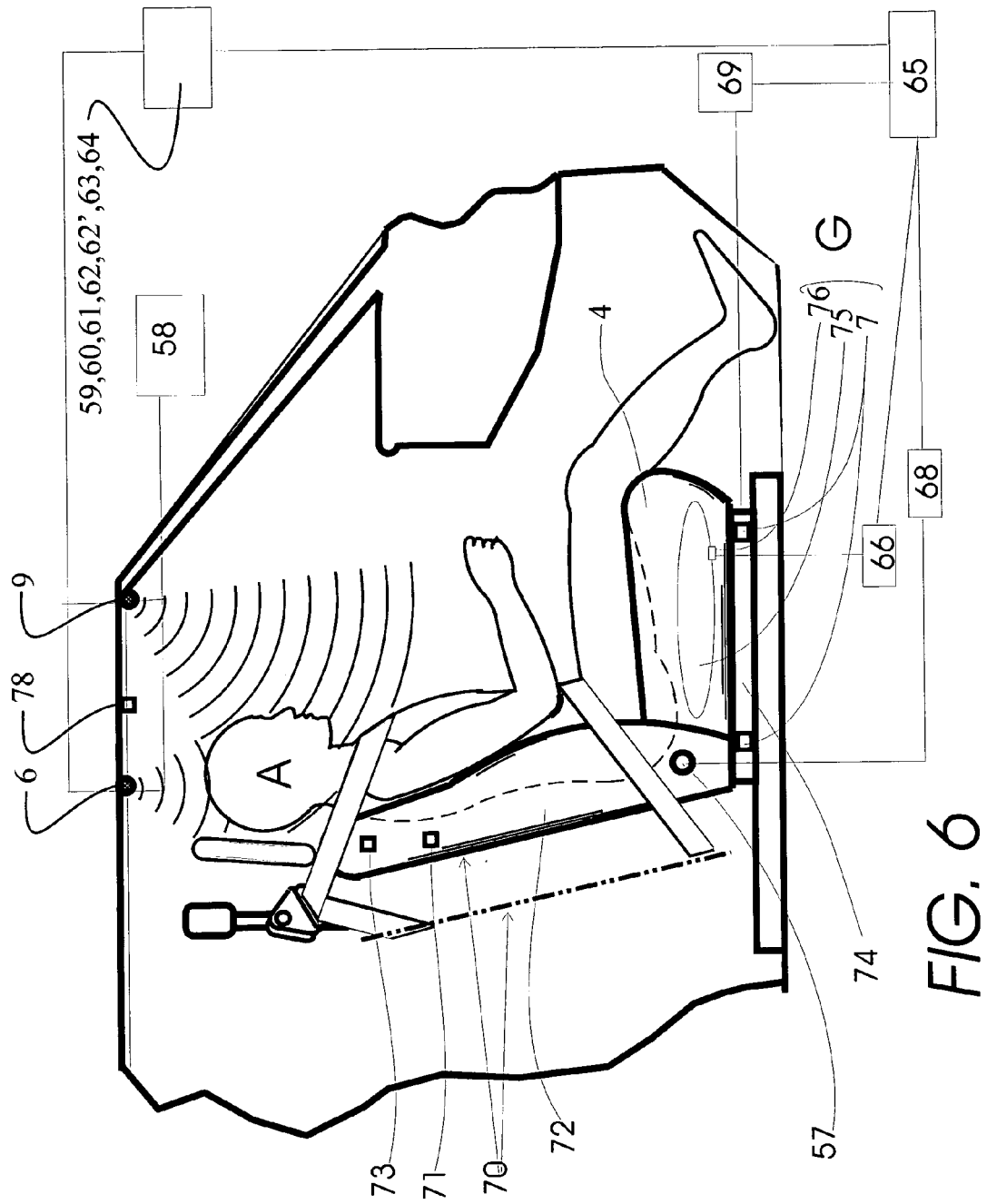
FIG. 6 shows a seated-state detecting unit in accordance with the present invention and the connections between ultrasonic or electromagnetic sensors, a weight sensor, a reclining angle detecting sensor, a seat track position detecting sensor, a heartbeat sensor, a motion sensor, a neural network, and an airbag system installed within a vehicle compartment.

In the case of a normally seated passenger, as shown in FIGS. 6 and 7, the location of the ultrasonic sensor system 6 is closest to the passenger A. Therefore, the reflected wave pulse P1 is received earliest after transmission by the receiver ChD as shown in FIG. 10(*a*), and the width of the reflected wave pulse P1 is larger. Next, the distance from the ultrasonic sensor 8 is closer to the passenger A, so a reflected wave pulse P2 is received earlier by the receiver ChA compared with the remaining reflected wave pulses P3 and P4. Since the reflected wave pauses P3 and P4 take more time than the reflected wave pulses P1 and P2 to arrive at the receivers ChC and ChB, the reflected wave pulses P3 and P4 are received as the timings shown in FIG. 10(*a*). More specifically, since it is believed that the distance from the ultrasonic sensor system 6 to the passenger A is slightly shorter than the distance from the ultrasonic sensor system 10 to the passenger A, the reflected wave pulse P3 is received slightly earlier by the receiver ChC than the reflected wave pulse P4 is received by the receiver ChB.

In the case where the passenger A is sitting in a slouching state in the passenger seat 4, the distance between the ultrasonic sensor system 6 and the passenger A is shortest. Therefore, the time from transmission at time t3 to reception is shortest, and the reflected wave pulse P3 is received by the receiver ChC, as shown in FIG. 10(*b*). Next, the distances between the ultrasonic sensor system 10 and the passenger A becomes shorter, so the reflected wave pulse P4 is received earlier by the receiver ChB than the remaining reflected wave pulses P2 and P1. When the distance from the ultrasonic sensor system 8 to the passenger A is compared with that from the ultrasonic sensor system 9 to the passenger A, the distance from the ultrasonic sensor system 8 to the passenger A becomes shorter, so the reflected wave pulse P2 is received by the receiver ChA first and the reflected wave pulse P1 is thus received last by the receiver ChD.

The configurations of the reflected wave pulses P1–P4, the times that the reflected wave pulses P1–P4 are received, the sizes of the reflected wave pulses P1–P4 are varied depending upon the configuration and position of an object such as a passenger situated on the front passenger seat 4. FIGS. 10(*a*) and (*b*) merely show examples for the purpose of description and therefore the present invention is not limited to these examples.

The outputs of the receivers ChA–ChD, as shown in FIG. 9, are input to a band pass filter 60 through a multiplex circuit 59 which is switched in synchronization with a timing signal from the ultrasonic sensor drive circuit 58. The band pass filter 60 removes a low frequency wave component from the output signal based on each of the reflected wave USRW and also removes some of the noise. The output signal based on each of the reflected wave USRW is passed through the band pass filter 60, then is amplified by an amplifier 61. The amplifier 61 also removes the high frequency carrier wave component in each of the reflected waves USRW and generates an envelope wave signal. This envelope wave signal is input to an analog/digital converter (ADC) 62 and digitized as measured data. The measured data is input to a processing circuit 63, which is controlled by the timing signal which is in turn output from the ultrasonic sensor drive circuit 58.

The processing circuit 63 collects measured data at intervals of 7 ms (or at another time interval with the time interval also being referred to as a time window or time period), and 47 data points are generated for each of the ultrasonic sensor systems 6, 8, 9 and 10. For each of these reflected waves USRW, the initial reflected wave portion T1 and the last reflected wave portion T2 are cut off or removed in each time window. The reason for this will be described when the training procedure of a neural network is described later, and the description is omitted for now. With this, 32, 31, 37 and 38 data points will be sampled by the ultrasonic sensor systems 6, 8, 9 and 10, respectively. The reason why the number of data points differs for each of the ultrasonic sensor systems 6, 8, 9 and 10 is that the distance from the passenger seat 4 to the ultrasonic sensor systems 6, 8, 9 and 10 differ from one another.

Each of the measured data is input to a normalization circuit 64 and normalized. The normalized measured data is input to the neural network 65 as wave data.

A comprehensive occupant sensing system will now be discussed which involves a variety of different sensors, again this is for illustration purposes only and a similar description can be constructed for other vehicles including shipping container and truck trailer monitoring. Many of these sensors will be discussed in more detail under the appropriate sections below. FIG. 6 shows a passenger seat 70 to which an adjustment apparatus including a seated-state detecting unit according to the present invention may be applied. The seat 70 includes a horizontally situated bottom seat portion 4 and a vertically oriented back portion 72. The seat portion 4 is provided with one or more pressure or weight sensors 7, 76 that determine the weight of the object occupying the seat or the pressure applied by the object to the seat. The coupled portion between the seated portion 4 and the back portion 72 is provided with a reclining angle detecting sensor 57, which detects the tilted angle of the back portion 72 relative to the seat portion 4. The seat portion 4 is provided with a seat track position-detecting sensor 74. The seat track position detecting sensor 74 detects the quantity of movement of the seat portion 4 which is moved from a back reference position, indicated by the dotted chain line. Optionally embedded within the back portion 72 are a heartbeat sensor 71 and a motion sensor 73. Attached to the headliner is a capacitance sensor 78. The seat 70 may be the driver seat, the front passenger seat or any other seat in a motor vehicle as well as other seats in transportation vehicles or seats in non-transportation applications.

Pressure or weight measuring means such as the sensors 7 and 76 are associated with the seat, e.g., mounted into or below the seat portion 4 or on the seat structure, for measuring the pressure or weight applied onto the seat. The pressure or weight may be zero if no occupying item is present and the sensors are calibrated to only measure incremental weight or pressure. Sensors 7 and 76 may represent a plurality of different sensors which measure the pressure or weight applied onto the seat at different portions thereof or for redundancy purposes, e.g., such as by means of an airbag or fluid filled bladder 75 in the seat portion 4. Airbag or bladder 75 may contain a single or a plurality of chambers, each of which may be associated with a sensor (transducer) 76 for measuring the pressure in the chamber. Such sensors may be in the form of strain, force or pressure sensors which measure the force or pressure on the seat portion 4 or seat back 72, a part of the seat portion 4 or seat back 72, displacement measuring sensors which measure the displacement of the seat surface or the entire seat 70 such as through the use of strain gages mounted on the seat structural members, such as 7, or other appropriate locations, or systems which convert displacement into a pressure wherein one or more pressure sensors can be used as a measure of weight and/or weight distribution. Sensors 7, 76 may be of the types disclosed in U.S. Pat. No. 6,242,701 and below herein. Although pressure or weight here is disclosed and illustrated with regard to measuring the pressure applied by or weight of an object occupying a seat in an automobile or truck, the same principles can be used to measure the pressure applied by and weight of objects occupying other vehicles including truck trailers and shipping containers. For example, a series of fluid filled bladders under a segmented floor could be used to measure the weight and weight distribution in a truck trailer.

Many practical problems have arisen during the development stages of bladder and strain gage based weight systems. Some of these problems relate to bladder sensors and in particular to gas-filled bladder sensors and are effectively dealt with in U.S. Pat. No. 5,918,696, U.S. Pat. No. 5,927,427, U.S. Pat. No. 5,957,491, U.S. Pat. No. 5,979,585, U.S. Pat. No. 5,984,349, U.S. Pat. No. 6,021,863, U.S. Pat. No. 6,056,079, U.S. Pat. No. 6,076,853, U.S. Pat. No. 6,260,879 and U.S. Pat. No. 6,286,861. Other problems relate to seatbelt usage and to unanticipated stresses and strains that occur in seat mounting structures and will be discussed below.

As illustrated in FIG. 9, the output of the pressure or weight sensor(s) 7 and 76 is amplified by an amplifier 66 coupled to the pressure or weight sensor(s) 7,76 and the amplified output is input to the analog/digital converter 67.

A heartbeat sensor 71 is arranged to detect a heartbeat, and the magnitude thereof, of a human occupant of the seat, if such a human occupant is present. The output of the heartbeat sensor 71 is input to the neural network 65. The heartbeat sensor 71 may be of the type as disclosed in McEwan (U.S. Pat. No. 5,573,012 and U.S. Pat. No. 5,766,208). The heartbeat sensor 71 can be positioned at any convenient position relative to the seat 4 where occupancy is being monitored. A preferred location is within the vehicle seatback. The heartbeat of a stowaway in a cargo container or truck trailer can similarly be measured be a sensor on the vehicle floor or other appropriate location that measures vibrations.

The reclining angle detecting sensor 57 and the seat track position-detecting sensor 74, which each may comprise a variable resistor, can be connected to constant-current circuits, respectively. A constant-current is supplied from the constant-current circuit to the reclining angle detecting sensor 57, and the reclining angle detecting sensor 57 converts a change in the resistance value on the tilt of the back portion 72 to a specific voltage. This output voltage is input to an analog/digital converter 68 as angle data, i.e., representative of the angle between the back portion 72 and the seat portion 4. Similarly, a constant current can be supplied from the constant-current circuit to the seat track position-detecting sensor 74 and the seat track position detecting sensor 74 converts a change in the resistance value based on the track position of the seat portion 4 to a specific voltage. This output voltage is input to an analog/digital converter 69 as seat track data. Thus, the outputs of the reclining angle-detecting sensor 57 and the seat track position-detecting sensor 74 are input to the analog/digital converters 68 and 69, respectively. Each digital data value from the ADCs 68, 69 is input to the neural network 65. Although the digitized data of the pressure or weight sensor(s) 7, 76 is input to the neural network 65, the output of the amplifier 66 is also input to a comparison circuit. The comparison circuit, which is incorporated in the gate circuit algorithm, determines whether or not the weight of an object on the passenger seat 70 is more than a predetermined weight, such as 60 lbs., for example. When the weight is more than 60 lbs., the comparison circuit outputs a logic 1 to the gate circuit to be described later. When the weight of the object is less than 60 lbs., a logic 0 is output to the gate circuit. A more detailed description of this and similar systems can be found in the above-referenced patents and patent applications assigned to the current assignee and in the description below.

The system described above is one example of many systems that can be designed using the teachings of at least one of the inventions disclosed herein for detecting the occupancy state of the seat of a vehicle.

Figure 18:
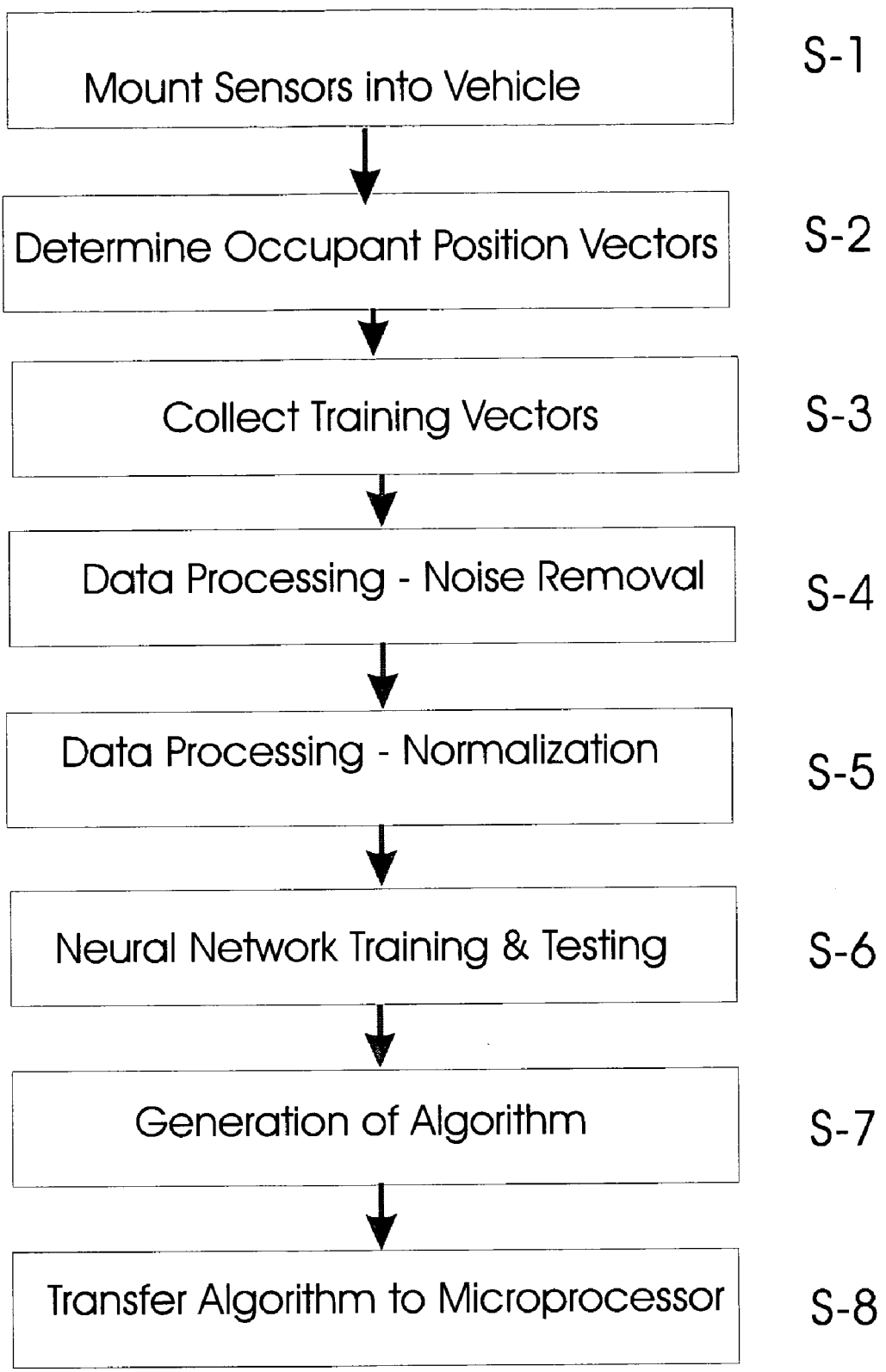
FIG. 18 a flowchart showing the training steps of a neural network.

As diagrammed in FIG. 18, the first step is to mount the four sets of ultrasonic sensor systems 11–14, the weight sensors 7,76, the reclining angle detecting sensor 57, and the seat track position detecting sensor 74, for example, into a vehicle (step S1). For other vehicle monitoring tasks different sets of sensors could be used. Next, in order to provide data for the neural network 65 to learn the patterns of seated states, data is recorded for patterns of all possible seated or occupancy states and a list is maintained recording the seated or occupancy states for which data was acquired. The data from the sensors/transducers 6, 8, 9, 10, 57, 71, 73, 74, 76 and 78 for a particular occupancy of the passenger seat, for example, is called a vector (step S2). It should be pointed out that the use of the reclining angle detecting sensor 57, seat track position detecting sensor 74, heartbeat sensor 71, capacitive sensor 78 and motion sensor 73 is not essential to the detecting apparatus and method in accordance with the invention. However, each of these sensors, in combination with any one or more of the other sensors enhances the evaluation of the seated-state of the seat or the occupancy of the vehicle.

Figure 11:
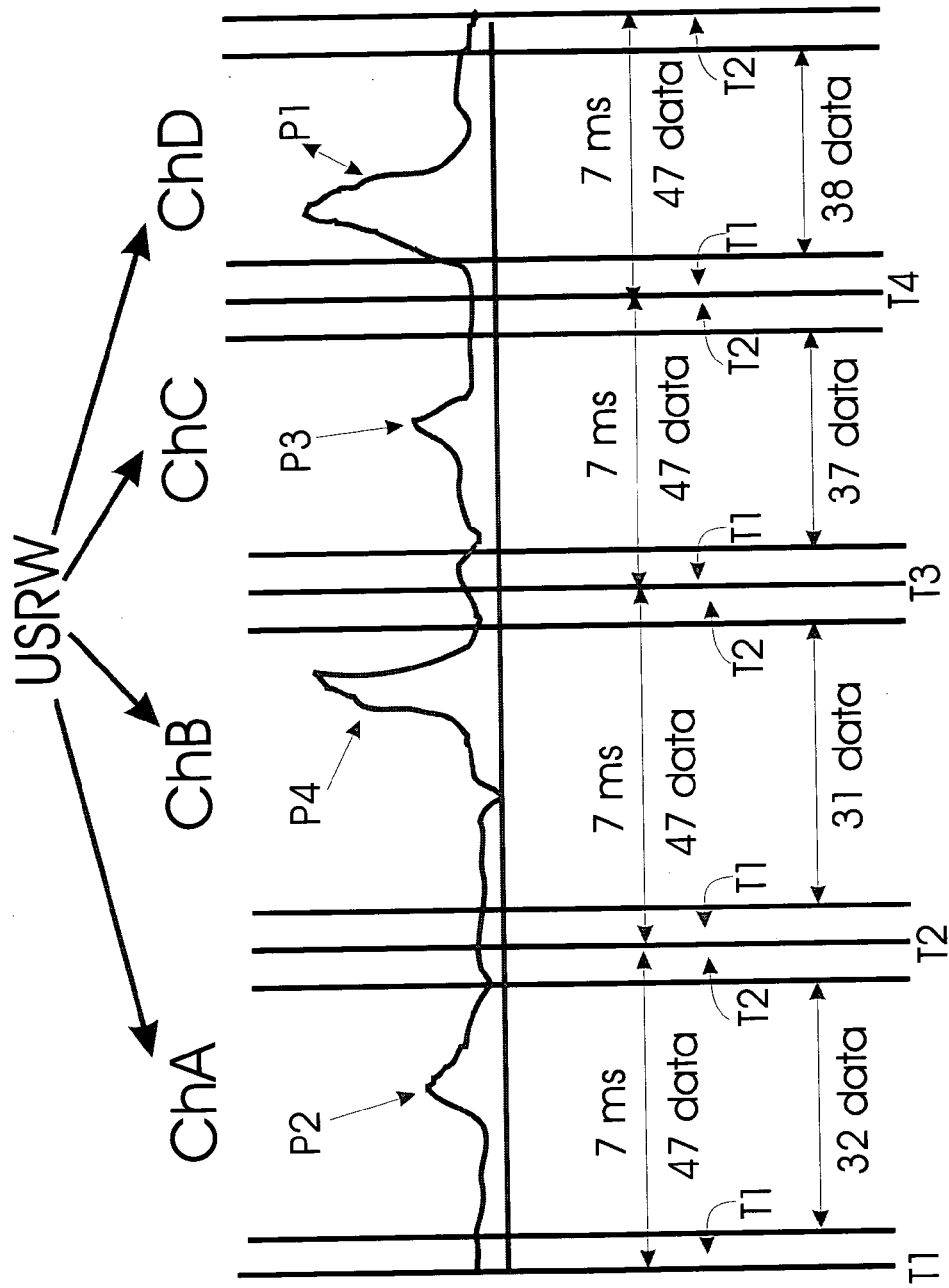
FIG. 11 is a diagram of the data processing of the reflected waves from the ultrasonic or electromagnetic sensors.

Next, based on the training data from the reflected waves of the ultrasonic sensor systems 6, 8, 9, 10 and the other sensors 7, 71, 73, 76, 78 the vector data is collected (step S3). Next, the reflected waves P1–P4 are modified by removing the initial reflected waves from each time window with a short reflection time from an object (range gating) (period T1 in FIG. 11) and the last portion of the reflected waves from each time window with a long reflection time from an object (period P2 in FIG. 11) (step S4). It is believed that the reflected waves with a short reflection time from an object is due to cross-talk, that is, waves from the transmitters which leak into each of their associated receivers ChA–ChD. It is also believed that the reflected waves with a long reflection time are reflected waves from an object far away from the passenger seat or from multipath reflections. If these two reflected wave portions are used as data, they will add noise to the training process. Therefore, these reflected wave portions are eliminated from the data.

Recent advances in ultrasonic transducer design have now permitted the use of a single transducer acting as both a sender (transmitter) and receiver. These same advances have substantially reduced the ringing of the transducer after the excitation pulse has been caused to die out to where targets as close as about 2 inches from the transducer can be sensed. Thus, the magnitude of the T1 time period has been substantially reduced.

Figure 19:
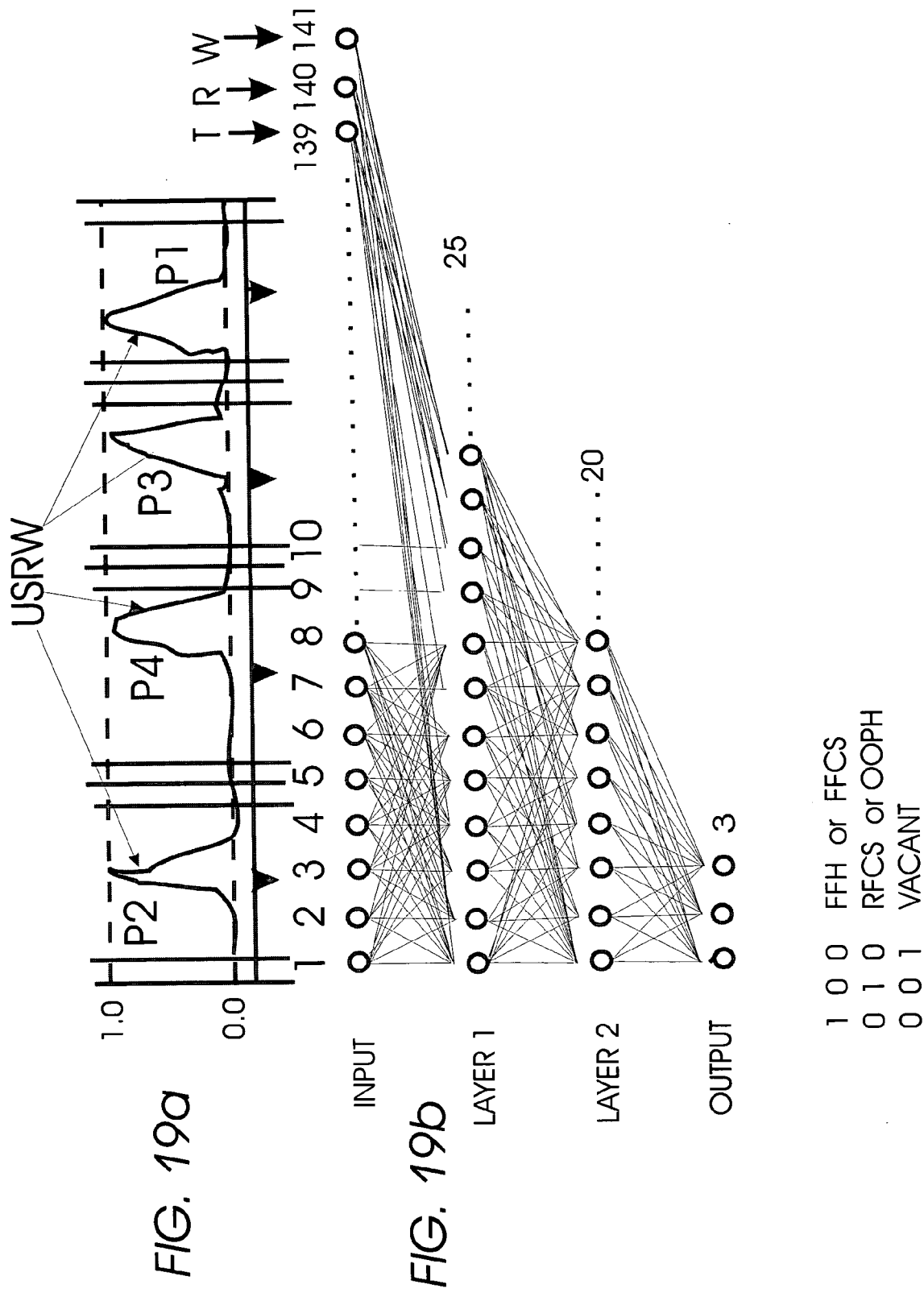
FIG. 19(a) is an explanatory diagram of a process for normalizing the reflected wave and shows normalized reflected waves.
FIG. 19(b) is a diagram similar to FIG. 19(a) showing a step of extracting data based on the normalized reflected waves and a step of weighting the extracted data by employing the data of the seat track position detecting sensor, the data of the reclining angle detecting sensor, and the data of the weight sensor.

As shown in FIG. 19(a), the measured data is normalized by making the peaks of the reflected wave pulses P1–P4 equal (step S5). This eliminates the effects of different reflectivities of different objects and people depending on the characteristics of their surfaces such as their clothing. Data from the weight sensor, seat track position sensor and seat reclining angle sensor is also frequently normalized based typically on fixed normalization parameters. When other sensors are used for other types of monitoring, similar techniques are used.

The data from the ultrasonic transducers are now also preferably fed through a logarithmic compression circuit that substantially reduces the magnitude of reflected signals from high reflectivity targets compared to those of low reflectivity. Additionally, a time gain circuit is used to compensate for the difference in sonic strength received by the transducer based on the distance of the reflecting object from the transducer.

Figure 20:
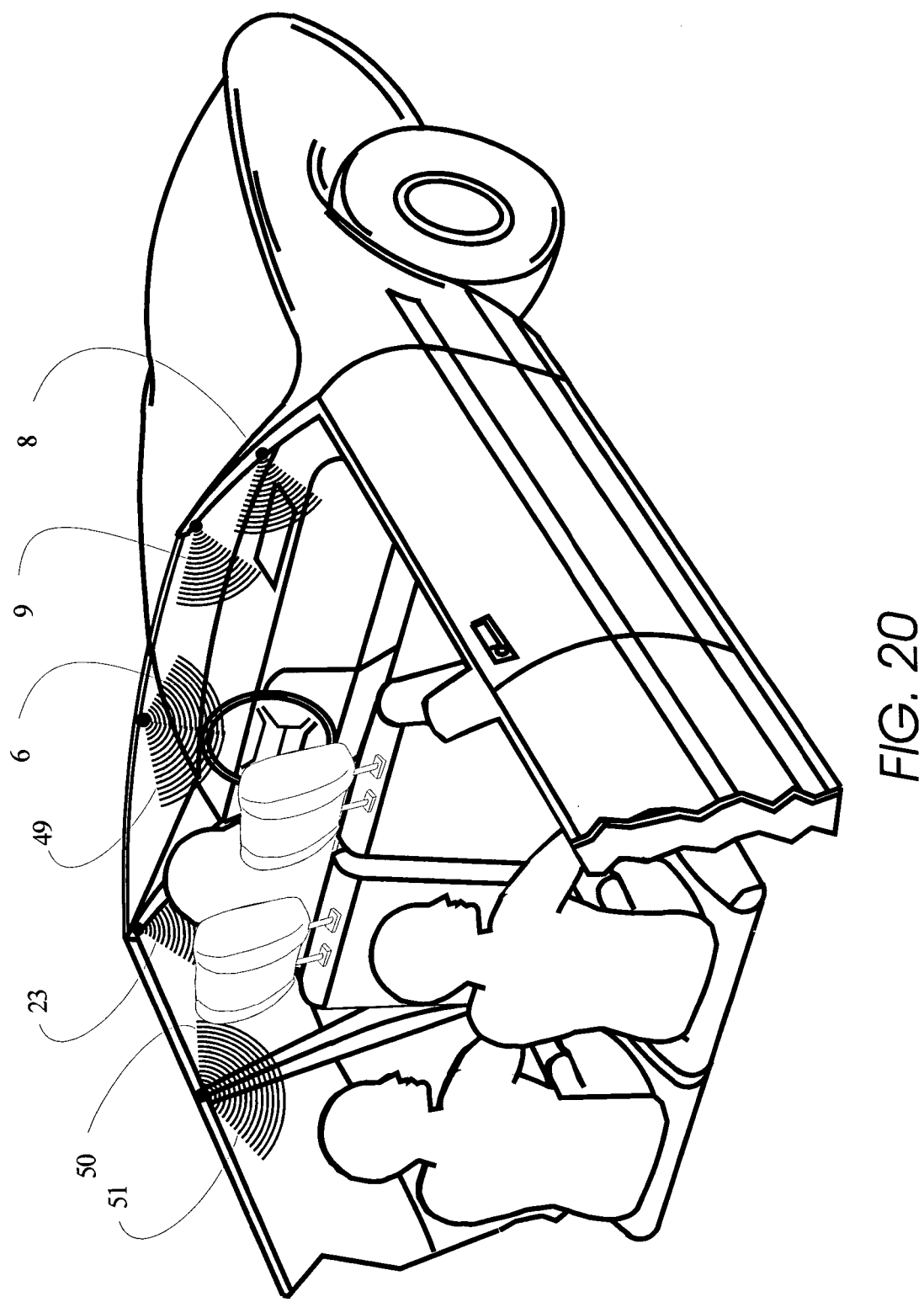
FIG. 20 is a perspective view of the interior of the passenger compartment of an automobile, with parts cut away and removed, showing a variety of transmitters that can be used in a phased array system.

As various parts of the vehicle interior identification and monitoring system described in the above reference patents and patent applications are implemented, a variety of transmitting and receiving transducers will be present in the vehicle passenger compartment. If several of these transducers are ultrasonic transmitters and receivers, they can be operated in a phased array manner, as described elsewhere for the headrest, to permit precise distance measurements and mapping of the components of the passenger compartment. This is illustrated in FIG. 20 which is a perspective view of the interior of the passenger compartment showing a variety of transmitters and receivers, 6, 8, 9, 23, 49–51 which can be used in a sort of phased array system. In addition, information can be transmitted between the transducers using coded signals in an ultrasonic network through the vehicle compartment airspace. If one of these sensors is an optical CCD or CMOS array, the location of the driver's eyes can be accurately determined and the results sent to the seat ultrasonically. Obviously, many other possibilities exist for automobile and other vehicle monitoring situations.

To use ultrasonic transducers in a phase array mode generally requires that the transducers have a low Q. Certain new micromachined capacitive transducers appear to be suitable for such an application. The range of such transducers is at present limited, however.

Figure 21:
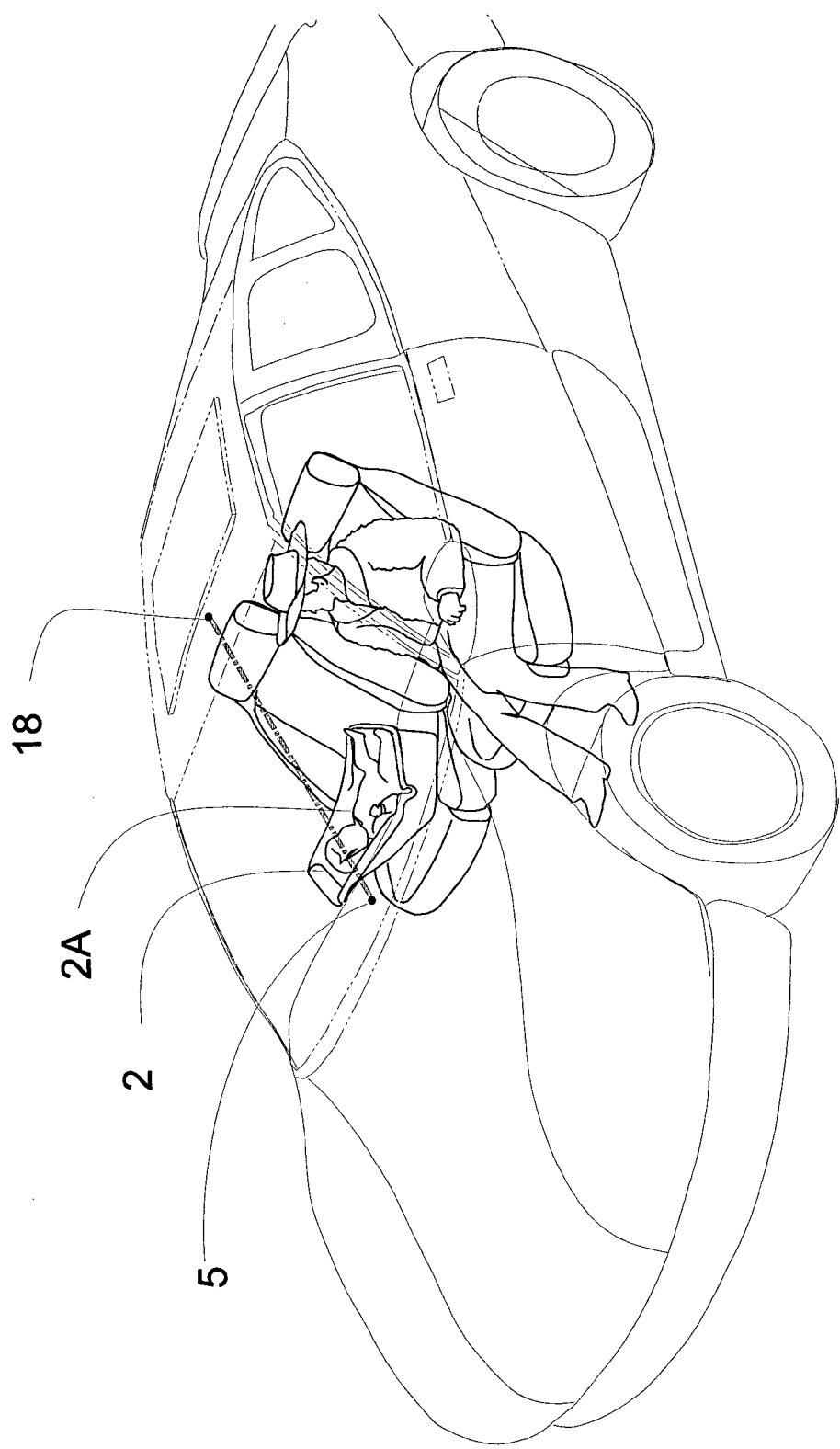
FIG. 21 is a perspective view of a vehicle containing an adult occupant and an occupied infant seat on the front seat with the vehicle shown in phantom illustrating one preferred location of the transducers placed according to the methods taught in at least one of the inventions disclosed herein.

The speed of sound varies with temperature, humidity, and pressure. This can be compensated for by using the fact that the geometry between the transducers is known and the speed of sound can therefore be measured. Thus, on vehicle startup and as often as desired thereafter, the speed of sound can be measured by one transducer, such as transducer 18 in FIG. 21, sending a signal which is directly received by another transducer 5. Since the distance separating them is known, the speed of sound can be calculated and the system automatically adjusted to remove the variation due to variations in the speed of sound. Therefore, the system operates with same accuracy regardless of the temperature, humidity or atmospheric pressure. It may even be possible to use this technique to also automatically compensate for any effects due to wind velocity through an open window. An additional benefit of this system is that it can be used to determine the vehicle interior temperature for use by other control systems within the vehicle since the variation in the velocity of sound is a strong function of temperature and a weak function of pressure and humidity.

The problem with the speed of sound measurement described above is that some object in the vehicle may block the path from one transducer to the other. This of course could be checked and a correction would not be made if the signal from one transducer does not reach the other transducer. The problem, however, is that the path might not be completely blocked but only slightly blocked. This would cause the ultrasonic path length to increase, which would give a false indication of a temperature change. This can be solved by using more than one transducer. All of the transducers can broadcast signals to all of the other transducers. The problem here, of course, is which transducer pair should be believed if they all give different answers. The answer is the one that gives the shortest distance or the greatest calculated speed of sound. By this method, there are a total of 6 separate paths for four ultrasonic transducers.

An alternative method of determining the temperature is to use the transducer circuit to measure some parameter of the transducer that changes with temperature. For example, the natural frequency of ultrasonic transducers changes in a known manner with temperature and therefore by measuring the natural frequency of the transducer, the temperature can be determined. Since this method does not require communication between transducers, it would also work in situations where each transducer has a different resonant frequency.

The process, by which all of the distances are carefully measured from each transducer to the other transducers, and the algorithm developed to determine the speed of sound, is a novel part of the teachings of the instant invention for use with ultrasonic transducers. Prior to this, the speed of sound calculation was based on a single transmission from one transducer to a known second transducer. This resulted in an inaccurate system design and degraded the accuracy of systems in the field.

If the electronic control module that is part of the system is located in generally the same environment as the transducers, another method of determining the temperature is available. This method utilizes a device and whose temperature sensitivity is known and which is located in the same box as the electronic circuit. In fact, in many cases, an existing component on the printed circuit board can be monitored to give an indication of the temperature. For example, the diodes in a log comparison circuit have characteristics that their resistance changes in a known manner with temperature. It can be expected that the electronic module will generally be at a higher temperature than the surrounding environment, however, the temperature difference is a known and predictable amount. Thus, a reasonably good estimation of the temperature in the passenger compartment, or other container compartment, can also be obtained in this manner. Naturally, thermisters or other temperature transducers can be used.

The placement of ultrasonic transducers for the example of ultrasonic occupant position sensor system of at least one of the inventions disclosed herein include the following novel disclosures: (1) the application of two sensors to single-axis monitoring of target volumes; (2) the method of locating two sensors spanning a target volume to sense object positions, that is, transducers are mounted along the sensing axis beyond the objects to be sensed; (3) the method of orientation of the sensor axis for optimal target discrimination parallel to the axis of separation of distinguishing target features; and (4) the method of defining the head and shoulders and supporting surfaces as defining humans for rear facing child seat detection and forward facing human detection.

A similar set of observations is available for the use of electromagnetic, capacitive, electric field or other sensors and for other vehicle monitoring situations. Such rules however must take into account that some of such sensors typically are more accurate in measuring lateral and vertical dimensions relative to the sensor than distances perpendicular to the sensor. This is particularly the case for CMOS and CCD-based transducers.

Considerable work is ongoing to improve the resolution of the ultrasonic transducers. To take advantage of higher resolution transducers, data points should be obtained that are closer together in time. This means that after the envelope has been extracted from the returned signal, the sampling rate should be increased from approximately 1000 samples per second to perhaps 2000 samples per second or even higher. By doubling or tripling the amount of data required to be analyzed, the system which is mounted on the vehicle will require greater computational power. This results in a more expensive electronic system. Not all of the data is of equal importance, however. The position of the occupant in the normal seating position does not need to be known with great accuracy whereas, as that occupant is moving toward the keep out zone boundary during pre-crash braking, the spatial accuracy requirements become more important. Fortunately, the neural network algorithm generating system has the capability of indicating to the system designer the relative value of each data point used by the neural network. Thus, as many as, for example, 500 data points per vector may be collected and fed to the neural network during the training stage and, after careful pruning, the final number of data points to be used by the vehicle mounted system may be reduced to 150, for example. This technique of using the neural network algorithm-generating program to prune the input data is an important teaching of the present invention.

By this method, the advantages of higher resolution transducers can be optimally used without increasing the cost of the electronic vehicle-mounted circuits. Also, once the neural network has determined the spacing of the data points, this can be fine-tuned, for example, by acquiring more data points at the edge of the keep out zone as compared to positions well into the safe zone. The initial technique is done by collecting the full 500 data points, for example, while in the system installed in the vehicle the data digitization spacing can be determined by hardware or software so that only the required data is acquired.

1.1.2 Temperature Gradient Compensation

Techniques for compensating for thermal gradients which affect ultrasonic waves and electromagnetic waves are set forth in U.S. patent application Ser. No. 10/940,881 and are incorporated by reference herein. Some of that disclosure is set forth below.

Thermal gradients adversely affect optics (e.g., create mirages) but typically do so to a lesser extent than they affect ultrasonic waves.

For example, an optical system used in a vehicle, in the same manner as an ultrasonic system is used as discussed in detail above, may include a high dynamic range camera (HDRC). HDRC's are known devices to those skilled in the art. In accordance with the invention, the HDRC can be coupled to a log compression amplifier so that the log compression amplifier amplifies some electromagnetic waves received by the HDRC relative to others. Thus, in this embodiment, the log compression amplifier would compensate for thermal instability affecting the propagation of electromagnetic waves within the vehicle interior. Some HDRC cameras are already designed to have this log compression built in such as one developed by Fraunhofer-Inst. of Microelectron. Circuits & Systems in Duisburg, Germany. An alternate approach using a combination of spatially varying images is described in International Application No. WO 00/79784 assigned to Columbia University.

Although the above discussion has centered on the front passenger seat, it is obvious that the same or similar apparatus can be used for the driver seat as well as the rear seats. Although attention has been focused of frontal protection airbags, again the apparatus can be applied to solving similar problems in side and rear impacts and to control the deployment of other occupant restraints in addition to airbags. Thus, to reiterate some of the more novel features of the invention, this application discloses: (1) the use of a tubular mounting structure for the transducers; (2) the use of electronic reduction or suppression of transducer ringing; (3) the use of mechanical damping of the transducer cone, all three of which permits the use of a single transducer for both sending and receiving; (4) the use of a shaped horn to control the pattern of ultrasound; (5) the use of the resonant frequency monitoring principle to permit speed of sound compensation; (6) the use of multiple frequencies with sufficient spacing to isolate the signals from each other; (7) the ability to achieve a complete neural network update using four transducers every 10 to 20 milliseconds; (8) the ability to package the transducer and tube into a small package due to the ability to use a small diameter tube for transmission with minimal signal loss; (9) the use of a logarithmic compression amplifier to minimize the effects of thermal gradients in the vehicle; and (10) the significant cost reduction and performance improvement which results from the applications of the above principles. To the extent possible, the foregoing features can be used in combination with one another.

Thus, disclosed above is a method and apparatus for use in a system to identify, locate and/or monitor occupants, including their parts, and other objects in the passenger compartment and in particular a child seat in the rear facing position or an out-of-position occupant in which the contents of the vehicle are irradiated with ultrasonic radiation, e.g., by transmitting ultrasonic radiation waves from an ultrasonic wave generating apparatus, and ultrasonic radiation is received using at least one ultrasonic transducer properly located in the vehicle passenger compartment, and in specific predetermined optimum locations. The ultrasonic radiation is reflected from any objects in the passenger compartment. More particularly, at least one of the inventions disclosed herein relates to methods and apparatus for enabling a single ultrasonic transducer to be used for both sending and receiving ultrasonic waves, to provide temperature compensation for a system using an ultrasonic transducer, to reduce the effects of thermal gradients on the accuracy of a system using an ultrasonic transducer, for enabling all of a plurality of ultrasonic transducers to send and receive data (waves) simultaneously, for enabling precise control of the radiated pattern of ultrasound waves, in order to achieve a speed, cost and accuracy of recognition heretofore not possible. Outputs from the ultrasonic receivers, are analyzed by appropriate computational means employing trained pattern recognition technologies, to classify, identify and/or locate the contents, and/or determine the orientation of a rear facing child seat, for example. In general, the information obtained by the identification and monitoring system is used to affect the operation of some other system in the vehicle and particularly the passenger and/or driver airbag systems, which may include a front airbag, a side airbag, a knee bolster, or combinations of the same. However, the information obtained can be used for a multitude of other vehicle systems.

1.2 Optics

Figure 4:
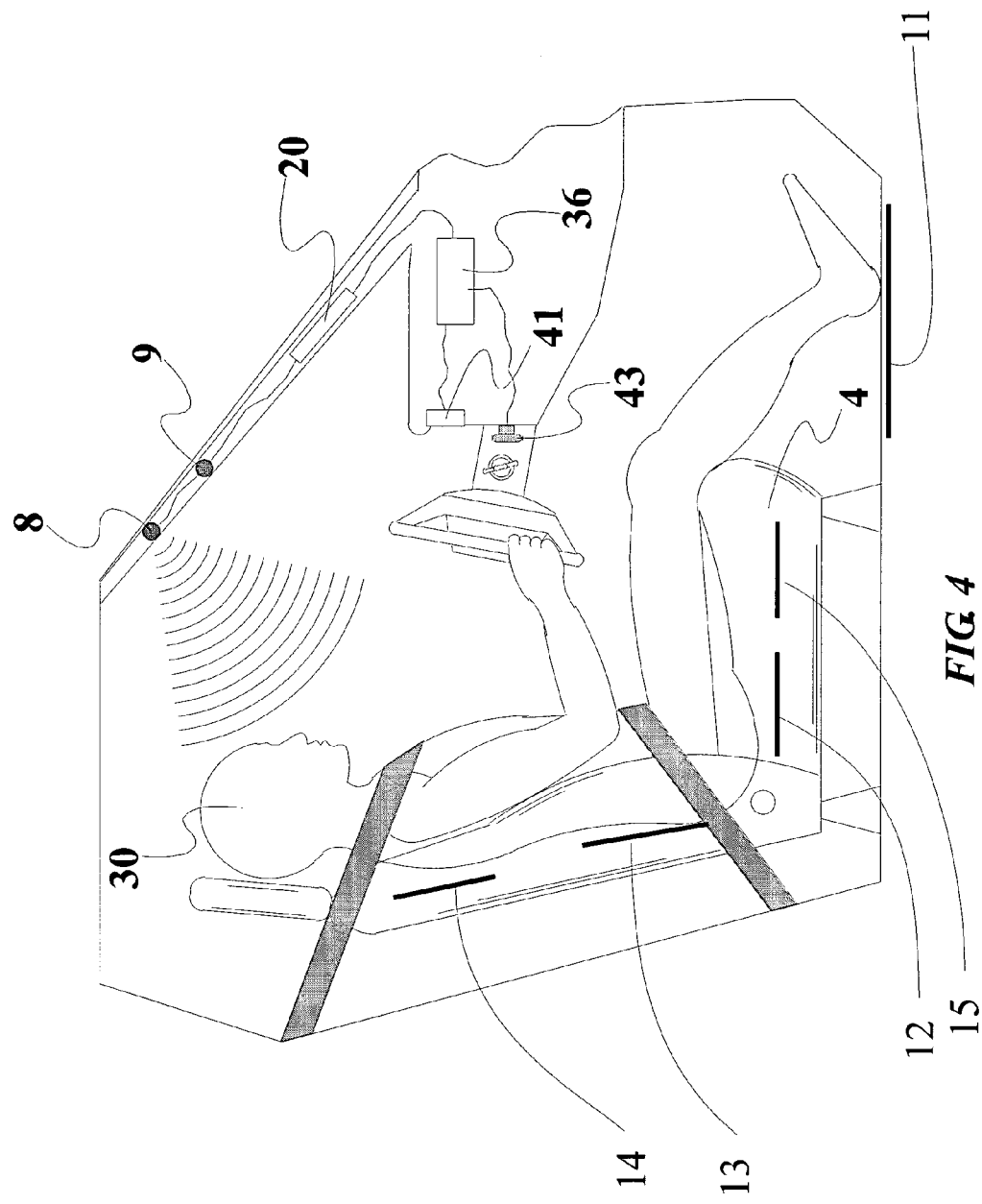
FIG. 4 is a side view with parts cutaway and removed of a vehicle showing the passenger compartment containing a driver and a preferred mounting location for an occupant identification system and including an antenna field sensor and an inattentiveness response button.

In FIG. 4, the ultrasonic transducers of the previous designs are replaced by laser transducers 8 and 9 which are connected to a microprocessor 20. In all other manners, the system operates the same. The design of the electronic circuits for this laser system is described in some detail in U.S. Pat. No. 5,653,462 and in particular FIG. 8 thereof and the corresponding description. In this case, a pattern recognition system such as a neural network system is employed and uses the demodulated signals from the laser transducers 8 and 9.

A more complicated and sophisticated system is shown conceptually in FIG. 5 where transmitter/receiver assembly 52 is illustrated. In this case, as described briefly above, an infrared transmitter and a pair of optical receivers are used to capture the reflection of the passenger. When this system is used to monitor the driver as shown in FIG. 5, with appropriate circuitry and a microprocessor, the behavior of the driver can be monitored. Using this system, not only can the position and velocity of the driver be determined and used in conjunction with an airbag system, but it is also possible to determine whether the driver is falling asleep or exhibiting other potentially dangerous behavior by comparing portions of his/her image over time. In this case, the speed of the vehicle can be reduced or the vehicle even stopped if this action is considered appropriate. This implementation has the highest probability of an unimpeded view of the driver since he/she must have a clear view through the windshield in order to operate the motor vehicle.

The output of microprocessor 20 of the monitoring system is shown connected schematically to a general interface 36 which can be the vehicle ignition enabling system; the entertainment system; the seat, mirror, suspension or other adjustment systems; telematics or any other appropriate vehicle system.

Figure 8A:
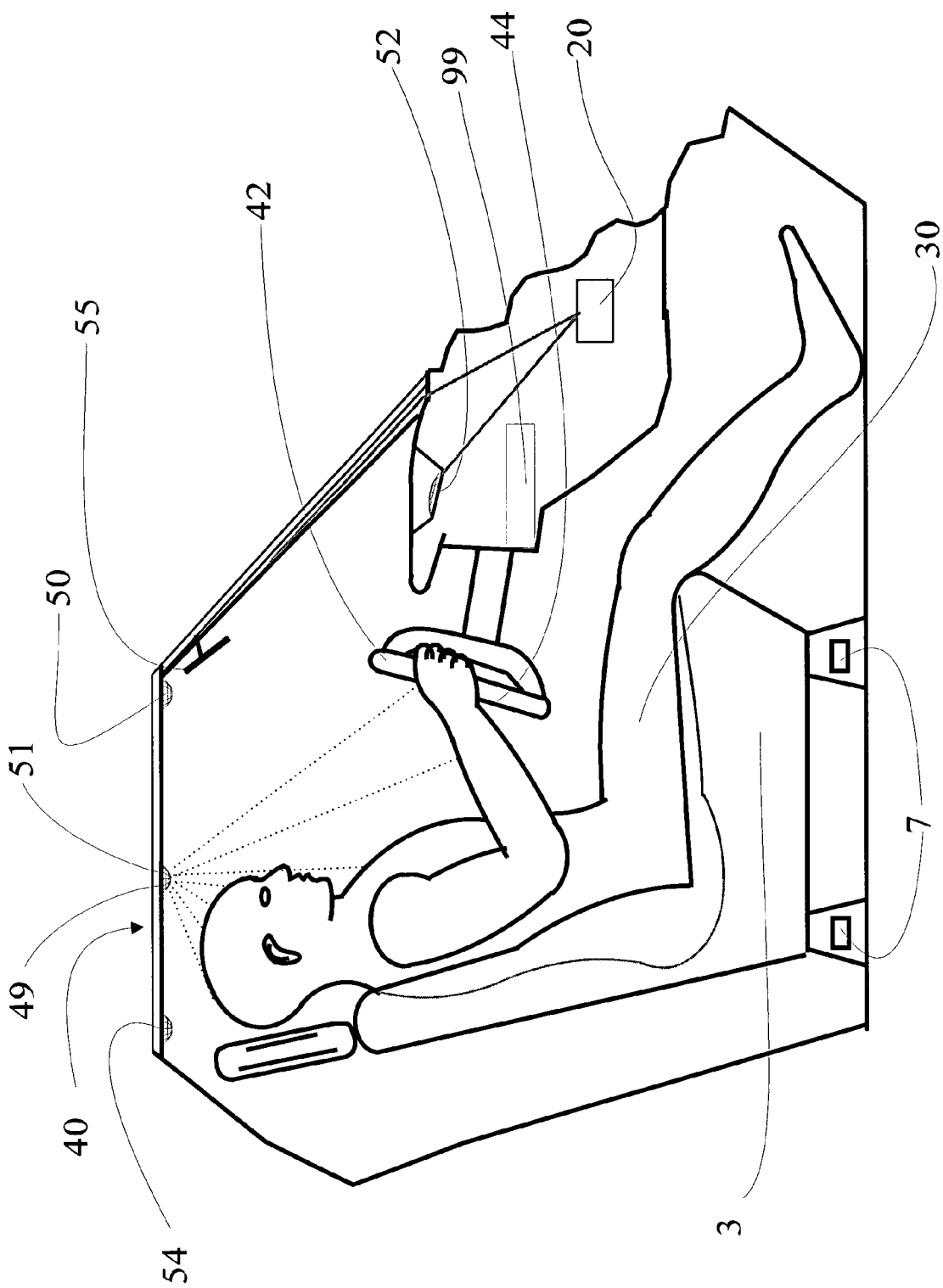
FIG. 8A is a side planar view, with certain portions removed or cut away, of a portion of the passenger compartment of a vehicle showing several preferred mounting locations of interior vehicle monitoring sensors shown particularly for sensing the vehicle driver illustrating the wave pattern from a CCD or CMOS optical position sensor mounted along the side of the driver or centered above his or her head.

FIG. 8A illustrates a typical wave pattern of transmitted infrared waves from transmitter/receiver assembly 49, which is mounted on the side of the vehicle passenger compartment above the front, driver's side door. Transmitter/receiver assembly 51, shown overlaid onto transmitter/receiver 49, is actually mounted in the center headliner of the passenger compartment (and thus between the driver's seat and the front passenger seat), near the dome light, and is aimed toward the driver. Typically, there will be a symmetrical installation for the passenger side of the vehicle. That is, a transmitter/receiver assembly would be arranged above the front, passenger side door and another transmitter/receiver assembly would be arranged in the center headliner, near the dome light, and aimed toward the front, passenger side door. Additional transducers can be mounted in similar places for monitoring both rear seat positions, another can be used for monitoring the trunk or any other interior volumes. As with the ultrasonic installations, most of the examples below are for automobile applications since these are generally the most complicated. Nevertheless, at least one of the inventions disclosed herein is not limited to automobile vehicles and similar but generally simpler designs apply to other vehicles such as shipping containers, railroad cars and truck trailers.

In a preferred embodiment, each transmitter/receiver assembly 49, 51 comprises an optical transducer, which may be a camera and an LED, that will frequently be used in conjunction with other optical transmitter/receiver assemblies such as shown at 50, 52 and 54, which act in a similar manner. In some cases, especially when a low cost system is used primarily to categorize the seat occupancy, a single or dual camera installation is used. In many cases, the source of illumination is not co-located with the camera. For example, in one preferred implementation, two cameras such as 49 and 51 are used with a single illumination source located at 49.

These optical transmitter/receiver assemblies frequently comprise an optical transmitter, which may be an infrared LED (or possibly a near infrared (NIR) LED), a laser with a diverging lens or a scanning laser assembly, and a receiver such as a CCD or CMOS array and particularly an active pixel CMOS camera or array or a HDRL or HDRC camera or array as discussed below. The transducer assemblies map the location of the occupant(s), objects and features thereof, in a two or three-dimensional image as will now be described in more detail.

Optical transducers using CCD arrays are now becoming price competitive and, as mentioned above, will soon be the technology of choice for interior vehicle monitoring. A single CCD array of 160 by 160 pixels, for example, coupled with the appropriate trained pattern recognition software, can be used to form an image of the head of an occupant and accurately locate the head, eyes, ears etc. for some of the purposes of at least one of the inventions disclosed herein.

The location or position of the occupant can be determined in various ways as noted and listed above and below as well. Generally, any type of occupant sensor can be used. Some particular occupant sensors which can be used in the systems and methods in accordance with the invention. Specifically, a camera or other device for obtaining images of a passenger compartment of the vehicle occupied by the occupant and analyzing the images can be mounted at the locations of the transmitter and/or receiver assemblies 49, 50, 51, and 54 in FIG. 8C. The camera or other device may be constructed to obtain three-dimensional images and/or focus the images on one or more optical arrays such as CCDs. Further, a mechanism for moving a beam of radiation through a passenger compartment of the vehicle occupied by the occupant, i.e., a scanning system, can be used. When using ultrasonic or electromagnetic waves, the time of flight between the transmission and reception of the waves can be used to determine the position of the occupant. The occupant sensor can also be arranged to receive infrared radiation from a space in a passenger compartment of the vehicle occupied by the occupant. It can also comprise an electric field sensor operative in a seat occupied by the occupant or a capacitance sensor operative in a seat occupied by the occupant. The implementation of such sensors in the invention will be readily appreciated by one skilled in the art in view of the disclosure herein of general occupant sensors for sensing the position of the occupant using waves, energy or radiation.

Figure 22:
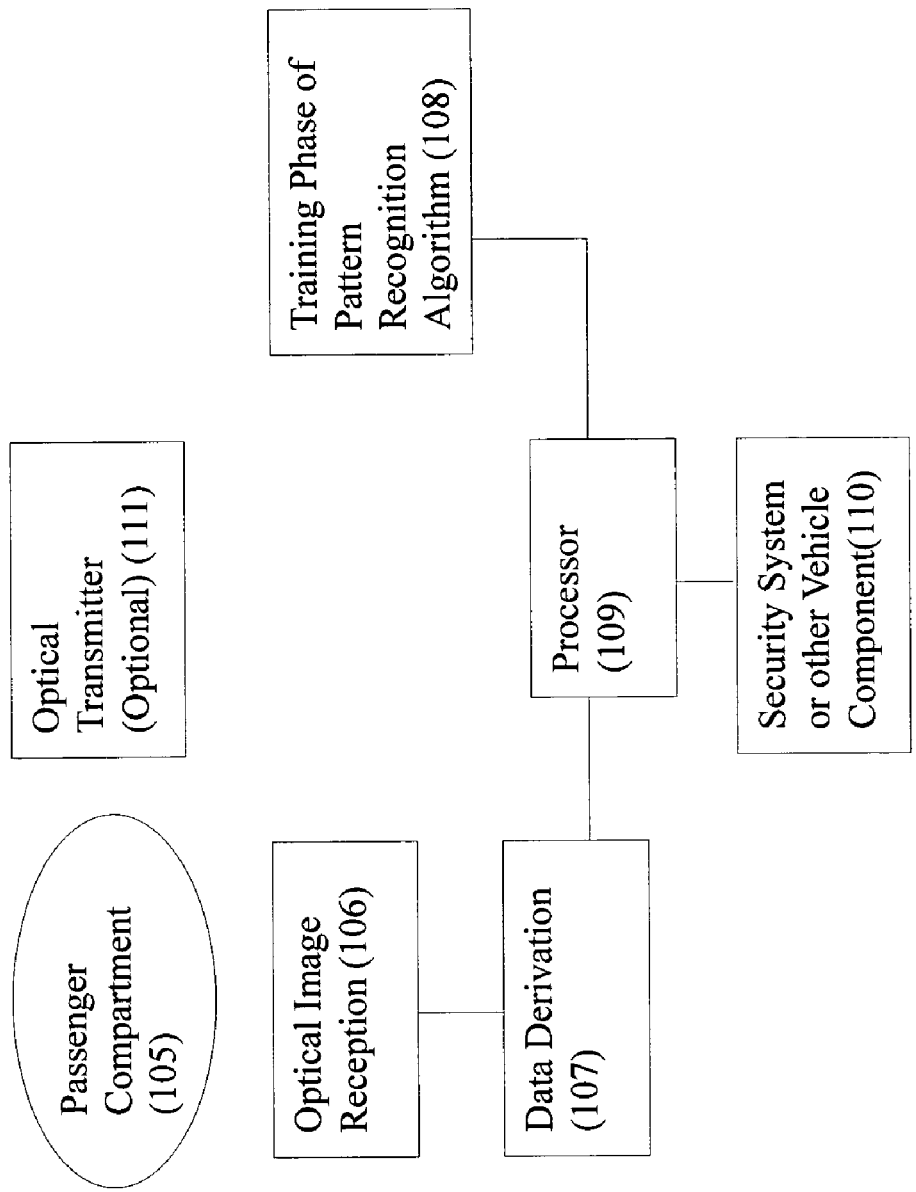
FIG. 22 is a schematic illustration of a system for controlling operation of a vehicle or a component thereof based on recognition of an authorized individual.

Looking now at FIG. 22, a schematic illustration of a system for controlling operation of a vehicle based on recognition of an authorized individual in accordance with the invention is shown. One or more images of the passenger compartment 105 are received at 106 and data derived therefrom at 107. Multiple image receivers may be provided at different locations. The data derivation may entail any one or more of numerous types of image processing techniques such as those described in U.S. Pat. No. 6,397,136 including those designed to improve the clarity of the image. A pattern recognition algorithm, e.g., a neural network, is trained in a training phase 108 to recognize authorized individuals. The training phase can be conducted upon purchase of the vehicle by the dealer or by the owner after performing certain procedures provided to the owner, e.g., entry of a security code or key. In the case of the operator of a truck or when such an operator takes possession of a trailer or cargo container, the identity of the operator can be sent by telematics to a central station for recording and perhaps further processing, In the training phase for a theft prevention system, the authorized driver(s) would sit themselves in the driver or passenger seat and optical images would be taken and processed to obtain the pattern recognition algorithm. A processor 109 is embodied with the pattern recognition algorithm thus trained to identify whether a person is the authorized individual by analysis of subsequently obtained data derived from optical images. The pattern recognition algorithm in processor 109 outputs an indication of whether the person in the image is an authorized individual for which the system is trained to identify. A security system 110 enables operations of the vehicle when the pattern recognition algorithm provides an indication that the person is an individual authorized to operate the vehicle and prevents operation of the vehicle when the pattern recognition algorithm does not provide an indication that the person is an individual authorized to operate the vehicle.

Optionally, an optical transmitting unit 111 is provided to transmit electromagnetic energy into the passenger compartment, or other volume in the case of other vehicles, such that electromagnetic energy transmitted by the optical transmitting unit is reflected by the person and received by the optical image reception device 106.

As noted above, several different types of optical reception devices can be used including a CCD array, a CMOS array, focal plane array (FPA), Quantum Well Infrared Photodetector (QWIP), any type of two-dimensional image receiver, any type of three-dimensional image receiver, an active pixel camera and an HDRC camera.

The processor 109 can be trained to determine the position of the individuals included in the images obtained by the optical image reception device, as well as the distance between the optical image reception devices and the individuals.

Instead of a security system, another component in the vehicle can be affected or controlled based on the recognition of a particular individual. For example, the rear view mirror, seat, seat belt anchorage point, headrest, pedals, steering wheel, entertainment system, ride quality, air-conditioning/ventilation system can be adjusted.

Figure 24:
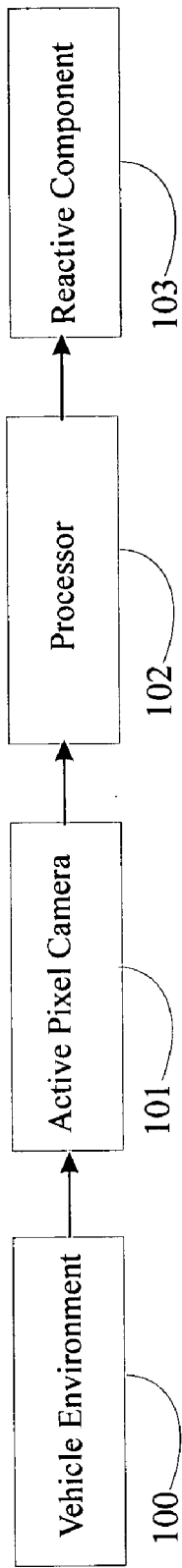
FIG. 24 is a schematic illustration of the environment monitoring in accordance with the invention.

FIG. 24 shows the components of the manner in which an environment of the vehicle, designated 100, is monitored. The environment may either be an interior environment (car, trailer, truck, shipping container, railroad car), the entire passenger compartment or only a part thereof, or an exterior environment. An active pixel camera 101 obtains images of the environment and provides the images or a representation thereof, or data derived therefrom, to a processor 102. The processor 102 determines at least one characteristic of an object in the environment based on the images obtained by the active pixel camera 101, e.g., the presence of an object in the environment, the type of object in the environment, the position of an object in the environment, the motion of an object in the environment and the velocity of an object in the environment. The environment can be any vehicle environment. Several active pixel cameras can be provided, each focusing on a different area of the environment, although some overlap is desired. Instead of an active pixel camera or array, a single light-receiving pixel can be used in some cases.

Systems based on ultrasonics and neural networks have been very successful in analyzing the seated-state of both the passenger and driver seats of automobiles. Such systems are now going into production for preventing airbag deployment when a rear facing child seat or and out-of-position occupant is present. The ultrasonic systems, however, suffer from certain natural limitations that prevent system accuracy from getting better than about 99 percent. These limitations relate to the fact that the wavelength of ultrasound is typically between 3 mm and 8 mm. As a result, unexpected results occur which are due partially to the interference of reflections from different surfaces. Additionally, commercially available ultrasonic transducers are tuned devices that require several cycles before they transmit significant energy and similarly require several cycles before they effectively receive the reflected signals. This requirement has the effect of smearing the resolution of the ultrasound to the point that, for example, using a conventional 40 kHz transducer, the resolution of the system is approximately three inches.

In contrast, the wavelength of near infrared is less than one micron and no significant interferences occur. Similarly, the system is not tuned and therefore is theoretically sensitive to a very few cycles. As a result, resolution of the optical system is determined by the pixel spacing in the CCD or CMOS arrays. For this application, typical arrays have been chosen to be 100 pixels by 100 pixels and therefore the space being imaged can be broken up into pieces that are significantly less than 1 cm in size. Naturally, if greater resolution is required arrays having larger numbers of pixels are readily available. Another advantage of optical systems is that special lenses can be used to magnify those areas where the information is most critical and operate at reduced resolution where this is not the case. For example, the area closest to the at-risk zone in front of the airbag can be magnified.

To summarize, although ultrasonic neural network systems are operating with high accuracy, they do not totally eliminate the problem of deaths and injuries caused by airbag deployments. Optical systems, on the other hand, at little or no increase in cost, have the capability of virtually 100 percent accuracy. Additional problems of ultrasonic systems arise from the slow speed of sound and diffraction caused by variations is air density. The slow sound speed limits the rate at which data can be collected and thus eliminates the possibility of tracking the motion of an occupant during a high speed crash.

In an embodiment wherein electromagnetic energy is used, it is to be appreciated that any portion of the electromagnetic signals that impinges upon a body portion of the occupant is at least partially absorbed by the body portion. Sometimes, this is due to the fact that the human body is composed primarily of water, and that electromagnetic energy at certain frequencies can be readily absorbed by water. The amount of electromagnetic signal absorption is related to the frequency of the signal, and size or bulk of the body portion that the signal impinges upon. For example, a torso of a human body tends to absorb a greater percentage of electromagnetic energy as compared to a hand of a human body for some frequencies.

Thus, when electromagnetic waves or energy signals are transmitted by a transmitter, the returning waves received by a receiver provide an indication of the absorption of the electromagnetic energy. That is, absorption of electromagnetic energy will vary depending on the presence or absence of a human occupant, the occupant's size, bulk, etc., so that different signals will be received relating to the degree or extent of absorption by the occupying item on a seat or elsewhere in the vehicle. The receiver will produce a signal representative of the returned waves or energy signals which will thus constitute an absorption signal as it corresponds to the absorption of electromagnetic energy by the occupying item in the seat.

Another optical infrared transmitter and receiver assembly is shown generally at 52 in FIG. 5 and is mounted onto the instrument panel facing the windshield. Although not shown in this view, reference 52 consists of three devices, one transmitter and two receivers, one on each side of the transmitter. In this case, the windshield is used to reflect the illumination light, and also the light reflected back by the driver, in a manner similar to the "heads-up" display which is now being offered on several automobile models. The "heads-up" display, of course, is currently used only to display information to the driver and is not used to reflect light from the driver to a receiver. In this case, the distance to the driver is determined stereoscopically through the use of the two receivers. In its most elementary sense, this system can be used to measure the distance between the driver and the airbag module. In more sophisticated applications, the position of the driver, and particularly of the driver's head, can be monitored over time and any behavior, such as a drooping head, indicative of the driver falling asleep or of being incapacitated by drugs, alcohol or illness can be detected and appropriate action taken. Other forms of radiation including visual light, radar, terahertz and microwaves as well as high frequency ultrasound could also be used by those skilled in the art.

A passive infrared system could be used to determine the position of an occupant relative to an airbag or even to detect the presence of a human or other life form in a vehicle. Passive infrared measures the infrared radiation emitted by the occupant and compares it to the background. As such, unless it is coupled with an imager and a pattern recognition system, it can best be used to determine that an occupant is moving toward the airbag since the amount of infrared radiation would then be increasing. Therefore, it could be used to estimate the velocity of the occupant but not his/her position relative to the airbag, since the absolute amount of such radiation will depend on the occupant's size, temperature and clothes as well as on his position. When passive infrared is used in conjunction with another distance measuring system, such as the ultrasonic system described above, the combination would be capable of determining both the position and velocity of the occupant relative to the airbag. Such a combination would be economical since only the simplest circuits would be required. In one implementation, for example, a group of waves from an ultrasonic transmitter could be sent to an occupant and the reflected group received by a receiver. The distance to the occupant would be proportional to the time between the transmitted and received groups of waves and the velocity determined from the passive infrared system. This system could be used in any of the locations illustrated in FIG. 5 as well as others not illustrated including truck trailers and cargo containers.

Recent advances in Quantum Well Infrared Photodetectors (QWIP) are particularly applicable here due to the range of frequencies that they can be designed to sense (3–18 microns) which encompasses the radiation naturally emitted by the human body. Currently, QWIPs need to be cooled and thus are not quite ready for vehicle applications. There are, however, longer wave IR detectors based of focal plane arrays (FPA) that are available in low resolution now. As the advantages of SWIR, MWIR and LWIR become more evident, devices that image in this part of the electromagnetic spectrum will become more available.

Passive infrared could also be used effectively in conjunction with a pattern recognition system. In this case, the passive infrared radiation emitted from an occupant can be focused onto a QWIP or FPA or even a CCD array, in some cases, and analyzed with appropriate pattern recognition circuitry, or software, to determine the position of the occupant. Such a system could be mounted at any of the preferred mounting locations shown in FIG. 5 as well as others not illustrated.

Lastly, it is possible to use a modulated scanning beam of radiation and a single pixel receiver, PIN or avalanche diode, in the inventions described above. Any form of energy or radiation used above may also be in the infrared or radar spectrums and may be polarized and filters may be used in the receiver to block out sunlight etc. These filters may be notch filters and may be made integral with the lens as one or more coatings on the lens surface as is well known in the art. Note, in many applications, this may not be necessary as window glass blocks all IR except the near IR.

For some cases, such as a laser transceiver that may contain a CMOS array, CCD, PIN or avalanche diode or other light sensitive devices, a scanner is also required that can be either solid state as in the case of some radar systems based on a phased array, an acoustical optical system as is used by some laser systems, or a mirror or MEMS based reflecting scanner, or other appropriate technology.

Figure 25:
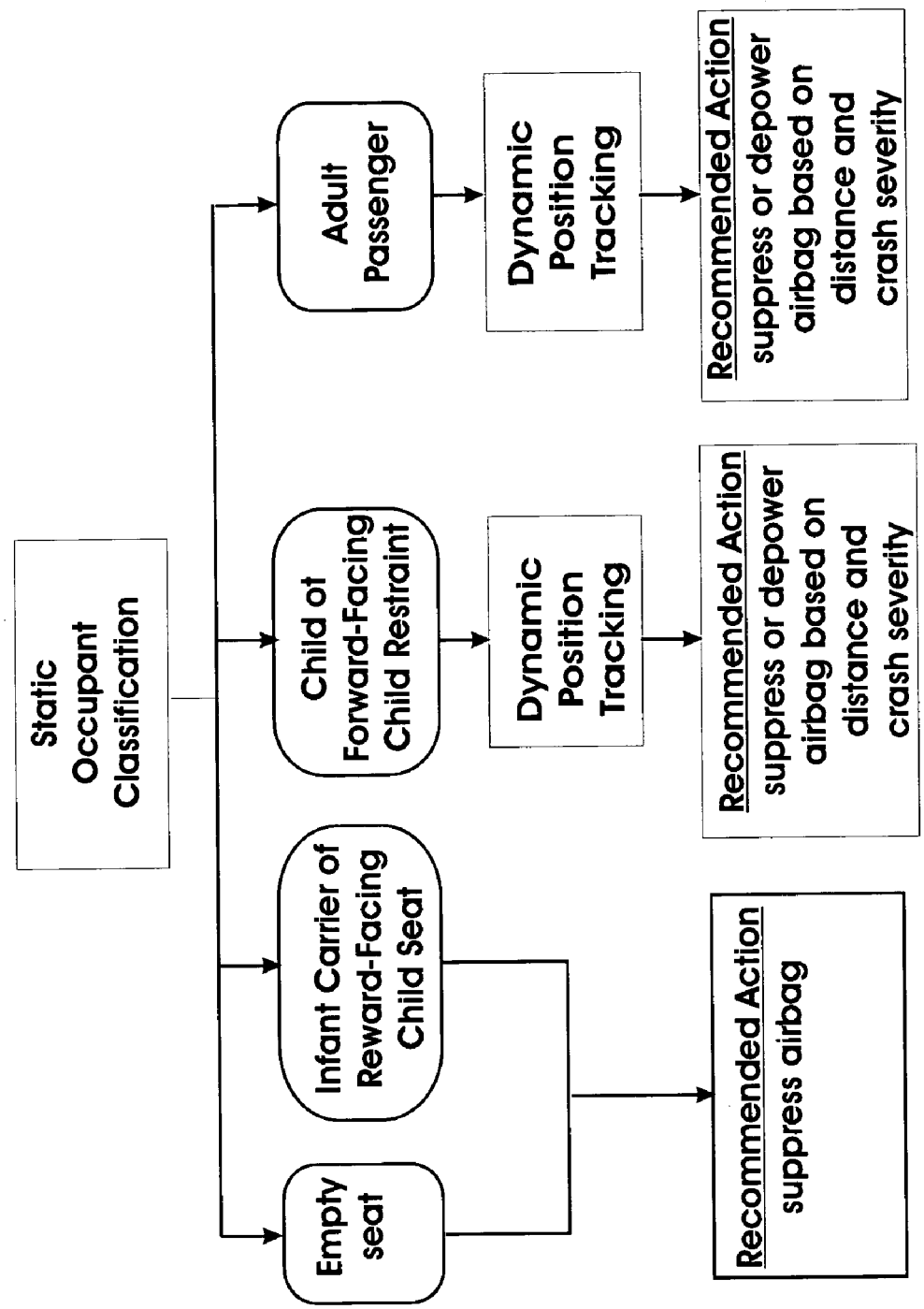
FIG. 25 is a diagram showing an example of an occupant sensing strategy for a single camera optical system.

An optical classification system using a single or dual camera design will now be discussed, although more than two cameras can also be used in the system described below. The occupant sensing system should perform occupant classification as well as position tracking since both are critical information for making decision of airbag deployment in an auto accident. For other purposes such as container or truck trailer monitoring generally only classification is required. FIG. 25 shows a preferred occupant sensing strategy. Occupant classification may be done statically since the type of occupant does not change frequently. Position tracking, however, has to be done dynamically so that the occupant can be tracked reliably during pre-crash braking situations. Position tracking should provide continuous position information so that the speed and the acceleration of the occupant can be estimated and a prediction can be made even before the next actual measurement takes place.

Figure 26:
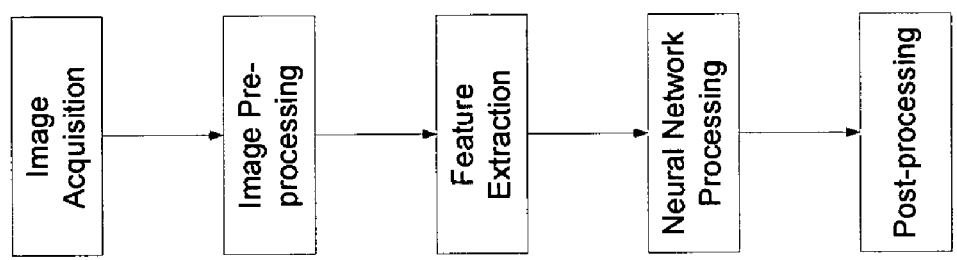
FIG. 26 is a processing block diagram of the example of FIG. 25.

The current assignee has demonstrated that occupant classification and dynamic position tracking can be done with a stand-alone optical system that uses a single camera. The same image information is processed in a similar fashion for both classification and dynamic position tracking. As shown in FIG. 26, the whole process can involve five steps: image acquisition, image preprocessing, feature extraction, neural network processing, and post-processing. These steps will now be discussed.

Step-1 image acquisition is to obtain the image from the imaging hardware. The imaging hardware main components may include one or more of the following image acquisition devices, a digital CMOS camera, a high-power near-infrared LED, and the LED control circuit. A plurality of such image acquisition devices can be used. This step also includes image brightness detection and LED control for illumination. Note that the image brightness detection and LED control do not have to be performed for every frame. For example, during a specific interval, the ECU can turn the LED ON and OFF and compare the resulting images. If the image with LED ON is significantly brighter, then it is identified as nighttime condition and the LED will remain ON; otherwise, it is identified as daytime condition and the LED can remain OFF.

Step-2 image preprocessing performs such activities as removing random noise and enhancing contrast. Under daylight condition, the image contains unwanted contents because the background is illuminated by sunlight. For example, the movement of the driver, other passengers in the backseat, and the scenes outside the passenger window can interfere if they are visible in the image. Usually, these unwanted contents cannot be completely eliminated by adjusting the camera position, but they can be removed by image preprocessing. This process is much less complicated for some vehicle monitoring cases such as trailer and cargo containers where sunlight is rarely a problem.

Step-3 feature extraction compresses the data from, for example, the 76,800 image pixels in the prototype camera to only a few hundred floating-point numbers, which may be based of edge detection algorithms, while retaining most of the important information. In this step, the amount of the data is significantly reduced so that it becomes possible to process the data using neural networks in Step-4.

There are many methods to extract information from an image for the purposes herein. One preferred method is to extract information as to the location of the edges of an object and then to input this information into a pattern recognition algorithm. As will be discussed below, the location and use of the edges of an occupying item as features in an imager is an important contribution of the inventions disclosed herein for occupant or other object sensing and tracking in a vehicle.

Step-4, to increase the system learning capability and performance stability, modular or combination neural networks can be used with each module handling a different subtask (for example, to handle either daytime or nighttime condition, or to classify a specific occupant group).

Step-5 post-processing removes random noise in the neural network outputs via filtering. Besides filtering, additional knowledge can be used to remove some of the undesired changes in the neural network output. For example, it is impossible to change from an adult passenger to a child restraint without going through an empty-seat state or key-off. After post-processing, the final decision of classification is output to the airbag control module, or other system, and it is up to the automakers or vehicle owners or managers to decide how to utilize the information. A set of display LED's on the instrument panel provides the same information to the vehicle occupant(s).

If multiple images are acquired substantially simultaneously, each by a different image acquisition device, then each image can be processed in the manner above. A comparison of the classification of the occupant obtained from the processing of the image obtained by each image acquisition device can be performed to ascertain any variations. If there are no variations, then the classification of the occupant is likely to be very accurate. However, in the presence of variations, then the images can be discarded and new images acquired until variations are eliminated.

A majority approach might also be used. For example, if three or more images are acquired by three different cameras, or other imagers, then if two provide the same classification, this classification will be considered the correct classification. Alternately, all of the data from all of the images can be analyzed and together in one combined neural network or combination neural network.

Referring again to FIG. 25, after the occupant is classified from the acquired image or images, i.e., as an empty seat (classification 1), an infant carrier or an occupied rearward-facing child seat (classification 2), a child or occupied forward-facing child seat (classification 3) or an adult passenger (classification 4), additional classification may be performed for the purpose of determining a recommendation for control of a vehicular component such as an occupant restraint device.

For classifications 1 and 2, the recommendation is always to suppress deployment of the occupant restraint device. For classifications 3 and 4, dynamic position tracking is performed. This involves the training of neural networks or other pattern recognition techniques, one for each classification, so that once the occupant is classified, the particular neural network can be trained to analyze the dynamic position of that occupant will be used. That is, the data from acquired images will be input to the neural network to determine a recommendation for control of the occupant restraint device and also into the neural network for dynamic position tracking of an adult passenger when the occupant is classified as an adult passenger. The recommendation may be either a suppression of deployment, a depowered deployment or a full power deployment.

To additionally summarize, the system described can be a single or multiple camera or other imager system where the cameras are typically mounted on the roof or headliner of the vehicle either on the roof rails or center or other appropriate location. The source of illumination is typically one or more infrared LEDs and if infrared, the images are typically monochromic, although color can effectively be used when natural illumination is available. Images can be obtained at least as fast as 100 frames per second; however, slower rates are frequently adequate. A pattern recognition algorithmic system can be used to classify the occupancy of a seat into a variety of classes such as: (1) an empty seat; (2) an infant seat which can be further classified as rear or forward facing; (3) a child which can be further classified as in or out-of-position and (4) an adult which can also be further classified as in or out-of-position. Such a system can be used to suppress the deployment of an occupant restraint. If the occupant is further tracked so that his or her position relative to the airbag, for example, is known more accurately, then the airbag deployment can be tailored to the position of the occupant. Such tracking can be accomplished since the location of the head of the occupant is either known from the analysis or can be inferred due to the position of other body parts.

As will be discussed in more detail below, data and images from the occupant sensing system, which can include an assessment of the type and magnitude of injuries, along with location information if available, can be sent to an appropriate off-vehicle location such as an emergency medical system (EMS) receiver either directly by cell phone, for example, via a telematics system such as OnStar®, or over the internet if available in order to aid the service in providing medical assistance and to access the urgency of the situation. The system can additionally be used to identify that there are occupants in the vehicle that has been parked, for example, and to start the vehicle engine and heater if the temperature drops below a safe threshold or to open a window or operate the air conditioning in the event that the temperature raises to a temperature above a safe threshold. In both cases, a message can be sent to the EMS or other services by any appropriate method such as those listed above. A message can also be sent to the owner's beeper or PDA.

The system can also be used alone or to augment the vehicle security system to alert the owner or other person or remote site that the vehicle security has been breeched so as to prevent danger to a returning owner or to prevent a theft or other criminal act. As discussed elsewhere herein, one method of alerting the owner or another interested person is through a satellite communication with a service such a as Skybitz or equivalent. The advantage here is that the power required to operate the system can be supplied by a long life battery and thus the system can be independent of the vehicle power system.

As discussed above and below, other occupant sensing systems can also be provided that monitor the breathing or other motion of the driver, for example, including the driver's heartbeat, eye blink rate, gestures, direction or gaze and provide appropriate responses including the control of a vehicle component including any such components listed herein. If the driver is falling asleep, for example, a warning can be issued and eventually the vehicle directed off the road if necessary.

The combination of a camera system with a microphone and speaker allows for a wide variety of options for the control of vehicle components. A sophisticated algorithm can interpret a gesture, for example, that may be in response to a question from the computer system. The driver may indicate by a gesture that he or she wants the temperature to change and the system can then interpret a "thumbs up" gesture for higher temperature and a "thumbs down" gesture for a lower temperature. When it is correct, the driver can signal by gesture that it is fine. A very large number of component control options exist that can be entirely executed by the combination of voice, speakers and a camera that can see gestures. When the system does not understand, it can ask to have the gesture repeated, for example, or it can ask for a confirmation. Note, the presence of an occupant in a seat can even be confirmed by a word spoken by the occupant, for example, which can use a technology known as voice print if it is desired to identify the particular occupant.

It is also to be noted that the system can be trained to recognize essentially any object or object location that a human can recognize and even some that a human cannot recognize since the system can have the benefit of special illumination as discussed above. If desired, a particular situation such as the presence of a passenger's feet on the instrument panel, hand on a window frame, head against the side window, or even lying down with his or her head in the lap of the driver, for example, can be recognized and appropriate adjustments to a component performed.

Note, it has been assumed that the camera would be permanently mounted in the vehicle in the above discussion. This need not be the case and especially for some after-market products, the camera function can be supplied by a cell phone or other device and a holder appropriately (and removably) mounted in the vehicle.

Again the discussion above related primarily to sensing the interior of and automotive vehicle for the purposes of controlling a vehicle component such as a restraint system. When the vehicle is a shipping container then different classifications can be used depending on the objective. If it is to determine whether there is a life form moving within the container, a stowaway, for example, then that can be one classification. Another may be the size of a cargo box or whether it is moving. Still another may be whether there is an unauthorized entry in progress or that the door has been opened. Others include the presence of a particular chemical vapor, radiation, excessive temperature, excessive humidity, excessive shock, excessive vibration etc.

1.3 Ultrasonics and Optics

In some cases, a combination of an optical system such as a camera and an ultrasonic system can be used. In this case, the optical system can be used to acquire an image providing information as to the vertical and lateral dimensions of the scene and the ultrasound can be used to provide longitudinal information, for example.

A more accurate acoustic system for determining the distance to a particular object, or a part thereof, in the passenger compartment is exemplified by transducers 24 in FIG. 8E. In this case, three ultrasonic transmitter/receivers 24 are shown spaced apart mounted onto the A-pillar of the vehicle. Due to the wavelength, it is difficult to get a narrow beam using ultrasonics without either using high frequencies that have limited range or a large transducer. A commonly available 40 kHz transducer, for example, is about 1 cm. in diameter and emits a sonic wave that spreads at about a sixty-degree angle. To reduce this angle requires making the transducer larger in diameter. An alternate solution is to use several transducers and to phase the transmissions from the transducers so that they arrive at the intended part of the target in phase. Reflections from the selected part of the target are then reinforced whereas reflections from adjacent parts encounter interference with the result that the distance to the brightest portion within the vicinity of interest can be determined. A low-Q transducer may be necessary for this application.

By varying the phase of transmission from the three transducers 24, the location of a reflection source on a curved line can be determined. In order to locate the reflection source in space, at least one additional transmitter/receiver is required which is not co-linear with the others. The waves shown in FIG. 8E coming from the three transducers 24 are actually only the portions of the waves which arrive at the desired point in space together in phase. The effective direction of these wave streams can be varied by changing the transmission phase between the three transmitters 24.

A determination of the approximate location of a point of interest on the occupant can be accomplished by a CCD or CMOS array and appropriate analysis and the phasing of the ultrasonic transmitters is determined so that the distance to the desired point can be determined.

Although the combination of ultrasonics and optics has been described, it will now be obvious to others skilled in the art that other sensor types can be combined with either optical or ultrasonic transducers including weight sensors of all types as discussed below, as well as electric field, chemical, temperature, humidity, radiation, vibration, acceleration, velocity, position, proximity, capacitance, angular rate, heartbeat, radar, other electromagnetic, and other sensors.

1.4 Other Transducers

In FIG. 4, the ultrasonic transducers of the previous designs can be replaced by laser or other electromagnetic wave transducers or transceivers 8 and 9, which are connected to a microprocessor 20. As discussed above, these are only illustrative mounting locations and any of the locations described herein are suitable for particular technologies. Also, such electromagnetic transceivers are meant to include the entire electromagnetic spectrum including from X-rays to low frequencies where sensors such as capacitive or electric field sensors including so called "displacement current sensors" as discussed in detail elsewhere herein, and the auto-tune antenna sensor also discussed herein operate.

1.5 Circuits

There are several preferred methods of implementing the vehicle interior monitoring systems of at least one of the inventions disclosed herein including a microprocessor, an application specific integrated circuit system (ASIC), a system on a chip and/or an FPGA or DSP. These systems are represented schematically as 20 herein. In some systems, both a microprocessor and an ASIC are used. In other systems, most if not all of the circuitry is combined onto a single chip (system on a chip). The particular implementation depends on the quantity to be made and economic considerations. It also depends on time-to-market considerations where FPGA is frequently the technology of choice.

The design of the electronic circuits for a laser system is described in some detail in U.S. Pat. No. 5,653,462 and in particular FIG. 8 thereof and the corresponding description.

2. Adaptation

The process of adapting a system of occupant or object sensing transducers to a vehicle is described in detail in U.S. patent application Ser. No. 10/940,881 and is incorporated by reference herein.

Figure 6A:
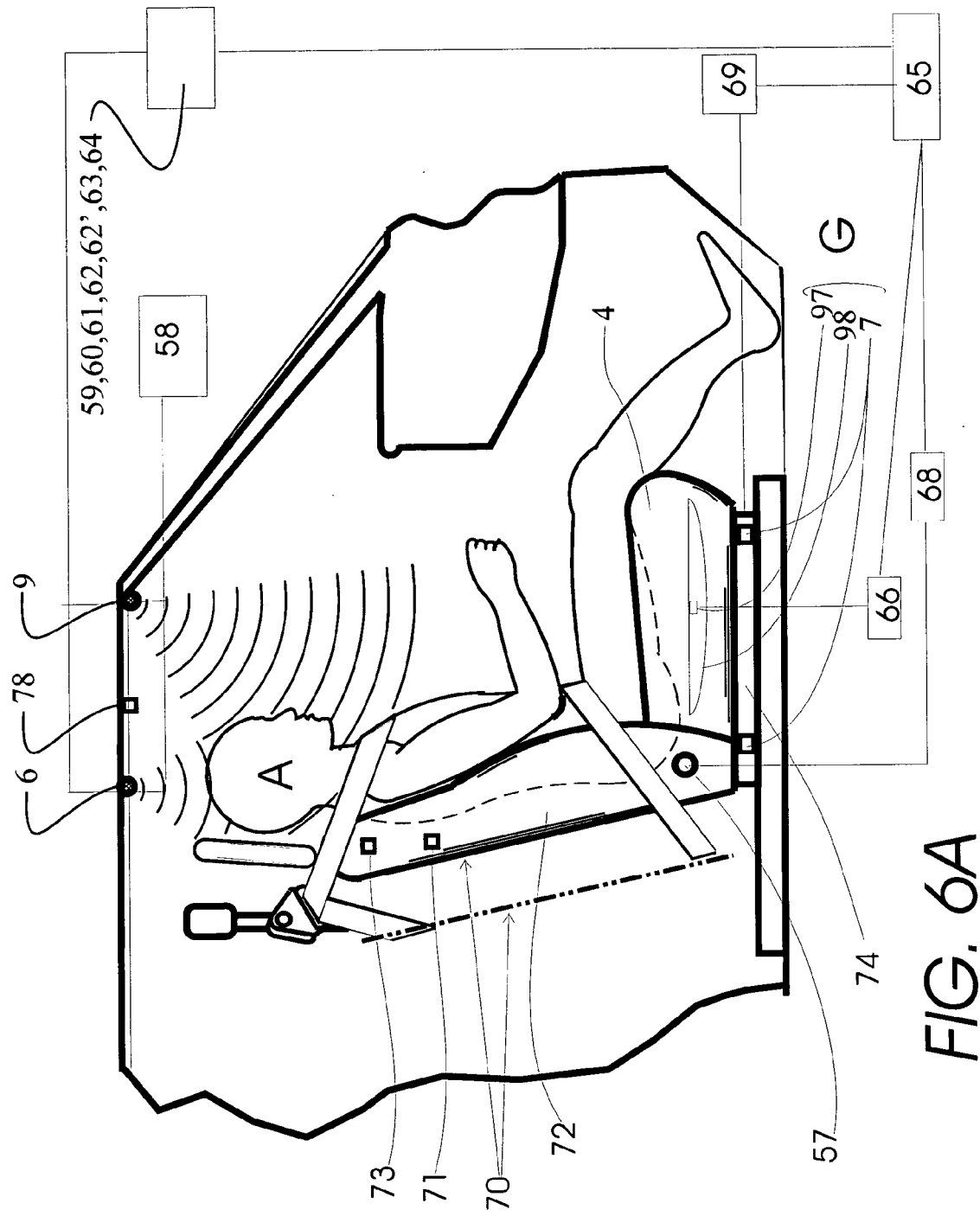
FIG. 6A is an illustration as in FIG. 6 with the replacement of a strain gage weight sensor within a cavity within the seat cushion for the bladder weight sensor of FIG. 6.

Referring again to FIG. 6, and to FIG. 6A which differs from FIG. 6 only in the use of a strain gage weight sensor mounted within the seat cushion, motion sensor 73 can be a discrete sensor that detects relative motion in the passenger compartment of the vehicle. Such sensors are frequently based on ultrasonics and can measure a change in the ultrasonic pattern that occurs over a short time period. Alternately, the subtracting of one position vector from a previous position vector to achieve a differential position vector can detect motion. For the purposes herein, a motion sensor will be used to mean either a particular device that is designed to detect motion for the creation of a special vector based on vector differences or a neural network trained to determine motion based on successive vectors.

An ultrasonic, optical or other sensor or transducer system 9 can be mounted on the upper portion of the front pillar, i.e., the A-Pillar, of the vehicle and a similar sensor system 6 can be mounted on the upper portion of the intermediate pillar, i.e., the B-Pillar. Each sensor system 6, 9 may comprise a transducer. The outputs of the sensor systems 6 and 9 can be input to a band pass filter 60 through a multiplex circuit 59 which can be switched in synchronization with a timing signal from the ultrasonic sensor drive circuit 58, for example, and then can be amplified by an amplifier 61. The band pass filter 60 removes a low frequency wave component from the output signal and also removes some of the noise. The envelope wave signal can be input to an analog/digital converter (ADC) 62 and digitized as measured data. The measured data can be input to a processing circuit 63, which can be controlled by the timing signal which can be in turn output from the sensor drive circuit 58. The above description applies primarily to systems based on ultrasonics and will differ somewhat for optical, electric field and other systems and for different vehicle types.

Each of the measured data can be input to a normalization circuit 64 and normalized. The normalized measured data can be input to the combination neural network (circuit) 65, for example, as wave data.

The output of the pressure or weight sensor(s) 7, 76 or 97 (see FIG. 6A) can be amplified by an amplifier 66 coupled to the pressure or weight sensor(s) 7, 76 and 97 and the amplified output can be input to an analog/digital converter and then directed to the neural network 65, for example, of the processor means. Amplifier 66 can be useful in some embodiments but it may be dispensed with by constructing the sensors 7, 76, 97 to provide a sufficiently strong output signal, and even possibly a digital signal. One manner to do this would be to construct the sensor systems with appropriate electronics.

The neural network 65 can be directly connected to the ADCs 68 and 69, the ADC associated with amplifier 66 and the normalization circuit 64. As such, information from each of the sensors in the system (a stream of data) can be passed directly to the neural network 65 for processing thereby. The streams of data from the sensors are usually not combined prior to the neural network 65 and the neural network 65 can be designed to accept the separate streams of data (e.g., at least a part of the data at each input node) and process them to provide an output indicative of the current occupancy state of the seat or of the vehicle. The neural network 65 thus includes or incorporates a plurality of algorithms derived by training in the manners discussed herein. Once the current occupancy state of the seat or vehicle is determined, it is possible to control vehicular components or systems, such as the airbag system or telematics system, in consideration of the current occupancy state of the seat or vehicle.

A discussion of the methodology of adapting a monitoring system to an automotive vehicle for the purpose primarily of controlling a component such as a restraint system is disclosed in U.S. patent application Ser. No. 10/940,881 (with reference to FIGS. 28–36 thereof) and is incorporated by reference herein.

Although the methods are described mainly in connection with the use of ultrasonic transducers, they are also applicable to optical, radar, capacitive, electric field and other sensing systems. In particular, an important feature of at least one of the inventions disclosed herein is the proper placement of two or more separately located receivers such that the system still operates with high reliability if one of the receivers is blocked by some object such as a newspaper or box. This feature is also applicable to systems using electromagnetic radiation instead of ultrasonic, however the particular locations will differ based on the properties of the particular transducers. Optical sensors based on two-dimensional cameras or other image sensors, for example, are more appropriately placed on the sides of a rectangle surrounding the seat to be monitored, for the automotive vehicle case, rather than at the corners of such a rectangle as is the case with ultrasonic sensors. This is because ultrasonic sensors measure an axial distance from the sensor where the 2D camera is most appropriate for measuring distances up and down and across its field view rather than distances to the object. With the use of electromagnetic radiation and the advances which have recently been made in the field of very low light level sensitivity, it is now possible, in some implementations, to eliminate the transmitters and use background light as the source of illumination along with using a technique such as auto-focusing or stereo vision to obtain the distance from the receiver to the object. Thus, only receivers would be required further reducing the complexity of the system.

Although implicit in the above discussion, an important feature of at least one of the inventions disclosed herein which should be emphasized is the method of developing a system having distributed transducer mountings. Other systems which have attempted to solve the rear facing child seat (RFCS) and out-of-position problems have relied on a single transducer mounting location or at most, two transducer mounting locations. Such systems can be easily blinded by a newspaper or by the hand of an occupant, for example, which is imposed between the occupant and the transducers. This problem is almost completely eliminated through the use of three or more transducers which are mounted so that they have distinctly different views of the passenger compartment volume of interest. If the system is adapted using four transducers, for example, the system suffers only a slight reduction in accuracy even if two of the transducers are covered so as to make them inoperable. However, the automobile manufacturers may not wish to pay the cost of several different mounting locations and an alternate is to mount the sensors high where blockage is difficult and to diagnose whether a blockage state exists.

It is important in order to obtain the full advantages of the system when a transducer is blocked, that the training and independent databases contains many examples of blocked transducers. If the pattern recognition system, the neural network in this case, has not been trained on a substantial number of blocked transducer cases, it will not do a good job in recognizing such cases later. This is yet another instance where the makeup of the databases is crucial to the success of designing the system that will perform with high reliability in a vehicle and is an important aspect of the instant invention. When camera-based transducers are used, for example, an alternative strategy is to diagnose when a newspaper or other object is blocking a camera, for example. In most cases, a short time blockage is of little consequence since earlier decisions provide the seat occupancy and the decision to enable deployment or suppress deployment of the occupant restraint will not change. For a prolonged blockage, the diagnostic system can provide a warning light indicating to the driver, operator or other interested party which may be remote from the vehicle, that the system is malfunctioning and the deployment decision is again either not changed or changed to the default decision, which is usually to enable deployment for the automobile occupant monitoring case.

Let us now consider some specific issues:

1. Blocked transducers. It is sometimes desirable to positively identify a blocked transducer and when such a situation is found to use a different neural network which has only been trained on the subset of unblocked transducers. Such a network, since it has been trained specifically on three transducers, for example, will generally perform more accurately than a network which has been trained on four transducers with one of the transducers blocked some of the time. Once a blocked transducer has been identified the occupant or other interested party can be notified if the condition persists for more than a reasonable time.

2. Transducer Geometry. Another technique, which is frequently used in designing a system for a particular vehicle, is to use a neural network to determine the optimum mounting locations, aiming or orientation directions and field angles of transducers. For particularly difficult vehicles, it is sometimes desirable to mount a large number of ultrasonic transducers, for example, and then use the neural network to eliminate those transducers which are least significant. This is similar to the technique described above where all kinds of transducers are combined initially and later pruned.

3. Data quantity. Since it is very easy to take large amounts of data and yet large databases require considerably longer training time for a neural network, a test of the variability of the database can be made using a neural network. If, for example, after removing half of the data in the database, the performance of a trained neural network against the validation database does not decrease, then the system designer suspects that the training database contains a large amount of redundant data. Techniques such as similarity analysis can then be used to remove data that is virtually indistinguishable from other data. Since it is important to have a varied database, it is undesirable generally to have duplicate or essentially duplicate vectors in the database since the presence of such vectors can bias the system and drive the system more toward memorization and away from generalization.

4. Environmental factors. An evaluation can be made of the beneficial effects of using varying environmental influences, such as temperature or lighting, during data collection on the accuracy of the system using neural networks along with a technique such as design of experiments.

5. Database makeup. It is generally believed that the training database must be flat, meaning that all of the occupancy states that the neural network must recognize must be approximately equally represented in the training database. Typically, the independent database has approximately the same makeup as the training database. The validation database, on the other hand, typically is represented in a non-flat basis with representative cases from real world experience. Since there is no need for the validation database to be flat, it can include many of the extreme cases as well as being highly biased towards the most common cases. This is the theory that is currently being used to determine the makeup of the various databases. The success of this theory continues to be challenged by the addition of new cases to the validation database. When significant failures are discovered in the validation database, the training and independent databases are modified in an attempt to remove the failure.

6. Biasing. All seated state occupancy states are not equally important. The final system for the automotive case for example must be nearly 100% accurate for forward facing "in-position" humans, i.e., normally positioned humans. Since that will comprise the majority of the real world situations, even a small loss in accuracy here will cause the airbag to be disabled in a situation where it otherwise would be available to protect an occupant. A small decrease in accuracy will thus result in a large increase in deaths and injuries. On the other hand, there are no serious consequences if the airbag is deployed occasionally when the seat is empty. Various techniques are used to bias the data in the database to take this into account. One technique is to give a much higher value to the presence of a forward facing human during the supervised learning process than to an empty seat. Another technique is to include more data for forward facing humans than for empty seats. This, however, can be dangerous as an unbalanced network leads to a loss of generality.

7. Screening. It is important that the loop be closed on data acquisition. That is, the data must be checked at the time the data is acquired to be sure that it is good data. Bad data can happen, for example, because of electrical disturbances on the power line, sources of ultrasound such as nearby welding equipment, or due to human error. If the data remains in the training database, for example, then it will degrade the performance of the network. Several methods exist for eliminating bad data. The most successful method is to take an initial quantity of data, such as 30,000 to 50,000 vectors, and create an interim network. This is normally done anyway as an initial check on the system capabilities prior to engaging in an extensive data collection process. The network can be trained on this data and, as the real training data is acquired, the data can be tested against the neural network created on the initial data set. Any vectors that fail are examined for reasonableness.

8. Vector normalization method. Through extensive research, it has been found that the vector should be normalized based on all of the data in the vector, that is have all its data values range from 0 to 1. For particular cases, however, it has been found desirable to apply the normalization process selectively, eliminating or treating differently the data at the early part of the data from each transducer. This is especially the case when there is significant ringing on the transducer or cross talk when a separate ultrasonic send and receive transducer is used. There are times when other vector normalization techniques are required and the neural network system can be used to determine the best vector normalization technique for a particular application.

9. Feature extraction. The success of a neural network system can frequently be aided if additional data is inputted into the network. One ultrasonic example can be the number of 0 data points before the first peak is experienced. Alternately, the exact distance to the first peak can be determined prior to the sampling of the data. Other features can include the number of peaks, the distance between the peaks, the width of the largest peak, the normalization factor, the vector mean or standard deviation, etc. These normalization techniques are frequently used at the end of the adaptation process to slightly increase the accuracy of the system.

10. Noise. It has been frequently reported in the literature that adding noise to the data that is provided to a neural network can improve the neural network accuracy by leading to better generalization and away from memorization. However, the training of the network in the presence of thermal gradients has been shown to substantially eliminate the need to artificially add noise to the data for ultrasonic systems. Nevertheless, in some cases, improvements have been observed when random arbitrary noise of a rather low level is superimposed on the training data.

11. Photographic recording of the setup. After all of the data has been collected and used to train a neural network, it is common to find a significant number of vectors which, when analyzed by the neural network, give a weak or wrong decision. These vectors must be carefully studied especially in comparison with adjacent vectors to see if there is an identifiable cause for the weak or wrong decision. Perhaps the occupant was on the borderline of the keep out zone and strayed into the keep out zone during a particular data collection event. For this reason, it is desirable to photograph each setup simultaneous with the collection of the data. This can be done using one or more cameras mounted in positions where they can have a good view of the seat occupancy. Sometimes several cameras are necessary to minimize the effects of blockage by a newspaper, for example. Having the photographic record of the data setup is also useful when similar results are obtained when the vehicle is subjected to real world testing. During real world testing, one or more cameras should also be present and the test engineer is required to initiate data collection whenever the system does not provide the correct response. The vector and the photograph of this real world test can later be compared to similar setups in the laboratory to see whether there is data that was missed in deriving the matrix of vehicle setups for training the vehicle.

12. Automation. When collecting data in the vehicle it is desirable to automate the motion of the vehicle seat, seatback, windows, visors etc. so that in this manner, the positions of these items can be controlled and distributed as desired by the system designer. This minimizes the possibility of taking too much data at one configuration and thereby unbalancing the network.

13. Automatic setup parameter recording. To achieve an accurate data set, the key parameters of the setup should be recorded automatically. These include the temperatures at various positions inside the vehicle and for the automotive case, the position of the vehicle seat, and seatback, the position of the headrest, visor and windows and, where possible, the position of the vehicle occupant(s). The automatic recordation of these parameters minimizes the effects of human errors.

14. Laser Pointers. For the ultrasonic case, during the initial data collection with full horns mounted on the surface of the passenger compartment, care must the exercised so that the transducers are not accidentally moved during the data collection process. In order to check for this possibility, a small laser diode is incorporated into each transducer holder. The laser is aimed so that it illuminates some other surface of the passenger compartment at a known location. Prior to each data taking session, each of the transducer aiming points is checked.

15. Multi-frequency transducer placement. When data is collected for dynamic out-of-position, each of the ultrasonic transducers must operate at a different frequency so that all transducers can transmit simultaneously. By this method, data can be collected every 10 milliseconds, which is sufficiently fast to approximately track the motion of an occupant during pre-crash braking prior to an impact. A problem arises in the spacing of the frequencies between the different transducers. If the spacing is too close, it becomes very difficult to separate the signals from different transducers and it also affects the sampling rate of the transducer data and thus the resolution of the transducers. If an ultrasonic transducer operates at a frequency much below about 35 kHz, it can be sensed by dogs and other animals. If the transducer operates at a frequency much above 70 kHz, it is very difficult to make the open type of ultrasonic transducer, which produces the highest sound pressure. If the multiple frequency system is used for both the driver and passenger-side, as many as eight separate frequencies are required. In order to find eight frequencies between 35 kHz and 70 kHz, a frequency spacing of 5 kHz is required. In order to use conventional electronic filters and to provide sufficient spacing to permit the desired resolution at the keep out zone border, a 10 kHz spacing is desired. These incompatible requirements can be solved through a careful, judicious placement of the transducers such that transducers that are within 5 kHz of each other are placed such that there is no direct path between the transducers and any indirect path is sufficiently long so that it can be filtered temporally. For this example, the transducers operate at the following frequencies A 65 kHz, B 55 kHz, C 35 kHz, D 45 kHz, E 50 kHz, F 40 kHz, G 60 kHz, H 70 kHz. Actually, other arrangements adhering to the principle described above would also work.

16. Use of a PC in data collection. When collecting data for the training, independent, and validation databases, it is frequently desirable to test the data using various screening techniques and to display the data on a monitor. Thus, during data collection the process is usually monitored using a desktop PC for data taken in the laboratory and a laptop PC for data taken on the road.

17. Use of referencing markers and gages. In addition to and sometimes as a substitution for, the automatic recording of the positions of the seats, seatbacks, windows etc. as described above, a variety of visual markings and gages are frequently used. This includes markings to show the angular position of the seatback, the location of the seat on the seat track, the degree of openness of the window, etc. Also in those cases where automatic tracking of the occupant is not implemented, visual markings are placed such that a technician can observe that the test occupant remains within the required zone for the particular data taking exercise. Sometimes, a laser diode is used to create a visual line in the space that represents the boundary of the keep out zone or other desired zone boundary.

18. Subtracting out data that represents reflections from known seat parts or other vehicle components. This is particularly useful if the seat track and seatback recline positions are known.

19. Improved identification and tracking can sometimes be obtained if the object can be centered or otherwise located in a particular part of the neural network in a manner similar to the way the human eye centers an object to be examined in the center of its field of view.

20. Continuous tracking of the object in place of a zone-based system also improves the operation of the pattern recognition system since discontinuities are frequently difficult for the pattern recognition system, such as a neural network, to handle. In this case, the location of the occupant relative to the airbag cover, for example, would be determined and then a calculation as to what zone the object is located in can be determined and the airbag deployment decision made (suppression, depowered, delayed, deployment). This also permits a different suppression zone to be used for different sized occupants further improving the matching of the airbag deployment to the occupant.

It is important to realize that the adaptation process described herein applies to any combination of transducers that provide information about the vehicle occupancy. These include weight sensors, capacitive sensors, electric field sensors, inductive sensors, moisture sensors, chemical sensors, ultrasonic, radiation, optic, infrared, radar, X-ray among others. The adaptation process begins with a selection of candidate transducers for a particular vehicle model. This selection is based on such considerations as cost, alternate uses of the system other than occupant sensing, vehicle interior compartment geometry, desired accuracy and reliability, vehicle aesthetics, vehicle manufacturer preferences, and others. Once a candidate set of transducers has been chosen, these transducers are mounted in the test vehicle according to the teachings of at least one of the inventions disclosed herein. The vehicle is then subjected to an extensive data collection process wherein various objects are placed in the vehicle at various locations as described below and an initial data set is collected. A pattern recognition system is then developed using the acquired data and an accuracy assessment is made. Further studies are made to determine which, if any, of the transducers can be eliminated from the design. In general, the design process begins with a surplus of sensors plus an objective as to how many sensors are to be in the final vehicle installation. The adaptation process can determine which of the transducers are most important and which are least important and the least important transducers can be eliminated to reduce system cost and complexity.

A process for adapting an ultrasonic system to a vehicle will now be described. Note, some steps will not apply to some vehicles. A more detailed list of steps is provided in Appendix 2 (set forth in U.S. patent application Ser. No. 10/940,881 incorporated by reference herein). Although the pure ultrasonic system is described here for automotive applications, a similar or analogous set of steps applies for other vehicle types and when other technologies such as weight and optical (scanning or imager) or other electromagnetic wave or electric field systems such as capacitance and field monitoring systems are used. This description is thus provided to be exemplary and not limiting:

1. Select transducer, horn and grill designs to fit the vehicle. At this stage, usually full horns are used which are mounted so that they project into the compartment. No attempt is made at this time to achieve an esthetic matching of the transducers to the vehicle surfaces. An estimate of the desired transducer fields is made at this time either from measurements in the vehicle directly or from CAD drawings.

2. Make polar plots of the transducer ultrasonic fields. Transducers and candidate horns and grills are assembled and tested to confirm that the desired field angles have been achieved. This frequently requires some adjustment of the transducers in the horn and of the grill. A properly designed grill for ultrasonic systems can perform a similar function as a lens for optical systems.

3. Check to see that the fields cover the required volumes of the vehicle passenger compartment and do not impinge on adjacent flat surfaces that may cause multipath effects. Redesign horns and grills if necessary.

4. Install transducers into vehicle.

5. Map transducer fields in the vehicle and check for multipath effects and proper coverage.

6. Adjust transducer aim and re-map fields if necessary.

7. Install daily calibration fixture and take standard setup data.

8. Acquire 50,000 to 100,000 vectors of data.

9. Adjust vectors for volume considerations by removing some initial data points if cross talk or ringing is present and some final points to keep data in the desired passenger compartment volume.

10. Normalize vectors.

11. Run neural network algorithm generating software to create algorithm for vehicle installation.

12. Check the accuracy of the algorithm. If not sufficiently accurate collect more data where necessary and retrain. If still not sufficiently accurate, add additional transducers to cover holes.

13. When sufficient accuracy is attained, proceed to collect ~500,000 training vectors varying:
Occupancy (see Appendices 1 and 3):
Occupant size, position (zones), clothing etc
Child seat type, size, position etc.
Empty seat
Vehicle configuration:
Seat position
Window position
Visor and armrest position
Presence of other occupants in adjoining seat or rear seat
Temperature
Temperature gradient—stable
Temperature turbulence—heater and air conditioner
Wind turbulence—High speed travel with windows open, top down etc.
Other similar features when the adaptation is to a vehicle other than an automobile.

14. Collect ~100,000 vectors of Independent data using other combinations of the above.

15. Collect ~50,000 vectors of "real world data" to represent the acceptance criteria and more closely represent the actual seated state probabilities in the real world.

16. Train network and create an algorithm using the training vectors and the Independent data vectors.

17. Validate the algorithm using the real world vectors.

18. Install algorithm into the vehicle and test.

19. Decide on post processing methodology to remove final holes (areas of inaccuracy) in system.

20. Implement post-processing methods into the algorithm.

21. Final test. The process up until step 13 involves the use of transducers with full horns mounted on the surfaces of the interior passenger compartment. At some point, the actual transducers which are to be used in the final vehicle must be substituted for the trial transducers. This is either done prior to step 13 or at this step. This process involves designing transducer holders that blend with the visual surfaces of the vehicle compartment so that they can be covered with a properly designed grill that helps control the field and also serves to retain the esthetic quality of the interior. This is usually a lengthy process and involves several consultations with the customer. Usually, therefore, the steps from 13–20 are repeated at this point after the fin transducer and holder design has been selected. The initial data taken with full horns gives a measure of the best system that can be made to operate in the vehicle. Some degradation in performance is expected when the aesthetic horns and grills are substituted for the full horns. By conducting two complete data collection cycles, an accurate measure of this accuracy reduction can be obtained.

22. Up until this point, the best single neural network algorithm has been developed. The final step is to implement the principles of a combination neural network in order to remove some remaining error sources such as bad data and to further improve the accuracy of the system. It has been found that the implementation of combination neural networks can reduce the remaining errors by up to 50 percent. A combination neural network CAD optimization program provided by International Scientific Research Inc. can now be used to derive the neural network architecture. Briefly, the operator lays out a combination neural network involving many different neural networks arranged in parallel and in series and with appropriate feedbacks which the operator believes could be important. The software then optimizes each neural network and also provides an indication of the value of the network. The operator can then selectively eliminate those networks with little or no value and retrain the system. Through this combination of pruning, retraining and optimizing the final candidate combination neural network results.

23. Ship to customers to be used in production vehicles.

24. Collect additional real world validation data for continuous improvement.

Figure 37:
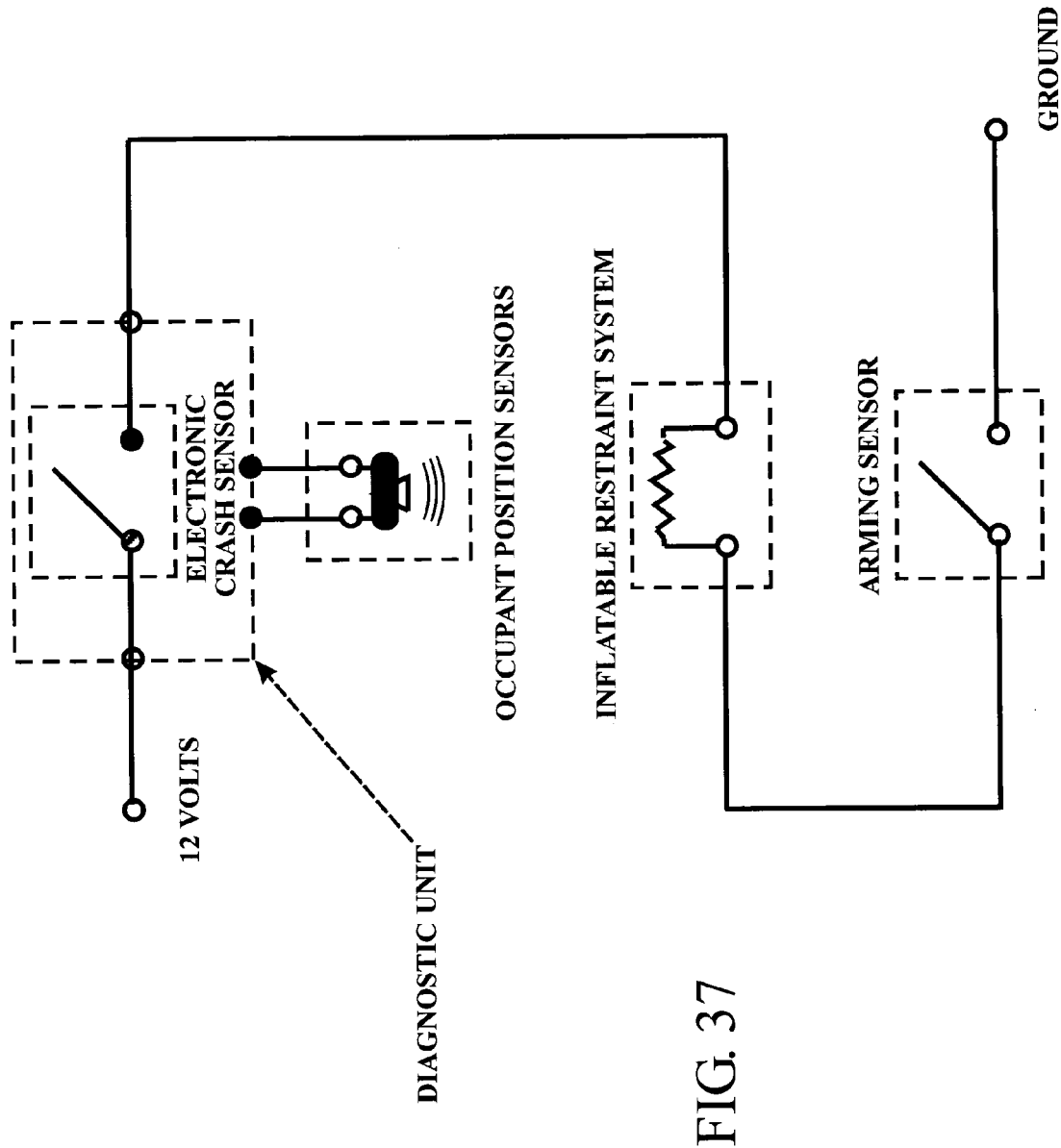
FIG. 37 is a circuit schematic illustrating the use of the vehicle interior monitoring sensor used as an occupant position sensor in conjunction with the remainder of the inflatable restraint system.

More detail on the operation of the transducers and control circuitry as well as the neural network is provided in the above-referenced patents and patent applications and elsewhere herein. One particular example of a successful neural network for the two transducer case had 78 input nodes, 6 hidden nodes and 1 output node and for the four transducer case had 176 input nodes 20 hidden layer nodes on hidden layer one, 7 hidden layer nodes on hidden layer two and 1 output node. The weights of the network were determined by supervised training using the back propagation method as described in the above-referenced patents and patent applications and in more detail in the references cited therein. Other neural network architectures are possible including RCE, Logicon Projection, Stochastic, cellular, or support vector machine, etc. An example of a combination neural network system is shown in FIG. 37 of U.S. patent application Ser. No. 10/940,881 and is incorporated by reference herein. Any of the network architectures mention here can be used for any of the boxes in FIG. 37.

Finally, the system is trained and tested with situations representative of the manufacturing and installation tolerances that occur during the production and delivery of the vehicle as well as usage and deterioration effects. Thus, for example, the system is tested with the transducer mounting positions shifted by up to one inch in any direction and rotated by up to 5 degrees, with a simulated accumulation of dirt and other variations. This tolerance to vehicle variation also sometimes permits the installation of the system onto a different but similar model vehicle with, in many cases, only minimal retraining of the system.

3. Mounting Locations for and Quantity of Transducers

Ultrasonic transducers are relatively good at measuring the distance along a radius to a reflective object. An optical array, to be discussed now, on the other hand, can get accurate measurements in two dimensions, the lateral and vertical dimensions relative to the transducer. Assuming the optical array has dimensions of 100 by 100 as compared to an ultrasonic sensor that has a single dimension of 100, an optical array can therefore provide 100 times more information than the ultrasonic sensor. Most importantly, this vastly greater amount of information does not cost significantly more to obtain than the information from the ultrasonic sensor.

As illustrated in FIGS. 8A-8D, the optical sensors are typically located for an automotive vehicle at the positions where the desired information is available with the greatest resolution. These positions are typically in the center front and center rear of the occupancy seat and at the center on each side and top. This is in contrast to the optimum location for ultrasonic sensors, which are the corners of such a rectangle that outlines the seated volume. Styling and other constraints often prevent mounting of transducers at the optimum locations.

Figure 8B:
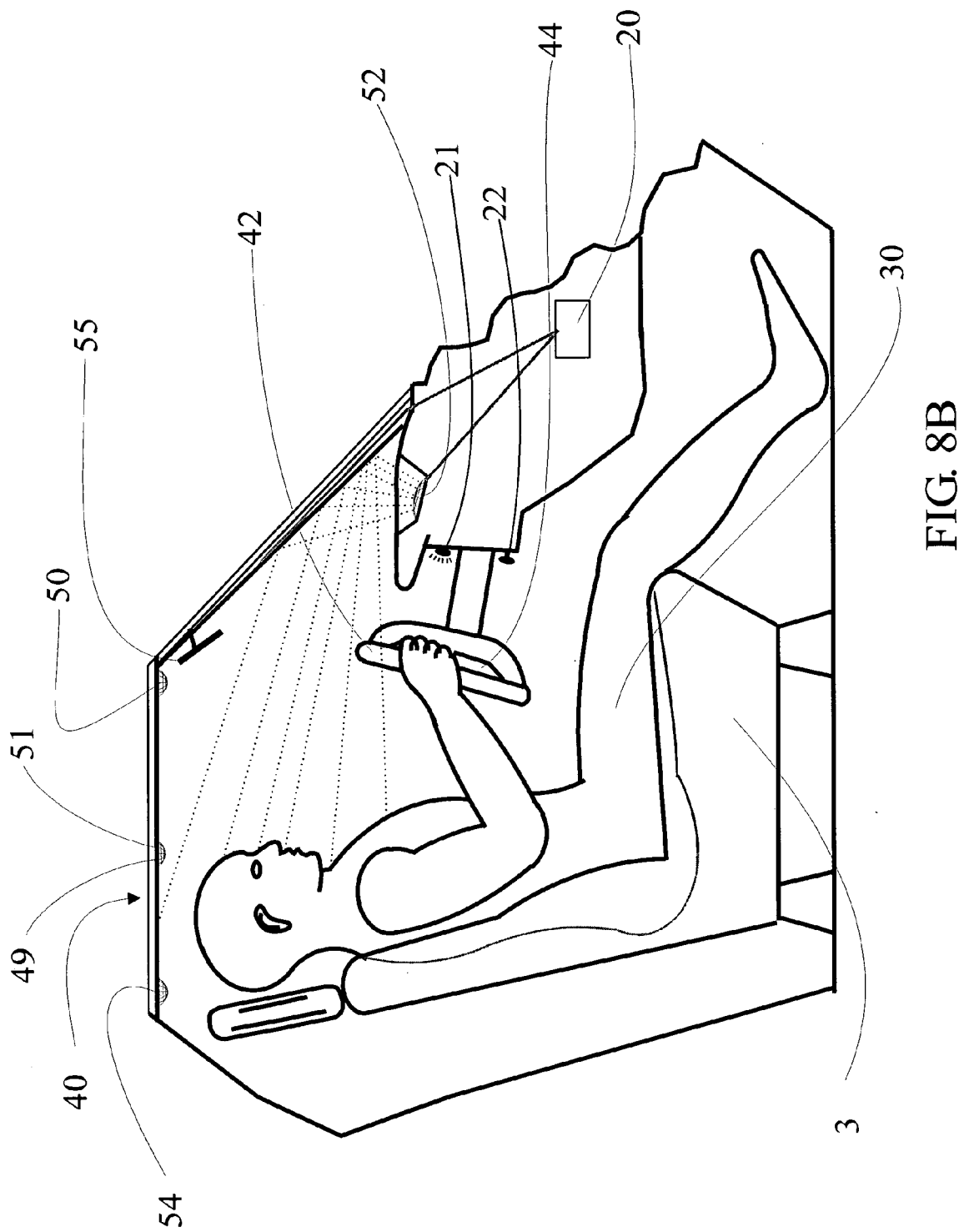
FIG. 8B is a view as in FIG. 8A illustrating the wave pattern from an optical system using an infrared light source and a CCD or CMOS array receiver using the windshield as a reflection surface and showing schematically the interface between the vehicle interior monitoring system of at least one of the inventions disclosed herein and an instrument panel mounted inattentiveness warning light or buzzer and reset button.

An optical infrared transmitter and receiver assembly is shown generally at 52 in FIG. 8B and is mounted onto the instrument panel facing the windshield. Assembly 52 can either be recessed below the upper face of the instrument panel or mounted onto the upper face of the instrument panel. Assembly 52, shown enlarged, comprises a source of infrared radiation, or another form of electromagnetic radiation, and a CCD, CMOS or other appropriate arrays of typically 160 pixels by 160 pixels. In this embodiment, the windshield is used to reflect the illumination light provided by the infrared radiation toward the objects in the passenger compartment and also reflect the light being reflected back by the objects in the passenger compartment, in a manner similar to the "heads-up" display which is now being offered on several automobile models. The "heads-up" display, of course, is currently used only to display information to the driver and is not used to reflect light from the driver to a receiver. Once again, unless one of the distance measuring systems as described below is used, this system alone cannot be used to determine distances from the objects to the sensor. Its main purpose is object identification and monitoring. Depending on the application, separate systems can be used for the driver and for the passenger. In some cases, the cameras located in the instrument panel which receive light reflected off of the windshield can be co-located with multiple lenses whereby the respective lenses aimed at the driver and passenger seats respectively.

Assembly 52 is actually about two centimeters or less in diameter and is shown greatly enlarged in FIG. 8B. Also, the reflection area on the windshield is considerably smaller than illustrated and special provisions are made to assure that this area of the windshield is flat and reflective as is done generally when heads-up displays are used. For cases where there is some curvature in the windshield, it can be at least partially compensated for by the CCD optics.

Transducers 23-25 are illustrated mounted onto the A-pillar of the vehicle, however, since these transducers are quite small, typically less than 2 cm on a side, they could alternately be mounted onto the windshield itself, or other convenient location which provides a clear view of the portion of the passenger compartment being monitored. Other preferred mounting locations include the headliner above and also the side of the seat. Some imagers are now being made that are less than 1 cm on a side.

Figure 27:
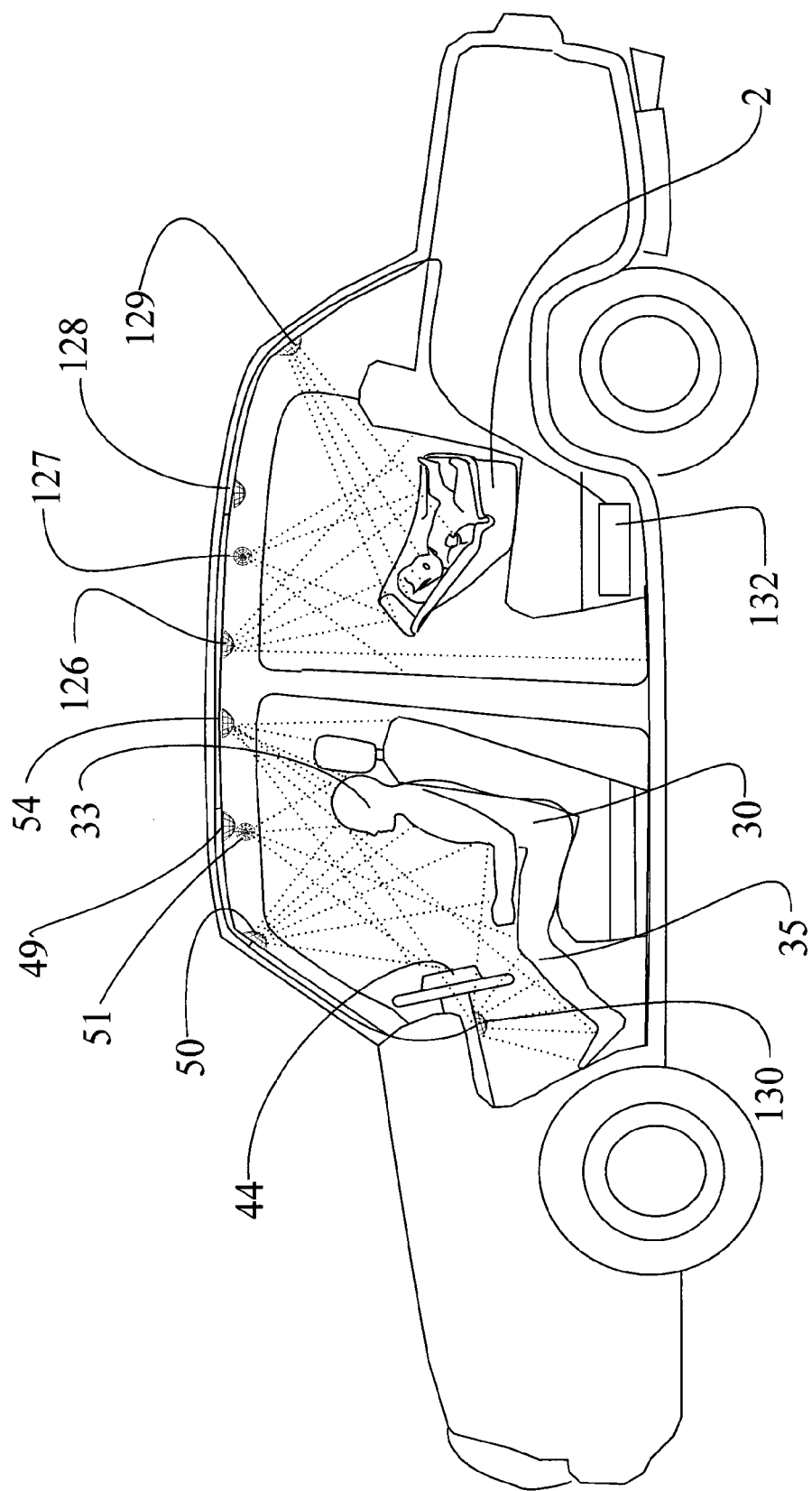
FIG. 27 is a side view, with certain portions removed or cut away, of a portion of the passenger compartment of a vehicle showing preferred mounting locations of optical interior vehicle monitoring sensors.

FIG. 27 is a side view, with certain portions removed or cut away, of a portion of the passenger compartment of a vehicle showing preferred mounting locations of optical interior vehicle monitoring sensors (transmitter/receiver assemblies or transducers) 49, 50, 51, 54, 126, 127, 128, 129, and 130. Each of these sensors is illustrated as having a lens and is shown enlarged in size for clarity. In a typical actual device, the diameter of the lens is less than 2 cm and it protrudes from the mounting surface by less than 1 cm. Specially designed sensors can be considerably smaller. This small size renders these devices almost unnoticeable by vehicle occupants. Since these sensors are optical, it is important that the lens surface remains relatively clean. Control circuitry 132, which is coupled to each transducer, contains a self-diagnostic feature where the image returned by a transducer is compared with a stored image and the existence of certain key features is verified. If a receiver fails this test, a warning is displayed to the driver which indicates that cleaning of the lens surface is required.

The technology illustrated in FIG. 27 can be used for numerous purposes relating to monitoring of the space in the passenger compartment behind the driver including: (i) the determination of the presence and position of objects in the rear seat(s), (ii) the determination of the presence, position and orientation of child seats 2 in the rear seat, (iii) the monitoring of the rear of an occupant's head 33, (iv) the monitoring of the position of occupant 30, (v) the monitoring of the position of the occupant's knees 35, (vi) the monitoring of the occupant's position relative to the airbag 44, (vii) the measurement of the occupant's height, as well as other monitoring functions as described elsewhere herein.

Information relating to the space behind the driver can be obtained by processing the data obtained by the sensors 126, 127, 128 and 129, which data would be in the form of images if optical sensors are used as in the preferred embodiment. Such information can be the presence of a particular occupying item or occupant, e.g., a rear facing child seat 2 as shown in FIG. 27, as well as the location or position of occupying items. Additional information obtained by the optical sensors can include an identification of the occupying item. The information obtained by the control circuitry by processing the information from sensors 126, 127, 128 and 129 may be used to affect any other system or component in the vehicle in a similar manner as the information from the sensors which monitor the front seat is used as described herein, such as the airbag system. Processing of the images obtained by the sensors to determine the presence, position and/or identification of any occupants or occupying item can be effected using a pattern recognition algorithm in any of the ways discussed herein, e.g., a trained neural network. For example, such processing can result in affecting a component or system in the front seat such as a display that allows the operator to monitor what is happening in the rear seat without having to turn his or her head.

In the preferred implementation, as shown in FIGS. 8A-8E, four transducer assemblies are positioned around the seat to be monitored, each can comprise one or more LEDs with a diverging lenses and a CMOS array. Although illustrated together, the illuminating source in many cases will not be co-located with the receiving array. The LED emits a controlled angle, 120° for example, diverging cone of infrared radiation that illuminates the occupant from both sides and from the front and rear. This angle is not to be confused with the field angle used in ultrasonic systems. With ultrasound, extreme care is required to control the field of the ultrasonic waves so that they will not create multipath effects and add noise to the system. With infrared, there is no reason, in the implementation now being described, other than to make the most efficient use of the infrared energy, why the entire vehicle cannot be flooded with infrared energy either from many small sources or from a few bright ones.

The image from each array is used to capture two dimensions of occupant position information, thus, the array of assembly 50 positioned on the windshield header, which is approximately 25% of the way laterally across the headliner in front of the driver, provides a both vertical and transverse information on the location of the driver. A similar view from the rear is obtained from the array of assembly 54 positioned behind the driver on the roof of the vehicle and above the seatback potion of the seat 72. As such, assembly 54 also provides both vertical and transverse information on the location of the driver. Finally, arrays of assemblies 49 and 51 provide both vertical and longitudinal driver location information. Another preferred location is the headliner centered directly above the seat of interest. The position of the assemblies 49–52 and 54 may differ from that shown in the drawings. In the invention, in order that the information from two or more of the assemblies 49–52 and 54 may provide a three-dimensional image of the occupant, or portion of the passenger compartment, the assemblies generally should not be arranged side-by-side. A side-by-side arrangement as used in several prior art references discussed above, will provide two essentially identical views with the difference being a lateral shift. This does not enable a complete three-dimensional view of the occupant.

One important point concerns the location and number of optical assemblies. It is possible to use fewer than four such assemblies with a possible resulting loss in accuracy. The number of four was chosen so that either a forward or rear assembly or either of the side assemblies can be blocked by a newspaper, for example, without seriously degrading the performance of the system. Since drivers rarely are reading newspapers while driving, fewer than four arrays are usually adequate for the driver side. In fact, one is frequently sufficient. One camera is also usually sufficient for the passenger side if the goal of the system is classification only or if camera blockage is tolerated for occupant tracking.

The particular locations of the optical assemblies were chosen to give the most accurate information as to the locations of the occupant. This is based on an understanding of what information can be best obtained from a visual image. There is a natural tendency on the part of humans to try to gauge distance from the optical sensors directly. This, as can be seen above, is at best complicated involving focusing systems, stereographic systems, multiple arrays and triangulation, time of flight measurement, etc. What is not intuitive to humans is to not try to obtain this distance directly from apparatus or techniques associated with the mounting location. Whereas ultrasound is quite good for measuring distances from the transducer (the z-axis), optical systems are better at measuring distances in the vertical and lateral directions (the x and y-axes). Since the precise locations of the optical transducers are known, that is, the geometry of the transducer locations is known relative to the vehicle, there is no need to try to determine the displacement of an object of interest from the transducer (the z-axis) directly. This can more easily be done indirectly by another transducer. That is, the vehicle z-axis to one transducer is the camera x-axis to another.

Another preferred location of a transmitter/receiver for use with airbags is shown at 54 in FIGS. 5 and 13. In this case, the device is attached to the steering wheel and gives an accurate determination of the distance of the driver's chest from the airbag module. This implementation would generally be used with another device such as 50 at another location.

A transmitter/receiver 54 shown mounted on the cover of the airbag module 44 is shown in FIG. 13. The transmitter/receiver 54 is attached to various electronic circuitry 224 by means of wire cable 48. Circuitry 224 is coupled to the inflator portion of the airbag module 44 and as discussed below, can determine whether deployment of the airbag should occur, whether deployment should be suppressed and modify a deployment parameter, depending on the construction of the airbag module 44. When an airbag in the airbag module 44 deploys, the cover begins moving toward the driver. If the driver is in close proximity to this cover during the early stages of deployment, the driver can be seriously injured or even killed. It is important, therefore, to sense the proximity of the driver to the cover and if he or she gets too close, to disable deployment of the airbag. An accurate method of obtaining this information would be to place the distance-measuring device 54 onto the airbag cover as shown in FIG. 13. Appropriate electronic circuitry, either in the transmitter/receiver unit 54 (which can also be referred to as a distance measuring device for this embodiment) or circuitry 224 can be used to not only determine the actual distance of the driver from the cover but also the driver's velocity as discussed above. In this manner, a determination can be made as to where the driver is likely to be at the time of deployment of the airbag, i.e., the driver's expected position based on his current position and velocity. This constitutes a determination of the expected position of the driver based on the current measured position, measured by the transmitter/receiver 54, and current velocity, determined from multiple distance measurements or otherwise as discussed herein. For example, with knowledge of the driver's current position and velocity, the driver's future, expected position can be extrapolated (for example, future position equals current position plus velocity multiplied by the time at which the future position is desired to be known considering the velocity to be constant over the time difference). This information (about where the driver is likely to be at the time of deployment of the airbag) can be used by the circuitry 224 most importantly to prevent deployment of the airbag (which constitutes suppression of the deployment) but also to modify any deployment parameter of the airbag via control of the inflator module such as the rate of airbag deployment. This constitutes control of a component (the airbag module) in consideration of the expected position of the occupant. In FIG. 5, for one implementation, ultrasonic waves are transmitted by a transmitter/receiver 54 toward the chest of the driver 30. The reflected waves are then received by the same transmitter/receiver 54.

One problem of the system using a transmitter/receiver 54 in FIG. 5 or 13 is that a driver may have inadvertently placed his hand over the transmitter/receiver 54, thus defeating the operation of the device. A second confirming transmitter/receiver 50 can therefore be placed at some other convenient position such as on the roof or headliner of the passenger compartment as shown in FIG. 5. This transmitter/receiver 50 operates in a manner similar to transmitter/receiver 54.

The applications described herein have been illustrated using the driver of the vehicle. The same systems of determining the position of the occupant relative to the airbag apply to the passenger, sometimes requiring minor modifications. Also of course, a similar system can be appropriately designed for other monitoring situations such as for cargo containers and truck trailers.

It is likely that the sensor required triggering time based on the position of the occupant will be different for the driver than for the passenger. Current systems are based primarily on the driver with the result that the probability of injury to the passenger is necessarily increased either by deploying the airbag too late or by failing to deploy the airbag when the position of the driver would not warrant it but the passenger's position would. With the use of occupant position sensors for both the passenger and driver, the airbag system can be individually optimized for each occupant and result in further significant injury reduction. In particular, either the driver or passenger system can be disabled if either the driver or passenger is out of position.

There is almost always a driver present in vehicles that are involved in accidents where an airbag is needed. Only about 30% of these vehicles, however, have a passenger. If the passenger is not present, there is usually no need to deploy the passenger side airbag. The occupant position sensor, when used for the passenger side with proper pattern recognition circuitry, can also ascertain whether or not the seat is occupied, and if not, can disable the deployment of the passenger side airbag and thereby save the cost of its replacement. A sophisticated pattern recognition system could even distinguish between an occupant and a bag of groceries or a box, for example, which in some cargo container or truck trailer monitoring situations is desired. Finally, there has been much written about the out of position child who is standing or otherwise positioned adjacent to the airbag, perhaps due to pre-crash braking. The occupant position sensor described herein can prevent the deployment of the airbag in this situation.

3.1 Single Camera, Dual Camera with Single Light Source

Many automobile companies are opting to satisfy the requirements of FMVSS-208 by using a weight only system such as the bladder or strain gage systems disclosed here. Such a system provides an elementary measure of the weight of the occupying object but does not give a reliable indication of its position, at least for automotive vehicles. It can also be easily confused by any object that weighs 60 or more pounds and that is interpreted as an adult. Weight only systems are also static systems in that due to vehicle dynamics that frequently accompany a pre crash braking event they are unable to track the position of the occupant. The load from seatbelts can confuse the system and therefore a special additional sensor must be used to measure seatbelt tension. In some systems, the device must be calibrated for each vehicle and there is some concern as to whether this calibration will be proper for the life on the vehicle.

A single camera can frequently provide considerably more information than a weight only system without the disadvantages of weight sensors and do so at a similar cost. Such a single camera in its simplest installation can categorize the occupancy state of the vehicle and determine whether the airbag should be suppressed due to an empty seat or the presence of a child of a size that corresponds to one weighing less than 60 pounds. Of course, a single camera can also easily do considerably more by providing a static out-of-position indication and, with the incorporation of a faster processor, dynamic out-of-position determination can also be provided.

Thus, especially with the costs of microprocessors continuing to drop, a single camera system can easily provide considerably more functionality than a weight only system and yet stay in the same price range.

A principal drawback of a single camera system is that it can be blocked by the hand of an occupant or by a newspaper, for example. This is a rare event since the preferred mounting location for the camera is typically high in the vehicle such as on the headliner. Also, it is considerably less likely that the occupant will always be reading a newspaper, for example, and if he or she is not reading it when the system is first started up, or at any other time during the trip, the camera system will still get an opportunity to see the occupant when he or she is not being blocked and make the proper categorization. The ability of the system to track the occupant will be impaired but the system can assume that the occupant has not moved toward the airbag while reading the newspaper and thus the initial position of the occupant can be retained and used for suppression determination. Finally, the fact that the camera is blocked can be determined and the driver made aware of this fact in much the same manner that a seatbelt light notifies the driver that the passenger is not wearing his or her seatbelt.

The accuracy of a single camera system can be above 99% which significantly exceeds the accuracy of weight only systems. Nevertheless, some automobile manufacturers desire even greater accuracy and therefore opt for the addition of a second camera. Such a camera is usually placed on the opposite side of the occupant as the first camera. The first camera may be placed on or near the dome light, for example, and the second camera can be on the headliner above the side door. A dual camera system such as this can operate more accurately in bright daylight situations where the window area needs to be ignored in the view of the camera that is mounted near the dome.

Sometimes, in a dual camera system, only a single light source is used. This provides a known shadow pattern for the second camera and helps to accentuate the edges of the occupying item rendering classification easier. Any of the forms of structured light can also be used and through these and other techniques the corresponding points in the two images can more easily be determined thus providing a three-dimensional model of the occupant or occupying object in the case of other vehicle types such as a cargo container or truck trailer.

As a result, the current assignee has developed a low cost single camera system which has been extensively tested for the most difficult problem of automobile occupant sensing but is nevertheless also applicable for monitoring of other vehicles such as cargo containers and truck trailers. The automotive occupant position sensor system uses a CMOS camera in conjunction with pattern recognition algorithms for the discrimination of out-of-position occupants and rear facing child safety seats. A single imager, located strategically within the occupant compartment, is coupled with an infrared LED that emits unfocused, wide-beam pulses toward the passenger volume. These pulses, which reflect off of objects in the passenger seat and are captured by the camera, contain information for classification and location determination in approximately 10 msec. The decision algorithm processes the returned information using a uniquely trained neural network, which may not be necessary in the simpler cargo container or truck trailer monitoring cases. The logic of the neural network was developed through extensive in-vehicle training with thousands of realistic occupant size and position scenarios. Although the optical occupant position sensor can be used in conjunction with other technologies (such as weight sensing, seat belt sensing, crash severity sensing, etc.), it is a stand-alone system meeting the requirements of FMVSS-208. This device will be discussed in detail below.

3.2 Location of the Transducers

Any of the transducers discussed herein such as an active pixel or other camera can be arranged in various locations in the vehicle including in a headliner, roof, ceiling, rear view mirror assembly, an A-pillar, a B-pillar and a C-pillar or a side wall or even a door in the case of a cargo container or truck trailer. Images of the front seat area or the rear seat area can be obtained by proper placement and orientation of the transducers such as cameras. The rear view mirror assembly can be a good location for a camera, particularly if it is attached to the portion of the mirror support that does not move when the occupant is adjusting the mirror. Cameras at this location can get a good view of the driver, passenger as well as the environment surrounding the vehicle and particularly in the front of the vehicle. It is an ideal location for automatic dimming headlight cameras.

3.3 Color Cameras—Multispectral Imaging

All occupant sensing systems, except those of the current assignee, developed to date as reported in the patent and non-patent literature have been generally based on a single frequency. As discussed herein, the use of multiple frequencies with ultrasound makes it possible to change a static system into a dynamic system allowing the occupant to be tracked during pre-crash braking, for example. Multispectral imaging can also provide advantages for camera or other optical-based systems. The color of the skin of an occupant is a reliable measure of the presence of an occupant and also renders the segmentation of the image to be more easily accomplished. Thus, the face can be more easily separated from the rest of the image simplifying the determination of the location of the eyes of the driver, for example. This is particularly true for various frequencies of passive and active infrared. Also, as discussed in more detail below, life forms react to radiation of different frequencies differently than non-life forms again making the determination of the presence of a life form easier. Finally, there is just considerably more information in a color or multispectral image than in a monochromic image. This additional information improves the accuracy of the identification and tracking process and thus of the system. In many cases, this accuracy improvement is so small that the added cost is not justified but as costs of electronics and cameras continue to drop this equation is changing and it is expected that multispectral imaging will prevail.

Illumination for nighttime is frequently done using infrared. When multispectral imaging is used the designer has the choice of reverting to IR only for night time or using a multispectral LED and a very sensitive camera so that the flickering light does not annoy the driver. Alternately, a sensitive camera along with a continuous low level of illumination can be used. Of course, multispectral imaging does not require that the visible part of the spectrum be used. Ultraviolet, X-rays and many other frequencies in the infrared part of the spectrum are available. Life forms, particularly humans, exhibit particularly interesting and identifiable reactions (reflection, absorption, scattering, transmission, emission) to frequencies in other parts of the electromagnetic spectrum (see for example the book *Alien Vision* referenced above) as discussed elsewhere herein.

3.4 High Dynamic Range Cameras

An active pixel camera is a special camera which has the ability to adjust the sensitivity of each pixel of the camera similar to the manner in which an iris adjusts the sensitivity of all of the pixels together of a camera. Thus, the active pixel camera automatically adjusts to the incident light on a pixel-by-pixel basis. An active pixel camera differs from an active infrared sensor in that an active infrared sensor, such as of the type envisioned by Mattes et al. (discussed above), is generally a single pixel sensor that measures the reflection of infrared light from an object. In some cases, as in the HDRC camera, the output of each pixel is a logarithm of the incident light thus giving a high dynamic range to the camera. This is similar to the technique used to suppress the effects of thermal gradient distortion of ultrasonic signals as described in the above cross-referenced patents. Thus, if the incident radiation changes in magnitude by 1,000,000, for example, the output of the pixel may change by a factor of only 6.

A dynamic pixel camera is a camera having a plurality of pixels and which provides the ability to pick and choose which pixels should be observed, as long as they are contiguous.

An HDRC camera is a type of active pixel camera where the dynamic range of each pixel is considerably broader. An active pixel camera manufactured by the Photobit Corporation has a dynamic range of 70 db while an IMS Chips camera, an HDRC camera manufactured by another manufacturer, has a dynamic range of 120 db. Thus, the HDRC camera has a 100,000 times greater range of light sensitivity than the Photobit camera.

The accuracy of the optical occupant sensor is dependent upon the accuracy of the camera. The dynamic range of light within a vehicle can exceed 120 decibels. When a car is driving at night, for example, very little light is available whereas when driving in a bright sunlight, especially in a convertible, the light intensity can overwhelm many cameras. Additionally, the camera must be able to adjust rapidly to changes in light caused by, for example, the emergence of the vehicle from tunnel, or passing by other obstructions such as trees, buildings, other vehicles, etc. which temporarily block the sun and can cause a strobing effect at frequencies approaching 1 kHz.

As mentioned, the IMS HDRC technology provides a 120 dB dynamic intensity response at each pixel in a monochromatic mode. The technology has a 1 million to one dynamic range at each pixel. This prevents blooming, saturation and flaring normally associated with CMOS and CCD camera technology. This solves a problem that will be encountered in an automobile when going from a dark tunnel into bright sunlight. Such a range can even exceed the 120 dB intensity.

There is also significant infrared radiation from bright sunlight and from incandescent lights within the vehicle. Such situations may even exceed the dynamic range of the HDRC camera and additional filtering may be required. Changing the bias on the receiver array, the use of a mechanical iris, or of electrochromic glass or liquid crystal, or a Kerr or Pockel cell can provide this filtering on a global basis but not at a pixel level. Filtering can also be used with CCD arrays, but the amount of filtering required is substantially greater than for the HDRC camera. A notch filter can be used to block significant radiation from the sun, for example. This notch filter can be made as a part of the lens through the placement of various coatings onto the lens surface.

Liquid crystals operate rapidly and give as much as a dynamic range of 10,000 to 1 but may create a pixel interference affect. Electrochromic glass operates more slowly but more uniformly thereby eliminating the pixel affect. The pixel effect arises whenever there is one pixel device in front of another. This results in various aliasing, Moiré patterns and other ambiguities. One way of avoiding this is to blur the image. Another solution is to use a large number of pixels and combine groups of pixels to form one pixel of information and thereby to blur the edges to eliminate some of the problems with aliasing and Moiré patterns. An alternate to the liquid crystal device is the suspended particle device or SPD as discussed elsewhere herein. Other alternatives include spatial light monitors such as Pockel or Kerr cells also discussed elsewhere herein.

One straightforward approach is the use of a mechanical iris. Standard cameras already have response times of several tens of milliseconds range. They will switch, for example, in a few frames on a typical video camera (1 frame=0.033 seconds). This is sufficiently fast for categorization but much too slow for dynamic out-of-position tracking.

An important feature of the IMS Chips HDRC camera is that the full dynamic range is available at each pixel. Thus, if there are significant variations in the intensity of light within the vehicle, and thereby from pixel to pixel, such as would happen when sunlight streams and through a window, the camera can automatically adjust and provide the optimum exposure on a pixel by pixel basis. The use of the camera having this characteristic is beneficial to the invention described herein and contributes significantly to system accuracy. CCDs have a rather limited dynamic range due to their inherent linear response and consequently cannot come close to matching the performance of human eyes. A key advantage of the IMS Chips HDRC camera is its logarithmic response which comes closest to matching that of the human eye. The IMS HDRC camera is also useful in monitoring cargo containers and truck trailers where very little light is available when the door is shut. A small IR LED then can provide the necessary light at a low power consumption which is consistent with a system that may have to operate for long periods on battery power.

Another approach, which is applicable in some vehicles at some times, is to record an image without the infrared illumination and then a second image with the infrared illumination and to then subtract the first image from the second image. In this manner, illumination caused by natural sources such as sunlight or even from light bulbs within the vehicle can be subtracted out. Using the logarithmic pixel system of the IMS Chips camera, care must be taken to include the logarithmic effect during the subtraction process. For some cases, natural illumination such as from the sun, light bulbs within the vehicle, or radiation emitted by the object itself can be used alone without the addition of a special source of infrared illumination as discussed below.

Other imaging systems such as CCD arrays can also of course be used with at least one of the inventions disclosed herein. However, the techniques will be different since the camera is very likely to saturate when bright light is present and to require the full resolution capability, when the light is dim, of the camera iris and shutter speed settings to provide some compensation. Generally, when practicing at least one of the inventions disclosed herein, the interior of the passenger compartment will be illuminated with infrared radiation.

One novel solution is to form the image in memory by adding up a sequence of very short exposures. The number stored in memory would be the sum of the exposures on a pixel by pixel basis and the problem of saturation disappears since the memory location can be made as floating point numbers. This then permits the maximum dynamic range but requires that the information from all of the pixels be removed at high speed. In some cases, each pixel would then be zeroed while in others, the charge can be left on the pixel since when saturation occurs the relevant information will already have been obtained.

There are other bright sources of infrared that must be accounted for. These include the sun and any light bulbs that may be present inside the vehicle. This lack of a high dynamic range inherent with the CCD technology requires the use of an iris, fast electronic shutter, liquid crystal, Kerr or Pockel cell, or electrochromic glass filter to be placed between the camera and the scene. Even with these filters however, some saturation can take place with CCD cameras under bright sun or incandescent lamp exposure. This saturation reduces the accuracy of the image and therefore the accuracy of the system. In particular, the training regimen that must be practiced with CCD cameras is more severe since all of the saturation cases must be considered since the camera may be unable to appropriately adjust. Thus, although CCD cameras can be used, HDRC logarithmic cameras such as manufactured by IMS Chips are preferred. They not only provide a significantly more accurate image but also significantly reduce the amount of training effort and associated data collection that must be undertaken during the development of the neural network algorithm or other computational intelligence system. In some applications, it is possible to use other more deterministic image processing or pattern recognition systems than neural networks.

Another very important feature of the HDRC camera from IMS Chips is that the shutter time is constant at less than 100 ns irrespective of brightness of the scene. The pixel data arrives at constant rate synchronous with the internal imager clock. Random access to each pixel facilitates high-speed intelligent access to any sub-frame (block) size or sub-sampling ratio and a trade-off of frame speed and frame size therefore results. For example, a scene with 128 K pixels per frame can be taken at 120 frames per second, or about 8 milliseconds per frame, whereas a sub-frame can be taken in run at as high as 4000 frames per second with 4 K pixels per frame. This combination allows the maximum resolution for the identification and classification part of the occupant sensor problem while permitting a concentration on those particular pixels which track the head or chest, as described above, for dynamic out-of-position tracking. In fact, the random access features of these cameras can be used to track multiple parts of the image simultaneously while ignoring the majority of the image, and do so at very high speed. For example, the head can be tracked simultaneously with the chest by defining two separate sub-frames that need not be connected. This random access pixel capability, therefore, is optimally suited for recognizing and tracking vehicle occupants. It is also suited for monitoring the environment outside of the vehicle for the purposes of blind spot detection, collision avoidance and anticipatory sensing. Photobit Corporation of 135 North Los Robles Ave., Suite 700, Pasadena, Calif. 91101 manufactures a camera with some characteristics similar to the IMS Chips camera. Other competitive cameras can be expected to appear on the market.

Photobit refers to their Active Pixel Technology as APS. According to Photobit, in the APS, both the photo detector and readout amplifier are part of each pixel. This allows the integrated charge to be converted into a voltage in the pixel that can then be read out over X-Y wires instead of using a charge domain shift register as in CCDs. This column and row addressability (similar to common DRAM) allows for window of interest readout (windowing) which can be utilized for on chip electronic pan/tilt and zoom. Windowing provides added flexibility in applications, such as disclosed herein, needing image compression, motion detection or target tracking. The APS utilizes intra-pixel amplification in conjunction with both temporal and fixed pattern noise suppression circuitry (i.e., correlated double sampling), which produces exceptional imagery in terms of wide dynamic range (~75 dB) and low noise (~15 e-rms noise floor) with low fixed pattern noise (<0.15% sat). Unlike CCDs, the APS is not prone to column streaking due to blooming pixels. This is because CCDs rely on charge domain shift registers that can leak charge to adjacent pixels when the CCD registers overflows. Thus, bright lights "bloom" and cause unwanted streaks in the image. The active pixel can drive column busses at much greater rates than passive pixel sensors and CCDs. On-chip analog-to-digital conversion (ADC) facilitates driving high speed signals off chip. In addition, digital output is less sensitive to pickup and crosstalk, facilitating computer and digital controller interfacing while increasing system robustness. A high speed APS recently developed for a custom binary output application produced over 8,000 frames per second, at a resolution of 128×128 pixels. It is possible to extend this design to a 1024×1024 array size and achieve greater than 1000 frames per second for machine vision. All of these features can be important to many applications of at least one of the inventions disclosed herein.

These advanced cameras, as represented by the HDRC and the APS cameras, now make it possible to more accurately monitor the environment in the vicinity of the vehicle. Previously, the large dynamic range of environmental light has either blinded the cameras when exposed to bright light or else made them unable to record images when the light level was low. Even the HDRC camera with its 120 dB dynamic range may be marginally sufficient to handle the fluctuations in environmental light that occur. Thus, the addition of a electrochromic, liquid crystal, SPD, spatial light monitors or other similar filter may be necessary. This is particularly true for cameras such as the Photobit APS camera with its 75 dB dynamic range.

At about 120 frames per second, these cameras are adequate for cases where the relative velocity between vehicles is low. There are many cases, however, where this is not the case and a much higher monitoring rate is required. This occurs for example, in collision avoidance and anticipatory sensor applications. The HDRC camera is optimally suited for handling these ases since the number of pixels that are being monitored can be controlled resulting in a frame rate as high as about 4000 frames per second with a smaller number of pixels.

Another key advantage of the HDRC camera is that it is quite sensitive to infrared radiation in the 0.8 to 1 micron wavelength range. This range is generally beyond visual range for humans permitting this camera to be used with illumination sources that are not visible to the human eye. Naturally, a notch filter is frequently used with the camera to eliminate unwanted wavelengths. These cameras are available from the Institute for Microelectronics (IMS Chips), Allamndring 30a, D-70569 Stuttgart, Germany with a variety of resolutions ranging from 512 by 256 to 720 by 576 pixels and can be custom fabricated for the resolution and response time required.

One problem with high dynamic range cameras, particularly those making use of a logarithmic compression is that the edges of objects in the field of view tend to wash out and the picture loses a lot of contrast. This causes problems for edge detecting algorithms and thus reduces the accuracy of the system. There are a number of other different methods of achieving a high dynamic range without sacrificing contrast. One system by Nayar, as discussed elsewhere herein, takes a picture using adjacent pixels with different radiation blocking filers. Four such pixel types are used allowing Nayar to essentially obtain 4 separate pictures with one snap of the shutter. Software then selects which of the four pixels to use for each part of the image so that the dark areas receive one exposure and somewhat brighter areas another exposure and so on. The brightest pixel receives all of the incident light, the next brightest filters half of the light, the next brightest half again and the dullest pixel half again. Other ratios could be used as could more levels of pixels, e.g., eight instead of four. Experiments have shown that this is sufficient to permit a good picture to be taken when bright sunlight is streaming into a dark room. A key advantage of this system is that the full frame rate is available and the disadvantage is that only 25% of the pixels are in fact used to form the image.

Another system drains the charge off of the pixels as the picture is being taken and stored the integrated results in memory. TFA technology lends itself to this implementation. As long as the memory capacity is sufficient, the pixel never saturates. An additional approach is to take multiple images at different iris or shutter settings and combine them in much the same way as with the Nayar method. A still different approach is to take several pictures at a short shutter time or a small iris setting and combine the pictures in a processor or other appropriate device. In this manner, the effective dynamic range of the camera can be extended. This method may be too slow for some dynamic applications.

3.5 Fisheye Lens, Pan and Zoom

Figure 8C:
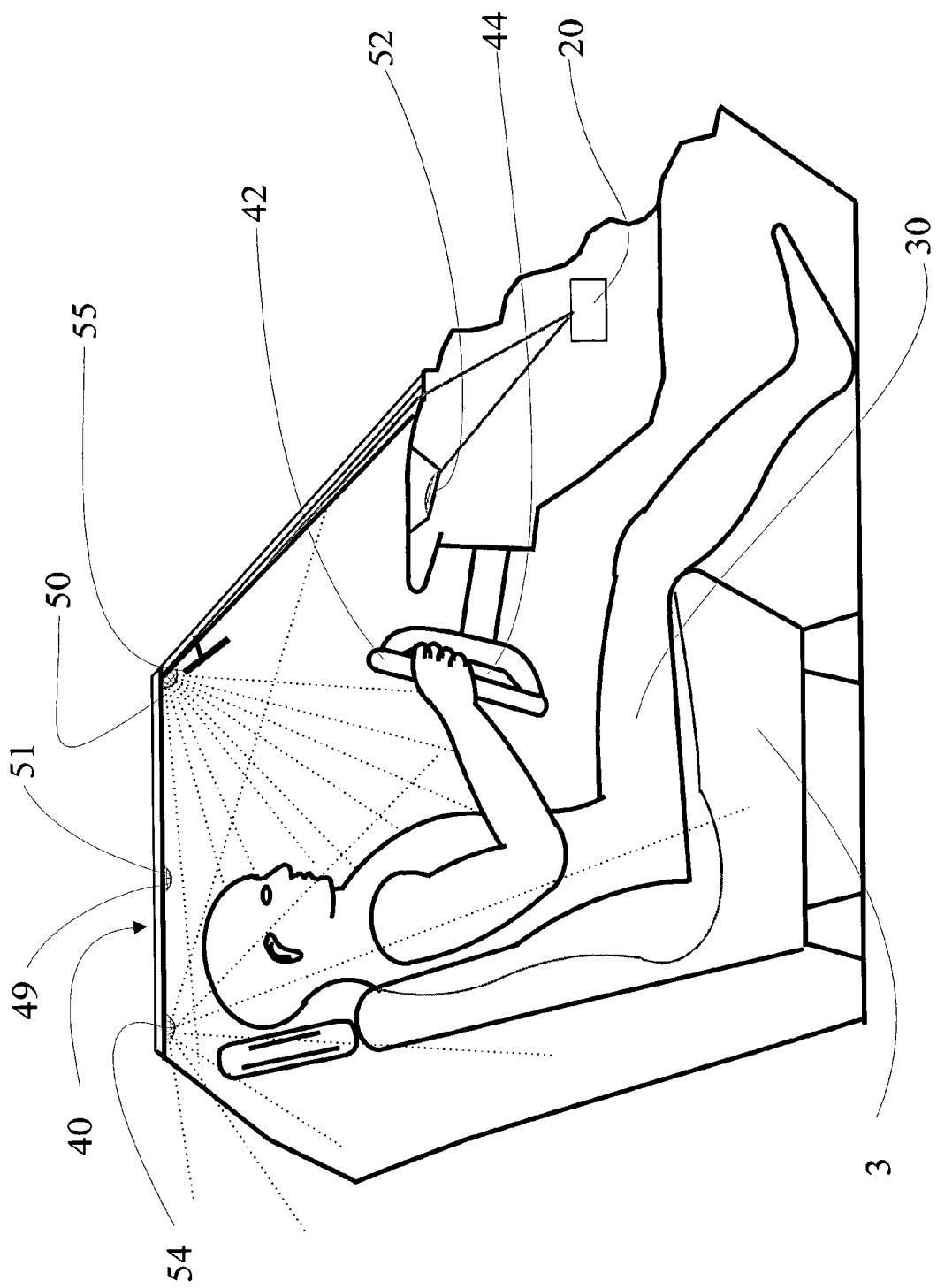
FIG. 8C is a view as in FIG. 8A illustrating the wave pattern from an optical system using an infrared light source and a CCD or CMOS array receiver where the CCD or CMOS array receiver is covered by a lens permitting a wide angle view of the contents of the passenger compartment.
Figure 8D:
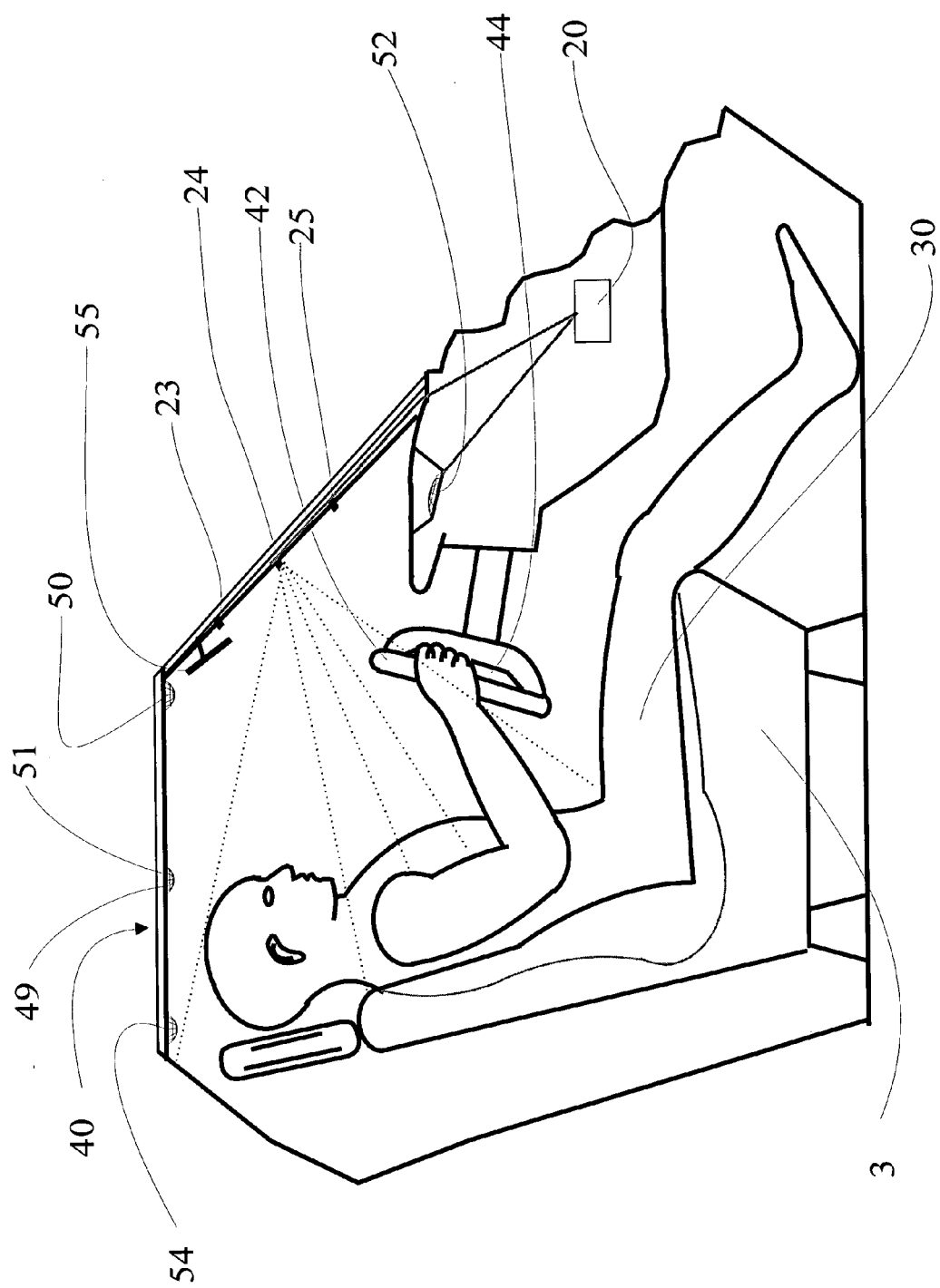
FIG. 8D is a view as in FIG. 8A illustrating the wave pattern from a pair of small CCD or CMOS array receivers and one infrared transmitter where the spacing of the CCD or CMOS arrays permits an accurate measurement of the distance to features on the occupant.
Figure 8E:
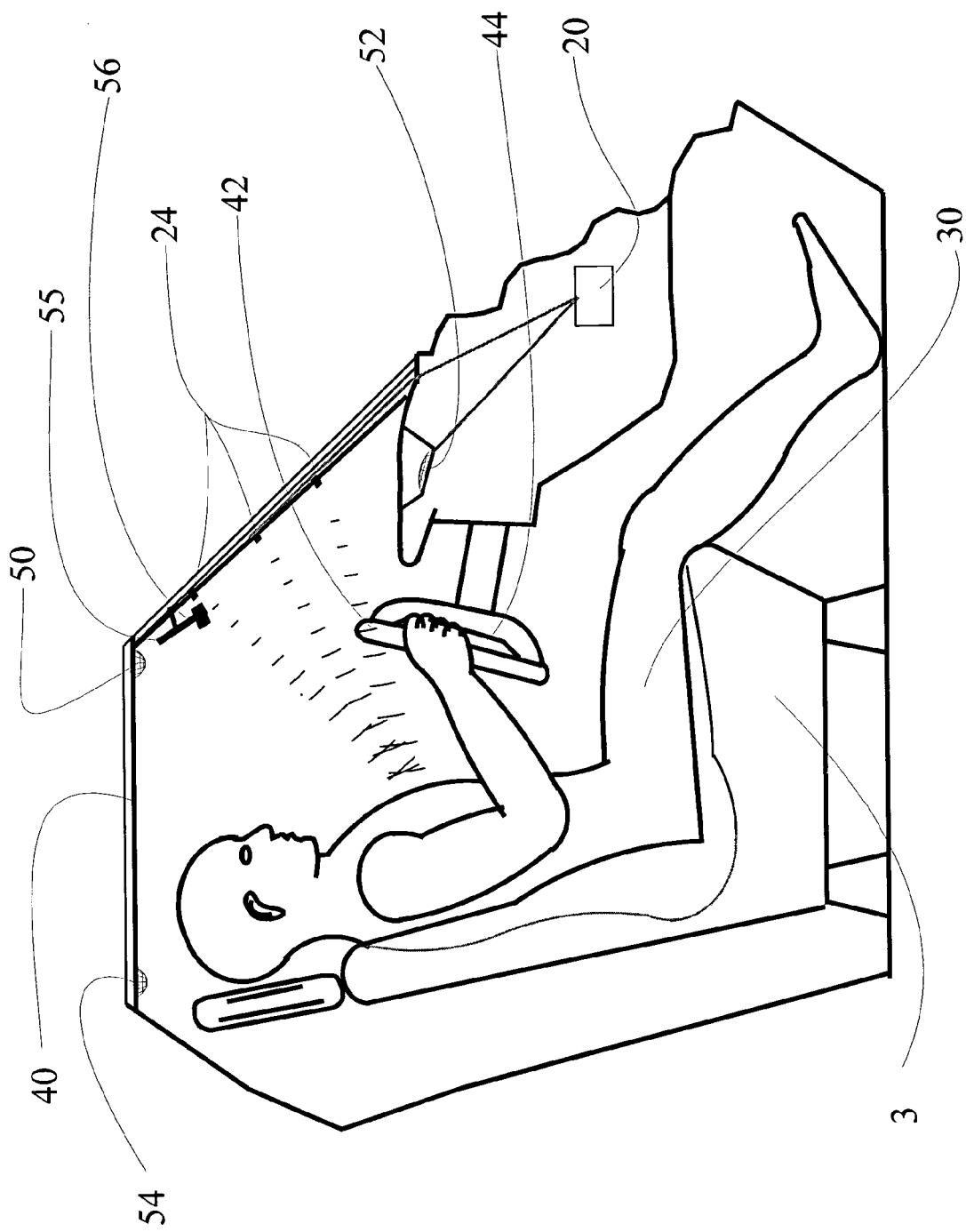
FIG. 8E is a view as in FIG. 8A illustrating the wave pattern from a set of ultrasonic transmitter/receivers where the spacing of the transducers and the phase of the signal permits an accurate focusing of the ultrasonic beam and thus the accurate measurement of a particular point on the surface of the driver.

Infrared waves are shown coming from the front and back transducer assemblies 54 and 55 in FIG. 8C. FIG. 8D illustrates two optical systems each having a source of infrared radiation and a CCD, CMOS, FPR, TFA or QWIP array receiver. The price of such arrays has dropped dramatically recently making most of them practical for interior and exterior vehicle monitoring. In this embodiment, transducers 54 and 55 are CMOS arrays having 160 pixels by 160 pixels covered by a lens. In some applications, this can create a "fisheye" effect whereby light from a wide variety of directions can be captured. One such transducer placed by the dome light or other central position in the vehicle headliner, such as the transducer designated 54, can monitor the entire vehicle interior with sufficient resolution to determine the occupancy of the vehicle, for example. Imagers such as those used herein are available from Marshall Electronics Inc. of Culver City, Calif. and others. A fisheye lens is " . . . a wide-angle photographic lens that covers an angle of about 180°, producing a circular image with exaggerated foreshortening in the center and increasing distortion toward the periphery". (*The American Heritage Dictionary of the English Language, Third Edition*, 1992 by Houghton Mifflin Company). This distortion of a fisheye lens can be substantially changed by modifying the shape of the lens to permit particular portions of the interior passenger compartment to be observed. Also, in many cases the full 180° is not desirable and a lens which captures a smaller angle may be used. Although primarily spherical lenses are illustrated herein, it is understood that the particular lens design will depend on the location in the vehicle and the purpose of the particular receiver. A fisheye lens can be particularly useful for some truck trailer, cargo container, railroad car and automobile trunk monitoring cases.

A camera that provides for pan and zoom using a fisheye lens is described in U.S. Pat. No. 5,185,667 and is applicable to at least one of the inventions disclosed herein. Here, however, it is usually not necessary to remove the distortion since the image will in general not be viewed by a human but will be analyzed by software. One exception is when the image is sent to emergency services via telematics. In that case, the distortion removal is probably best done at the EMS site.

Although a fisheye camera has primarily been discussed above, other types of distorting lenses or mirrors can be used to accomplished particular objectives. A distorting lens or mirror, for example, can have the effect of dividing the image into several sub-pictures so that the available pixels can cover more than one area of a vehicle interior or exterior. Alternately, the volume in close proximity to an airbag, for example, can be allocated a more dense array of pixels so that measurements of the location of an occupant relative to the airbag can be more accurately achieved. Numerous other objectives can now be envisioned which can now be accomplished with a reduction in the number of cameras or imagers through either distortion or segmenting of the optical field.

Another problem associated with lens is cleanliness. In general, the optical systems of these inventions comprise methods to test for the visibility through the lens and issue a warning when that visibility begins to deteriorate. Many methods exist for accomplishing this feat including the taking of an image when the vehicle is empty and not moving and at night. Using neural networks, for example, or some other comparison technique, a comparison of the illumination reaching the imager can be compared with what is normal. A network can be trained on empty seats, for example, in all possible positions and compared with the new image. Or, those pixels that correspond to any movable surface in the vehicle can be removed from the image and a brightness test on the remaining pixels used to determine lens cleanliness.

Once a lens has been determined to be dirty, then either a warning light can be set telling the operator to visit the dealer or a method of cleaning the lens automatically invoked. One such method for night vision systems is disclosed in WO0234572. Another, which is one on the inventions disclosed herein, is to cover the lens with a thin film. This film may be ultrasonically excited thereby greatly minimizing the tendency for it to get dirty and/or the film can be part of a roll of film that is advanced when the diagnostic system detects a dirty lens thereby placing a new clean surface in front of the imager. The film roll can be sized such that under normal operation, the roll would last some period such as 20 years. A simple, powerless mechanism can be designed that will gradually advance the film across the lens over a period of 10 to 20 years using the normal daily thermal cycling to cause relative expansion and contraction of materials with differing thermal expansion coefficients.

4.3D Cameras

Optical sensors can be used to obtain a three-dimensional measurement of the object through a variety of methods that use time of flight, modulated light and phase measurement, quantity of light received within a gated window, structured light and triangulation etc. Some of these techniques are discussed in the current assignee's U.S. Pat. No. 6,393,133 and below.

4.1 Stereo

One method of obtaining a three-dimensional image is illustrated in FIG. 8D wherein transducer 24 is an infrared source having a wide transmission angle such that the entire contents of the front driver's seat is illuminated. Receiving imager transducers 23 and 25 are shown spaced apart so that a stereographic analysis can be made by the control circuitry 20. This circuitry 20 contains a microprocessor with appropriate pattern recognition algorithms along with other circuitry as described above. In this case, the desired feature to be located is first selected from one of the two returned images from either imaging transducer 23 or 25. The software then determines the location of the same feature, through correlation analysis or other methods, on the other image and thereby, through analysis familiar to those skilled in the art, determines the distance of the feature from the transducers by triangulation.

As the distance between the two or more imagers used in the stereo construction increases, a better and better model of the object being imaged can be obtained since more of the object is observable. On the other hand, it becomes increasingly difficult to pair up points that occur in both images. Given sufficient computational resources, this not a difficult problem but with limited resources and the requirement to track a moving occupant during a crash, for example, the problem becomes more difficult. One method to ease the problem is to project onto the occupant, a structured light that permits a recognizable pattern to be observed and matched up in both images. The source of this projection should lie midway between the two imagers. By this method, a rapid correspondence between the images can be obtained.

On the other hand, if a source of structured light is available at a different location than the imager, then a simpler three-dimensional image can be obtained using a single imager. Furthermore, the model of the occupant really only needs to be made once during the classification phase of the process and there is usually sufficient time to accomplish that model with ordinary computational power. Once the model has been obtained, then only a few points need be tracked by either one or both of the cameras.

Another method exists whereby the displacement between two images from two cameras is estimated using a correlator. Such a fast correlator has been developed by Professor Lukin of Kyiv, Ukraine in conjunction with his work on noise radar. This correlator is very fast and can probably determine the distance to an occupant at a rate sufficient for tracking purposes.

4.2 Distance by Focusing

In the above-described imaging systems, a lens within a receptor captures the reflected infrared light from the head or chest of the driver, or other object to be monitored, and displays it onto an imaging device (CCD, CMOS, FPA, TFA, QWIP or equivalent) array. For the discussion of FIGS. 5 and 13–17 at least, either CCD or the word "imager" will be used to include all devices which are capable of converting light frequencies, including infrared, into electrical signals. In one method of obtaining depth from focus, the CCD is scanned and the focal point of the lens is altered, under control of an appropriate circuit, until the sharpest image of the driver's head or chest, or other object, results and the distance is then known from the focusing circuitry. This trial and error approach may require the taking of several images and thus may be time consuming and perhaps too slow for occupant tracking during pre-crash braking.

The time and precision of this measurement is enhanced if two receptors (e.g., lenses) are used which can either project images onto a single CCD or onto separate CCDs. In the first case, one of the lenses could be moved to bring the two images into coincidence while in the other case, the displacement of the images needed for coincidence would be determined mathematically. Other systems could be used to keep track of the different images such as the use of filters creating different infrared frequencies for the different receptors and again using the same CCD array. In addition to greater precision in determining the location of the occupant, the separation of the two receptors can also be used to minimize the effects of hands, arms or other extremities which might be very close to the airbag. In this case, where the receptors are mounted high on the dashboard on either side of the steering wheel, an arm, for example, would show up as a thin object but much closer to the airbag than the larger body parts and, therefore, easily distinguished and eliminated, permitting the sensors to determine the distance to the occupant's chest. This is one example of the use of pattern recognition.

An alternate method is to use a lens with a short focal length. In this case, the lens is mechanically focused, e.g., automatically, directly or indirectly, by the control circuitry 20, to determine the clearest image and thereby obtain the distance to the object. This is similar to certain camera auto-focusing systems such as one manufactured by Fuji of Japan. Again this is a time consuming method. Other methods can be used as described in the patents and patent applications referenced above.

Instead of focusing the lens, the lens could be moved relative to the array to thereby adjust the image on the array. Instead of moving the lens, the array could be moved to achieve the proper focus. In addition, it is also conceivable that software could be used to focus the image without moving the lens or the array especially if at least two images are available.

An alternative is to use the focusing systems described in patents U.S. Pat. No. 5,193,124 and U.S. Pat. No. 5,003,166. These sy quite efficient requiring only two images with different camera settings. Thus, if there is sufficient time to acquire an image, change the camera settings and acquire a second image, this system is fine and can be used with the inventions disclosed herein. Once the position of the occupant has been determined for one point in time, then the process may not have to be repeated as a measurement of the size of a part of an occupant can serve as a measure of its relative location compared to the previous image from which the range was obtained. Thus, other than the requirement of a somewhat more expensive imager, the system of the '124 and '166 patents is fine. The accuracy of the range is perhaps limited to a few centimeters depending on the quality of the imager used. Also, if multiple ranges to multiple objects are required, then the process becomes a bit more complicated.

4.3 Ranging

The scanning portion of a pulse laser radar device can be accomplished using rotating mirrors, vibrating mirrors, or preferably, a solid state system, for example one utilizing $TeO_2$ as an optical diffraction crystal with lithium niobate crystals driven by ultrasound (although other solid state systems not necessarily using $TeO_2$ and lithium niobate crystals could also be used) which is an example of an acoustic optical scanner. An alternate method is to use a micromachined mirror, which is supported at its center and caused to deflect by miniature coils or equivalent MEMS device. Such a device has been used to provide two-dimensional scanning to a laser. This has the advantage over the $TeO_2$— lithium niobate technology in that it is inherently smaller and lower cost and provides two-dimensional scanning capability in one small device. The maximum angular deflection that can be achieved with this process is on the order of about 10 degrees. Thus, a diverging lens or equivalent will be needed for the scanning system.

Another technique to multiply the scanning angle is to use multiple reflections off of angled mirror surfaces. A tubular structure can be constructed to permit multiple interior reflections and thus a multiplying effect on the scan angle.

An alternate method of obtaining three-dimensional information from a scanning laser system is to use multiple arrays to replace the single arrays used in FIG. 8A. In the case, the arrays are displaced from each other and, through triangulation, the location of the reflection from the illumination by a laser beam of a point on the object can be determined in a manner that is understood by those skilled in the art. Alternately, a single array can be used with the scanner displaced from the array.

A new class of laser range finders has particular application here. This product, as manufactured by Power Spectra, Inc. of Sunnyvale, Calif., is a GaAs pulsed laser device which can measure up to 30 meters with an accuracy of <2 cm and a resolution of <1 cm. This system can be implemented in combination with transducer 24 and one of the receiving transducers 23 or 25 may thereby be eliminated. Once a particular feature of an occupying item of the passenger compartment has been located, this device is used in conjunction with an appropriate aiming mechanism to direct the laser beam to that particular feature. The distance to that feature can then be known to within 2 cm and with calibration even more accurately. In addition to measurements within the passenger compartment, this device has particular applicability in anticipatory sensing and blind spot monitoring applications exterior to the vehicle. An alternate technology using range gating to measure the time of flight of electromagnetic pulses with even better resolution can be developed based on the teaching of the McEwan patents listed above.

Figure 17:
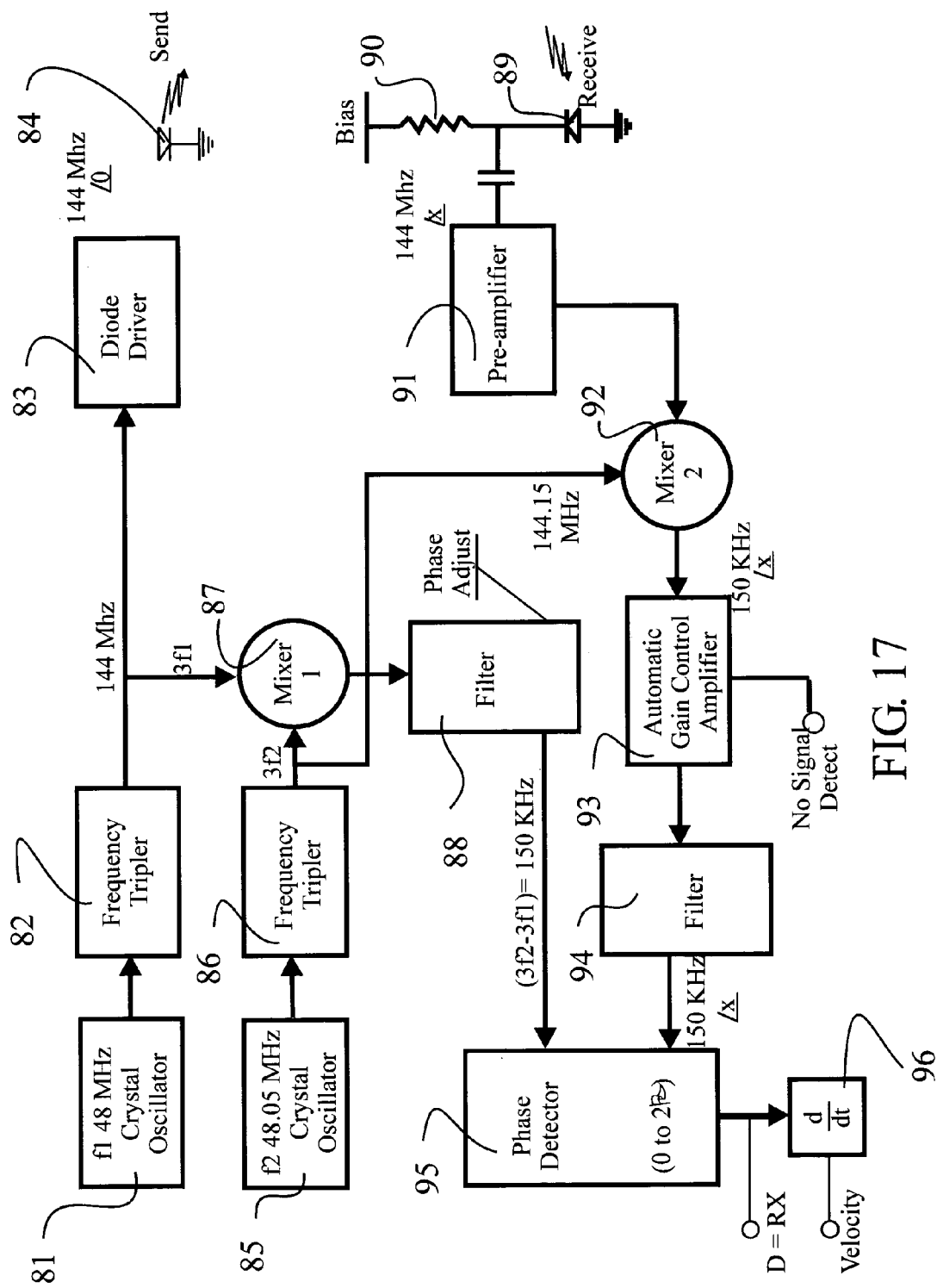
FIG. 17 is a schematic illustrating the circuit of an occupant position-sensing device using a modulated infrared signal, beat frequency and phase detector system.

A particular implementation of an occupant position sensor having a range of from 0 to 2 meters (corresponding to an occupant position of from 0 to 1 meter since the signal must travel both to and from the occupant) using infrared is illustrated in the block diagram schematic of FIG. 17. This system was designed for automobile occupant sensing and a similar system having any reasonable range up to and exceeding 100 meters can be designed on the same principles for other monitoring applications. The operation is as follows. A 48 MHz signal, f1, is generated by a crystal oscillator 81 and fed into a frequency tripler 82 which produces an output signal at 144 MHz. The 144 MHz signal is then fed into an infrared diode driver 83 which drives the infrared diode 84 causing it to emit infrared light modulated at 144 MHz and a reference phase angle of zero degrees. The infrared diode 84 is directed at the vehicle occupant. A second signal f2 having a frequency of 48.05 MHz, which is slightly greater than f1, is similarly fed from a crystal oscillator 85 into a frequency tripler 86 to create a frequency of 144.15 MHz. This signal is then fed into a mixer 87 which combines it with the 144 MHz signal from frequency tripler 82. The combined signal from the mixer 87 is then fed to filter 88 which removes all signals except for the difference, or beat frequency, between 3 times f1 and 3 times f2, of 150 kHz. The infrared signal which is reflected from the occupant is received by receiver 89 and fed into pre-amplifier 91, a resistor 90 to bias being coupled to the connection between the receiver 89 and the pre-amplifier 91. This signal has the same modulation frequency, 144 MHz, as the transmitted signal but now is out of phase with the transmitted signal by an angle x due to the path that the signal took from the transmitter to the occupant and back to the receiver.

The output from pre-amplifier 91 is fed to a second mixer 92 along with the 144.15 MHz signal from the frequency tripler 86. The output from mixer 92 is then amplified by an automatic gain amplifier 93 and fed into filter 94. The filter 94 eliminates all frequencies except for the 150 kHz difference, or beat, frequency, in a similar manner as was done by filter 88. The resulting 150 kHz frequency, however, now has a phase angle x relative to the signal from filter 88. Both 150 kHz signals are now fed into a phase detector 95 which determines the magnitude of the phase angle x. It can be shown mathematically that, with the above values, the distance from the transmitting diode to the occupant is x/345.6 where x is measured in degrees and the distance in meters. The velocity can also be obtained using the distance measurement as represented by 96. An alternate method of obtaining distance information, as discussed above, is to use the teachings of the McEwan patents discussed elsewhere herein.

As reported above, cameras can be used for obtaining three-dimensional images by modulation of the illumination as taught in U.S. Pat. No. 5,162,861. The use of a ranging device for occupant sensing is believed to have been first disclosed by the current assignee in the above-referenced patents. More recent attempts include the PMD camera as disclosed in PCT application WO09810255 and similar concepts disclosed in U.S. Pat. No. 6,057,909 and U.S. Pat. No. 6,100,517.

Note that although the embodiment in FIG. 17 uses near infrared, it is possible to use other frequencies of energy without deviating from the scope of the invention. In particular, there are advantages in using the short wave (SWIR), medium wave (MWIR) and long wave (LWIR) portions of the infrared spectrum as the interact in different and interesting ways with living occupants as described elsewhere herein and in the book *Alien Vision* referenced above.

4.4 Pockel or Kerr Cell for Determining Range

Pockel and Kerr cells are well known in optical laboratories. They act as very fast shutters (up to 10 billion cycles per second) and as such can be used to range-gate the reflections based on distance giving a range resolution of up to 3 cm without the use of phase techniques to divide the interval into parts or sub millimeter resolution using phasing techniques. Thus, through multiple exposures the range to all reflecting surfaces inside and outside of the vehicle can be determined to any appropriate degree of accuracy. The illumination is transmitted, the camera shutter opened and the cell allows only that reflected light to enter the camera that arrived at the cell a precise time range after the illumination was initiated.

These cells are part of a class of devices called spatial light modulators (SLM). One novel application of an SLM is reported in U.S. Pat. No. 5,162,861. In this case, an SLM is used to modulate the light returning from a transmitted laser pulse that is scattered from a target. By comparing the intensities of the modulated and unmodulated images, the distance to the target can be ascertained. Using a SLM in another manner, the light valve can be kept closed for all ranges except the ones of interest. Thus, by changing the open time of the SLM, only returns from certain distances are permitted to pass through to the imager. By selective changing the opened time, the range to the target can be "range-gated" and thereby accurately determined. Thus, the outgoing light need not be modulated and a scanner is not necessary unless there is a need to overcome the power of the sun reflecting off of the object of interest. This form of range-gating can of course be used for either external or internal applications.

4.5 Thin Film on ASIC (TFA)

Since the concepts of using cameras for monitoring the passenger compartment of a vehicle and measuring distance to a vehicle occupant based on the time of flight were first disclosed in the commonly assigned above-referenced patents, several improvements have been reported in the literature including the thin film on ASIC (TFA) (references 6–11) and photonic mixing device (PMD) (reference 12) camera technologies. Both of these technologies and combinations thereof are good examples of devices that can be used in practicing the inventions herein and those in the above-referenced patents and applications for monitoring both inside and exterior to a vehicle.

An improvement to these technologies is to use noise or pseudo noise modulation for a PMD-like device to permit more accurate distance to object determination especially for exterior to the vehicle monitoring through correlation of the generated and reflected modulation sequences. This has the further advantage that systems from different vehicles will not interfere with each other.

The TFA is an example of a high dynamic range camera (HDRC) the use of which for interior monitoring was first disclosed in U.S. Pat. No. 6,393,133. Since there is direct connection between each pixel and an associated electronic circuit, the potential exists for range gating the sensor to isolate objects between certain limits thus simplifying the identification process by eliminating reflections from objects that are closer or further away than the object of interest. A further advantage of the TFA is that it can be doped to improve its sensitivity to infrared and it also can be fabricated as a three-color camera system.

Another novel HDRC camera is disclosed by Nayar (reference 13), as discussed above, and involves varying the sensitivity of pixels in the imager. Each of four adjacent pixels has a different exposure sensitivity and an algorithm is presented that combines the four exposures in a manner that loses little resolution but provides a high dynamic range picture. This particularly simple system is a preferred approach to handling the dynamic range problem in several monitoring applications of at least one of the inventions disclosed herein.

A great deal of development effort has gone into automatic camera focusing systems such as described in the Scientific American Article "Working Knowledge: Focusing in a Flash" (reference 14). The technology is now to the point that it can be taught to focus on a particular object, such as the head or chest of an occupant, or other object, and measure the distance to the object to within approximately 1 inch. If this technology is coupled with the Nayar camera, a very low cost semi 3D high dynamic range camera or imager results that is sufficiently accurate for locating an occupant in the passenger compartment or an object in another container. If this technology is coupled with an eye locator and the distance to the eyes of the occupant are determined, then a single camera is all that is required for either the driver or passenger. Such a system would display a fault warning when it is unable to find the occupant's eyes. Such a system is illustrated in FIGS. 52 and 53.

As discussed above, thin film on ASIC technology, as described in Lake, D. W. "TFA Technology: The Corning Revolution in Photography", Advanced Imaging Magazine, April, 2002 (www.advancedimagingmag.com) shows promise of being the next generation of imager for automotive and other vehicle monitoring applications. The anticipated specifications for this technology, as reported in the Lake article, are:

| | |
|---|---|
| Dynamic Range | 120 db |
| Sensitivity | 0.01 lux |
| Anti-blooming | 1,000,000:1 |
| Pixel Density | 3,200,000 |
| Pixel Size | 3.5 um |
| Frame Rate | 30 fps |
| DC Voltage | 1.8 v |
| Compression | 500 to 1 |

All of these specifications, except for the frame rate, are attractive for occupant sensing. It is believed that the frame rate can be improved with subsequent generations of the technology. Some advantages of this technology for occupant sensing include the possibility of obtaining a three-dimensional image by varying the pixel on time in relation to a modulated illumination in a simpler manner than that proposed with the PMD imager or with a Pockel or Kerr cell. The ability to build the entire package on one chip will reduce the cost of this imager compared with two or more chips required by current technology. Other technical papers on TFA are referenced above.

TFA thus appears to be a major breakthrough when used in the interior and exterior imaging systems. Its use in these applications falls within the teachings of the inventions disclosed herein.

5. Glare Control

The headlights of oncoming vehicles frequently make it difficult for the driver of a vehicle to see the road and safely operate the vehicle. This is a significant cause of accidents and much discomfort. The problem is especially severe during bad weather where rain can cause multiple reflections. Opaque visors are now used to partially solve this problem but they do so by completely blocking the view through a large portion of the window and therefore cannot be used to cover the entire windshield. Similar problems happen when the sun is setting or rising and the driver is operating the vehicle in the direction of the sun. U.S. Pat. No. 4,874,938 attempts to solve this problem through the use of a motorized visor but although it can block some glare sources, it also blocks a substantial portion of the field of view.

The vehicle interior monitoring system disclosed herein can contribute to the solution of this problem by determining the position of the driver's eyes. If separate sensors are used to sense the direction of the light from the on-coming vehicle or the sun, and through the use of electrochromic glass, a liquid crystal device, suspended particle device glass (SPD) or other appropriate technology, a portion of the windshield, or special visor, can be darkened to impose a filter between the eyes of the driver and the light source. Electrochromic glass is a material where the transparency of the glass can be changed through the application of an electric current. The term "liquid crystal" as used herein will be used to represent the class of all such materials where the optical transmissibility can be varied electrically or electronically. Electrochromic products are available from Gentex of Zeeland, Mich., and Donnelly of Holland, Mich. Other systems for selectively imposing a filter between the eyes of an occupant and the light source are currently under development.

By dividing the windshield into a controlled grid or matrix of contiguous areas and through feeding the current into the windshield from orthogonal directions, selective portions of the windshield can be darkened as desired. Other systems for selectively imposing a filter between the eyes of an occupant and the light source are currently under development. One example is to place a transparent sun visor type device between the windshield and the driver to selectively darken portions of the visor as described above for the windshield.

5.1 Windshield

Figure 28:
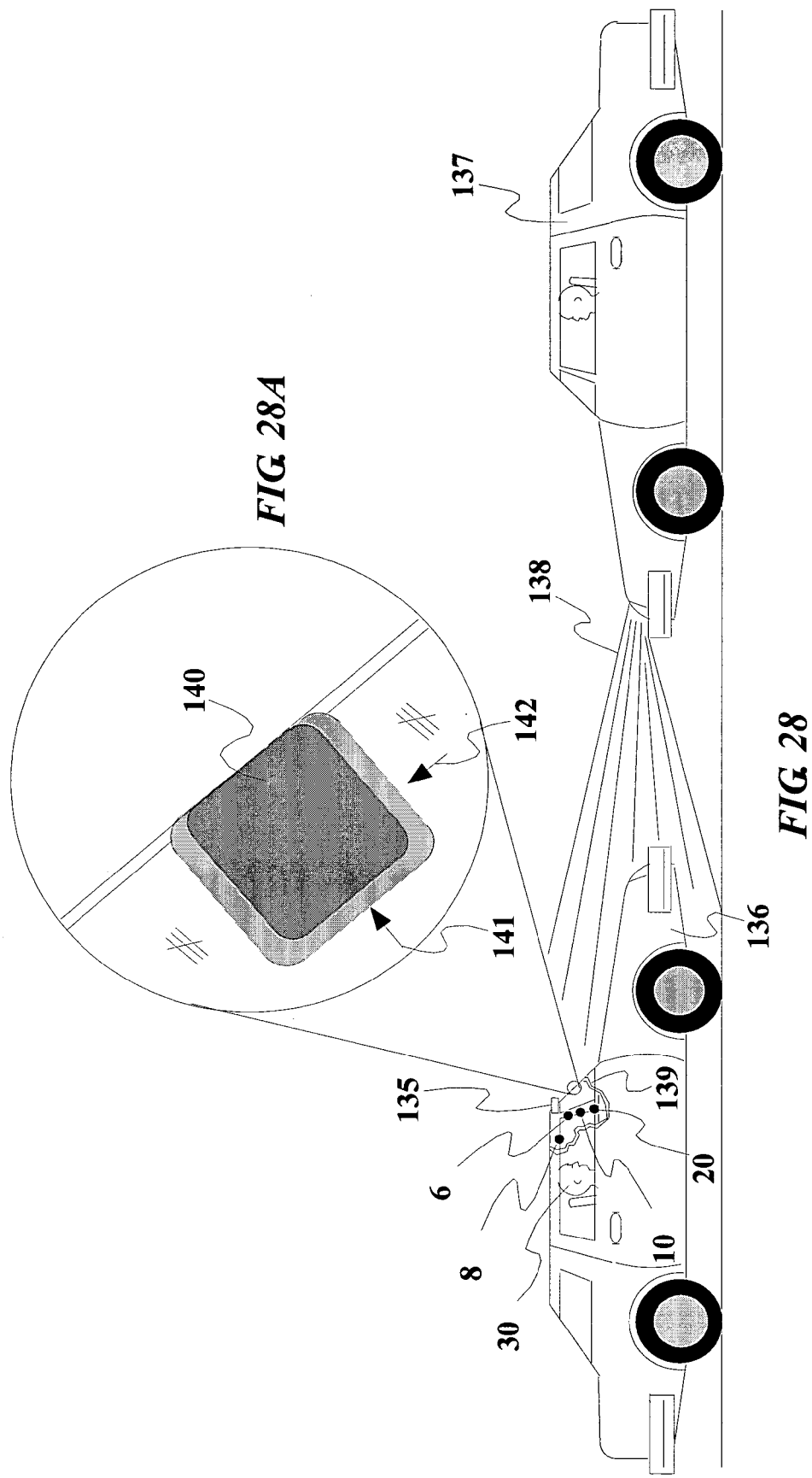
FIG. 28 is a side view with parts cutaway and removed of a subject vehicle and an oncoming vehicle, showing the headlights of the oncoming vehicle and the passenger compartment of the subject vehicle, containing detectors of the driver's eyes and detectors for the headlights of the oncoming vehicle and the selective filtering of the light of the approaching vehicle's headlights through the use of electro-chromic glass, organic or metallic semiconductor polymers or electropheric particulates (SPD) in the windshield.

FIG. 28 illustrates how such a system operates for the windshield. A sensor 135 located on vehicle 136 determines the direction of the light 138 from the headlights of oncoming vehicle 137. Sensor 135 is comprised of a lens and a charge-coupled device (CCD), CMOS or similar device, with appropriate software or electronic circuitry that determines which elements of the CCD are being most brightly illuminated. An algorithm stored in processor 20 then calculates the direction of the light from the oncoming headlights based on the information from the CCD, or CMOS device. Usually two systems 135 are required to fix the location of the offending light. Transducers 6, 8 and 10 determine the probable location of the eyes of the operator 30 of vehicle 136 in a manner such as described above and below. In this case, however, the determination of the probable locus of the driver's eyes is made with an accuracy of a diameter for each eye of about 3 inches (7.5 cm). This calculation sometimes will be in error especially for ultrasonic occupant sensing systems and provision is made for the driver to make an adjustment to correct for this error as described below.

The windshield 139 of vehicle 136 comprises electrochromic glass, a liquid crystal, SPD device or similar system, and is selectively darkened at area 140, FIG. 28A, due to the application of a current along perpendicular directions 141 and 142 of windshield 139. The particular portion of the windshield to be darkened is determined by processor 20. Once the direction of the light from the oncoming vehicle is known and the locations of the driver's eyes are known, it is a matter of simple trigonometry to determine which areas of the windshield matrix should be darkened to impose a filter between the headlights and the driver's eyes. This is accomplished by the processor 20. A separate control system, not shown, located on the instrument panel, steering wheel or at some other convenient location, allows the driver to select the amount of darkening accomplished by the system from no darkening to maximum darkening. In this manner, the driver can select the amount of light that is filtered to suit his particular physiology. Alternately, this process can take place automatically. The sensor 135 can either be designed to respond to a single light source or to multiple light sources to be sensed and thus multiple portions of the vehicle windshield 139 to be darkened. Unless the camera is located on the same axis at the eyes of the driver, two cameras would in general be required to determine the distance of the glare causing object from the eyes of the driver. Without this third dimension, two glare sources that are on the same axis to the camera could be on different axes to the driver, for example.

As an alternative to locating the direction of the offending light source, a camera looking at the eyes of the driver can determine when they are being subjected to glare and then impose a filter. A trial and error process or through the use of structured light created by a pattern on the windshield, determines where to create the filter to block the glare.

More efficient systems are now becoming available to permit a substantial cost reduction as well as higher speed selective darkening of the windshield for glare control. These systems permit covering the entire windshield which is difficult to achieve with LCDs. For example, such systems are made from thin sheets of plastic film, sometimes with an entrapped liquid, and can usually be sandwiched between the two pieces of glass that make up a typical windshield. The development of conductive plastics permits the addressing and thus the manipulation of pixels of a transparent film that previously was not possible. These new technologies will now be discussed.

If the objective is for glare control, then the Xerox Gyricon technology applied to windows can be appropriate. Previously, this technology has only been used to make e-paper and a modification to the technology is necessary for it to work for glare control. Gyricon is a thin layer of transparent plastic full of millions of small black and white or red and white beads, like toner particles. The beads are contained in an oil-filled cavity. When voltage is applied, the beads rotate to present a colored side to the viewer. The advantages of Gyricon are: (1) it is electrically writeable and erasable; (2) it can be re-used thousands of times; (3) it does not require backlighting or refreshing; (4) it is brighter than today's reflective displays; and, (5) it operates on low power. The changes required are to cause the colored spheres to rotate 90 degrees rather than 180 degrees and to make half of each sphere transparent so that the display switches from opaque to 50% transparent.

Another technology, SPD light control technology from Research Frontiers Inc., has been used to darken entire windows but not as a system for darkening only a portion of the glass or sun visor to impose a selective filter to block the sun or headlights of an oncoming vehicle. Although it has been used as a display for laptop computers, it has not been used as a heads-up display (HUD) replacement technology for automobile or truck windshields.

Both SPD and Gyricon technologies require that the particles be immersed in a fluid so that the particles can move.

Since the properties of the fluid will be temperature sensitive, these technologies will vary somewhat in performance over the automotive temperature range. The preferred technology, therefore, is plastic electronics although in many applications either Gyricon or SPD will also be used in combination with plastic electronics, at least until the technology matures. Currently plastic electronics can only emit light and not block it. However, research is ongoing to permit it to also control the transmission of light.

The calculations of the location of the driver's eyes using acoustic systems may be in error and therefore provision must be made to correct for this error. One such system permits the driver to adjust the center of the darkened portion of the windshield to correct for such errors through a knob, mouse pad, joy stick or other input device, on the instrument panel, steering wheel, door, armrest or other convenient location. Another solution permits the driver to make the adjustment by slightly moving his head. Once a calculation as to the location of the driver's eyes has been made, that calculation is not changed even though the driver moves his head slightly. It is assumed that the driver will only move his head in a very short time period to center the darkened portion of the windshield to optimally filter the light from the oncoming vehicle. The monitoring system will detect this initial head motion and make the correction automatically for future calculations. Additionally, a camera observing the driver or other occupant can monitor the reflections of the sun or the headlights of oncoming vehicles off of the occupant's head or eyes and automatically adjust the filter in the windshield or sun visor.

5.2 Glare in Rear View Mirrors

Electrochromic glass is currently used in rear view mirrors to darken the entire mirror in response to the amount of light striking an associated sensor. This substantially reduces the ability of the driver to see objects coming from behind his vehicle. If one rear-approaching vehicle, for example, has failed to dim his lights, the mirror will be darkened to respond to the light from that vehicle making it difficult for the driver to see other vehicles that are also approaching from the rear. If the rear view mirror is selectively darkened on only those portions that cover the lights from the offending vehicle, the driver is able to see all of the light coming from the rear whether the source is bright or dim. This permits the driver to see all of the approaching vehicles not just the one with bright lights.

Figure 29:
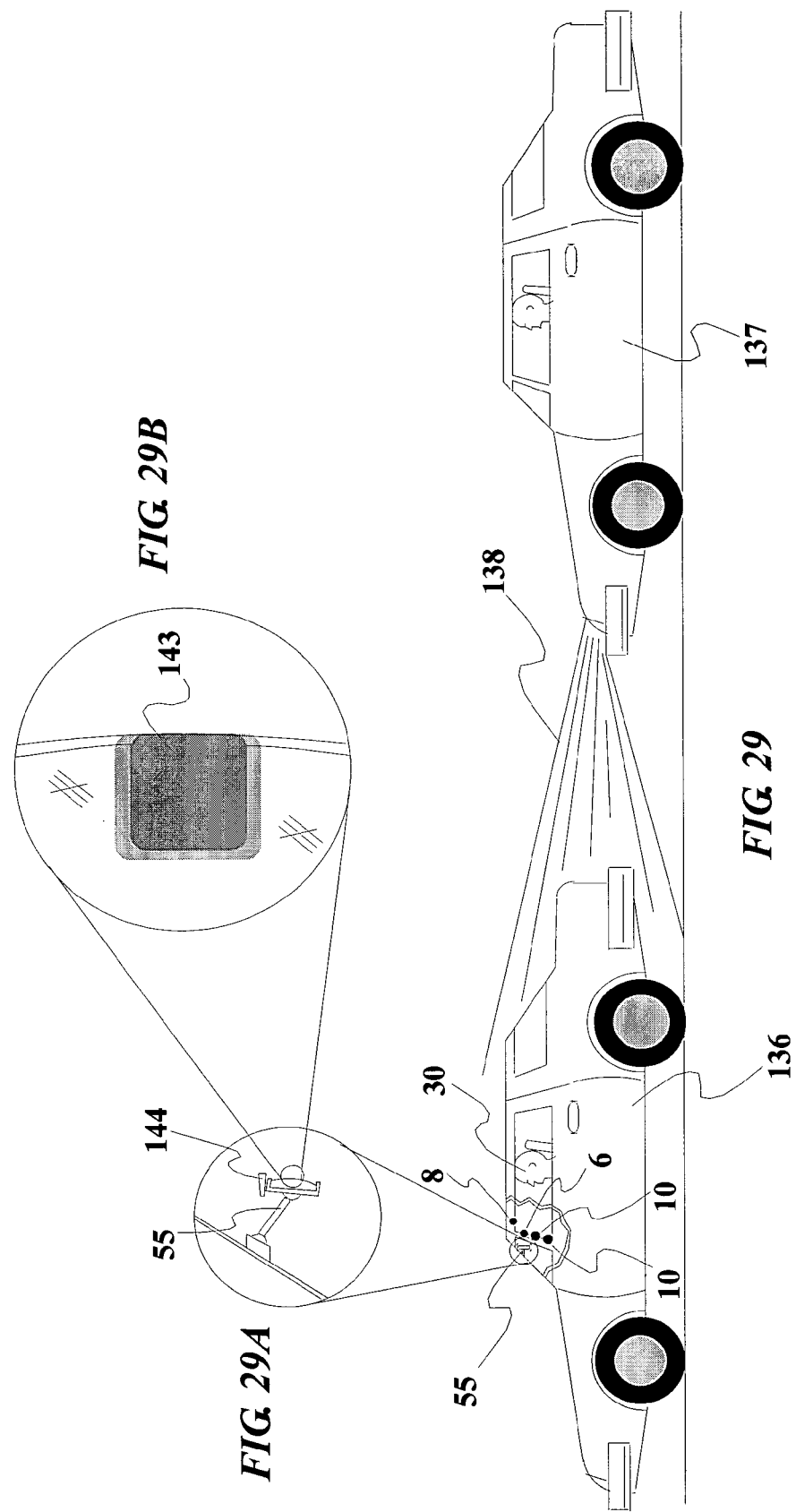
FIG. 29 is a side view with parts cutaway and removed of a vehicle and a following vehicle showing the headlights of the following vehicle and the passenger compartment of the leading vehicle containing a driver and a preferred mounting location for driver eyes and following vehicle headlight detectors and the selective filtering of the light of the following vehicle's headlights through the use of electrochromic glass, SPD glass or equivalent, in the rear view mirror.

Such a system is illustrated in FIGS. 29, 29A and 29B wherein rear view mirror 55 is equipped with electrochromic glass, or comprises a liquid crystal or similar device, having the capability of being selectively darkened, e.g., at area 143. Associated with mirror 55 is a light sensor 144 that determines the direction of light 138 from the headlights of rear approaching vehicle 137. Again, as with the windshield, a stereo camera is used if the camera is not aligned with the eye view path. This is easier to accomplish with a mirror due to its much smaller size. In such a case, the imager could be mounted on the movable part of the mirror and could even look through the mirror from behind. In the same manner as above, transducers 6, 8 and 10 determine the location of the eyes of the driver 30. The signals from both sensor systems, 6, 8, 10 and 144, are combined in the processor 20, where a determination is made as to what portions of the mirror should be darkened, e.g., area 143. Appropriate currents are then sent to the mirror 55 in a manner similar to the windshield system described above. Again, an alternative solution is to observe a glare reflection on the face of the driver and remove the glare with a filter.

Note, the rearview mirror is also an appropriate place to display icons of the contents of the blind spot or other areas surrounding the vehicle as disclosed in U.S. patent application Ser. No. 09/851,362 filed May 8, 2001.

5.3 Visor for Glare Control and HUD

Figure 30:
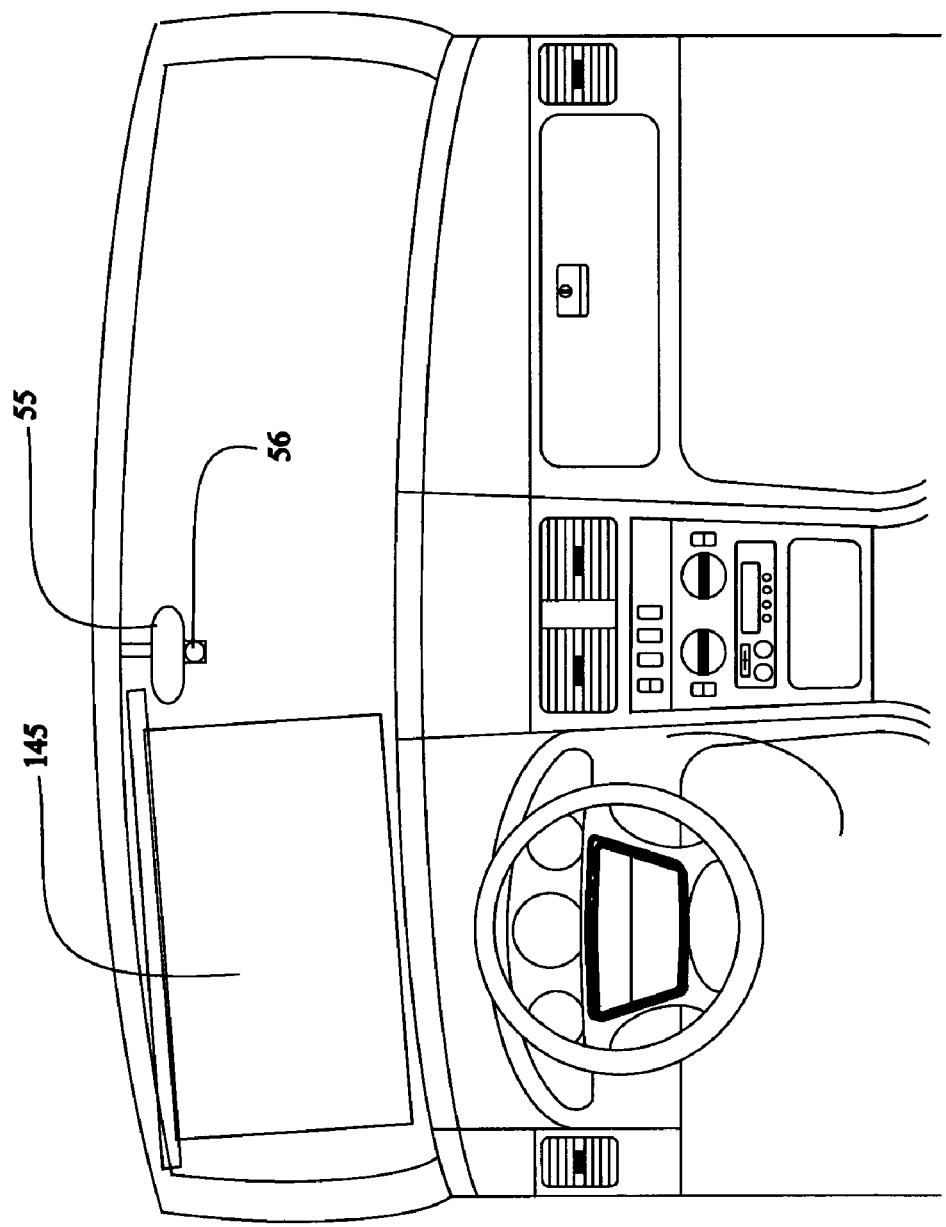
FIG. 30 illustrates the interior of a passenger compartment with a rear view mirror, a camera for viewing the eyes of the driver and a large generally transparent visor for glare filtering.

FIG. 30 illustrates the interior of a passenger compartment with a rear view mirror assembly 55, a camera for viewing the eyes of the driver 56 and a large generally transparent sun visor 145. The sun visor 145 is normally largely transparent and is made from electrochromic glass, suspended particle glass, a liquid crystal device or equivalent. The camera 56 images the eyes of the driver and looks for a reflection indicating that glare is impinging on the driver's eyes. The camera system may have a source of infrared or other frequency illumination that would be momentarily activated to aid in locating the driver's eyes. Once the eyes have been located, the camera monitors the area around the eyes, or direct reflections from the eyes themselves, for an indication of glare. The camera system in this case would not know the direction from which the glare is originating; it would only know that the glare was present. The glare blocker system then can darken selected portions of the visor to attempt to block the source of glare and would use the observation of the glare from or around the eyes of the driver as feedback information. When the glare has been eliminated, the system maintains the filter, perhaps momentarily reducing it from time to time to see that the source of glare has not stopped.

If the filter is electrochromic glass, a significant time period is required to activate the glare filter and therefore a trial and error search for the ideal filter location could be too slow. In this case, a non-recurring spatial pattern can be placed in the visor such that when light passes through the visor and illuminates the face of the driver, the location where the filter should be placed can be easily determined. That is, the pattern reflection off of the face of the driver would indicate the location of the visor through which the light causing the glare was passing. Such a structured light system can also be used for the SPD and LCD filters but since they act significantly more rapidly, it would serve only to simplify the search algorithm for filter placement.

A second photo sensor 135 can also be used pointing through the windshield to determine only that glare was present. In this manner, when the source of the glare disappears, the filter can be turned off. A more sophisticated system as described above for the windshield system whereby the direction of the light is determined using a camera-type device can also be implemented.

The visor 145 is illustrated as substantially covering the front windshield in front of the driver. This is possible since it is transparent except where the filter is applied, which would in general be a small area. A second visor, not shown, can also be used to cover the windshield for the passenger side that would also be useful when the light-causing glare on the driver's eyes enters thought the windshield in front of the passenger or if a passenger system is also desired. In some cases, it might even be advantageous to supply a similar visor to cover the side windows but in general, standard opaque visors would serve for both the passenger side windshield area and the side windows since the driver in general only needs to look through the windshield in front of him or her.

A smaller visor can also be used as long as it is provided with a positioning system or method. The visor only needs to cover the eyes of the driver. This could either be done manually or by electric motors similar to the system disclosed in U.S. Pat. No. 4,874,938. If electric motors are used, then the adjustment system would first have to move the visor so that it covered the driver's eyes and then provide the filter. This could be annoying if the vehicle is heading into the sun and turning and/or going up and down hills. In any case, the visor should be movable to cover any portion of the windshield where glare can get through, unlike conventional visors that only cover the top half of the windshield. The visor also does not need to be close to the windshield and the closer that it is to the driver, the smaller and thus the less expensive it can be.

As with the windshield, the visor of at least one of the inventions disclosed herein can also serve as a display using plastic electronics as described above either with or without the SPD or other filter material. Additionally, visor-like displays can now be placed at many locations in the vehicle for the display of Internet web pages, movies, games etc. Occupants of the rear seat, for example, can pull down such displays from the ceiling, up from the front seatbacks or out from the B-pillars or other convenient locations.

A key advantage of the systems disclosed herein is the ability to handle multiple sources of glare in contrast to the system of U.S. Pat. No. 4,874,938, which requires that the multiple sources must be close together.

6. Weight Measurement and Biometrics

One way to determine motion of the occupant(s) is to monitor the weight distribution of the occupant whereby changes in weight distribution after an accident would be highly suggestive of movement of the occupant. A system for determining the weight distribution of the occupants can be integrated or otherwise arranged in the seats 3 and 4 of the vehicle and several patents and publications describe such systems.

More generally, any sensor that determines the presence and health state of an occupant can also be integrated into the vehicle interior monitoring system in accordance with the inventions herein. For example, a sensitive motion sensor can determine whether an occupant is breathing and a chemical sensor, such as accomplished using SAW technology, can determine the amount of carbon dioxide, or the concentration of carbon dioxide, in the air in the vehicle, which can be correlated to the health state of the occupant(s). The motion sensor and chemical sensor can be designed to have a fixed operational field situated near the occupant. In the alternative, the motion sensor and chemical sensor can be adjustable and adapted to adjust their operational field in conjunction with a determination by an occupant position and location sensor that would determine the location of specific parts of the occupant's body such as his or her chest or mouth. Furthermore, an occupant position and location sensor can be used to determine the location of the occupant's eyes and determine whether the occupant is conscious, that is, whether his or her eyes are open or closed or moving.

Chemical sensors can also be used to detect whether there is blood present in the vehicle such as after an accident. Additionally, microphones can detect whether there is noise in the vehicle caused by groaning, yelling, etc., and transmit any such noise through the cellular or similar connection to a remote listening facility using a telematics communication system such as operated by OnStar™.

FIG. 2A shows a schematic diagram of an embodiment of the invention including a system for determining the presence and health state of any occupants of the vehicle and a telecommunications link. This embodiment includes means 150 for determining the presence of any occupants 151, which may take the form of a heartbeat sensor, chemical sensor or motion sensor as described above and means for determining the health state of any occupants 151. The latter means may be integrated into the means for determining the presence of any occupants using the same or different component. The presence determining means 150 may encompass a dedicated presence determination device associated with each seating location in the vehicle, or at least sufficient presence determination devices having the ability to determine the presence of an occupant at each seating location in the vehicle. Further, means for determining the location, and optionally velocity, of the occupants or one or more parts thereof 152 are provided and may be any conventional occupant position sensor or preferably, one of the occupant position sensors as described herein such as those utilizing waves such as electromagnetic radiation or fields such as capacitance sensors or as described in the current assignee's patents and patent applications referenced above as well as herein.

A processor 153 is coupled to the presence determining means 150, the health state determining means 151 and the location determining means 152. A communications unit 154 is coupled to the processor 153. The processor 153 and/or communications unit 154 can also be coupled to microphones 158 that can be distributed throughout the vehicle passenger compartment and include voice-processing circuitry to enable the occupant(s) to effect vocal control of the processor 153, communications unit 154 or any coupled component or oral communications via the communications unit 154. The processor 153 is also coupled to another vehicular system, component or subsystem 155 and can issue control commands to effect adjustment of the operating conditions of the system, component or subsystem. Such a system, component or subsystem can be the heating or air-conditioning system, the entertainment system, an occupant restraint device such as an airbag, a glare prevention system, etc. Also, a positioning system 156, such as a GPS or differential GPS system, could be coupled to the processor 153 and provides an indication of the absolute position of the vehicle.

Pressure or weight sensors 7, 76 and 97 are also included in the system shown in FIGS. 6 and 6A. Although strain gage-type sensors are schematically illustrated mounted to the supporting structure of the seat portion 4, and a bladder pressure sensor mounted in the seat portion 4, any other type of pressure or weight sensor can be used including mat or butt spring sensors. Strain gage sensors are described in detail in U.S. Pat. No. 6,242,701 as well as herein. Weight can be used to confirm the occupancy of the seat, i.e., the presence or absence of an occupant as well as whether the seat is occupied by a light or heavy object. In the latter case, a measured weight of less than 60 pounds is often determinative of the presence of a child seat whereas a measured weight of greater than 60 pounds is often indicative of the absence of a child seat. The weight sensors 7 can also be used to determine the weight distribution of the occupant of the seat and thereby ascertain whether the occupant is moving and the position of the occupant. As such, the weight sensors 7 could be used to confirm the position and motion of the occupant. The measured pressure or weight or distribution thereof can also be used in combination with the data from the transmitter/receiver assemblies 49, 50, 51, 52 and 54 of FIG. 8C to provide an identification of the occupants in the seat.

As discussed below, weight can be measured both statically and dynamically. Static weight measurements require that the pressure or strain gage system be accurately calibrated and care must be taken to compensate for the effects of seatbelt load, aging, unwanted stresses in the mounting structures, temperature etc. Dynamic measurements, on the other hand, can be used to measure the mass of an object on the seat, the presence of a seatbelt load and can be made insensitive to unwanted static stresses in the supporting members and to aging of the seat and its structure. In the simplest implementation, the natural frequency of seat is determined due to the random vibrations or accelerations that are input to the seat from the vehicle suspension system. In more sophisticated embodiments, an accelerometer and/or seatbelt tension sensor is also used to more accurately determine the forces acting on the occupant. In another embodiment, a vibrator can be used in conjunction with the seat to excite the seat occupying item either on a total basis or on a local basis using PVDF film as an exciter and a determination of the contact pattern of the occupant with the seat determined by the local response to the PVDF film. This latter method using the PVDF film or equivalent is closer to a pattern determination rather than a true weight measurement.

Although many weight sensing systems are described herein, at least one of the inventions disclosed herein is, among other things, directed to the use of weight in any manner to determine the occupancy of a vehicle. Prior art mat sensors determined the occupancy through the butt print of the occupying item rather than actually measuring its weight. In an even more general sense, at least one of the inventions disclosed herein is the use of any biometric measurement to determine vehicle occupancy.

As to the latter issue, when an occupant or object is strapped into the seat using a seatbelt, it can cause an artificial load on a bladder-type weight sensor and/or strain gage-type weight sensors when the seatbelt anchorage points are not on the seat. The effects of seatbelt load can be separated from the effects of object or occupant weight, as disclosed in U.S. Pat. No. 6,242,701, if the time-varying signals are considered rather than merely using averaging to obtain the static load. If a vehicle-mounted vertical accelerometer is present, then the forcing function on the seat caused by road roughness, steering maneuvers, and the vehicle suspension system can be compared with the response of the seat as measured by the bladder or strain gage pressure or weight sensors. Through mathematical analysis, the magnitude of the bladder pressure or strain caused by seat belt loads can be separated from pressure and strain caused by occupant or object mass. Also, since animated objects such as people cannot sit still indefinitely, such occupants can be distinguished from inanimate objects by similarly observing the change in pressure and strain distribution over time.

A serious problem that has plagued researchers attempting to adapt strain gage technology to seat weight sensing arises from fact that a typical automobile seat is an over-determined structure containing indeterminate stresses and strains in the supporting structure. This arises from a variety of causes such as the connection between the seat structure and the slide mechanisms below the seat or between the slide mechanisms and the floor which induces twisting and bending moments in the seat structural members. Similarly, since most seats have four attachment points and since only three points are necessary to determine a plane, there can be an unexpected distribution of compression and tensile stresses in the support structure. To complicate the situation, these indeterminable stresses and strains can vary as a function of seat position and temperature. The combination of all of these effects produces a significant error in the calculation of the weight of an occupying item and the distribution of this weight.

This problem can be solved by looking at changes in pressure and strain readings in addition to the absolute values. The dynamic response of an occupied seat is a function of the mass of the occupying item. As the car travels down the road, a forcing function is provided to the seat which can be measured by the vertical acceleration component and other acceleration components. This provides a method of measuring the response of the seat as well as the forcing function and thereby determining the mass of occupying item.

For example, when an occupant first enters the vehicle and sits on a seat, the change in pressure and/or strain measurements will provide an accurate measurement of the occupant's weight. This accuracy deteriorates as soon as the occupant attaches a seatbelt and/or moves the seat to a new position. Nevertheless, the change in occupancy of the seat is a significant event that can be easily detected and if the change in pressure and strain measurements are used as the measurement of the occupant weight, then the weight can be accurately determined. Similarly, the sequence of events for attaching a child seat to a vehicle is one that can be easily discerned since the seat is first placed into the vehicle and the seat belt cinched followed by placing the child in the seat or, alternately, the child and seat are placed in the vehicle followed by a cinching of the seatbelt. Either of these event sequences gives a high probability of the occupancy being a child in a child seat. This decision can be confirmed by dynamical measurements as described in U.S. patent application Ser. No. 10/940,881, incorporated by reference herein.

6.1 Combined Spatial and Weight

A novel occupant position sensor for a vehicle, for determining the position of the occupant, comprises a weight sensor for determining the weight of an occupant of a seat and processor means for receiving the determined weight of the occupant from the weight sensor and determining the position of the occupant based at least in part on the determined weight of the occupant. The position of the occupant could also be determined based in part on waves received from the space above the seat, data from seat position sensors, reclining angle sensors, etc.

Although spatial sensors such as ultrasonic, electric field and optical occupant sensors can accurately identify and determine the location of an occupying item in the vehicle, a determination of the mass of the item is less accurate as it can be fooled in some cases by a thick but light winter coat, for example. Therefore, it is desirable, when the economics permit, to provide a combined system that includes both weight and spatial sensors. Such a system permits a fine tuning of the deployment time and the amount of gas in the airbag to match the position and the mass of the occupant. If this is coupled with a smart crash severity sensor, then a true smart airbag system can result, as disclosed in the current assignee's U.S. Pat. No. 6,532,408.

As disclosed in several of the current assignee's patents, referenced herein and others, the combination of a reduced number of transducers including weight and spatial can result from a pruning process starting from a larger number of sensors. For example, such a process can begin with four load cells and four ultrasonic sensors and after a pruning process, a system containing two ultrasonic sensors and one load cell can result. At least one of the inventions disclosed herein is therefore not limited to any particular number or combination of sensors and the optimum choice for a particular vehicle will depend on many factors including the specifications of the vehicle manufacturer, cost, accuracy desired, availability of mounting locations and the chosen technologies.

6.2 Face Recognition

A neural network, or other pattern recognition system, can be trained to recognize certain people as permitted operators of a vehicle or for granting access to a cargo container or truck trailer. In this case, if a non-recognized person attempts to operate the vehicle or to gain access, the system can disable the vehicle and/or sound an alarm or send a message to a remote site via telematics. Since it is unlikely that an unauthorized operator will resemble the authorized operator, the neural network system can be quite tolerant of differences in appearance of the operator. The system defaults to where a key or other identification system must be used in the case that the system doesn't recognize the operator or the owner wishes to allow another person to operate the vehicle or have access to the container. The transducers used to identify the operator can be any of the types described in detail above. A preferred method is to use optical imager-based transducers perhaps in conjunction with a weight sensor for automotive applications. This is necessary due to the small size of the features that need to be recognized for a high accuracy of recognition. An alternate system uses an infrared laser, which can be modulated to provide three-dimensional measurements, to irradiate or illuminate the operator and a CCD or CMOS device to receive the reflected image. In this case, the recognition of the operator is accomplished using a pattern recognition system such as described in Popesco, V. and Vincent, J. M. "Location of Facial Features Using a Boltzmann Machine to Implement Geometric Constraints", Chapter 14 of Lisboa, P. J. G. and Taylor, M. J. Editors, *Techniques and Applications of Neural Networks*, Ellis Horwood Publishers, New York, 1993. In the present case, a larger CCD element array containing 50,000 or more elements would typically be used instead of the 16 by 16 or 256 element CCD array used by Popesco and Vincent.

FIG. 22 shows a schematic illustration of a system for controlling operation of a vehicle based on recognition of an authorized individual in accordance with the invention. A similar system can be designed for allowing access to a truck trailer, cargo container or railroad car, for example. One or more images of the passenger compartment 260 are received at 261 and data derived therefrom at 262. Multiple image receivers may be provided at different locations. The data derivation may entail any one or more of numerous types of image processing techniques such as those described in the current assignee's U.S. Pat. No. 6,397,136 including those designed to improve the clarity of the image. A pattern recognition algorithm, e.g., a neural network, is trained in a training phase 263 to recognize authorized individuals. The training phase can be conducted upon purchase of the vehicle by the dealer or by the owner after performing certain procedures provided to the owner, e.g., entry of a security code or key or at another appropriate time and place. In the training phase for a theft prevention system, the authorized operator(s) would sit themselves in the passenger seat and optical images would be taken and processed to obtain the pattern recognition algorithm. Alternately, the training can be done away from the vehicle which would be more appropriate for cargo containers and the like.

A processor 264 is embodied with the pattern recognition algorithm thus trained to identify whether a person is the authorized individual by analysis of subsequently obtained data derived from optical images 262. The pattern recognition algorithm in processor 264 outputs an indication of whether the person in the image is an authorized individual for which the system is trained to identify. A security system 265 enables operations of the vehicle when the pattern recognition algorithm provides an indication that the person is an individual authorized to operate the vehicle and prevents operation of the vehicle when the pattern recognition algorithm does not provide an indication that the person is an individual authorized to operate the vehicle.

In some cases, the recognition system can be substantially improved if different parts of the electromagnetic spectrum are used. As taught in the book *Alien Vision* referenced above, distinctive facial markings are evident when viewed under near UV or MWIR illumination that can be used to positively identify a person. Other biometric measures can be used with, or in place of, a facial or iris image to further improve the recognition accuracy such as voice recognition (voice-print), finger or hand prints, weight, height, arm length, hand size etc.

Instead of a security system, another component in the vehicle can be affected or controlled based on the recognition of a particular individual. For example, the rear view mirror, seat, seat belt anchorage point, headrest, pedals, steering wheel, entertainment system, air-conditioning/ventilation system can be adjusted. Additionally, the door can be unlocked upon approach of an authorized person.

Figure 23:
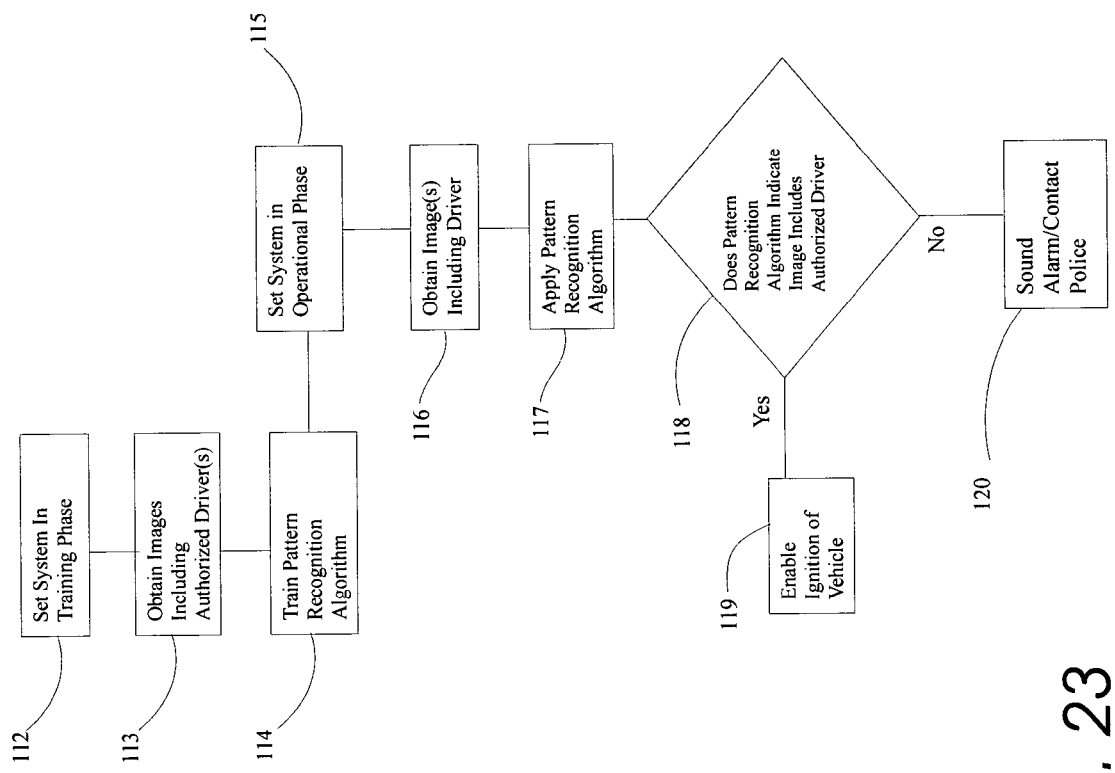
FIG. 23 is a schematic illustration of a method for controlling operation of a vehicle based on recognition of an individual.

FIG. 23 is a schematic illustration of a method for controlling operation of a vehicle based on recognition of a person as one of a set of authorized individuals. Although the method is described and shown for permitting or preventing ignition of the vehicle based on recognition of an authorized driver, it can be used to control for any vehicle component, system or subsystem based on recognition of an individual.

Initially, the system is set in a training phase 266 in which images, and other biometric measures, including the authorized individuals are obtained by means of at least one optical receiving unit 267 and a pattern recognition algorithm is trained based thereon 268, usually after application of one or more image processing techniques to the images. The authorized individual(s) occupy the passenger compartment, or some other appropriate location, and have their picture taken by the optical receiving unit to enable the formation of a database on which the pattern recognition algorithm is trained. Training can be performed by any known method in the art, although combination neural networks are preferred.

The system is then set in an operational phase 269 wherein an image is operatively obtained 270, including the driver when the system is used for a security system. If the system is used for component adjustment, then the image would include any passengers or other occupying items in the vehicle. The obtained image, or images if multiple optical receiving units are used, plus other biometric information, are input into the pattern recognition algorithm 271, preferably after some image processing, and a determination is made whether the pattern recognition algorithm indicates that the image includes an authorized driver 272. If so, ignition, or some other system, of the vehicle is enabled 273, or the vehicle may actually be started automatically. If not, an alarm is sounded and/or the police or other remote site may be contacted 274.

Once an optic-based system is present in a vehicle, other options can be enabled such as eye-tracking as a data input device or to detect drowsiness, as discussed above, and even lip reading as a data input device or to augment voice input. This is discussed, for example, Eisenberg, Anne, "Beyond Voice Recognition to a Computer That Reads Lips", New York Times, Sep. 11, 2003. Lip reading can be implemented in a vehicle through the use of IR illumination and training of a pattern recognition algorithm, such as a neural network or a combination network. This is one example of where an adaptive neural or combination network can be employed that learns as it gains experience with a particular driver. The word "radio", for example, can be associated with lip motions when the vehicle is stopped or moving slowly and then at a later time when the vehicle is traveling at high speed with considerable wind noise, the voice might be difficult for the system to understand. When augmented with lip reading, the word "radio" can be more accurately recognized. Thus, the combination of lip reading and voice recognition can work together to significantly improve accuracy.

Face recognition can of course be done in two or three dimensions and can involve the creation of a model of the person's head that can aid when illumination is poor, for example. Three dimensions are available if multiple two dimensional images are acquired as the occupant moves his or her head or through the use of a three-dimensional camera. A three-dimensional camera generally has two spaced-apart lenses plus software to combine the two views. Normally, the lenses are relatively close together but this may not need to be the case and significantly more information can be acquired if the lenses are spaced further apart and in some cases, even such that one camera has a frontal view and the other a side view, for example. Naturally, the software is complicated for such cases but the system becomes more robust and less likely to be blocked by a newspaper, for example. A scanning laser radar, PMD or similar system with a modulated beam or with range gating as described above can also be used to obtain three-dimensional information or a 3D image.

Eye tracking as disclosed in Jacob, "Eye Tracking in Advanced Interface Design", Robert J. K. Jacob, Human-Computer Interaction Lab, Naval Research Laboratory, Washington, D.C., can be used by vehicle operator to control various vehicle components such as the turn signal, lights, radio, air conditioning, telephone, Internet interactive commands, etc. much as described in U.S. patent application Ser. No. 09/645,709. The display used for the eye tracker can be a heads-up display reflected from the windshield or it can be a plastic electronics display located either in the visor or the windshield.

The eye tracker works most effectively in dim light where the driver's eyes are sufficiently open that the cornea and retina are clearly distinguishable. The direction of operator's gaze is determined by calculation of the center of pupil and the center of the iris that are found by illuminating the eye with infrared radiation. FIG. 8E illustrates a suitable arrangement for illuminating eye along the same axis as the pupil camera. The location of occupant's eyes must be first determined as described elsewhere herein before eye tracking can be implemented. In FIG. 8E, imager system 52, 54, or 56 are candidate locations for eye tracker hardware.

The technique is to shine a collimated beam of infrared light on to be operator's eyeball producing a bright corneal reflection can be bright pupil reflection. Imaging software analyzes the image to identify the large bright circle that is the pupil and a still brighter dot which is the corneal reflection and computes the center of each of these objects. The line of the gaze is determined by connecting the centers of these two reflections.

It is usually necessary only to track a single eye as both eyes tend to look at the same object. In fact, by checking that both eyes are looking at the same object, many errors caused by the occupant looking through the display onto the road or surrounding environment can be eliminated.

Object selection with a mouse or mouse pad, as disclosed in the '709 application cross-referenced above is accomplished by pointing at the object and depressing a button. Using eye tracking, an additional technique is available based on the length of time the operator gazes at the object. In the implementations herein, both techniques are available. In the simulated mouse case, the operator gazes at an object, such as the air conditioning control, and depresses a button on the steering wheel, for example, to select the object. Alternately, the operator merely gazes at the object for perhaps one-half second and the object is automatically selected. Both techniques can be implemented simultaneously allowing the operator to freely choose between them. The dwell time can be selectable by the operator as an additional option. Typically, the dwell times will range from about 0.1 seconds to about 1 second.

The problem of finding the eyes and tracking the head of the driver, for example, is handled in Smeraldi, F., Carmona, J. B., "Saccadic search with Garbor features applied to eye detection and real-time head tracking", Image and Vision Computing 18 (2000) 323–329, Elsevier Science B.V. The Saccadic system described is a very efficient method of locating the most distinctive part of a persons face, the eyes, and in addition to finding the eyes, a modification of the system can be used to recognize the driver. The system makes use of the motion of the subject's head to locate the head prior to doing a search for the eyes using a modified Garbor decomposition method. By comparing two consecutive frames, the head can usually be located if it is in the field of view of the camera. Although this is the preferred method, other eye location and tracking methods can also be used as reported in the literature and familiar to those skilled in the art.

6.3 Heartbeat and Health State

In addition to the use of transducers to determine the presence and location of occupants in a vehicle, other sensors can also be used. For example, as discussed above, a heartbeat sensor, which determines the number and presence of heartbeats, can also be arranged in the vehicle. Heartbeat sensors can be adapted to differentiate between a heartbeat of an adult, a heartbeat of a child and a heartbeat of an animal. As its name implies, a heartbeat sensor detects a heartbeat, and the magnitude thereof, of a human occupant of the seat or other position, if such a human occupant is present. The output of the heartbeat sensor is input to the processor of the interior monitoring system. One heartbeat sensor for use in the invention may be of the types as disclosed in McEwan in U.S. Pat. No. 5,573,012 and U.S. Pat. No. 5,766,208. The heartbeat sensor can be positioned at any convenient position relative to the seats or other appropriate location where occupancy is being monitored. A preferred automotive location is within the vehicle seatback.

This type of micropower impulse radar (MIR) sensor is not believed to have been used in an interior monitoring system in the past. It can be used to determine the motion of an occupant and thus can determine his or her heartbeat (as evidenced by motion of the chest), for example. Such an MIR sensor can also be arranged to detect motion in a particular area in which the occupant's chest would most likely be situated or could be coupled to an arrangement which determines the location of the occupant's chest and then adjusts the operational field of the MIR sensor based on the determined location of the occupant's chest. A motion sensor utilizing a micro-power impulse radar (MIR) system as disclosed, for example, in McEwan U.S. Pat. No. 5,361,070, as well as many other patents by the same inventor. Motion sensing is accomplished by monitoring a particular range from the sensor as disclosed in that patent. MIR is one form of radar that has applicability to occupant sensing and can be mounted at various locations in the vehicle. Other forms include, among others, ultra wideband (UWB) by the Time Domain Corporation and noise radar (NR) by Professor Konstantin Lukin of the National Academy of Sciences of Ukraine Institute of Radiophysics and Electronics. Radar has an advantage over ultrasonic sensors in that data can be acquired at a higher speed and thus the motion of an occupant can be more easily tracked. The ability to obtain returns over the entire occupancy range is somewhat more difficult than with ultrasound resulting in a more expensive system overall. MIR, UWB or NR have additional advantages in their lack of sensitivity to temperature variation and have a comparable resolution to about 40 kHz ultrasound. Resolution comparable to higher frequency is of course possible using millimeter waves, for example. Additionally, multiple MIR, UWB or NR sensors can be used when high-speed tracking of the motion of an occupant during a crash is required since they can be individually pulsed without interfering with each other through frequency, time or code division multiplexing or other multiplexing schemes.

Other methods have been reported for measuring heartbeat including vibrations introduced into a vehicle and variations in the electric field in the vicinity of where an occupant might reside. All such methods are considered encompassed by the teachings of at least one of the inventions disclosed herein. The detection of a heartbeat regardless of how it is accomplished is indicative of the presence of a living being within the vehicle and such a detection as part of an occupant presence detection system is novel to at least one of the inventions disclosed herein. Similarly, any motion of an object that is not induced by the motion of the vehicle itself is indicative of the presence of a living being and thus part of the teachings herein. The sensing of occupant motion regardless of how it is accomplished when used in a system to affect another vehicle system is contemplated herein.

6.4 Other Inputs

Information can be provided as to the location of the driver, or other vehicle occupant, relative to an airbag, to appropriate circuitry which will process this information and make a decision as to whether to prevent deployment of the airbag in a situation where it would otherwise be deployed, or otherwise affect the time of deployment, rate of inflation, rate of deflation etc. One method of determining the position of the driver as discussed above is to actually measure his or her position either using electric fields, radar, optics or acoustics. An alternate approach, which is preferably used to confirm the measurements made by the systems described above, is to use information about the position of the seat and the seatbelt spool out to determine the likely location of the driver relative to the airbag. To accomplish this, the length of belt material which has been pulled out of the seatbelt retractor can be measured using conventional shaft encoder technology using either magnetic or optical systems. An example of an optical encoder is illustrated generally as 37 in FIG. 14. It consists of an encoder disk 38 and a receptor 39 which sends a signal to appropriate circuitry every time a line on the encoder disk 38 passes by the receptor 39.

Figure 15:
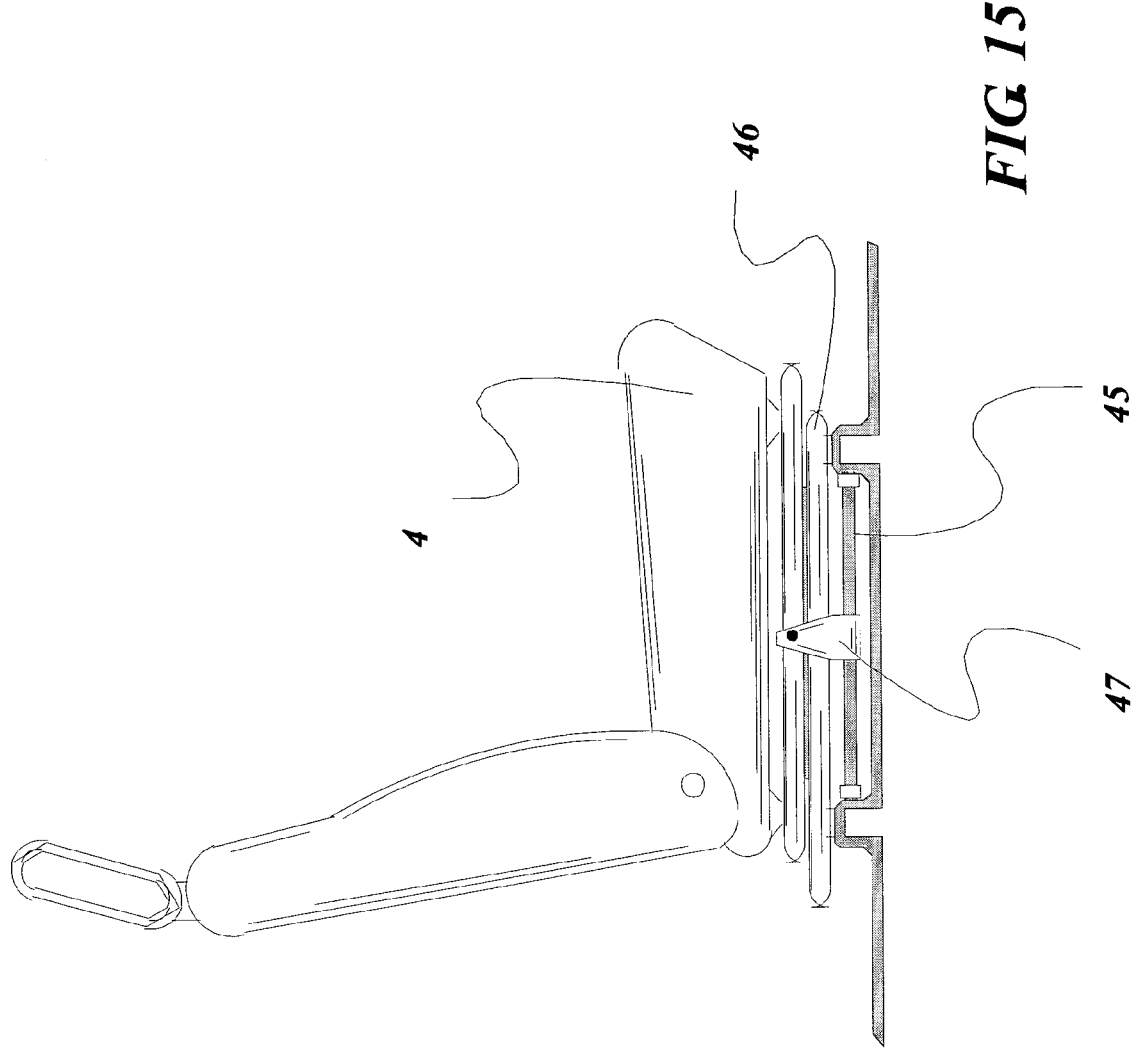
FIG. 15 is a side view of a portion of a seat and seat rail showing a seat position sensor utilizing a potentiometer.
Figure 16:
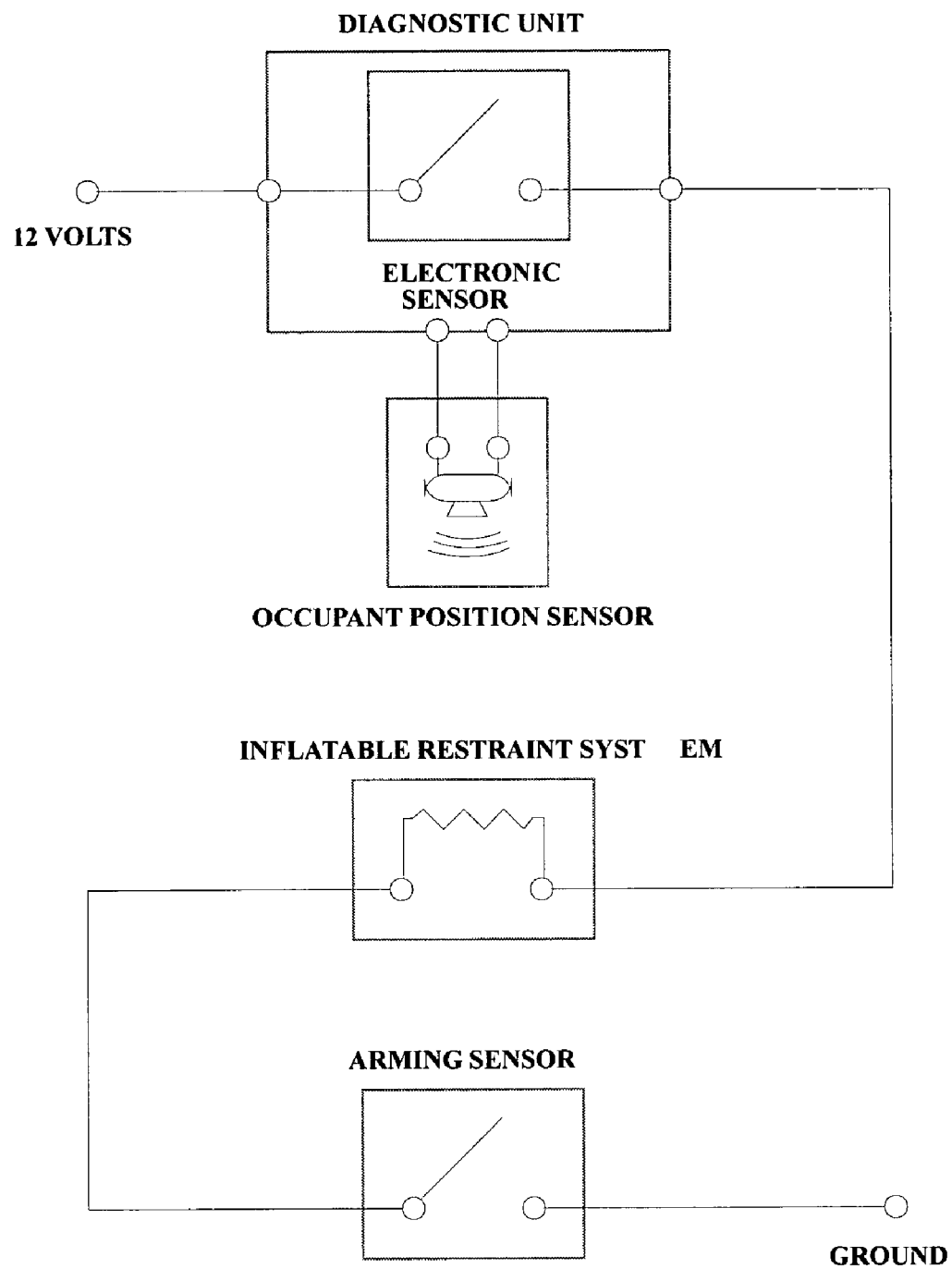
FIG. 16 is a circuit schematic illustrating the use of the occupant position sensor in conjunction with the remainder of the inflatable restraint system.

In a similar manner, the position of the seat can be determined through either a linear encoder or a potentiometer as illustrated in FIG. 15. In this case, a potentiometer 45 is positioned along the seat track 46 and a sliding brush assembly 47 can be used with appropriate circuitry to determine the fore and aft location of the seat 4. For those seats which permit the seat back angle to be adjusted, a similar measuring system would be used to determine the angle of the seat back. In this manner, the position of the seat relative to the airbag module can be determined. This information can be used in conjunction with the seatbelt spool out sensor to confirm the approximate position of the chest of the driver relative to the airbag. Of course, there are many other ways of measuring the angles and positions of the seat and its component parts.

For a simplified occupant position measuring system, a combination of seatbelt spool out sensor, seat belt buckle sensor, seat back position sensor, and seat position sensor (the "seat" in this last case meaning the seat portion) can be used either together or as a subset of such sensors to make an approximation as to the location of the driver or passenger in the vehicle. This information can be used to confirm the measurements of the electric field, ultrasonic and infrared sensors or as a stand-alone system. As a stand-alone system, it will not be as accurate as systems using ultrasonics or electromagnetics. Since a significant number of fatalities involve occupants who are not wearing seatbelts, and since accidents frequently involved significant pre-crash maneuvers and breaking that can cause at least the vehicle passenger to be thrown out of position, this system has serious failure modes. Nevertheless, sensors that measure seat position, for example, are available now and this system permits immediate introduction of a crude occupant position sensing system immediately and therefore it has great value. One such simple system, employs a seat position sensor only. For the driver, for example, if the seat is in the forwardmost position, then it makes no sense to deploy the driver airbag at full power. Instead, either a depowered deployment or no deployment would be called for in many crash situations.

For most cases, the seatbelt spool out sensor would be sufficient to give a good confirming indication of the position of the occupant's chest regardless of the position of the seat and seat back. This is because the seatbelt is usually attached to the vehicle at least at one end. In some cases, especially where the seat back angle can be adjusted, separate retractors can be used for the lap and shoulder portions of the seatbelt and the belt would not be permitted to slip through the "D-ring". The length of belt spooled out from the shoulder belt retractor then becomes a very good confirming measure of the position of the occupant's chest.

7. Illumination 7.1 Infrared Light

Many forms illumination can of course be used as discussed herein. Near infrared is a preferred source since it can be produced relatively inexpensively with LEDs and is not seen by vehicle occupants or others outside of the vehicle. The use of spatially modulated (as in structured light) and temporally modulated (as in amplitude, frequency, pulse, code, random or other such methods) permits additional information to be obtained such as a three-dimensional image as first disclosed by the current assignee in earlier patents. Infrared is also interesting since the human body naturally emits IR and this fact can be used to positively identify that there is a human occupying a vehicle seat and to determine fairly accurately the size of the occupant. This technique only works when the ambient temperature is different from body temperature, which is most of the time. In some climates, it is possible that the interior temperature of a vehicle can reach or exceed 100 degrees F., but it is unlikely to stay at that temperature for long as humans find such a temperature uncomfortable. However, it is even more unlikely that such a temperature will exist except when there is significant natural illumination in the visible part of the spectrum. Thus, a visual size determination is possible especially since it is very unlikely that such an occupant will be wearing heavy or thick clothing. Passive infrared, used of course with an imaging system, is thus a viable technique for the identification of a human occupant if used in conjunction with an optical system for high temperature situations. Even if the ambient temperature is nearly the same as body temperature, there will still be contrasts in the image which are sufficient to differentiate an occupant or his or her face from the background. Whereas a single pixel sensor, as in the prior art patents to Colorado and Mattes referenced above, could give false results, an imaging system such as a focal plane array as disclosed herein can still operate effectively.

Passive IR is also a good method of finding the eyes and other features of the occupant since hair, some hats and other obscuring items frequently do not interfere with the transmission of IR. When active IR illumination is used, the eyes are particularly easy to find due to corneal reflection and the eyes will be dilated at night when finding the eyes is most important. Even in glare situations, where the glare is coming through the windshield, passive IR is particularly useful since glass blocks most IR with wavelengths beyond 1.1 microns and thus the glare will not interfere with the imaging of the face.

Particular frequencies of active IR are especially useful for external monitoring. Except for monitoring objects close to the vehicle, most radar systems have a significant divergence angle making imaging more that a few meters from the vehicle problematic. Thus there is typically not enough information from a scene say 100 meters away to permit the monitor to obtain an image that would permit classification of sensed objects. Using radar, it is difficult to distinguish a car from a truck or a parked car at the side of the road from one on the same lane as the vehicle or from an advertising sign, for example. Normal visual imaging also will not work in bad weather situations however some frequencies of IR do penetrate fog, rain and snow sufficiently well as to permit the monitoring of the road at a significant distance and with enough resolution to permit imaging and thus classification even in the presence of rain, snow and fog.

As mentioned elsewhere herein, there are various methods of illuminating the object or occupant in the passenger compartment. A scanning point of IR can be used to overcome reflected sunlight. A structured pattern can be used to help achieve a three-dimensional representation of the vehicle contents. An image can be compared with illumination and without in an attempt to eliminate the effects on natural and uncontrollable illumination. This generally doesn't work very well since the natural illumination can overpower the IR. Thus it is usually better to develop two pattern recognition algorithms, one for IR illumination and one for natural illumination. For the natural illumination case, the entire visual and near visual spectrum can be used or some subset of it. For the case where a rolling shutter is used, the process can be speeded up substantially if one line of pixels is subtracted from the adjacent line where the illumination is turned on for every other row and off for the intervening rows. In addition to structured light, there are many other methods of obtaining a 3D image as discussed above.

7.2 Structured Light

In the applications discussed and illustrated above, the source and receiver of the electromagnetic radiation have frequently been mounted in the same package. This is not necessary and in some implementations, the illumination source will be mounted elsewhere. For example, a laser beam can be used which is directed along an axis which bisects the angle between the center of the seat volume, or other volume of interest, and two of the arrays. Such a beam may come from the A-Pillar, for example. The beam, which may be supplemental to the main illumination system, provides a point reflection from the occupying item that, in most cases, can be seen by two receivers, even if they are significantly separated from each other, making it easier to identify corresponding parts in the two images. Triangulation thereafter can precisely determination the location of the illuminated point. This point can be moved, or a pattern of points provided, to provide even more information. In another case where it is desired to track the head of the occupant, for example, several such beams can be directed at the occupant's head during pre-crash braking or even during a crash to provide the fastest information as to the location of the head of the occupant for the fastest tracking of the motion of the occupant's head. Since only a few pixels are involved, even the calculation time is minimized.

In most of the applications above, the assumption has been made that either a uniform field of light or a scanning spot of light will be provided. This need not be the case. The light that is emitted or transmitted to illuminate the object can be structured light. Structured light can take many forms starting with, for example, a rectangular or other macroscopic pattern of light and dark that can be superimposed on the light by passing it through a filter. If a similar pattern is interposed between the reflections and the camera, a sort of pseudo-interference pattern can result sometimes known as Moiré patterns. A similar effect can be achieved by polarizing transmitted light so that different parts of the object that is being illuminated are illuminated with light of different polarization. Once again, by viewing the reflections through a similarly polarized array, information can be obtained as to where the source of light came from which is illuminating a particular object. Any of the transmitter/receiver assemblies or transducers in any of the embodiments above using optics can be designed to use structured light.

Usually the source of the structured light is displaced either vertically, laterally or axially from the imager, but this need not necessarily be the case. One excellent example of the use of structured light to determine a 3D image where the source of the structured light and the imager are on the same axis is illustrated in U.S. Pat. No. 5,003,166. Here, the third dimension is obtained by measuring the degree of blur of the pattern as reflected from the object. This can be done since the focal point of the structured light is different from the camera. This is accomplished by projecting it through its own lens system and then combining the two paths through the use of a beam splitter. The use of this or any other form of structured light is within the scope of at least one of the inventions disclosed herein. There are so many methods that the details of all of them cannot be enumerated here.

One consideration when using structured light is that the source of structured light should not generally be exactly co-located with the array because in this case, the pattern projected will not change as a function of the distance between the array and the object and thus the distance between the array and the object cannot be determined, except by the out-of-focus and similar methods discussed above. Thus, it is usually necessary to provide a displacement between the array and the light source. For example, the light source can surround the array, be on top of the array or on one side of the array. The light source can also have a different virtual source, i.e., it can appear to come from behind of the array or in front of the array, a variation of the out-of-focus method discussed above.

For a laterally displaced source of structured light, the goal is to determine the direction that a particular ray of light had when it was transmitted from the source. Then, by knowing which pixels were illuminated by the reflected light ray along with the geometry of the vehicle, the distance to the point of reflection off of the object can be determined. If a particular light ray, for example, illuminates an object surface which is near to the source, then the reflection off of that surface will illuminate a pixel at a particular point on the imaging array. If the reflection of the same ray however occurs from a more distant surface, then a different pixel will be illuminated in the imaging array. In this manner, the distance from the surface of the object to the array can be determined by triangulation formulas. Similarly, if a given pixel is illuminated in the imager from a reflection of a particular ray of light from the transmitter, and knowing the direction that that ray of light was sent from the transmitter, then the distance to the object at the point of reflection can be determined. If each ray of light is individually recognizable and therefore can be correlated to the angle at which it was transmitted, a full three-dimensional image can be obtained of the object that simplifies the identification problem. This can be done with a single imager.

One particularly interesting implementation due to its low cost is to project one or more dots or other simple shapes onto the occupant from a position which is at an angle relative to the occupant such as 10 to 45 degrees from the camera location. These dots will show up as bright spots even in bright sunlight and their location on the image will permit the position of the occupant to be determined. Since the parts of the occupant are all connected with relative accuracy, the position of the occupant can now be accurately determined using only one simple camera. Additionally, the light that makes up the dots can be modulated and the distance from the dot source can then be determined if there is a receiver at the light source and appropriate circuitry such as used with a scanning range meter.

The coding of the light rays coming from the transmitter can be accomplished in many ways. One method is to polarize the light by passing the light through a filter whereby the polarization is a combination of the amount and angle of the polarization. This gives two dimensions that can therefore be used to fix the angle that the light was sent. Another method is to superimpose an analog or digital signal onto the light which could be done, for example, by using an addressable light valve, such as a liquid crystal filter, electrochromic filter, or, preferably, a garnet crystal array. Each pixel in this array would be coded such that it could be identified at the imager or other receiving device. Any of the modulation schemes could be applied such as frequency, phase, amplitude, pulse, random or code modulation.

The techniques described above can depend upon either changing the polarization or using the time, spatial or frequency domains to identify particular transmission angles with particular reflections. Spatial patterns can be imposed on the transmitted light which generally goes under the heading of structured light. The concept is that if a pattern is identifiable, then either the direction of transmitted light can be determined or, if the transmission source is co-linear with the receiver, then the pattern differentially expands or contracts relative to the field of view as it travels toward the object and then, by determining the size or focus of the received pattern, the distance to the object can be determined. In some cases, Moiré pattern techniques are utilized.

When the illumination source is not placed on the same axis as the receiving array, it is typically placed at an angle such as 45 degrees. At least two other techniques can be considered. One is to place the illumination source at 90 degrees to the imager array. In this case, only those surface elements that are closer to the receiving array than previous surfaces are illuminated. Thus, significant information can be obtained as to the profile of the object. In fact, if no object is occupying the seat, then there will be no reflections except from the seat itself. This provides a very powerful technique for determining whether the seat is occupied and where the initial surfaces of the occupying item are located. A combination of the above techniques can be used with temporally or spatially varying illumination. Taking images with the same imager but with illumination from different directions can also greatly enhance the ability to obtain three-dimensional information.

The particular radiation field of the transmitting transducer can also be important to some implementations of at least one of the inventions disclosed herein. In some techniques, the object which is occupying the seat is the only part of the vehicle which is illuminated. Extreme care is exercised in shaping the field of light such that this is true. For example, the objects are illuminated in such a way that reflections from the door panel do not occur. Ideally, if only the items which occupy the seat can be illuminated, then the problem of separating the occupant from the interior vehicle passenger compartment surfaces can be more easily accomplished. Sending illumination from both sides of the vehicle across the vehicle can accomplish this.

Figure 64:
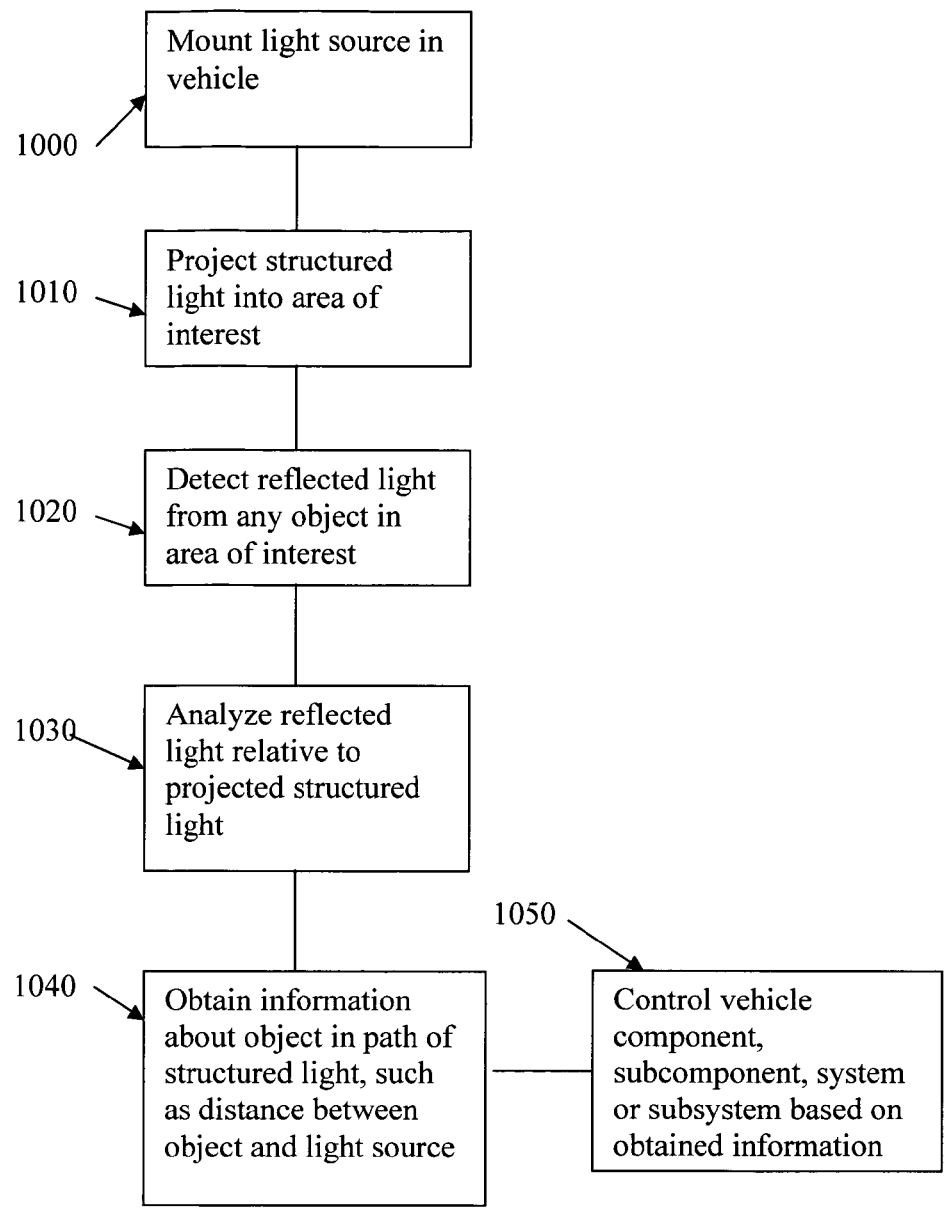
FIG. 64 is a schematic of a method in accordance with the invention using structured light.

To summarize the discussions herein about the use of structured light to obtain information about a vehicle occupant in a compartment of the vehicle, FIG. 64 shows a schematic of a method using structured light. At step 1000, a light source is mounted in the vehicle, for example, in the dashboard, instrument panel or ceiling of the vehicle. Multiple light sources can be used. At step 1010, structured light is projected into an area of interest in the compartment, the rays of light forming the structured light originating from the light source. At step 1020, light reflected from any objects in the path of the projected structured light is received by an image sensor or imager and at step 1030, the received reflected light is analyzed relative to the projected structured light, e.g., by a processor or control module or unit, to obtain information about the object(s) (step 1040). Such information can be the distance between the object and the light source, the location from which the structured light is projected, and/or the image sensor. This information is used to control one or more vehicle components, subcomponents, systems or subsystems (step 1050).

Variations to the method include imposing a pattern in the structured light, such as pattern of dots or lines, and arranging the image sensor at a different location in the vehicle than the light source such that the location from which structured light is projected is spaced apart from the image sensor. For example, the image sensor can be arranged relative to the light source such that a line between the image sensor and the area of interest is at an angle of about 20° to about 45° to a line between the location from which the structured light is projected and the area of interest. The light pattern of structured light can be varied or modified to create a virtual light source different than the light source. This may be achieved by interposing a first filter in front of the actual light source, in which case, a second filter similar to the first filter is arranged between the area of interest and the image sensor. The structured light can also be formed by polarizing the rays of light from the light source so that different parts of the area of interest are illuminated with light having different polarization, or by imposing spatial patterns on the rays of light from the light source such that the time domain is used to identify particular transmission angles with particular reflections.

Figure 65:
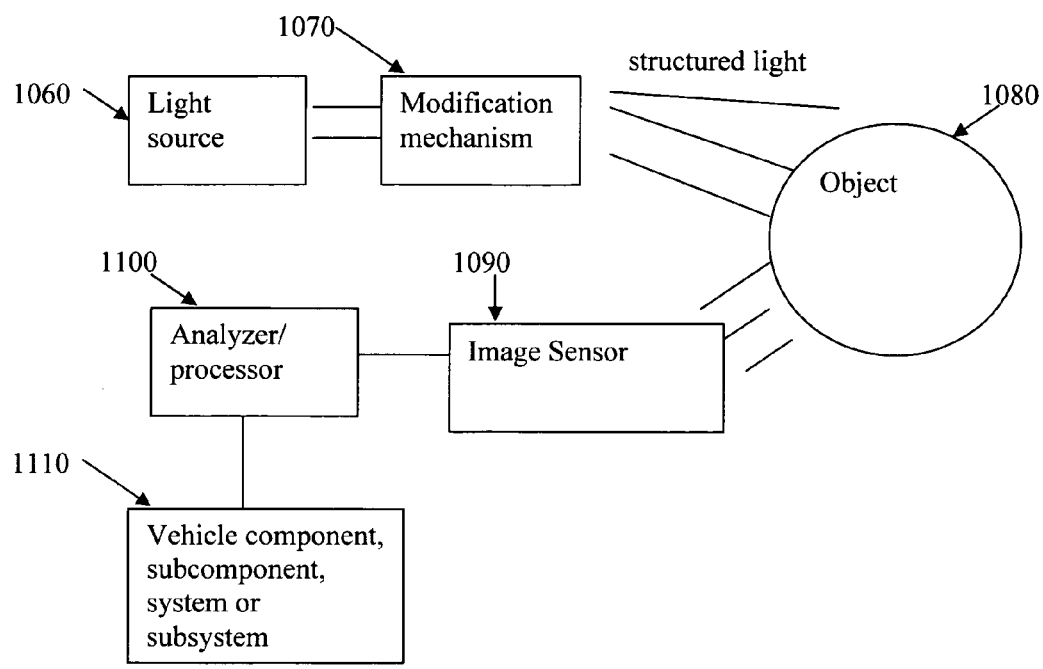
FIG. 65 is a schematic of an arrangement in accordance with the invention using structured light

FIG. 65 is a schematic of an arrangement for obtaining information about objects in a compartment of a vehicle summarizing the discussion herein. The arrangement includes a light source 1060, a modification mechanism 1070 for projecting structured light generated from the rays of light from the light source, and an image sensor 1080 which receives light reflected from the object 1070. An analyzer/processor 1090 is used to analyze the received reflected light relative to the projected structured light to obtain information about the object 1070. This information is used in the control of one or more vehicle components, subcomponents, systems or subsystems. The modification mechanism may be designed to modify rays of light generated by the light source to cause the projection of structured light into the area of interest in the compartment. A filter is one example of a modification mechanism, and if used, a similar filter is arranged between the area of interest and the image sensor.

The modification mechanism can also be a mechanism which polarizes the rays of light from the light source so that different parts of the area of interest are illuminated with light having different polarization, or which imposes spatial patterns on the rays of light from the light source such that the time domain is used to identify particular transmission angles with particular reflections.

The above discussion has concentrated on automobile occupant sensing but the teachings, with some modifications, are applicable to monitoring of other vehicles including railroad cars, truck trailers and cargo containers.

7.3 Color and Natural Light

As discussed above, the use of multispectral imaging can be a significant aid in recognizing objects inside and outside of a vehicle. Two objects may not be separable under monochromic illumination yet be quite distinguishable when observed in color or with illumination from other parts of the electromagnetic spectrum. Also, the identification of a particular individual is enhanced using near UV radiation, for example. Even low level X-rays can be useful in identifying and locating objects in a vehicle.

7.4 Radar

Particular mention should be made of the use of radar since novel inexpensive antennas and ultra wideband radars are now readily available. A scanning radar beam can be used in this implementation and the reflected signal is received by a phase array antenna to generate an image of the occupant for input into the appropriate pattern detection circuitry. Naturally, the image is not very clear due to the longer wave lengths used and the difficulty in getting a small enough radar beam. The word circuitry as used herein includes, in addition to normal electronic circuits, a microprocessor and appropriate software.

Another preferred embodiment makes use of radio waves and a voltage-controlled oscillator (VCO). In this embodiment, the frequency of the oscillator is controlled through the use of a phase detector which adjusts the oscillator frequency so that exactly one half wave occupies the distance from the transmitter to the receiver via reflection off of the occupant. The adjusted frequency is thus inversely proportional to the distance from the transmitter to the occupant. Alternately, an FM phase discriminator can be used as known to those skilled in the art. These systems could be used in any of the locations illustrated in FIG. 5 as well as in the monitoring of other vehicle types.

In FIG. 6, a motion sensor 73 is arranged to detect motion of an occupying item on the seat 4 and the output thereof is input to the neural network 65. Motion sensors can utilize a micro-power impulse radar (MIR) system as disclosed, for example, in McEwan U.S. Pat. No. 5,361,070, as well as many other patents by the same inventor. Motion sensing is accomplished by monitoring a particular range from the sensor as disclosed in that patent. MIR is one form of radar which has applicability to occupant sensing and can be mounted, for example, at locations such as designated by reference numerals 6 and 8–10 in FIG. 7. It has an advantage over ultrasonic sensors in that data can be acquired at a higher speed and thus the motion of an occupant can be more easily tracked. The ability to obtain returns over the entire occupancy range is somewhat more difficult than with ultrasound resulting in a more expensive system overall. MIR has additional advantages over ultrasound in lack of sensitivity to temperature variation and has a comparable resolution to about 40 kHz ultrasound. Resolution comparable to higher frequency is feasible but has not been demonstrated. Additionally, multiple MIR sensors can be used when high speed tracking of the motion of an occupant during a crash is required since they can be individually pulsed without interfering with each, through time division multiplexing. MIR sensors are also particularly applicable to the monitoring of other vehicles and can be configured to provide a system that requires very low power and thus is ideal for use with battery-operated systems that require a very long life.

Sensors 126, 127, 128, 129 in FIG. 27 can also be microwave or mm wave radar sensors which transmit and receive radar waves. As such, it is possible to determine the presence of an object in the rear seat and the distance between the object and the sensors. Using multiple radar sensors, it would be possible to determine the contour of an object in the rear seat and thus using pattern recognition techniques, the classification or identification of the object. Motion of objects in the rear seat can also be determined using radar sensors. For example, if the radar sensors are directed toward a particular area and/or are provided with the ability to detect motion in a predetermined frequency range, they can be used to determine the presence of children or pets left in the vehicle, i.e., by detecting heartbeats or other body motions such as movement of the chest cavity.

7.5 Frequency or Spectrum Considerations

The maximum acoustic frequency range that is practical to use for acoustic imaging in the acoustic systems herein is about 40 to 160 kilohertz (kHz). The wavelength of a 50 kHz acoustic wave is about 0.6 cm, which is too coarse to determine the fine features of a person's face, for example. It is well understood by those skilled in the art that features that are smaller than the wavelength of the irradiating radiation cannot be distinguished. Similarly, the wavelength of common radar systems varies from about 0.9 cm (for 33 GHz K band) to 133 cm (for 225 MHz P band), which is also too coarse for person identification systems. Millimeter wave and sub-millimeter wave radar can of course emit and receive waves considerably smaller. Millimeter wave radar and Micropower Impulse Radar (MIR) as discussed above are particularly useful for occupant detection and especially the motion of occupants such as motion caused by heartbeats and breathing, but still too course for feature identification. For security purposes, for example, MIR can be used to detect the presence of weapons on a person that might be approaching a vehicle such as a bus, truck or train and thus provide a warning of a potential terrorist threat. Passive IR is also useful for this purpose.

MIR is reflected by edges, joints and boundaries and through the technique of range gating, particular slices in space can be observed. Millimeter wave radar, particularly in the passive mode, can also be used to locate life forms because they naturally emit waves at particular wave lengths such as 3 mm. A passive image of such a person will also show the presence of concealed weapons as they block this radiation. Similarly, active millimeter wave radar reflects off of metallic objects but is absorbed by the water in a life form. The absorption property can be used by placing a radar receiver or reflector behind the occupant and measuring the shadow caused by the absorption. The reflective property of weapons including plastics can be used as above to detect possible terrorist threats. Finally, the use of sub-millimeter waves again using a detector or reflector on the other side of the occupant can be used not only to determine the density of the occupant but also some measure of its chemical composition as the chemical properties alter the pulse shape. Such waves are more readily absorbed by water than by plastic. From the above discussion, it can be seen that there are advantages of using different frequencies of radar for different purposes and, in some cases, a combination of frequencies is most useful. This combination occurs naturally with noise radar (NR), ultra-wideband radar (UWB) and MIR and these technologies are most appropriate for occupant detection when using electromagnetic radiation at longer wavelengths than visible light and IR.

Another variant on the invention is to use no illumination source at all. In this case, the entire visible and infrared spectrum could be used. CMOS arrays are now available with very good night vision capabilities making it possible to see and image an occupant in very low light conditions. QWIP, as discussed above, may someday become available when on-chip cooling systems using a dual stage Peltier system become cost effective or when the operating temperature of the device rises through technological innovation. For a comprehensive introduction to multispectral imaging, see Richards, Austin *Alien Vision. Exploring the Electromagnetic Spectrum with Imaging Technology*, SPIE Press, 2001.

Thus many different frequencies can be used to image a scene each having particular advantages and disadvantages. At least one of the inventions disclosed herein is not limited to using a particular frequency or part of the electromagnetic spectrum and images can advantageously be combined from different frequencies. For example, a radar image can be combined or fused with an image from the infrared or ultraviolet portions of the spectrum. Additionally, the use of a swept frequency range such as in a chirp can be advantageously used to distinguish different objects or in some cases different materials. It is well known that different materials absorb and reflect different electromagnetic waves and that this fact can be used to identify the material as in spectrographic analysis.

8. Field Sensors and Antennas

A living object such as an animal or human has a fairly high electrical permittivity (Dielectric Constant) and relatively lossy dielectric properties (Loss Tangent) absorbs a lot of energy absorption when placed in an appropriate varying electric field. This effect varies with the frequency. If a human, which is a lossy dielectric, is present in the detection field, then the dielectric absorption causes the value of the capacitance of the object to change with frequency. For a human (poor dielectric) with high dielectric losses (loss tangent), the decay with frequency will be more pronounced than objects that do not present this high loss tangency. Exploiting this phenomena, it is possible to detect the presence of an adult, child, baby or pet that is in the field of the detection circuit.

In FIG. 6, a capacitive sensor 78 is arranged to detect the presence of an occupying item on the seat 4 and the output thereof is input to the neural network 65. Capacitive sensors can be located many other places in the passenger compartment. Capacitive sensors appropriate for this function are disclosed in Kithil U.S. Pat. No. 5,602,734, U.S. Pat. No. 5,802,479 and U.S. Pat. No. 5,844,486 and U.S. Pat. No. 5,948,031 to Jinno et al. Capacitive sensors can in general be mounted at locations designated by reference numerals 6 and 8–10 in FIG. 7 or as shown in FIG. 6 or in the vehicle seat and seatback, although by their nature they can occupy considerably more space than shown in the drawings.

In FIG. 4, transducers 5, 11, 12, 13, 14 and 15 can be antennas placed in the seat and headrest such that the presence of an object, particularly a water-containing object such as a human, disturbs the near field of the antenna. This disturbance can be detected by various means such as with Micrel parts MICREF102 and MICREF104, which have a built-in antenna auto-tune circuit. Note, these parts cannot be used as is and it is necessary to redesign the chips to allow the auto-tune information to be retrieved from the chip.

Note that the bio-impedance that can be measured using the methods described above can be used to obtain a measure of the water mass, for example, of an object and thus of its weight.

9. Telematics

Some of the inventions herein relate generally to telematics and the transmission of information from a vehicle to one or more remote sites which can react to the position or status of the vehicle and/or occupant(s) therein.

Initially, sensing of the occupancy of the vehicle and the optional transmission of this information, which may include images, to remote locations will be discussed. This entails obtaining information from various sensors about the occupants in the passenger compartment of the vehicle, e.g., the number of occupants, their type and their motion, if any. Then, the concept of a low cost automatic crash notification system will be discussed. Next, a diversion into improvements in cell phones will be discussed followed by a discussion of trapped children and how telematics can help save their lives. Finally, the use of telematics with non-automotive vehicles will round out this section.

Elsewhere in section 13, the use of telematics is included with a discussion of general vehicle diagnostic methods with the diagnosis being transmittable via a communications device to the remote locations. The diagnostics section includes an extensive discussion of various sensors for use on the vehicle to sense different operating parameters and conditions of the vehicle is provided. All of the sensors discussed herein can be coupled to a communications device enabling transmission of data, signals and/or images to the remote locations, and reception of the same from the remote locations.

9.1 Transmission of Occupancy Information

The cellular phone system, or other telematics communication device, is shown schematically in FIG. 2 by box 34 and outputs to an antenna 32. The phone system or telematics communication device 34 can be coupled to the vehicle interior monitoring system in accordance with any of the embodiments disclosed herein and serves to establish a communications channel with one or more remote assistance facilities, such as an EMS facility or dispatch facility from which emergency response personnel are dispatched. The telematics system can also be a satellite-based system such as provided by Skybitz.

In the event of an accident, the electronic system associated with the telematics system interrogates the various interior monitoring system memories in processor 20 and can arrive at a count of the number of occupants in the vehicle, if each seat is monitored, and, in more sophisticated systems, even makes a determination as to whether each occupant was wearing a seatbelt and if he or she is moving after the accident, and/or the health state of one or more of the occupants as described above, for example. The telematics communication system then automatically notifies an EMS operator (such as 911, OnStar® or equivalent) and the information obtained from the interior monitoring systems is forwarded so that a determination can be made as to the number of ambulances and other equipment to send to the accident site. Vehicles having the capability of notifying EMS in the event one or more airbags deployed are now in service but are not believed to use any of the innovative interior monitoring systems described herein. Such vehicles will also have a system, such as the global positioning system, which permits the vehicle to determine its location and to forward this information to the EMS operator.

Figure 61:
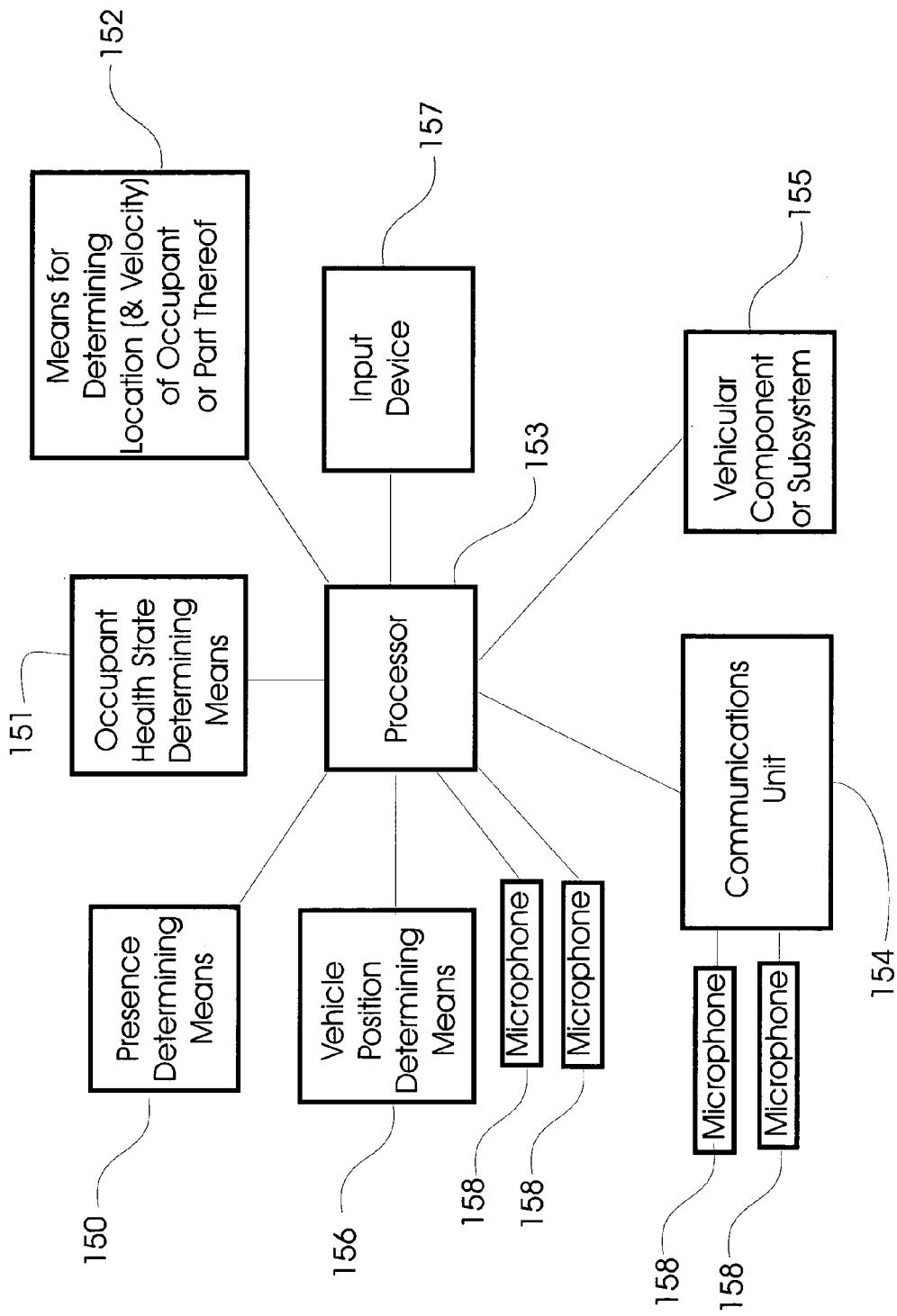
FIG. 61 is a diagram of one exemplifying embodiment of the invention.

FIG. 61 shows a schematic diagram of an embodiment of the invention including a system for determining the presence and health state of any occupants of the vehicle and a telecommunications link. This embodiment includes means for determining the presence of any occupants 150 which may take the form of a heartbeat sensor, chemical sensor and/or motion sensor as described above and means for determining the health state of any occupants 151 as discussed above. The latter means may be integrated into the means for determining the presence of any occupants, i.e., one and the same component, or separate therefrom. Further, means for determining the location, and optionally velocity, of the occupants and/or one or more parts thereof 152 are provided and may be any conventional occupant position sensor or preferably, one of the occupant position sensors as described herein (e.g., those utilizing waves, electromagnetic radiation, electric fields, bladders, strain gages etc.) or as described in the current assignee's patents and patent applications referenced above.

A processor 153 is coupled to the presence determining means 150, the health state determining means 151 and the location determining means 152. A communications unit 154 is coupled to the processor 153. The processor 153 and/or communications unit 154 can also be coupled to microphones 158 that can be distributed throughout the vehicle and include voice-processing circuitry to enable the occupant(s) to effect vocal control of the processor 153, communications unit 154 or any coupled component or oral communications via the communications unit 154. The processor 153 is also coupled to another vehicular system, component or subsystem 155 and can issue control commands to effect adjustment of the operating conditions of the system, component or subsystem. Such a system, component or subsystem can be the heating or air-conditioning system, the entertainment system, an occupant restraint device such as an airbag, a glare prevention system, etc. Also, a positioning system 156 could be coupled to the processor 153 and provides an indication of the absolute position of the vehicle, preferably using satellite-based positioning technology (e.g., a GPS receiver).

In normal use (other then after a crash), the presence determining means 150 determine whether any human occupants are present, i.e., adults or children, and the location determining means 152 determine the occupant's location. The processor 153 receives signals representative of the presence of occupants and their location and determines whether the vehicular system, component or subsystem 155 can be modified to optimize its operation for the specific arrangement of occupants. For example, if the processor 153 determines that only the front seats in the vehicle are occupied, it could control the heating system to provide heat only through vents situated to provide heat for the front-seated occupants.

The communications unit 154 performs the function of enabling establishment of a communications channel to a remote facility to receive information about the occupancy of the vehicle as determined by the presence determining means 150, occupant health state determining means 151 and/or occupant location determining means 152. The communications unit 154 thus can be designed to transmit over a sufficiently large range and at an established frequency monitored by the remote facility, which may be an EMS facility, sheriff department, or fire department. Alternately, it can communicate with a satellite system such as the Skybitz system and the information can be forwarded to the appropriate facility via the Internet or other appropriate link.

Another vehicular telematics system, component or subsystem is a navigational aid, such as a route guidance display or map. In this case, the position of the vehicle as determined by the positioning system 156 is conveyed through processor 153 to the communications unit 154 to a remote facility and a map is transmitted from this facility to the vehicle to be displayed on the route display. If directions are needed, a request for such directions can be entered into an input unit 157 associated with the processor 153 and transmitted to the facility. Data for the display map and/or vocal instructions can then be transmitted from this facility to the vehicle.

Moreover, using this embodiment, it is possible to remotely monitor the health state of the occupants in the vehicle and most importantly, the driver. The health state determining means 151 may be used to detect whether the driver's breathing is erratic or indicative of a state in which the driver is dozing off. The health state determining means 151 can also include a breath-analyzer to determine whether the driver's breath contains alcohol. In this case, the health state of the driver is relayed through the processor 153 and the communications unit 154 to the remote facility and appropriate action can be taken. For example, it would be possible to transmit a command, e.g., in the form of a signal, to the vehicle to activate an alarm or illuminate a warning light or if the vehicle is equipped with an automatic guidance system and ignition shut-off, to cause the vehicle to come to a stop on the shoulder of the roadway or elsewhere out of the traffic stream. The alarm, warning light, automatic guidance system and ignition shut-off are thus particular vehicular components or subsystems represented by 155. The vehicular component or subsystem could be activated directly by the signal from the remote facility, if they include a signal receiver, or indirectly via the communications unit 154 and processor 153.

In use after a crash, the presence determining means 150, health state determining means 151 and location determining means 152 obtain readings from the passenger compartment and direct such readings to the processor 153. The processor 153 analyzes the information and directs or controls the transmission of the information about the occupant(s) to a remote, manned facility. Such information could include the number and type of occupants, i.e., adults, children, infants, whether any of the occupants have stopped breathing or are breathing erratically, whether the occupants are conscious (as evidenced by, e.g., eye motion), whether blood is present (as detected by a chemical sensor) and whether the occupants are making sounds (as detected by a microphone). The determination of the number of occupants is obtained from the presence determining mechanism 150, i.e., the number of occupants whose presence is detected is the number of occupants in the passenger compartment. The determination of the status of the occupants, i.e., whether they are moving is performed by the health state determining mechanism 151, such as the motion sensors, heartbeat sensors, chemical sensors, etc. Moreover, the communications link through the communications unit 154 can be activated immediately after the crash to enable personnel at the remote facility to initiate communications with the vehicle.

Once an occupying item has been located in a vehicle, or any object outside of the vehicle, the identification or categorization information along with an image, including an IR or multispectral image, or icon of the object can be sent via a telematics channel to a remote location. A passing vehicle, for example, can send a picture of an accident or a system in a vehicle that has had an accident can send an image of the occupant(s) of the vehicle to aid in injury assessment by the EMS team.

Although in most if not all of the embodiments described above, it has been assumed that the transmission of images or other data from the vehicle to the EMS or other off-vehicle (remote) site is initiated by the vehicle, this may not always be the case and in some embodiments, provision is made for the off-vehicle site to initiate the acquisition and/or transmission of data including images from the vehicle. Thus, for example, once an EMS operator knows that there has been an accident, he or she can send a command to the vehicle to control components in the vehicle to cause the components send images and other data so that the situation can be monitored by the operator or other person. The capability to receive and initiate such transmissions can also be provided in an emergency vehicle such as a police car or ambulance. In this manner, for a stolen vehicle situation, the police officer, for example, can continue to monitor the interior of the stolen vehicle.

Figure 62:
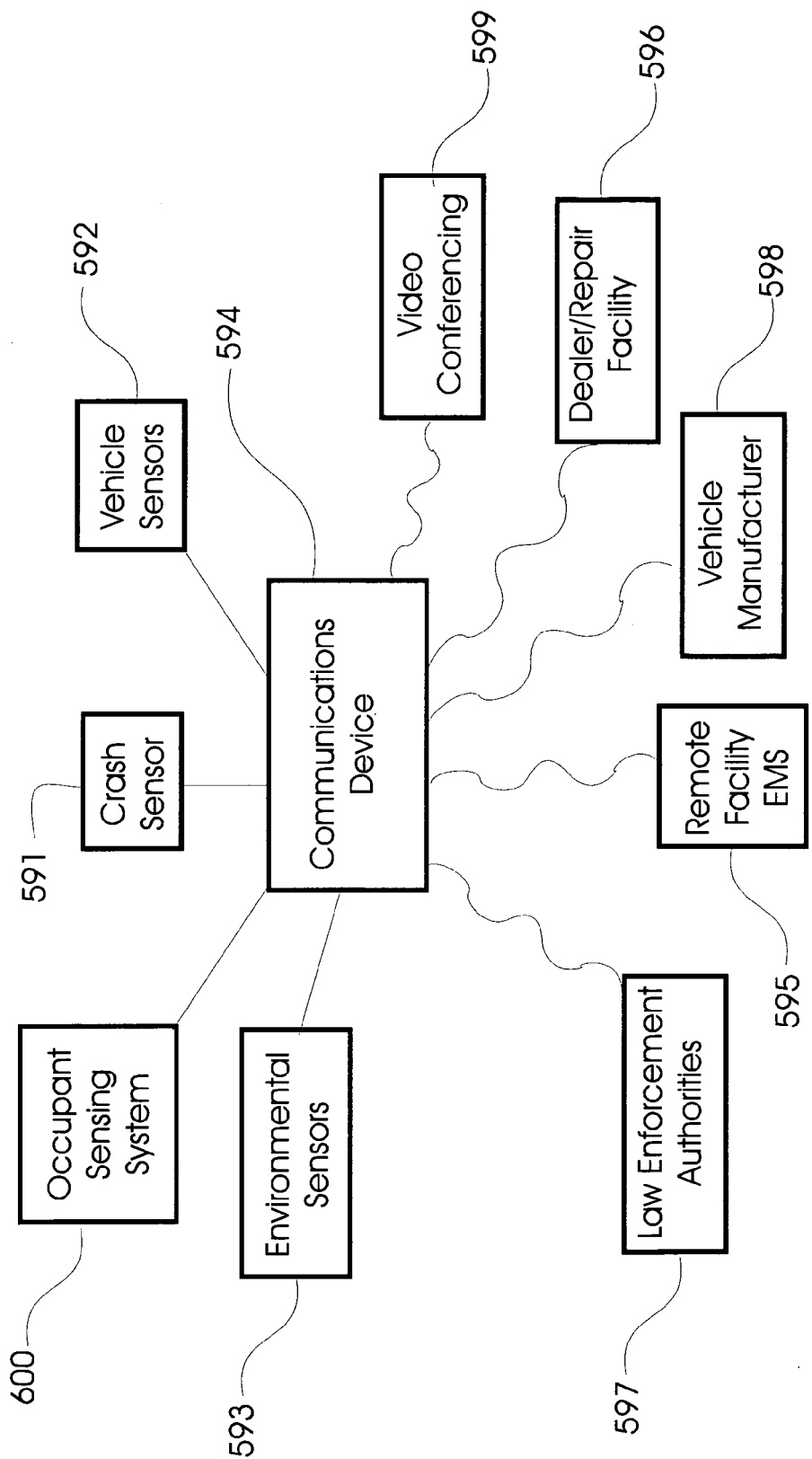
FIG. 62 is a schematic view of overall telematics system in accordance with the invention.

FIG. 62 shows a schematic of the integration of the occupant sensing with a telematics link and the vehicle diagnosis with a telematics link. As envisioned, the occupant sensing system 600 includes those components which determine the presence, position, health state, and other information relating to the occupants. Information relating to the occupants includes information as to what the driver is doing, talking on the phone, communicating with OnStar® or other route guidance, listening to the radio, sleeping, drunk, drugged, having a heart attack The occupant sensing system may also be any of those systems and apparatus described in any of the current assignee's above-referenced patents and patent applications or any other comparable occupant sensing system which performs any or all of the same functions as they relate to occupant sensing. Examples of sensors which might be installed on a vehicle and constitute the occupant sensing system include heartbeat sensors, motion sensors, weight sensors, microphones and optical sensors.

A crash sensor system 591 is provided and determines when the vehicle experiences a crash. This crash sensor may be part of the occupant restraint system or independent from it. Crash sensor system 591 may include any type of crash sensors, including one or more crash sensors of the same or different types.

Vehicle sensors 592 include sensors which detect the operating conditions of the vehicle. Also included are tire sensors such as disclosed in U.S. Pat. No. 6,662,642. Other examples include velocity and acceleration sensors, and angle and angular rate pitch, roll and yaw sensors. Of particular importance are sensors that tell what the car is doing: speed, skidding, sliding, location, communicating with other cars or the infrastructure, etc.

Environment sensors 593 includes sensors which provide data to the operating environment of the vehicle, e.g., the inside and outside temperatures, the time of day, the location of the sun and lights, the locations of other vehicles, rain, snow, sleet, visibility (fog), general road condition information, pot holes, ice, snow cover, road visibility, assessment of traffic, video pictures of an accident, etc. Possible sensors include optical sensors which obtain images of the environment surrounding the vehicle, blind spot detectors which provides data on the blind spot of the driver, automatic cruise control sensors that can provide images of vehicles in front of the host vehicle, various radar devices which provide the position of other vehicles and objects relative to the subject vehicle.

The occupant sensing system 600, crash sensors 591, vehicle sensors 592, environment sensors 593 and all other sensors listed above can be coupled to a communications device 594 which may contain a memory unit and appropriate electrical hardware to communicate with the sensors, process data from the sensors, and transmit data from the sensors. The memory unit would be useful to store data from the sensors, updated periodically, so that such information could be transmitted at set time intervals.

The communications device 594 can be designed to transmit information to any number of different types of facilities. For example, the communications device 594 would be designed to transmit information to an emergency response facility 595 in the event of an accident involving the vehicle. The transmission of the information could be triggered by a signal from a crash sensor 591 that the vehicle was experiencing a crash or experienced a crash. The information transmitted could come from the occupant sensing system 600 so that the emergency response could be tailored to the status of the occupants. For example, if the vehicle was determined to have ten occupants, multiple ambulances might be sent. Also, if the occupants are determined not be breathing, then a higher priority call with living survivors might receive assistance first. As such, the information from the occupant sensing system 600 would be used to prioritize the duties of the emergency response personnel.

Information from the vehicle sensors 592 and environment sensors 593 can also be transmitted to law enforcement authorities 597 in the event of an accident so that the cause(s) of the accident could be determined. Such information can also include information from the occupant sensing system 600, which might reveal that the driver was talking on the phone, putting on make-up, or another distracting activity, information from the vehicle sensors 592 which might reveal a problem with the vehicle, and information from the environment sensors 593 which might reveal the existence of slippery roads, dense fog and the like.

Information from the occupant sensing system 600, vehicle sensors 592 and environment sensors 593 can also be transmitted to the vehicle manufacturer 598 in the event of an accident so that a determination can be made as to whether failure of a component of the vehicle caused or contributed to the cause of the accident. For example, the vehicle sensors might determine that the tire pressure was too low so that advice can be disseminated to avoid maintaining the tire pressure too low in order to avoid an accident. Information from the vehicle sensors 592 relating to component failure could be transmitted to a dealer/repair facility 596 which could schedule maintenance to correct the problem.

The communications device 594 can be designed to transmit particular information to each site, i.e., only information important to be considered by the personnel at that site. For example, the emergency response personnel have no need for the fact that the tire pressure was too low but such information is important to the law enforcement authorities 597 (for the possible purpose of issuing a recall of the tire and/or vehicle) and the vehicle manufacturer 598.

In one exemplifying use of the system shown in FIG. 62, the operator at the remote facility 595 could be notified when the vehicle experiences a crash, as detected by the crash sensor system 591 and transmitted to the remote facility 595 via the communications device 594. In this case, if the vehicle occupants are unable to, or do not, initiate communications with the remote facility 595, the operator would be able to receive information from the occupant sensing system 600, as well as the vehicle sensors 592 and environmental sensors 593. The operator could then direct the appropriate emergency response personnel to the vehicle. The communications device 594 could thus be designed to automatically establish the communications channel with the remote facility when the crash sensor system 591 determines that the vehicle has experienced a crash.

The communications device 594 can be a cellular phone, OnStar® or other subscriber-based telematics system, a peer-to-peer vehicle communication system that eventually communicates to the infrastructure and then, perhaps, to the Internet with e-mail to the dealer, manufacturer, vehicle owner, law enforcement authorities or others. It can also be a vehicle to LEO or Geostationary satellite system such as Skybitz which can then forward the information to the appropriate facility either directly or through the Internet.

The communication may need to be secret so as not to violate the privacy of the occupants and thus encrypted communication may in many cases be required. Other innovations described herein include the transmission of any video data from a vehicle to another vehicle or to a facility remote from the vehicle by any means such as a telematics communication system such as OnStar®, a cellular phone system, a communication via GEO, geocentric or other satellite system and any communication that communicates the results of a pattern recognition system analysis. Also, any communication from a vehicle that combines sensor information with location information is anticipated by at least one of the inventions disclosed herein.

When optical sensors are provided as part of the occupant sensing system 600, video conferencing becomes a possibility, whether or not the vehicle experiences a crash. That is, the occupants of the vehicle can engage in a video conference with people at another location 599 via establishment of a communications channel by the communications device 594.

The vehicle diagnostic system described above using a telematics link can transmit information from any type of sensors on the vehicle.

10. Pattern Recognition

In basic embodiments of the inventions, wave or energy-receiving transducers are arranged in the vehicle at appropriate locations, associated algorithms are trained, if necessary depending on the particular embodiment, and function to determine whether a life form, or other object, is present in the vehicle and if so, how many life forms or objects are present. A determination can also be made using the transducers as to whether the life forms are humans, or more specifically, adults, child in child seats, etc. As noted above and below, this is possible using pattern recognition techniques. Moreover, the processor or processors associated with the transducers can be trained (loaded with a trained pattern recognition algorithm) to determine the location of the life forms or objects, either periodically or continuously or possibly only immediately before, during and after a crash. The location of the life forms or objects can be as general or as specific as necessary depending on the system requirements, i.e., a determination can be made that a human is situated on the driver's seat in a normal position (general) or a determination can be made that a human is situated on the driver's seat and is leaning forward and/or to the side at a specific angle as well as determining the position of his or her extremities and head and chest (specific). Or, a determination can be made as to the size or type of objects such as boxes are in a truck trailer or cargo container. The degree of detail is limited by several factors, including, e.g., the number, position and type of transducers and the training of the pattern recognition algorithm.

When different objects are placed on the front passenger seat, the images (here "image" is used to represent any form of signal) from transducers 6, 8, 10 (FIG. 1) are different for different objects but there are also similarities between all images of rear facing child seats, for example, regardless of where on the vehicle seat it is placed and regardless of what company manufactured the child seat. Alternately, there will be similarities between all images of people sitting on the seat regardless of what they are wearing, their age or size. The problem is to find the set of "rules" or an algorithm that differentiates the images of one type of object from the images of other types of objects, for example which differentiate the adult occupant images from the rear facing child seat images or boxes. The similarities of these images for various child seats are frequently not obvious to a person looking at plots of the time series from ultrasonic sensors, for example, and thus computer algorithms are developed to sort out the various patterns. For a more detailed discussion of pattern recognition see U.S. RE Pat. 37,260 to Varga et. and discussions elsewhere herein.

The determination of these rules is important to the pattern recognition techniques used in at least one of the inventions disclosed herein. In general, three approaches have been useful, artificial intelligence, fuzzy logic and artificial neural networks including modular or combination neural networks. Other types of pattern recognition techniques may also be used, such as sensor fusion as disclosed in Corrado U.S. Pat. No. 5,482,314, U.S. Pat. No. 5,890,085, and U.S. Pat. No. 6,249,729. In some of the inventions disclosed herein, such as the determination that there is an object in the path of a closing window or door using acoustics or optics as described herein, the rules are sufficiently obvious that a trained researcher can look at the returned signals and devise an algorithm to make the required determinations. In others, such as the determination of the presence of a rear facing child seat or of an occupant, artificial neural networks are used to determine the rules. Neural network software for determining the pattern recognition rules is available from various sources such as International Scientific Research, Inc., Panama City, Panama.

The human mind has little problem recognizing faces even when they are partially occluded such as with a hat, sunglasses or a scarf, for example. With the increase in low cost computing power, it is now becoming possible to train a rather large neural network, perhaps a combination neural network, to recognize most of those cases where a human mind will also be successful.

Other techniques which may or may not be part of the process of designing a system for a particular application include the following:

1. Fuzzy logic. Neural networks frequently exhibit the property that when presented with a situation that is totally different from any previously encountered, an irrational decision can result. Frequently, when the trained observer looks at input data, certain boundaries to the data become evident and cases that fall outside of those boundaries are indicative of either corrupted data or data from a totally unexpected situation. It is sometimes desirable for the system designer to add rules to handle these cases. These can be fuzzy logic-based rules or rules based on human intelligence. One example would be that when certain parts of the data vector fall outside of expected bounds that the system defaults to an airbag-enable state or the previously determined state.

2. Genetic algorithms. When developing a neural network algorithm for a particular vehicle, there is no guarantee that the best of all possible algorithms has been selected. One method of improving the probability that the best algorithm has been selected is to incorporate some of the principles of genetic algorithms. In one application of this theory, the network architecture and/or the node weights are varied pseudo-randomly to attempt to find other combinations which have higher success rates. The discussion of such genetic algorithms systems appears in the book *Computational Intelligence* referenced above.

Although neural networks are preferred other classifiers such as Bayesian classifiers can be used as well as any other pattern recognition system. A key feature of most of the inventions disclosed herein is the recognition that the technology of pattern recognition rather than deterministic mathematics should be applied to solving the occupant sensing problem.

10.1 Neural Networks

Figure 63:
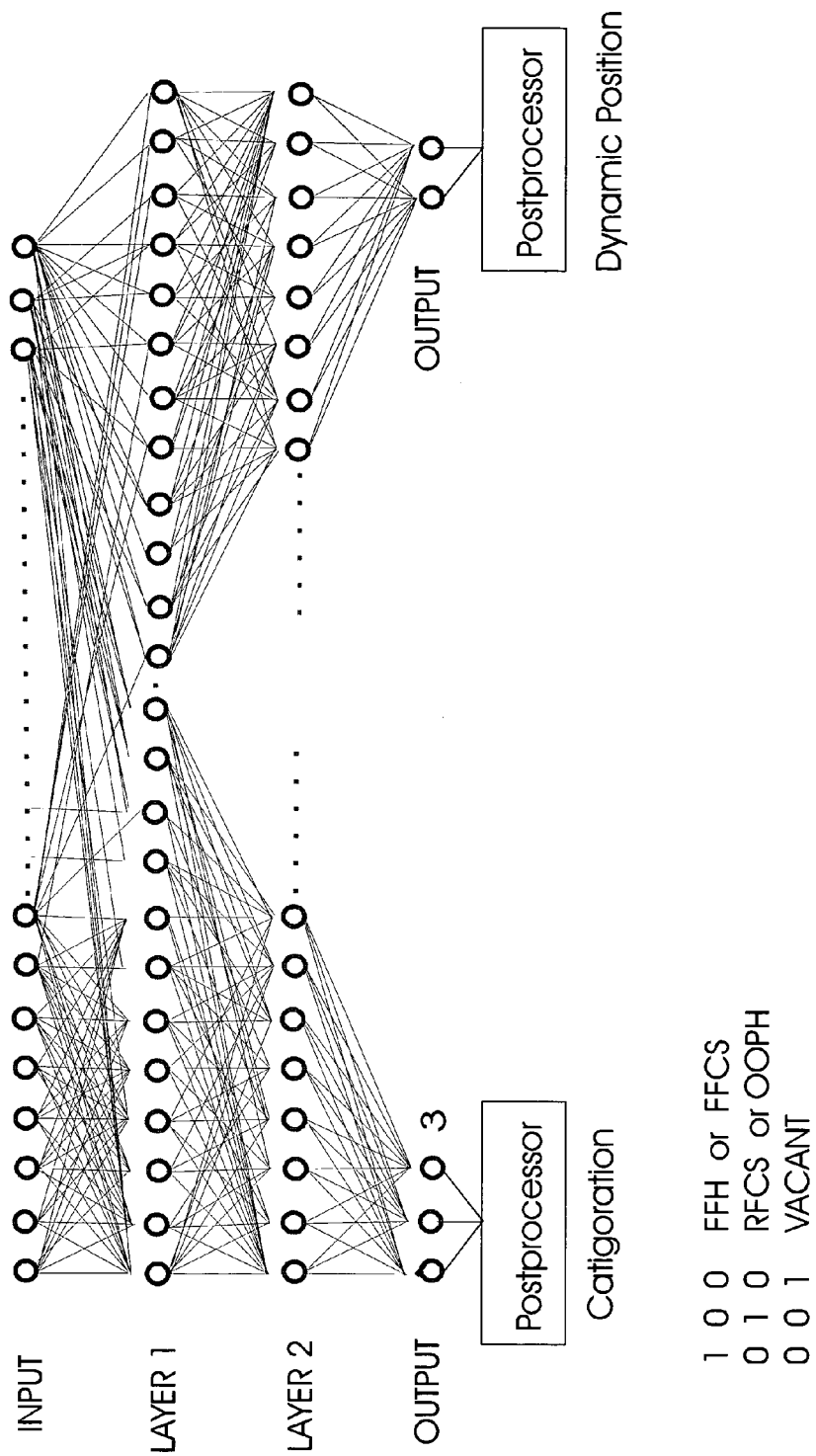
FIG. 63 is diagram of a neural network similar to FIG. 19*b* only with a dual architecture with the addition of a post processing operation for both the categorization and position measurement networks and separate hidden layer nodes for each of the two networks.

An occupant can move from a position safely displaced from the airbag to a position where he or she can be seriously injured by the deployment of an airbag within a fraction of a second during pre-crash braking, for example. On the other hand, it takes a substantially longer time period to change the seat occupancy state from a forward facing person to a rear facing child seat, or even from a forward facing child seat to a rear facing child seat. This fact can be used in the discrimination process through post-processing algorithms. One method, which also prepares for DOOP, is to use a two-layered neural network or two separate neural networks. The first one categorizes the seat occupancy into, for example, (1) empty seat, (2) rear facing child seat, (3) forward facing child seat and (4) forward facing human (not in a child seat). The second is used for occupant position determination. In the implementation, the same input layer can be used for both neural networks but separate hidden and output layers are used. This is illustrated in FIG. 63 which is similar to FIG. 19*b* with the addition of a post processing operation for both the categorization and position networks and the separate hidden layer nodes for each network.

If the categorization network determines that either a category (3) or (4) exists, then the second network is run, which determines the location of the occupant. Significant averaging of the vectors is used for the first network and substantial evidence is required before the occupancy class is changed. For example, if data is acquired every 10 milliseconds, the first network might be designed to require 600 out of 1000 changed vectors before a change of state is determined. In this case, at least 6 seconds of confirming data would be required. Such a system would therefore not be fooled by a momentary placement of a newspaper by a forward facing human, for example, that might look like a rear-facing child seat.

If, on the other hand, a forward facing human were chosen, his or her position could be determined every 10 milliseconds. A decision that the occupant had moved out of position would not necessarily be made from one 10 millisecond reading unless that reading was consistent with previous readings. Nevertheless, a series of consistent readings would lead to a decision within 10 milliseconds of when the occupant crossed over into the danger zone proximate to the airbag module. This method of using history is used to eliminate the effects of temperature gradients, for example, or other events that could temporarily distort one or more vectors. The algorithms which perform this analysis are part of the post-processor.

More particularly, in one embodiment of the method in accordance with at least one of the inventions herein in which two neural networks are used in the control of the deployment of an occupant restraint device based on the position of an object in a passenger compartment of a vehicle, several wave-emitting and receiving transducers are mounted on the vehicle. In one preferred embodiment, the transducers are ultrasonic transducers which simultaneously transmit and receive waves at different frequencies from one another. A determination is made by a first neural network whether the object is of a type requiring deployment of the occupant restraint device in the event of a crash involving the vehicle based on the waves received by at least some of the transducers after being modified by passing through the passenger compartment. If so, another determination is made by a second neural network whether the position of the object relative to the occupant restraint device would cause injury to the object upon deployment of the occupant restraint device based on the waves received by at least some of the transducers. The first neural network is trained on signals from at least some of the transducers representative of waves received by the transducers when different objects are situated in the passenger compartment. The second neural network is trained on signals from at least some of the transducers when different objects in different positions are situated in the passenger compartment.

The transducers used in the training of the first and second neural networks and operational use of method are not necessary the same transducers and different sets of transducers can be used for the typing or categorizing of the object via the first neural network and the position determination of the object via the second neural network.

The modifications described above with respect to the use of ultrasonic transducers can also be used in conjunction with a dual neural network system. For example, motion of a respective vibrating element or cone of one or more of the transducers may be electronically or mechanically diminished or suppressed to reduce ringing of the transducer and/or one or more of the transducers may be arranged in a respective tube having an opening through which the waves are transmitted and received.

In another embodiment of the invention, a method for categorizing and determining the position of an object in a passenger compartment of a vehicle entails mounting a plurality of wave-receiving transducers on the vehicle, training a first neural network on signals from at least some of the transducers representative of waves received by the transducers when different objects in different positions are situated in the passenger compartment, and training a second neural network on signals from at least some of the transducers representative of waves received by the transducers when different objects in different positions are situated in the passenger compartment. As such, the first neural network provides an output signal indicative of the categorization of the object while the second neural network provides an output signal indicative of the position of the object. The transducers may be controlled to transmit and receive waves each at a different frequency, as discussed elsewhere herein, and one or more of the transducers may be arranged in a respective tube having an opening through which the waves are transmitted and received.

Although this system is described with particular advantageous use for ultrasonic and optical transducers, it is conceivable that other transducers other than the ultrasonics or optics can also be used in accordance with the invention. A dual neural network is a form of a modular neural network and both are subsets of combination neural networks.

The system used in a preferred implementation of at least one of the inventions disclosed herein for the determination of the presence of a rear facing child seat, of an occupant or of an empty seat, for example, is the artificial neural network, which is also commonly referred to as a trained neural network. In one case, illustrated in FIG. 1, the network operates on the returned signals as sensed by transducers 6, 8, 9 and 10, for example. Through a training session, the system is taught to differentiate between the different cases. This is done by conducting a large number of experiments where a selection of the possible child seats is placed in a large number of possible orientations on the front passenger seat. Similarly, a sufficiently large number of experiments are run with human occupants and with boxes, bags of groceries and other objects (both inanimate and animate). For each experiment with different objects and the same object in different positions, the returned signals from the transducers 6, 8, 9 and 10, for example, are associated with the identification of the occupant in the seat or the empty seat and information about the occupant such as its orientation if it is a child seat and/or position. Data sets are formed from the returned signals and the identification and information about the occupant or the absence of an occupant. The data sets are input into a neural network-generating program that creates a trained neural network that can, upon receiving input of returned signals from the transducers 6, 8, 9 and 10, provide an output of the identification and information about the occupant most likely situated in the seat or ascertained the existence of an empty seat. Sometimes as many as 1,000,000 such experiments are run before the neural network is sufficiently trained and tested so that it can differentiate among the several cases and output the correct decision with a very high probability. The data from each trial is combined to form a one-dimensional array of data called a vector. Of course, it must be realized that a neural network can also be trained to differentiate among additional cases, for example, a forward facing child seat. It can also be trained to recognize the existence of one or more boxes or other cargo within a truck trailer, cargo container, automobile trunk or railroad car, for example.

Considering now FIG. 9, the normalized data from the ultrasonic transducers 6, 8, 9 and 10, the seat track position detecting sensor 74, the reclining angle detecting sensor 57, from the weight sensor(s) 7, 76 and 97, from the heartbeat sensor 71, the capacitive sensor 78 and the motion sensor 73 are input to the neural network 65, and the neural network 65 is then trained on this data. More specifically, the neural network 65 adds up the normalized data from the ultrasonic transducers, from the seat track position detecting sensor 74, from the reclining angle detecting sensor 57, from the weight sensor(s) 7, 76 and 97, from the heartbeat sensor 71, from the capacitive sensor 78 and from the motion sensor 73 with each data point multiplied by an associated weight according to the conventional neural network process to determine correlation function (step S6 in FIG. 18).

Looking now at FIG. 19B, in this embodiment, 144 data points are appropriately interconnected at 25 connecting points of layer 1, and each data point is mutually correlated through the neural network training and weight determination process. The 144 data points consist of 138 measured data points from the ultrasonic transducers, the data (139th) from the seat track position detecting sensor 74, the data (140th) from the reclining angle detecting sensor 57, the data (141st) from the weight sensor(s) 7 or 76, the data ($142^{nd}$) from the heartbeat sensor 71, the data ($143^{rd}$) from the capacitive sensor and the data ($144^{th}$) from the motion sensor (the last three inputs are not shown on FIG. 19B. Each of the connecting points of the layer 1 has an appropriate threshold value, and if the sum of measured data exceeds the threshold value, each of the connecting points will output a signal to the connecting points of layer 2. Although the weight sensor input is shown as a single input, in general there will be a separate input from each weight sensor used. For example, if the seat has four seat supports and a strain measuring element is used on each support, what will be four data inputs to the neural network.

The connecting points of the layer 2 comprises 20 points, and the 25 connecting points of the layer 1 are appropriately interconnected as the connecting points of the layer 2. Similarly, each data is mutually correlated through the training process and weight determination as described above and in the above-referenced neural network texts. Each of the 20 connecting points of the layer 2 has an appropriate threshold value, and if the sum of measured data exceeds the threshold value, each of the connecting points will output a signal to the connecting points of layer 3.

The connecting points of the layer 3 comprises 3 points, and the connecting points of the layer 2 are interconnected at the connecting points of the layer 3 so that each data is mutually correlated as described above. If the sum of the outputs of the connecting points of layer 2 exceeds a threshold value, the connecting points of the latter 3 will output Logic values (100), (010), and (001) respectively, for example.

The neural network 65 recognizes the seated-state of a passenger A by training as described in several books on Neural Networks mentioned in the above referenced patents and patent applications. Then, after training the seated-state of the passenger A and developing the neural network weights, the system is tested. The training procedure and the test procedure of the neural network 65 will hereafter be described with a flowchart shown in FIG. 18.

The threshold value of each connecting point is determined by multiplying weight coefficients and summing up the results in sequence, and the aforementioned training process is to determine a weight coefficient Wj so that the threshold value (ai) is a previously determined output.

$$ai = \Sigma Wj \cdot Xj (j=1 \text{ to } N)$$

wherein
Wj is the weight coefficient,
Xj is the data and
N is the number of samples.

Based on this result of the training, the neural network 65 generates the weights for the coefficients of the correlation function or the algorithm (step S7).

At the time the neural network 65 has learned a suitable number of patterns of the training data, the result of the training is tested by the test data. In the case where the rate of correct answers of the seated-state detecting unit based on this test data is unsatisfactory, the neural network is further trained and the test is repeated. In this embodiment, the test was performed based on about 600,000 test patterns. When the rate of correct test result answers was at about 98%, the training was ended. Further improvements to the ultrasonic occupant sensor system has now resulted in accuracies exceeding 98% and for the optical system exceeding 99%.

The neural network software operates as follows. The training data is used to determine the weights which multiply the values at the various nodes at the lower level when they are combined at nodes at a higher level. Once a sufficient number of iterations have been accomplished, the independent data is used to check the network. If the accuracy of the network using the independent data is lower than the last time that it was checked using the independent data, then the previous weights are substituted for the new weights and training of the network continues on a different path. Thus, although the independent data is not used to train the network, it does strongly affect the weights. It is therefore not really independent. Also, both the training data and the independent data are created so that all occupancy states are roughly equally represented. As a result, a third set of data is used which is structured to more closely represent the real world of vehicle occupancy. This third data set, the "real world" data, is then used to arrive at a figure as to the real accuracy of the system.

The neural network 65 has outputs 65a, 65b and 65c (FIG. 9). Each of the outputs 65a, 65b and 65c output logic 0 or 1 to a gate circuit or algorithm 77. Based on the signals from the outputs 65a, 65b and 65c, any one of these combination (100), (010) and (001) is obtained. In another preferred embodiment, all data for the empty seat was removed from the training set and the empty seat case was determined based on the output of the weight sensor alone. This simplifies the neural network and improves its accuracy.

In this embodiment, the output (001) correspond to a vacant seat, a seat occupied by an inanimate object or a seat occupied by a pet (VACANT), the output (010) corresponds to a rear facing child seat (RFCS) or an abnormally seated passenger (ASP or OOPA), and the output (100) corresponds to a normally seated passenger (NSP or FFA) or a forward facing child seat (FFCS).

The gate circuit (seated-state evaluation circuit) 77 can be implemented by an electronic circuit or by a computer algorithm by those skilled in the art and the details will not be presented here. The function of the gate circuit 77 is to remove the ambiguity that sometimes results when ultrasonic sensors and seat position sensors alone are used. This ambiguity is that it is sometimes difficult to differentiate between a rear facing child seat (RFCS) and an abnormally seated passenger (ASP), or between a normally seated passenger (NSP) and a forward facing child seat (FFCS). By the addition of one or more weight sensors in the function of acting as a switch when the weight is above or below 60 lbs., it has been found that this ambiguity can be eliminated. The gate circuit therefore takes into account the output of the neural network and also the weight from the weight sensor(s) as being above or below 60 lbs. and thereby separates the two cases just described and results in five discrete outputs.

The use of weight data must be heavily filtered since during driving conditions, especially on rough roads or during an accident, the weight sensors will give highly varying output. The weight sensors, therefore, are of little value during the period of time leading up to and including a crash and their influence must be minimized during this time period. One way of doing this is to average the data over a long period of time such as from 5 seconds to a minute or more.

Thus, the gate circuit 77 fulfills a role of outputting five kinds of seated-state evaluation signals, based on a combination of three kinds of evaluation signals from the neural network 65 and superimposed information from the weight sensor(s). The five seated-state evaluation signals are input to an airbag deployment determining circuit that is part of the airbag system and will not be described here. As disclosed in the above-referenced patents and patent applications, the output of this system can also be used to activate a variety of lights or alarms to indicate to the operator of the vehicle the seated state of the passenger. The system that has been here described for the passenger side is also applicable for the most part for the driver side.

An alternate and preferred method of accomplishing the function performed by the gate circuit is to use a modular neural network. In this case, the first level neural network is trained on determining whether the seat is occupied or vacant. The input to this neural network consists of all of the data points described above. Since the only function of this neural network is to ascertain occupancy, the accuracy of this neural network is very high. If this neural network determines that the seat is not vacant, then the second level neural network determines the occupancy state of the seat.

In this embodiment, although the neural network 65 has been employed as an evaluation circuit, the mapping data of the coefficients of a correlation function may also be implemented or transferred to a microcomputer to constitute the evaluation circuit (see Step S8 in FIG. 18).

According to the seated-state detecting unit of the present invention, the identification of a vacant seat (VACANT), a rear facing child seat (RFCS), a forward facing child seat (FFCS), a normally seated adult passenger (NSP), an abnormally seated adult passenger (ASP), can be reliably performed. Based on this identification, it is possible to control a component, system or subsystem in the vehicle. For example, a regulation valve which controls the inflation or deflation of an airbag may be controlled based on the evaluated identification of the occupant of the seat. This regulation valve may be of the digital or analog type. A digital regulation valve is one that is in either of two states, open or closed. The control of the flow is then accomplished by varying the time that the valve is open and closed, i.e., the duty cycle.

The neural network has been previously trained on a significant number of occupants of the passenger compartment. The number of such occupants depends strongly on whether the driver or the passenger seat is being analyzed. The variety of seating states or occupancies of the passenger seat is vastly greater than that of the driver seat. For the driver seat, a typical training set will consist of approximately 100 different vehicle occupancies. For the passenger seat, this number can exceed 1000. These numbers are used for illustration purposes only and will differ significantly from vehicle model to vehicle model. Of course many vectors of data will be taken for each occupancy as the occupant assumes different positions and postures.

The neural network is now used to determine which of the stored occupancies most closely corresponds to the measured data. The output of the neural network can be an index of the setup that was used during training that most closely matches the current measured state. This index can be used to locate stored information from the matched trained occupancy. Information that has been stored for the trained occupancy typically includes the locus of the centers of the chest and head of the driver, as well as the approximate radius of pixels which is associated with this center to define the head area, for example. For the case of FIG. 8A, it is now known from this exercise where the head, chest, and perhaps the eyes and ears, of the driver are most likely to be located and also which pixels should be tracked in order to know the precise position of the driver's head and chest. What has been described above is the identification process for automobile occupancy and is only representative of the general process. A similar procedure, although usually simpler with fewer steps, is applicable to other vehicle monitoring cases.

The use of trainable pattern recognition technologies such as neural networks is an important part of the some of the inventions discloses herein particularly for the automobile occupancy case, although other non-trained pattern recognition systems such as fuzzy logic, correlation, Kalman filters, and sensor fusion can also be used. These technologies are implemented using computer programs to analyze the patterns of examples to determine the differences between different categories of objects. These computer programs are derived using a set of representative data collected during the training phase, called the training set. After training, the computer programs output a computer algorithm containing the rules permitting classification of the objects of interest based on the data obtained after installation in the vehicle. These rules, in the form of an algorithm, are implemented in the system that is mounted onto the vehicle. The determination of these rules is important to the pattern recognition techniques used in at least one of the inventions disclosed herein. Artificial neural networks using back propagation are thus far the most successful of the rule determination approaches, however, research is underway to develop systems with many of the advantages of back propagation neural networks, such as learning by training, without the disadvantages, such as the inability to understand the network and the possibility of not converging to the best solution. In particular, back propagation neural networks will frequently give an unreasonable response when presented with data than is not within the training data. It is well known that neural networks are good at interpolation but poor at extrapolation. A combined neural network fuzzy logic system, on the other hand, can substantially solve this problem. Additionally, there are many other neural network systems in addition to back propagation. In fact, one type of neural network may be optimum for identifying the contents of the passenger compartment and another for determining the location of the object dynamically.

Numerous books and articles, including more that 500 U.S. patents, describe neural networks in great detail and thus the theory and application of this technology is well known and will not be repeated here. Except in a few isolated situations where neural networks have been used to solve particular problems limited to engine control, for example, they have not previously been applied to automobiles, trucks or other vehicle monitoring situations.

The system generally used in the instant invention, therefore, for the determination of the presence of a rear facing child seat, an occupant, or an empty seat is the artificial neural network or a neural-fuzzy system. In this case, the network operates on the returned signals from a CCD or CMOS array as sensed by transducers 49, 50, 51 and 54 in FIG. 8D, for example. For the case of the front passenger seat, for example, through a training session, the system is taught to differentiate between the three cases. This is done by conducting a large number of experiments where available child seats are placed in numerous positions and orientations on the front passenger seat of the vehicle.

Once the network is determined, it is possible to examine the result to determine, from the algorithm created by the neural network software, the rules that were finally arrived at by the trial and error training technique. In that case, the rules can then be programmed into a microprocessor. Alternately, a neural computer can be used to implement the neural network directly. In either case, the implementation can be carried out by those skilled in the art of pattern recognition using neural networks. If a microprocessor is used, a memory device is also required to store the data from the analog to digital converters which digitize the data from the receiving transducers. On the other hand, if a neural network computer is used, the analog signal can be fed directly from the transducers to the neural network input nodes and an intermediate memory is not required. Memory of some type is needed to store the computer programs in the case of the microprocessor system and if the neural computer is used for more than one task, a memory is needed to store the network specific values associated with each task.

A review of the literature on neural networks yields the conclusion that the use of such a large training set is unique in the neural network field. The rule of thumb for neural networks is that there must be at least three training cases for each network weight. Thus, for example, if a neural network has 156 input nodes, 10 first hidden layer nodes, 5 second hidden layer nodes, and one output node this results in a total of 1,622 weights. According to conventional theory 5000 training examples should be sufficient. It is highly unexpected, therefore, that greater accuracy would be achieved through 100 times that many cases. It is thus not obvious and cannot be deduced from the neural network literature that the accuracy of the system will improve substantially as the size of the training database increases even to tens of thousands of cases. It is also not obvious looking at the plots of the vectors obtained using ultrasonic transducers that increasing the number of tests or the database size will have such a significant effect on the system accuracy. Each of the vectors is typically a rather course plot with a few significant peaks and valleys. Since the spatial resolution of an ultrasonic system is typically about 2 to 4 inches, it is once again surprising that such a large database is required to achieve significant accuracy improvements.

The back propagation neural network is a very successful general-purpose network. However, for some applications, there are other neural network architectures that can perform better. If it has been found, for example, that a parallel network as described above results in a significant improvement in the system, then, it is likely that the particular neural network architecture chosen has not been successful in retrieving all of the information that is present in the data. In such a case, an RCE, Stochastic, Logicon Projection, cellular, support vector machine or one of the other approximately 30 types of neural network architectures can be tried to see if the results improve. This parallel network test, therefore, is a valuable tool for determining the degree to which the current neural network is capable of using efficiently the available data.

One of the salient features of neural networks is their ability of find patterns in data regardless of its source. Neural networks work well with data from ultrasonic sensors, optical imagers, strain gage and bladder weight sensors, temperature sensors, chemical sensors, radiation sensors, pressure sensors, electric field sensors, capacitance based sensors, any other wave sensors including the entire electromagnetic spectrum, etc. If data from any sensors can be digitized and fed into a neural network generating program and if there is information in the pattern of the data then neural networks can be a viable method of identifying those patterns and correlating them with a desired output function. Note that although the inventions disclosed herein preferably use neural networks and combination neural networks to be described next, these inventions are not limited to this form or method of pattern recognition. The major breakthrough in occupant sensing came with the recognition by the current assignee that ordinary analysis using mathematical equations where the researcher looks at the data and attempts, based on the principles of statistics, engineering or physics, to derive the relevant relationships between the data and the category and location of an occupying item, is not the proper approach and that pattern recognition technologies should be used. This is believed to be the first use of such pattern recognition technologies in the automobile safety and monitoring fields with the exception that neural networks have been used by the current assignee and others as the basis of a crash sensor algorithm and by certain automobile manufacturers for engine control. Note for many monitoring situations in truck trailers, cargo containers and railroad cars where questions such as "is there anything in the vehicle?" are asked, neural networks may not always be required.

10.2 Combination Neural Networks

The technique that was described above for the determination of the location of an occupant during panic or braking pre-crash situations involved the use of a modular neural network. In that case, one neural network was used to determine the occupancy state of the vehicle and one or more neural networks were used to determine the location of the occupant within the vehicle. The method of designing a system utilizing multiple neural networks is a key teaching of the present invention. When this idea is generalized, many potential combinations of multiple neural network architectures become possible. Some of these will now be discussed.

One of the earliest attempts to use multiple neural networks was to combine different networks trained differently but on substantially the same data under the theory that the errors which affect the accuracy of one network would be independent of the errors which affect the accuracy of another network. For example, for a system containing four ultrasonic transducers, four neural networks could be trained each using a different subset of the data from the four transducers. Thus, if the transducers are arbitrarily labeled A, B, C and D, the first neural network would be trained on data from A, B and C. The second neural network would be trained on data from B, C, and D etc. This technique has not met with a significant success since it is an attempt to mask errors in the data rather than to eliminate them. Nevertheless, such a system does perform marginally better in some situations compared to a single network using data from all four transducers. The penalty for using such a system is that the computational time is increased by approximately a factor of three. This significantly affects the cost of the system installed in a vehicle.

An alternate method of obtaining some of the advantages of the parallel neural network architecture described above, is to form a single neural network but where the nodes of one or more of the hidden layers are not all connected to all of the input nodes. Alternately, if the second hidden layer is chosen, all of the notes from the previous hidden layer are not connected to all of the nodes of the subsequent layer. The alternate groups of hidden layer nodes can then be fed to different output notes and the results of the output nodes combined, either through a neural network training process into a single decision or a voting process. This latter approach retains most of the advantages of the parallel neural network while substantially reducing the computational complexity.

The fundamental problem with parallel networks is that they focus on achieving reliability or accuracy by redundancy rather than by improving the neural network architecture itself or the quality of the data being used. They also increase the cost of the final vehicle installed systems. Alternately, modular neural networks improve the accuracy of the system by dividing up the tasks. For example, if a system is to be designed to determine the type of tree or the type of animal in a particular scene, the modular approach would be to first determine whether the object of interest is an animal or a tree and then use separate neural networks to determine the type of tree and the type of animal. When a human looks at a tree, he is not asking himself "is that a tiger or a monkey?". Modular neural network systems are efficient since once the categorization decision is made, e.g., the seat is occupied by forward facing human, the location of that object can be determined more accurately and without requiring increased computational resources.

Another example where modular neural networks have proven valuable is to provide a means for separating "normal cases" from "special cases". It has been found that in some cases, the vast majority of the data falls into what might be termed "normal" cases that are easily identified with a neural network. The balance of the cases cause the neural network considerable difficulty, however, there are identifiable characteristics of the special cases that permits them to be separated from the normal cases and dealt with separately. Various types of human intelligence rules can be used, in addition to a neural network, to perform this separation including fuzzy logic, statistical filtering using the average class vector of normal cases, the vector standard deviation, and threshold where a fuzzy logic network is used to determine chance of a vector belonging to a certain class. If the chance is below a threshold, the standard neural network is used and if above the threshold, the special one is used.

Mean-Variance calculations, Fuzzy Logic, Stochastic, and Genetic Algorithm networks, and combinations thereof such as Neuro-Fuzzy systems are other technologies considered in designing an appropriate system. During the process of designing a system to be adapted to a particular vehicle, many different neural networks and other pattern recognition architectures are considered including those mentioned above. The particular choice of architecture is frequently determined on a trial and error basis by the system designer in many cases using the combination neural network CAD software from International Scientific Research Inc. (ISR). Although the parallel architecture system described above has not proven to be in general beneficial, one version of this architecture has shown some promise. It is known that when training a neural network, that as the training process proceeds, the accuracy of the decision process improves for the training and independent databases. It is also known that the ability of the network to generalize suffers. That is, when the network is presented with a system which is similar to some case in the database but still with some significant differences, the network may make the proper decision in the early stages of training, but the wrong decisions after the network has become fully trained. This is sometimes called the young network vs. old network dilemma. In some cases, therefore, using an old network in parallel with a young network can retain some of the advantages of both networks, that is, the high accuracy of the old network coupled with the greater generality of the young network. Once again, the choice of any of these particular techniques is part of the process of designing a system to be adapted to a particular vehicle and is a prime subject of at least one of the inventions disclosed herein. The particular combination of tools used depends on the particular application and the experience of the system designer.

It has been found that the accuracy of the neural network pattern recognition system can be substantially enhanced if the problem is broken up into several problems. Thus, for example, rather than deciding that the airbag should be deployed or not using a single neural network and inputting all of the available data, the accuracy is improved it is first decided whether the data is good, then whether the seat is empty or occupied and then whether it is occupied by an adult or a child. Finally, if the decisions say that there is a forward facing adult occupying the seat, then the final level of neural network determines the location of the adult. Once the location is determined, a non-neural network algorithm can determine whether to enable deployment of the restraint system. The process of using multiple layers of neural networks is called modular neural networks and when other features are added, it is called combination neural networks.

Examples of combination neural networks are found in U.S. patent application Ser. No. 10/940,811 and are incorporated by reference herein.

10.3 Interpretation of Other Occupant States

Once a vehicle interior monitoring system employing a sophisticated pattern recognition system, such as a neural network or modular neural network, is in place, it is possible to monitor the motions of the driver over time and determine if he is falling asleep or has otherwise become incapacitated. In such an event, the vehicle can be caused to respond in a number of different ways. One such system is illustrated in FIG. 6 and consists of a monitoring system having transducers 8 and 9 plus microprocessor 20 programmed to compare the motions of the driver over time and trained to recognize changes in behavior representative of becoming incapacitated e.g., the eyes blinking erratically and remaining closed for ever longer periods of time. If the system determines that there is a reasonable probability that the driver has fallen asleep, for example, then it can turn on a warning light shown here as 41 or send a warning sound. If the driver fails to respond to the warning by pushing a button 43, for example, then the horn and lights can be operated in a manner to warn other vehicles and the vehicle brought to a stop. One novel approach, not shown, would be to use the horn as the button 43. For a momentary depression of the horn, for this case, the horn would not sound. Other responses can also be programmed and other tests of driver attentiveness can be used, without resorting to attempting to monitor the motions of the driver's eyes that would signify that the driver was alert. These other responses can include an input to the steering wheel, motion of the head, blinking or other motion of the eyes etc. In fact, by testing a large representative sample of the population of drivers, the range of alert responses to the warning light and/or sound can be compared to the lack of response of a sleeping driver and thereby the state of attentiveness determined.

An even more sophisticated system of monitoring the behavior of the driver is to track his eye motions using such techniques as are described in: Freidman et al., U.S. Pat. No. 4,648,052 "Eye Tracker Communication System"; Heyner et al., U.S. Pat. No. 4,72,0189 "Eye Position Sensor"; Hutchinson, U.S. Pat. No. 4,836,670 "Eye Movement Detector"; and Hutchinson, U.S. Pat. No. 4,950,069 "Eye Movement Detector With Improved Calibration and Speed" as well as U.S. Pat. No. 5,008,946 and U.S. Pat. No. 5,305,012 referenced above. The detection of the impaired driver in particular can be best determined by these techniques. These systems use pattern recognition techniques plus, in many cases, the transmitter and CCD receivers must be appropriately located so that the reflection off of the cornea of the driver's eyes can be detected as discussed in the above-referenced patents. The size of the CCD arrays used herein permits their location, sometimes in conjunction with a reflective windshield, where this corneal reflection can be detected with some difficulty. Sunglasses or other items can interfere with this process.

In a similar manner as described in these patents, the motion of the driver's eyes can be used to control various systems in the vehicle permitting hands off control of the entertainment system, heating and air conditioning system or all of the other systems described above. Although some of these systems have been described in the afore-mentioned patents, none have made use of neural networks for interpreting the eye movements. The use of particular IR wavelengths permits the monitoring of the driver's eyes without the driver knowing that this is occurring. IR with a wave length above about 1.1 microns, however, is blocked by glass eyeglasses and thus other invisible frequencies may be required.

The use of the windshield as a reflector is particularly useful when monitoring the eyes of the driver by means of a camera mounted on the rear view mirror assembly. The reflections from the cornea are highly directional, as every driver knows whose lights have reflected off the eyes of an animal on the roadway. For this to be effective, the eyes of the driver must be looking at the radiation source. Since the driver is presumably looking through the windshield, the source of the radiation must also come from the windshield and the reflections from the driver's eyes must also be in the direction of the windshield. Using this technique, the time that the driver spends looking through the windshield can be monitored and if that time drops below some threshold value, it can be presumed that the driver is not attentive and may be sleeping or otherwise incapacitated.

The location of the eyes of the driver, for this application, is greatly facilitated by the teachings of the inventions as described above. Although others have suggested the use of eye motions and corneal reflections for drowsiness determination, up until now there has not been a practical method for locating the driver's eyes with sufficient precision and reliability as to render this technique practical. Also, although sunglasses might defeat such a system, most drowsiness caused accidents happen at night when it is less likely that sunglasses are worn.

10.4 Combining Occupant Monitoring and Car Monitoring

There is an inertial measurement unit (IMU) under development by the current assignee that will have the equivalent accuracy as an expensive military IMU but will sell for under $200 in sufficient volume. This IMU can contain three accelerometers and three gyroscopes and permit a very accurate tracking of the motion of the vehicle in three dimensions. The main purposes of this device will be replace all non-crush zone crash and rollover sensors, chassis control gyros etc. with a single device that will be up to 100 times more accurate. Another key application will be in vehicle guidance systems and it will eventually form the basis of a system that will know exactly where the vehicle is on the face of the earth within a few centimeters.

An additional use will be to monitor the motion of the vehicle in comparison with that of an occupant. From this, several facts can be gained. First, if the occupant moves in such a manner that is not caused by the motion of the vehicle, then the occupant must be alive. Conversely, if the driver motion is only caused by the vehicle, then perhaps he or she is asleep or otherwise incapacitated. A given driver will usually have a characteristic manner of operating the steering wheel to compensate for drift on the road. If this manner changes, then again, the occupant may be falling asleep. If the motion of the occupant seems to be restrained relative to what a free body would do, then there would be an indication that the seatbelt is in use, and if not, that the seatbelt is not in use or that it is too slack and needs to be retracted somewhat.

10.5 Continuous Tracking

Previously, the output of the pattern recognition system, the neural network or combined neural network, has been the zone that the occupant is occupying. This is a somewhat difficult task for the neural network since it calls for a discontinuous output for a continuous input. If the occupant is in the safe seating zone, then the output may be 0, for example and 1 if he moves into the at-risk zone. Thus, for a small motion there is a big change in output. On the other hand, as long as the occupant remains in the safe seating zone, he or she can move substantially with no change in output. A better method is to have as the output the position of the occupant from the airbag, for example, which is a continuous function and easier for the neural network to handle. This also provides for a meaningful output that permits, for example, the projection or extrapolation of the occupant's position forward in time and thus a prediction as to when he or she will enter another zone. This training of a neural network using a continuous position function is an important teaching of at least one of the inventions disclosed herein.

To do continuous tracking, however, the neural network must be trained on data that states the occupant location rather than the zone that he or she is occupying. This requires that this data be measured by a different system than is being used to monitor the occupant. Various electromagnetic systems have been tried but they tend to get foiled by the presence of metal in the interior passenger compartment. Ultrasonic systems have provided such information as have various optical systems. Tracking with a stereo camera arrangement using black light for illumination, for example is one technique. The occupant can even be illuminated with a UV point of light to make displacement easier to measure.

In addition, when multiple cameras are used in the final system, a separate tracking system may not be required. The normalization process conducted above, for example, created a displacement value for each of the CCD or CMOS arrays in the assemblies 49, 50, 52, 52, and 54, (FIG. 8A) or a subset thereof, which can now be used in reverse to find the precise location of the driver's head or chest, for example, relative to the known location of the airbag. From the vehicle geometry, and the head and chest location information, a choice can now be made as to whether to track the head or chest for dynamic out-of-position analysis.

Tracking of the motion of the occupant's head or chest can be done using a variety of techniques. One preferred technique is to use differential motion, that is, by subtracting the current image from the previous image to determine which pixels have changed in value and by looking at the leading edge of the changed pixels and the width of the changed pixel field, a measurement of the movement of the pixels of interest, and thus the driver, can be readily accomplished. Alternately, a correlation function can be derived which correlates the pixels in the known initial position of the head, for example, with pixels that were derived from the latest image. The displacement of the center of the correlation pixels would represent the motion of the head of the occupant. Naturally, a wide variety of other techniques will now be obvious to those skilled in the art.

In a method disclosed above for tracking motion of a vehicular occupant's head or chest in accordance with the inventions, electromagnetic waves are transmitted toward the occupant from at least one location, a first image of the interior of the passenger compartment is obtained from each location, the first image being represented by a matrix of pixels, and electromagnetic waves are transmitted toward the occupant from the same location(s) at a subsequent time and an additional image of the interior of the passenger compartment is obtained from each location, the additional image being represented by a matrix of pixels. The additional image is subtracted from the first image to determine which pixels have changed in value. A leading edge of the changed pixels and a width of a field of the changed pixels is determined to thereby determine movement of the occupant from the time between which the first and additional images were taken. The first image is replaced by the additional image and the steps of obtaining an additional image and subtracting the additional image from the first image are repeated such that progressive motion of the occupant is attained.

Other methods of continuous tracking include placing an ultrasonic transducer in the seatback and also on the airbag, each providing a measure of the displacement of the occupant. Knowledge of vehicle geometry is required here, such as the position of the seat. The thickness of the occupant can then be calculated and two measures of position are available. Other ranging systems such as optical range meters and stereo or distance by focusing cameras could be used in place of the ultrasonic sensors. Another system involves the placement on the occupant of a resonator or reflector such as a radar reflector, resonating antenna, or an RFID or SAW tag. In several of these cases, two receivers and triangulation based on the time of arrival of the returned pulses may be required.

Tracking can also be done during data collection using the same or a different system comprising structured light. If a separate tracking system is used, the structured light can be projected onto the object at time intervals in-between the taking of data with the main system. In this manner, the tracking system would not interfere with the image being recorded by the primary system. All of the methods of obtaining three-dimensional information described above can be implemented in a separate tracking system.

10.6 Preprocessing

Another important feature of a system, developed in accordance with the teachings of at least one of the inventions disclosed herein, is the realization that motion of the vehicle can be used in a novel manner to substantially increase the accuracy of the system. Ultrasonic waves reflect on most objects as light off a mirror. This is due to the relatively long wavelength of ultrasound as compared with light. As a result, certain reflections can overwhelm the receiver and reduce the available information. When readings are taken while the occupant and/or the vehicle is in motion, and these readings averaged over several transmission/reception cycles, the motion of the occupant and vehicle causes various surfaces to change their angular orientation slightly but enough to change the reflective pattern and reduce this mirror effect. The net effect is that the average of several cycles gives a much clearer image of the reflecting object than is obtainable from a single cycle. This then provides a better image to the neural network and significantly improves the identification accuracy of the system. The choice of the number of cycles to be averaged depends on the system requirements. For example, if dynamic out-of-position is required, then each vector must be used alone and averaging in the simple sense cannot be used. This will be discussed more detail below. Similar techniques can be used for other transducer technologies. Averaging, for example, can be used to minimize the effects of flickering light in camera-based systems.

Only rarely is unprocessed or raw data that is received from the A to D converters fed directly into the pattern recognition system. Instead, it is preprocessed to extract features, normalize, eliminate bad data, remove noise and elements that have no informational value etc.

For example, for military target recognition is common to use the Fourier transform of the data rather than the data itself. This can be especially valuable for categorization as opposed to location of the occupant and the vehicle. When used with a modular network, for example, the Fourier transform of the data may be used for the categorization neural network and the non-transformed data used for the position determination neural network. Recently wavelet transforms have also been considered as a preprocessor.

Above, under the subject of dynamic out-of-position, it was discussed that the position of the occupant can be used as a preprocessing filter to determine the quality of the data in a particular vector. This technique can also be used in general as a method to improve the quality of a vector of data based on the previous positions of the occupant. This technique can also be expanded to help differentiate live objects in the vehicle from inanimate objects. For example, a forward facing human will change his position frequently during the travel of the vehicle whereas a box will tend to show considerably less motion. This is also useful, for example, in differentiating a small human from an empty seat. The motion of a seat containing a small human will be significantly different from that of an empty seat even though the particular vector may not show significant differences. That is, a vector formed from the differences from two successive vectors is indicative of motion and thus of a live occupant.

Preprocessing can also be used to prune input data points. If each receiving array of assemblies, 49, 50, 51, and 54 for example (FIG. 8A), contains a matrix of 100 by 100 pixels, then 40,000 (4×100×100) pixels or data elements of information will be created each time the system interrogates the driver seat, for example. There are many pixels of each image that can be eliminated as containing no useful information. This typically includes the corner pixels, back of the seat and other areas where an occupant cannot reside. This pixel pruning can typically reduce the number of pixels by up to 50 percent resulting in approximately 20,000 remaining pixels. The output from each array is then compared with a series of stored arrays representing different unoccupied positions of the seat, seatback, steering wheel etc. For each array, each of the stored arrays is subtracted from the acquired array and the results analyzed to determine which subtraction resulted in the best match. The best match is determined by such things as the total number of pixels reduced below the threshold level, or the minimum number of remaining detached pixels, etc. Once this operation is completed for all four images, the position of the movable elements within the passenger compartment has been determined. This includes the steering wheel angle, telescoping position, seatback angle, headrest position, and seat position. This information can be used elsewhere by other vehicle systems to eliminate sensors that are currently being used to sense such positions of these components. Alternately, the sensors that are currently on the vehicle for sensing these component positions can be used to simplify processes described above. Each receiving array may also be a 256×256 CMOS pixel array as described in the paper by C. Sodini et al. referenced above greatly increasing the need for an efficient pruning process.

An alternate technique of differentiating between the occupant and the vehicle is to use motion. If the images of the passenger seat are compared over time, reflections from fixed objects will remain static whereas reflections from vehicle occupants will move. This movement can be used to differentiate the occupant from the background.

Following the subtraction process described above, each image now consists of typically as many as 50 percent fewer pixels leaving a total of approximately 10,000 pixels remaining, for the 4 array 100×100 pixel case. The resolution of the images in each array can now be reduced by combining adjacent pixels and averaging the pixel values. This results in a reduction to a total pixel count of approximately 1000. The matrices of information that contains the pixel values is now normalized to place the information in a location in the matrix which is independent of the seat position. The resulting normalized matrix of 1000 pixel values can now be used as input into an artificial neural network and represents the occupancy of the seat independent of the position of the occupant. This is a brut force method and better methods based on edge detection and feature extraction can greatly simplify this process as discussed below.

There are many mathematical techniques that can be applied to simplify the above process. One technique used in military pattern recognition, as mentioned above, uses the Fourier transform of particular areas in an image to match with known Fourier transforms of known images. In this manner, the identification and location can be determined simultaneously. There is even a technique used for target identification whereby the Fourier transforms are compared optically as mentioned elsewhere herein. Other techniques utilize thresholding to limit the pixels that will be analyzed by any of these processes. Other techniques search for particular features and extract those features and concentrate merely on the location of certain of these features. (See for example the Kage et al. artificial retina publication referenced above.)

Generally, however as mentioned, the pixel values are not directly fed into a pattern recognition system but rather the image is preprocessed through a variety of feature extraction techniques such as an edge detection algorithm. Once the edges are determined, a vector is created containing the location of the edges and their orientation and that vector is fed into the neural network, for example, which performs the pattern recognition.

Another preprocessing technique that improves accuracy is to remove the fixed parts of the image, such as the seatback, leaving only the occupying object. This can be done many ways such as by subtracting one mage form another after the occupant has moved, as discussed above. Another is to eliminate pixels related to fixed parts of the image through knowledge of what pixels to removed based on seat position and previous empty seat analysis. Other techniques are also possible. Once the occupant has been isolated then those pixels remaining can be placed in a particular position in the neural network vector. This is akin to the fact that a human, for example, will always move his or her eyes so as to place the object under observation into the center of the field of view, which is a small percent of the total field of view. In this manner the same limited number in pixels always observe the image of the occupying item thereby removing a significant variable and greatly improving system accuracy. The position of the occupant than can be determined by the displacement required to put the image into the appropriate part of the vector.

10.7 Post Processing

Once the pattern recognition system has been applied to the preprocessed data, one or more decisions are available as output. The output from the pattern recognition system is usually based on a snapshot of the output of the various transducers unless a combination neural network with feedback was used. Thus, it represents one epoch or time period. The accuracy of such a decision can usually be substantially improved if previous decisions from the pattern recognition system are also considered. In the simplest form, which is typically used for the occupancy identification stage, the results of many decisions are averaged together and the resulting averaged decision is chosen as the correct decision. Once again, however, the situation is quite different for dynamic out-of-position occupants. The position of the occupant must be known at that particular epoch and cannot be averaged with his previous position. On the other hand, there is information in the previous positions that can be used to improve the accuracy of the current decision. For example, if the new decision says that the occupant has moved six inches since the previous decision, and, from physics, it is known that this could not possibly take place, then a better estimate of the current occupant position can be made by extrapolating from earlier positions. Alternately, an occupancy position versus time curve can be fitted using a variety of techniques such as the least squares regression method, to the data from previous 10 epochs, for example. This same type of analysis could also be applied to the vector itself rather than to the final decision thereby correcting the data prior to entry into the pattern recognition system. An alternate method is to train a module of a modular neural network to predict the position of the occupant based on feedback from previous results of the module.

Summarizing, when an occupant is sitting in the vehicle during normal vehicle operation, the determination of the occupancy state can be substantially improved by using successive observations over a period of time. This can either be accomplished by averaging the data prior to insertion into a neural network, or alternately the decision of the neural network can be averaged. This is known as the categorization phase of the process. During categorization, the occupancy state of the vehicle is determined. Is the vehicle occupied by the forward facing human, an empty seat, a rear facing child seat, or an out-of-position human? Typically many seconds of data can be accumulated to make the categorization decision. For non-automotive vehicles this categorization process may be the only process that is required. Is the container occupied or is it empty? If occupied is there a human or other life form present? Is there a hazardous chemical or a source of radioactivity present etc.?

When a driver senses an impending crash, he or she will typically slam on the brakes to try to slow vehicle prior to impact. If an occupant, particularly the passenger, is unbelted, he or she will begin moving toward the airbag during this panic braking. For the purposes of determining the position of the occupant, there is not sufficient time to average data as in the case of categorization. One method is to determine the location of the occupant using the neural network based on previous training. The motion of the occupant can then be compared to a maximum likelihood position based on the position estimate of the occupant at previous vectors. Thus, for example, perhaps the existence of thermal gradients in the vehicle caused an error in the current vector leading to a calculation that the occupant has moved 12 inches since the previous vector. Since this could be a physically impossible move during ten milliseconds, the measured position of the occupant can be corrected based on his previous positions and known velocity. Naturally, if an accelerometer is present in the vehicle and if the acceleration data is available for this calculation, a much higher accuracy prediction can be made. Thus, there is information in the data in previous vectors as well as in the positions of the occupant determined from the latest data that can be used to correct erroneous data in the current vector and, therefore, in a manner not too dissimilar from the averaging method for categorization, the position accuracy of the occupant can be known with higher accuracy.

Post processing can use a comparison of the results at each time interval along with a test of reasonableness to remove erroneous results. Also averaging through a variety of techniques can improve the stability of the output results. Thus the output of a combination neural network is not necessarily the final decision of the system.

One principal used in a preferred implementation of at least one invention herein is to use images of different views of the occupant to correlate with known images that were used to train a neural network for vehicle occupancy. Then carefully measured positions of the known images are used to locate particular parts of the occupant such as his or her head, chest, eyes, ears, mouth, etc. An alternate approach is to make a three-dimensional map of the occupant and to precisely locate these features using neural networks, sensor fusion, fuzzy logic or other pattern recognition techniques. One method of obtaining a three-dimensional map is to utilize a scanning laser radar system where the laser is operated in a pulse mode and the distance from the object being illuminated is determined using range gating in a manner similar to that described in various patents on micropower impulse radar to McEwan. (See, for example, U.S. Pat. No. 5,457,394 and U.S. Pat. No. 5,521,600) Naturally, many other methods of obtaining a 3D representation can be used as discussed in detail above. This post processing step allows the determination of occupant parts from the image once the object is classified as an occupant.

Many other post processing techniques are available as discussed elsewhere herein.

10.8 An Example of Image Processing

As an example of the above concepts, a description of a single imager optical occupant classification system will now be presented.

10.8.1 Image Preprocessing

A number of image preprocessing filters have been implemented, including noise reduction, contrast enhancement, edge detection, image down sampling and cropping, etc. and some of them will now be discussed.

The Gaussian filter, for example, is very effective in reducing noise in an image. The Laplacian filter can be used to detect edges in an image. The result from a Laplacian filter plus the original image produces an edge-enhanced image. Both the Gaussian filter and the Laplacian filter can be implemented efficiently when the image is scanned twice. The original Kirsch filter consists of 8 filters that detect edges of 8 different orientations. The max Kirsch filter, however, uses a single filter that detects (but does not distinguish) edges of all 8 different orientations.

The histogram-based contrast enhancement filter improves image contrast by stretching pixel grayscale values until a desired percentage of pixels are suppressed and/or saturated.

The wavelet-based enhancement filter modifies an image by performing multilevel wavelet decomposition and then applies a nonlinear transfer function to the detail coefficients. This filter reduces noise if the nonlinear transfer function suppresses the detail coefficients, and enhances the image if the nonlinear transfer function retains and increases the significant detail coefficients. A total of 54 wavelet functions from 7 families, for example, have been implemented.

Mathematical morphology has been proven to be a powerful tool for image processing (especially texture analysis). For example, the grayscale morphological filter that has been implemented by the current assignee includes the following operators: dilation, erosion, close, open, white top hat, black top hat, h-dome, and noise removal. The structure element is totally customizable. The implementation uses fast algorithms such as van Herk/Gil-Werman's dilation/erosion algorithm, and Luc Vincent's grayscale reconstruction algorithm.

Sometimes using binary images instead of grayscale images increases the system robustness. The binarization filter provides 3 different ways to convert a grayscale image into a binary image: 1) using a constant threshold; 2) specifying a white pixel percentage; 3) Otsu's minimum deviation method. The image down-size filter performs image down-sampling and image cropping. This filter is useful for removing unwanted background (but limited to preserving a rectangular region). Image down-sampling is also useful because our experiments show that, given the current accuracy requirement, using a lower resolution image for occupant position detection does not degrade the system performance, and is more computationally efficient.

Three other filters that were implemented provide maximum flexibility, but require more processing time. The generic in-frame filter implements almost all known and to be developed window-based image filters. It allows the user to specify a rectangular spatial window, and define a mathematical function of all the pixels within the window. This covers almost all well-known filters such as averaging, median, Gaussian, Laplacian, Prewit, Sobel, and Kirsch filters. The generic cross-frame filter implements almost all known and to be developed time-based filters for video streams. It allows the user to specify a temporal window, and define a mathematical function of all the frames within the window. The pixel transfer filter provides a flexible way to transform an image. A pixel value in the resulting image is a customizable function of the pixel coordinates and the original pixel value. The pixel transfer filter is useful in removing unwanted regions with irregular shapes.

FIG. 41 shows some examples of the preprocessing filters that have been implemented. FIG. 41(1) shows the original image. FIG. 41(2) shows the result from a histogram-based contrast enhancement filter. FIG. 41(3) shows the fading effect generated using a pixel transfer filter where the transfer function is defined as $\frac{1}{14}z^{1.5}e^{-0.0001[(x-60)^2+(y-96)^2]}$. FIG. 41(4) shows the result from a morphological filter followed by a histogram-based contrast enhancement filter. The h-dome operator was used with the dome height=128. One can see that the h-dome operator preserves bright regions and regions that contain significant changes, and suppresses dark and flat regions. FIG. 41(5) shows the edges detected using a Laplacian filter. FIG. 41(6) shows the result from a Gaussian filter followed by a max Kirsch filter, a binarization filter that uses Otsu's method, and a morphological erosion that uses a 3×3 flat structure element.

10.8.2 Feature Extraction Algorithm

The image size in the current classification system is 320× 240, i.e. 76,800 pixels, which is too large for the neural network to handle. In order to reduce the amount of the data while retaining most of the important information, a good feature extraction algorithm is needed. One of the algorithms that was developed includes three steps:

1) Divide the whole image into small rectangular blocks.
2) Calculate a few feature values from each block.
3) Line up the feature values calculated from individual blocks and then apply normalization.

By dividing the image into blocks, the amount of the data is effectively reduced while most of the spatial information is preserved.

Figure 42:
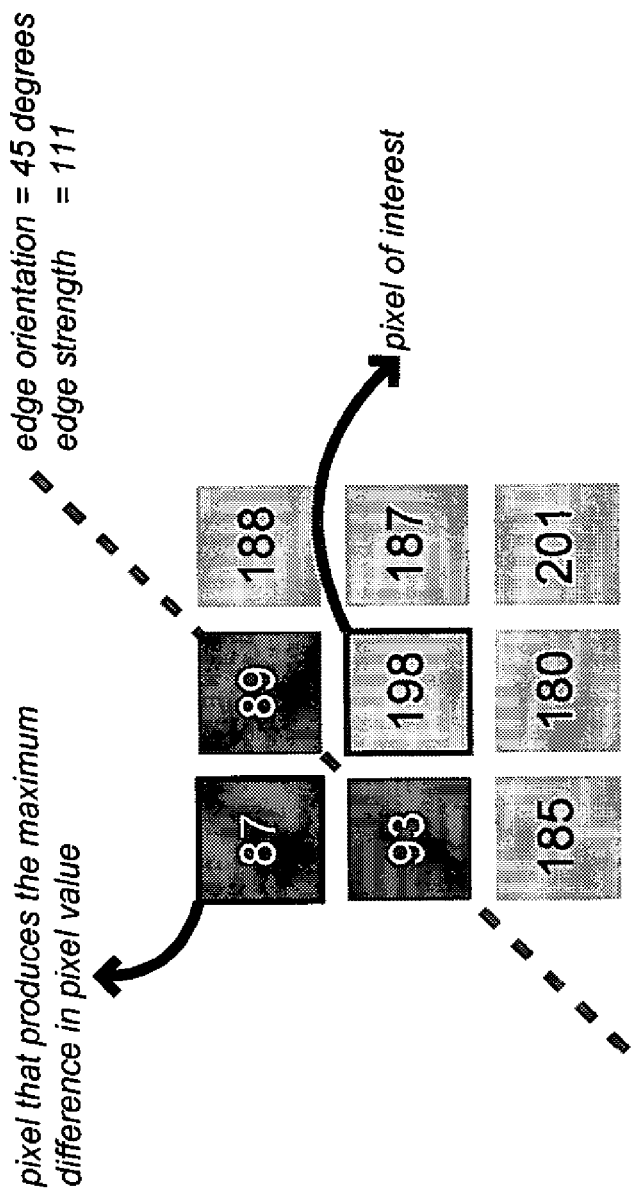
FIG. 42 shows single camera optical examples explaining the use of edge strength and edge orientation.

This algorithm was derived from a well-known algorithm that has been used in applications such as handwriting recognition. For most of the document related applications, binary images are usually used. Studies have shown that the numbers of the edges of different orientations in a block are very effective feature values for handwriting recognition. For our application where grayscale images are used, the count of the edges can be replaced by the sum of the edge strengths that are defined as the largest differences between the neighboring pixels. The orientation of an edge is determined by the neighboring pixel that produces the largest difference between itself and the pixel of interest (see FIG. 42).

Figure 43:
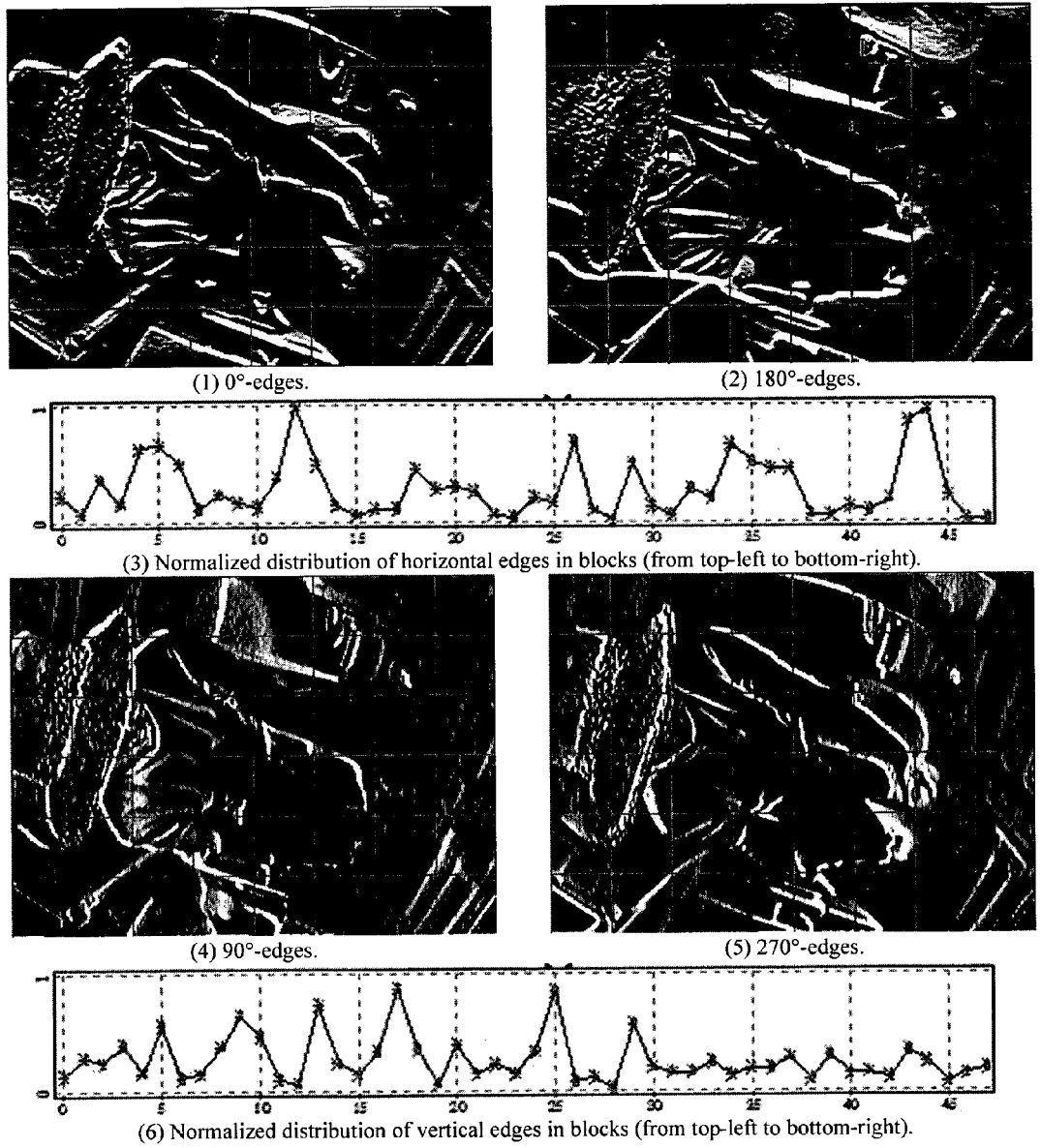
FIG. 43 shows single camera optical examples explaining the use of feature vector generated from distribution of horizontal/vertical edges.
Figure 44:
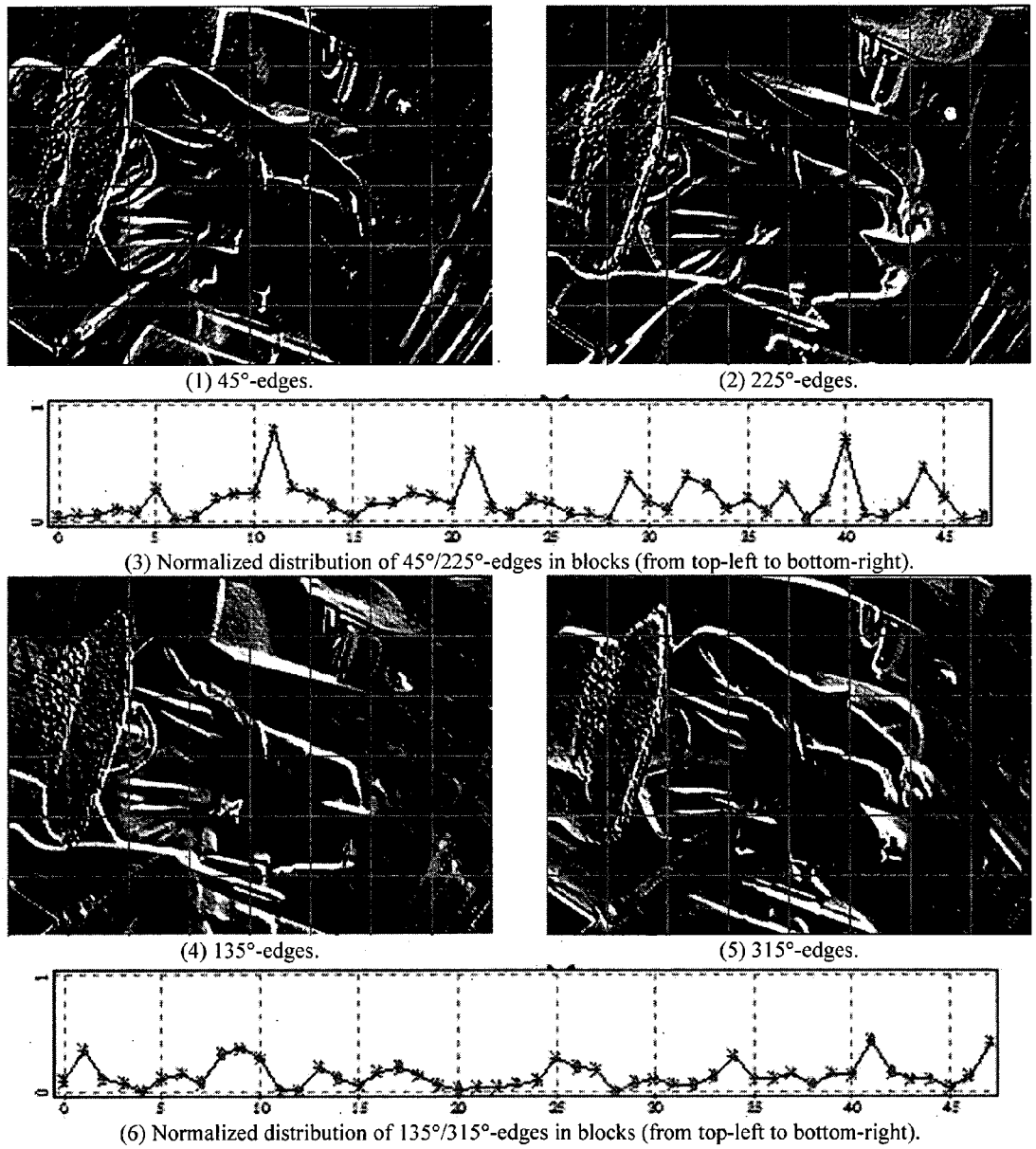
FIG. 44 shows single camera optical example explaining the use of feature vector generated from distribution of tilted edges.

FIGS. 43 and 44 show the edges of eight different orientations that are detected using Kirsch filters. The feature values that are calculated from these edges are also shown. Besides Kirsch filters, other edge detection methods such as Prewit and Sobel filters were also implemented.

Besides the edges, other information can also be used as the feature values. FIG. 45 shows the feature values calculated from the block-average intensities and deviations. Our studies show that the deviation feature is less effective than the edge and the intensity features.

The edge detection techniques are usually very effective for finding sharp (or abrupt) edges. But for blunt (or rounded) edges, most of the techniques are not effective at all. These kinds of edges also contain useful information for classification. In order to utilize such information, a multi-scale feature extraction technique was developed. In other words, after the feature extraction algorithm was applied to the image of the original size, a 50% down-sampling was done and the same feature extraction algorithm (with the same block size) was applied to the image of reduced size. If it is desired to find even blunter edges, this technique can be applied again to the down-sampled image.

10.8.3 Modular Neural Network Architecture

The camera based optical occupant classification system described here was designed to be a standalone system whose only input is the image from the camera. Once an image is converted into a feature vector, the classification decision can be made using any pattern recognition technique. A vast amount of evidence in literature shows that a neural network technique is particularly effective in image based pattern recognition applications.

In this application the patterns of the feature vectors are extremely complex. FIG. 46 shows a list of things that may affect the image data and therefore the feature vector. Considering all the combinations, there could be an infinite number of patterns. For a complex system like this, it would be almost impossible to train a single neural network to handle all the possible scenarios. Our studies have shown that by dividing a large task into many small subtasks, a modular approach is extremely effective with such complex systems.

As a first step the problem can be divided into an ambient light (or daytime) condition and a low-light (or nighttime) condition, each of which can be handled by a subsystem (see FIG. 47). Under low-light condition, the center of the view is illuminated by near infrared LEDs. The background (including the floor, the backseats, and the scene outside the window) is virtually invisible, which makes classification somewhat easier. Classification is more difficult under the ambient light condition because the background is illuminated by sunlight, and sometimes the bright sunlight projects sharp shadows onto the seat, which creates patterns in the feature vectors.

Based on the classification requirement, each subsystem can be implemented using a modular neural network architecture that consists of multiple neural networks. FIG. 48 shows two modular architectures that both consist of three neural networks. In FIG. 48(1), the three neural networks are connected in a cascade fashion. This architecture was based on the following facts that were observed:

1) Separating empty-seat (ES) patterns from all other patterns is much easier than isolating any other patterns;
2) After removing ES patterns, isolating the patterns of infant carriers and rearward-facing child seats (RFCS) is relatively easier than isolating the patterns of adult passengers.

In this architecture, the "empty-seat" neural network identifies ES from all classes, and it has to be trained with all data; the "infant" neural network identifies infant carrier and rearward-facing child seat, and it is trained with all data except the ES data; and the "adult" neural network is trained with the adult data against the data of child, booster seat, and forward-facing child seat (FFCS). Since isolating the patterns of adult passengers is the most difficult task here, training the "adult" neural network with fewer patterns improves the success rate.

The architecture in FIG. 48(2) is similar to FIG. 48(1) except that the "infant" neural network and the "dult" neural network run in parallel. As a result, the output from this architecture has an extra "undetermined" state. The advantage of this architecture is that a misclassification between adult and infant/RFCS happens only if both the "infant" and "adult" neural networks fail at the same time. The disadvantage is that the success rates of individual classes (except ES) are slightly lower. In this architecture, both the "infant" and "adult" neural networks must be trained with the similar data patterns.

Figure 49:
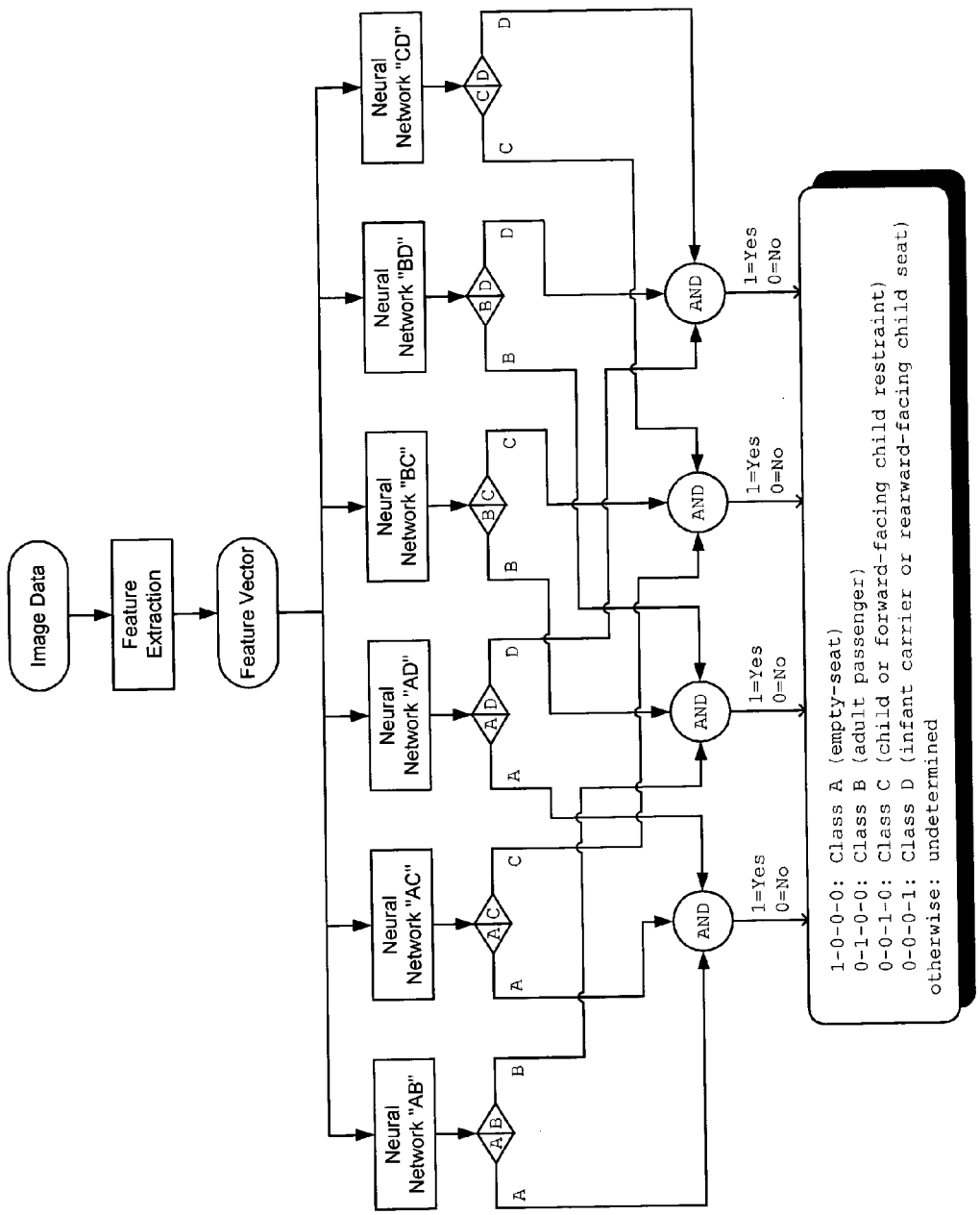
FIG. 49 is a flow chart of a modular subsystem consisting of 6 neural networks.

The architecture in FIG. 49 is more symmetrical. Although it is designed for classification among four different classes, it can be generalized to classify more classes. This architecture consists of six neural networks. Each neural network is trained to separate two classes, and it is trained with the data from these two classes only. Therefore high success rates can be expected from all six neural networks. This architecture has two unique characteristics:

1) Since the outputs of all the six neural networks can be considered as binary, there are 64 possible output combinations, but only 32 of them are valid. For an untrained data pattern, it is very likely that the output combination is invalid. This is very important. Given an input data pattern, most of the neural network systems are able to tell you "what I think it is", but they are not able to tell you "I haven't seen it before and I don't know what it is". With this architecture, most of the "never seen" data can be easily identified and processed accordingly.

2) From FIG. 49, it can be seen that, for a class A data pattern to be misclassified as class B, the trained neural network "AB", and the untrained neural networks "BC" and "BD"—all three of them—have to vote for class B. Given a fairly good training data set, the chance for that to happen should be very small. The chance for a misclassification can be made even smaller by using tighter thresholds. Assume that the neural network "AB" uses sigmoid transfer function, so its output is always between 0 and 1. Usually, an input data pattern is classified as class A if the output is below 0.5, and as class B otherwise. "Using tighter thresholds" means that an input data pattern is allowed to be classified as class A only if the output is below 0.4, as class B only if the output is above 0.6, and as undetermined if the output is between 0.4 and 0.6.

Figures 50, 51:
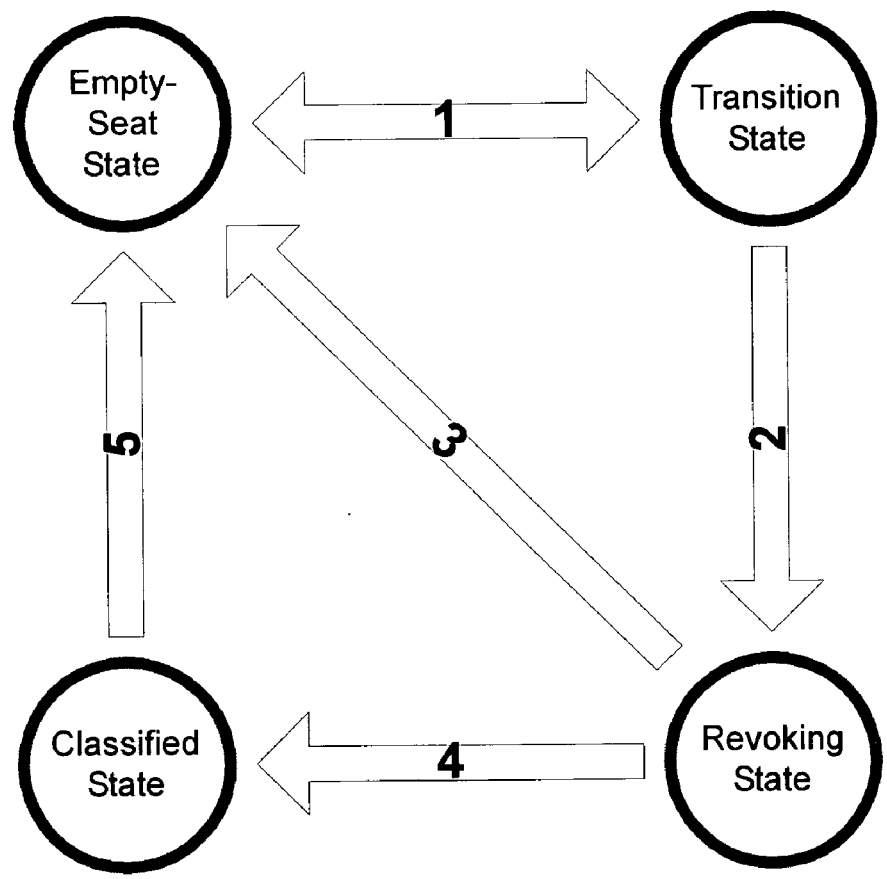
FIG. 50 is a table of post-processing filters implemented in the invention.
FIG. 51 is a flow chart of a decision-locking mechanism implemented using four internal states.

10.8.4 Post Neural Network Processing
10.8.4.1 Post-Processing Filters The simplest way to utilize the temporal information is to use the fact that the data pattern always changes continuously. Since the input to the neural networks is continuous, the output from the neural networks should also be continuous. Based on this idea, post-processing filters can be used to eliminate the random fluctuations in the neural network output. FIG. 50 shows a list of four of the many post-processing filters that have been implemented so far.

The generic digital filter covers almost all window-based FIR and IIR filters, which include averaging, exponential, Butterworth, Chebyshev, Elliptic, Kaiser window, and all other windowing functions such as Barlett, Hanning, Hamming, and Blackman. The output from a generic digital filter can be written as, $$y(n) = \frac{B_0 x(n) + B_1 x(n-1) + \ldots + B_M x(n-M)}{A_1 y(n-1) + A_2 y(n-2) + \ldots + A_N y(n-N)}$$

where x(n) and y(n) are current input and output respectively, and x(n−i) and y(n−j) are the previous input and output respectively. The characteristics of the filter are determined by the coefficients $B_i$ and $A_j$.

The Kalman filter algorithm can be summarized by the following group of equations:

$$\begin{cases} x^-_{k+1} = \Phi_{k+1} x_k & \text{(state extrapolation)} \\ P^-_{k+1} = \Phi_{k+1} P_k \Phi^T_{k+1} + Q_k & \text{(covarianve extrapolation)} \\ K_{k+1} = P^-_{k+1} H^T_{k+1} (H_{k+1} P^-_{k+1} H^T_{k+1} + R_{k+1})^{-1} & \text{(Kalman gain computation)} \\ x_{k+1} = x^-_{k+1} + K_{k+1}(z_{k+1} - H_{k+1} x^-_{k+1}) & \text{(state update)} \\ P_{k+1} = P^-_{k+1} - K_{k+1} H_{k+1} P^-_{k+1} & \text{(covarianve update)} \end{cases}$$

where x is the state vector, $\Phi$ is the state transition matrix, P is the filter error covariance matrix, Q is the process noise covariance matrix, R is the measurement noise covarianve matrix, H is the observation matrix, z is the observation vector, and $x^-$, $P^-$ and K are intermediate variables. The subscript k indicates that a variable is at time k. Given the initial conditions ($x_0$ and $P_0$), the Kalman filter gives the optimal estimate of the state vector as each new observation becomes available. The Kalman filter implemented here is a simplified version, where a linear AR(p) time series model is used. All the noise covariance matrices (Q and R) are assumed to be identity matrices multiplied by constants. The observation matrix H=(1 0 . . . 0). The state $$\text{transition matrix } \Phi = \begin{pmatrix} \phi_1 & \phi_2 & \phi_3 & \cdots & \phi_{p-1} & \phi_p \\ 1 & 0 & 0 & \cdots & 0 & 0 \\ 0 & 1 & 0 & \cdots & 0 & 0 \\ 0 & 0 & 1 & \cdots & 0 & 0 \\ \cdots & \cdots & \cdots & \cdots & \cdots & \cdots \\ 0 & 0 & 0 & \cdots & 1 & 0 \end{pmatrix},$$

where $\phi_i$ are parameters of the system.

The Median filter is a simple window-based filter that uses the median value within the window as the current output. ATI's post-decision filter is also a window-based filter. Basically it performs a weighted averaging, but the weight of a previous input depends on its "age" and its "locality" in the internal buffer.

Besides filtering, additional knowledge can be used to remove some of the undesired changes in the neural network output. For example, it is impossible to change from an adult passenger to a child restraint without going through an empty-seat state or key-off, and vice versa. Based on this idea, a decision-locking mechanism for eliminating undesired decision changes was implemented by introducing four internal system states (see FIG. 51). The definitions of the internal states are shown in FIG. 52, and the paths between the internal states are explained in FIG. 53. As can be seen, once the system stabilizes (i.e. enters classified state), any direct change between two non-empty-seat classes is prohibited.

The decision locking mechanism can operate in a variety of ways to minimize unintended changes in the occupancy decision. In one method, the occupancy decision is cleared when there is an event such as the opening of a door, the turning on the ignition, the motion of the vehicle indicative of the vehicle being driven, or some similar event. Once the decision is cleared, a default occupancy decision, usually meaning enable the airbag at least in the depowered state, is used until there is a significant over time stable decision at which time the new decision is locked until either the decision is again cleared or there is an overwhelming sequence of data that indicates that the occupancy has changed. For example, the decision could move off of the default decision if 100 decisions in a row indicated that a rear facing infant seat was present. At 10 milliseconds per decision this would mean about 1 second of data. Once this occurred then the count of consecutive rear facing infant seat decisions could be kept and in order for the decision to change that number of consecutive changed decisions would have to occur. Thus, until the decision function was reset, it would be difficult, but not impossible, to change the decision. This is a simplistic example of such a decision function but serves to illustrate the concept. Naturally an infinite number of similar functions can now be implemented by those skilled in the art. The use of any such decision function that locks the decision to prevent toggling, or for any other similar purpose is within the scope of these inventions. One further comment, the motion of the vehicle indicating that the locking process should commence can be accomplished by an accelerometer or other motion sensor or by a magnetic flux sensor thereby making it unnecessary to connect to other vehicle systems that may not have sufficient reliability.

The decision-locking mechanism is the first use of such a mechanism in the vehicle monitoring art. In U.S. patent publication No. 2003/0168895 referenced-above, the time that a vehicle seat is in a given weight state alone with a door switch and seatbelt switch is used in a somewhat similar manner except that once the decision is made, it remains until the door is opened or the seatbelt in unfastened, as best as can be discerned from the description. This is quite different from the general use of the time that a seat is in a given state to lock the decision until there is a significant time period where the state has changed, as disclosed herein.

10.8.5 Data Collection and Neural Network Training
10.8.5.1 Nighttime Subsystem The data collection on the night subsystem was done inside a building where the illumination from outside the vehicle can be filtered out using a near-infrared filter. The initial data set consisted of 364,000 images. After evaluating the subsystem trained with the initial data set, an additional data set (all from child restraints) consisting of 58,000 images was collected.

Later a third data set (for boosting adult and dummy) was collected consisting of 150,750 images. Combining the three data sets together, the data distribution is shown in FIG. 54.

The night subsystem used the 3-network architecture shown in FIG. 48(2). The performance of the latest neural networks is shown in FIG. 55. Only a small portion of the data was used in training these three neural networks: for "infant" network and "adult" network, less than 44% of the data was used; for "empty-seat" network, only about 16% of the data was used. According to our experiences, given a complex data set like this one, a balanced training becomes very difficult to achieve once the data entries used in the training exceed 250,000. The success rates in Table 6, however, were obtained by testing these neural networks against the entire data set. The performance of the whole modular subsystem is shown in FIG. 56. A Gaussian filter was used for image preprocessing, the selected image features included pixel intensity and the edges detected using Sobel filters, and the features were calculated using 40×40 blocks.

10.8.5.2 Daytime Subsystem

The data collection on the daytime subsystem consisted of 195,000 images, and the data distribution is shown in FIG. 57. This is the first daytime subsystem that the assignee considered, and the data set collected was not complete. All images in this data set were collected under sunny condition with the same vehicle orientation.

The data collection on daytime subsystem should be more complex because different sunlight conditions have to be considered. The matrix covers both sunny conditions and overcast conditions. For sunny condition, a schedule was created to cover all sunlight conditions corresponding to different times of the day. The vehicle configuration (including seat track, seat recline, passenger window, sun visor, center console, and vehicle orientation) is set randomly in order to provide a flat distribution.

The day subsystem used a neural network architecture simpler than the ones shown in FIG. 48. This architecture includes two neural networks: the "empty-seat" network and the "adult" network. This subsystem did not separate infant carrier and rearward-facing child seat from child and forward-facing child restraint. The performance of the neural networks is shown in FIG. 58, and the performance of the whole modular subsystem is shown in FIG. 59.

For this daytime subsystem, a Gaussian filter was used for image preprocessing, and the selected image feature included only the edges detected using Prewit filters, and the features were calculated using 30×30 blocks.

For this daytime subsystem, the back seat was clearly visible since the background was illuminated by the sunlight. The initial training results showed that the classification of child restraints was mistakenly associated with the presence of the operator in the back seat because the operator was moving the child restraint from the back seat during data collection. The classification of child restraints failed when the back seat was empty. This problem was solved by removing that particular region (about 80 pixel wide) from the image.

The accuracies reported in the above tables are based on single images and when the post processing steps are included the overall system accuracy approaches 100% and is a substantial improvement over previous systems.

10.8.6 Conclusions and Discussions

The symmetrical neural network architecture shown in FIG. 49 was developed after the system reported here. The results prove that this architecture gives better performance than the other architectures. With this architecture, it is possible to reduce misclassifications by replacing the weak classifications with "undetermined" states. More importantly, this architecture provides a way to identify "unseen" patterns.

Figure 60:
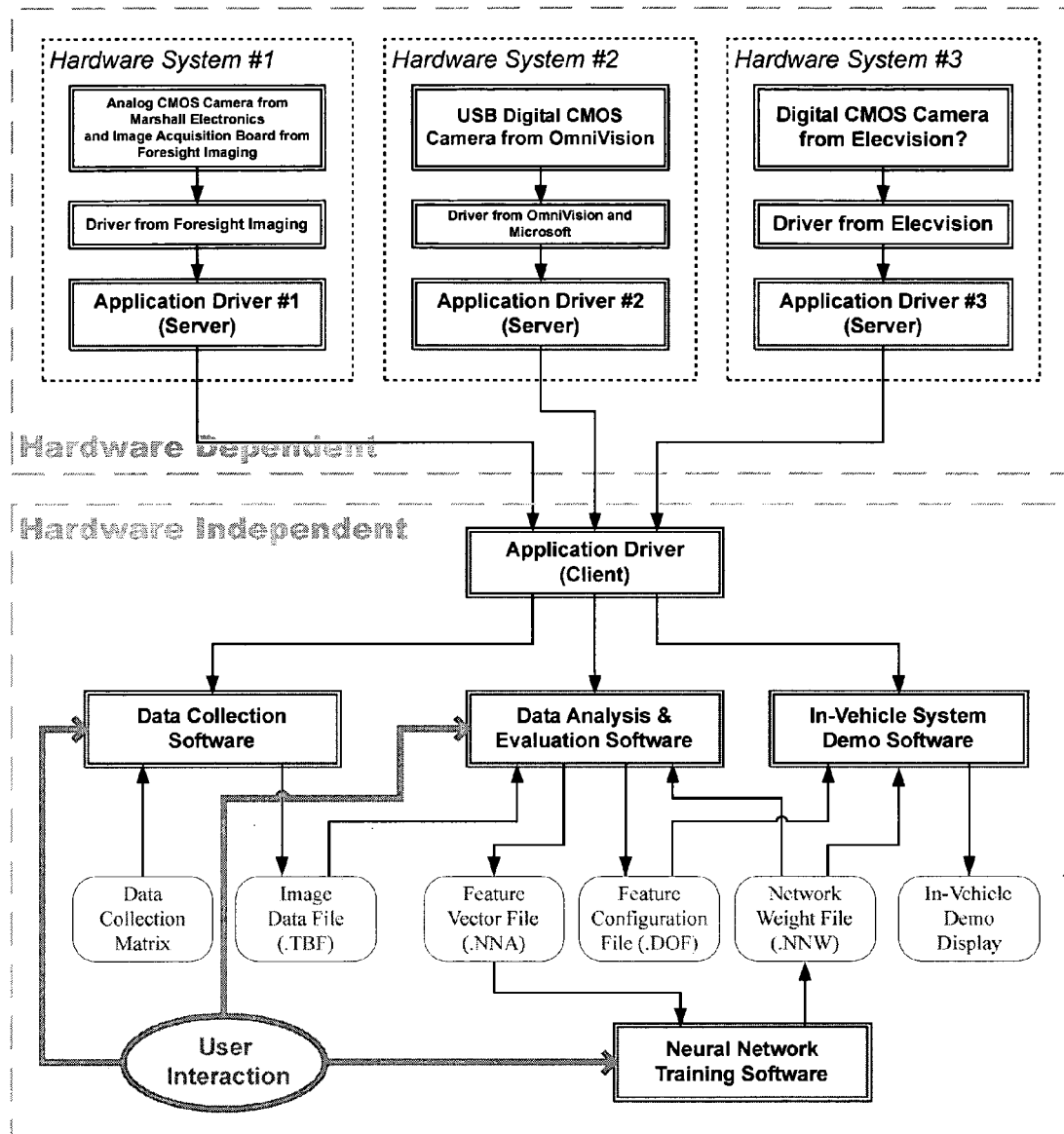
FIG. 60 is a flow chart of the software components for system development.

The development of an optical occupant sensing system requires many software tools whose functionalities include: communication with hardware, assisting data collection, analyzing and converting data, training modular neural networks, evaluating and demonstrating system performance, and evaluating new algorithms. The major software components are shown in FIG. 60 where the components in red boxes are developed by assignee.

It is important to note that the classification accuracies reported here are based on single images and when the post processing steps are included the overall system accuracy approaches 100%. This is a substantial improvement over previous systems even thought it is based on a single camera. Although this system is capable of dynamic tracking, some additional improvement can be obtained through the addition of a second camera. Nevertheless, the system as described herein is cost competitive with a weight only system and substantially more accurate. This system is now ready for commercialization where the prototype system described herein is made ready for high volume serial production.

11. Optical Correlators

A great deal of effort has been ongoing to develop fast optical pattern recognition systems to allow military vehicles such as helicopters to locate all of the enemy vehicles in a field of view. Some of the systems that have been developed are called optical correlation systems and have the property that the identification and categorization of various objects in the field of view happens very rapidly. A helicopter, for example coming onto a scene with multiple tanks and personnel carriers in a wide variety of poses and somewhat camouflaged can locate, identify and count all such vehicles in a fraction of a second. The cost of these systems has been prohibitively expensive for their use in automobiles for occupant tracking or for collision avoidance but this is changing.

Theoretically system performance is simple. The advantage of optical correlation approach is that correlation function is calculated almost instantly, much faster that with microprocessors and neural networks, for example. In simplest case, one looks for correlation of an input image with reference samples. The sample which has the largest correlation peak is assumed as a match. In practice, the system is based on a training set of reference samples. Special filters are constructed for correlation with input image. Filters are used in order to reduce number of correlations to calculate. The output of the filters, the result of the correlation, is frequently a set of features. Finally the features are fed into a classifier for decision making. This classifier can use Neural Networks.

The main bottleneck of optical correlators is large number of filters, or reference image samples, that are required. For example, if it is requirement to detect 10 different types of objects at different orientation, scale and illumination conditions, every modification factor enlarges number of filters for feature selection or correlation by factor of approximately 10. So, in a real system one may have to input 10,000 filters or reference images. Most correlators are able to find correlation of an input image with about of 5–20 filters during single correlation cycle. In other words the reference image contains 5–20 filt Therefore during decision making cycle one needs to feed into correlator and find correlation with approximately 1000 filters.

If the problem is broken down, as was done with modular neural networks, then the classification stage may take on the order of a second while the tracking stage can be done perhaps in a millisecond.

U.S. Pat. No. 5,473,466 and U.S. Pat. No. 5,051,738 describe a miniature high resolution display system for use with heads up di installation into the helmets of fighter pilots. This system, which is based on a thin garnet crystal, requires very little power and maintains a particular display until display is changed. Thus, for example, if there is a loss of power the display will retain the image that was last displayed. This technology has the capability of producing a very small heads up display unit as will be described more detail below. This technology has also been used as a spatial light monitor for pattern recognition based on optical correlation. Although this technology has been applied to military helicopters, it has previously not been used for occupant sensing, collision avoidance, anticipatory sensing, blind spot monitoring or any other ground vehicle application.

Although the invention described herein is not limited to a particular spatial light monitor (SLM) technology, the preferred or best mode technology is to use the garnet crystal system described U.S. Pat. No. 5,473,466. Although the system has never been applied to automobiles, it has significant advantages over other systems particularly in the resolution and optical intensity areas. The resolution of the garnet crystals as manufactured by Revtek is approximately 600 by 600 pixels. The size of the crystal is typically 1 cm square.

Basically, the optical correlation pattern recognition system works as follows. Stored in a computer are many Fourier transforms of images of objects that the system should identify. For collision avoidance, these include cars, trucks, deer or other animals, pedestrians, motorcycles, bicycles, or any other objects that could occur on a roadway. For an interior monitoring, these objects could include faces (particularly ones that are authorized to operate the vehicle), eyes, ears, child seats, children, adults of all sizes etc. The image from the scene that is captured by the lens is fed through a diffraction grating that optically creates the Fourier transform of the scene and projects it through SLM such as the garnet crystal of the '466 patent. The SLM is simultaneously fed and displays the Fourier stored transforms and a camera looks at the light that comes through the SLM. If there is a match then the camera sees a spike that locates the matching objects in the scene, there can be many such objects, all are found. The main advantage of this system over neural network pattern recognition systems is speed since it is all done optically and in parallel.

For collision avoidance, for example, many vehicles can be easily classified and tracked. For occupant sensing, the occupant's eyes can be tracked even if he is rapidly moving his head and the occupant herself can be tracked during a crash.

12. Other Products, Outputs, Features

Once the occupancy state of the seat (or seats) in the vehicle or of the vehicle itself, as in a cargo container, truck trailer or railroad car, is known, this information can be used to control or affect the operation of a significant number of vehicular systems, components and devices. That is, the systems, components and devices in the vehicle can be controlled and perhaps their operation optimized in consideration of the occupancy of the seat(s) in the vehicle or of the vehicle itself. Thus, the vehicle includes control means coupled to the processor means for controlling a component or device in the vehicle in consideration of the output indicative of the current occupancy state of the seat obtained from the processor means. The component or device can be an airbag system including at least one deployable airbag whereby the deployment of the airbag is suppressed, for example, if the seat is occupied by a rear-facing child seat, or otherwise the parameters of the deployment are controlled. Thus, the seated-state detecting unit described above may be used in a component adjustment system and method described below when the presence of a human being occupying the seat is detected. The component can also be a telematics system such as the Skybitz or OnStar systems where information about the occupancy state of the vehicle, or changes in that state, can be sent to a remote site.

The component adjustment system and methods in accordance with the invention can automatically and passively adjust the component based on the morphology of the occupant of the seat. As noted above, the adjustment system may include the seated-state detecting unit described above so that it will be activated if the seated-state detecting unit detects that an adult or child occupant is seated on the seat, that is, the adjustment system will not operate if the seat is occupied by a child seat, pet or inanimate objects. Obviously, the same system can be used for any seat in the vehicle including the driver seat and the passenger seat(s). This adjustment system may incorporate the same components as the seated-state detecting unit described above, that is, the same components may constitute a part of both the seated-state detecting unit and the adjustment system, for example, the weight measuring system.

The adjustment system described herein, although improved over the prior art, will at best be approximate since two people, even if they are identical in all other respects, may have a different preferred driving position or other preferred adjusted component location or orientation. A system that automatically adjusts the component, therefore, should learn from its errors. Thus, when a new occupant sits in the vehicle, for example, the system automatically estimates the best location of the component for that occupant and moves the component to that location, assuming it is not already at the best location. If the occupant changes the location, the system should remember that change and incorporate it into the adjustment the next time that person enters the vehicle and is seated in the same seat. Therefore, the system need not make a perfect selection the first time but it should remember the person and the position the component was in for that person. The system, therefore, makes one, two or three measurements of morphological characteristics of the occupant and then adjusts the component based on an algorithm. The occupant will correct the adjustment and the next time that the system measures the same measurements for those measurement characteristics, it will set the component to the corrected position. As such, preferred components for which the system in accordance with the invention is most useful are those which affect a driver of the vehicle and relate to the sensory abilities of the driver, i.e., the mirrors, the seat, the steering wheel and steering column and accelerator, clutch and brake pedals.

Thus, although the above description mentions that the airbag system can be controlled by the control circuitry 20 (FIG. 1), any vehicular system, component or subsystem can be controlled based on the information or data obtained by transmitter and/or receiver assemblies 6, 8, 9 and 10. Control circuitry 20 can be programmed or trained, if for example a neural network is used, to control heating an air-conditioning systems based on the presence of occupants in certain positions so as to optimize the climate control in the vehicle. The entertainment system can also be controlled to provide sound only to locations at which occupants are situated. There is no limit to the number and type of vehicular systems, components and subsystems that can be controlled using the analysis techniques described herein.

Furthermore, if multiple vehicular systems are to be controlled by control circuitry 20, then these systems can be controlled by the control circuitry 20 based on the status of particular components of the vehicle. For example, an indication of whether a key is in the ignition can be used to direct the control circuitry 20 to either control an airbag system (when the key is present in the ignition) or an antitheft system (when the key is not present in the ignition). Control circuitry 20 would thus be responsive to the status of the ignition of the motor vehicle to perform one of a plurality of different functions. More particularly, the pattern recognition algorithm, such as the neural network described herein, could itself be designed to perform in a different way depending on the status of a vehicular component such as the detected presence of a key in the ignition. It could provide one output to control an antitheft system when a key is not present and another output when a key is present using the same inputs from the transmitter and/or receiver assemblies 6, 8, 9 and 10.

The algorithm in control circuitry 20 can also be designed to determine the location of the occupant's eyes either directly or indirectly through a determination of the location of the occupant and an estimation of the position of the eyes therefrom. As such, the position of the rear view mirror 55 can be adjusted to optimize the driver's use thereof.

Once a characteristic of the object is obtained, it can be used for numerous purposes. For example, the processor can be programmed to control a reactive component, system or subsystem 103 in FIG. 24 based on the determined characteristic of the object. When the reactive component is an airbag assembly including one or more airbags, the processor can control one or more deployment parameters of the airbag(s).

Figure 31:
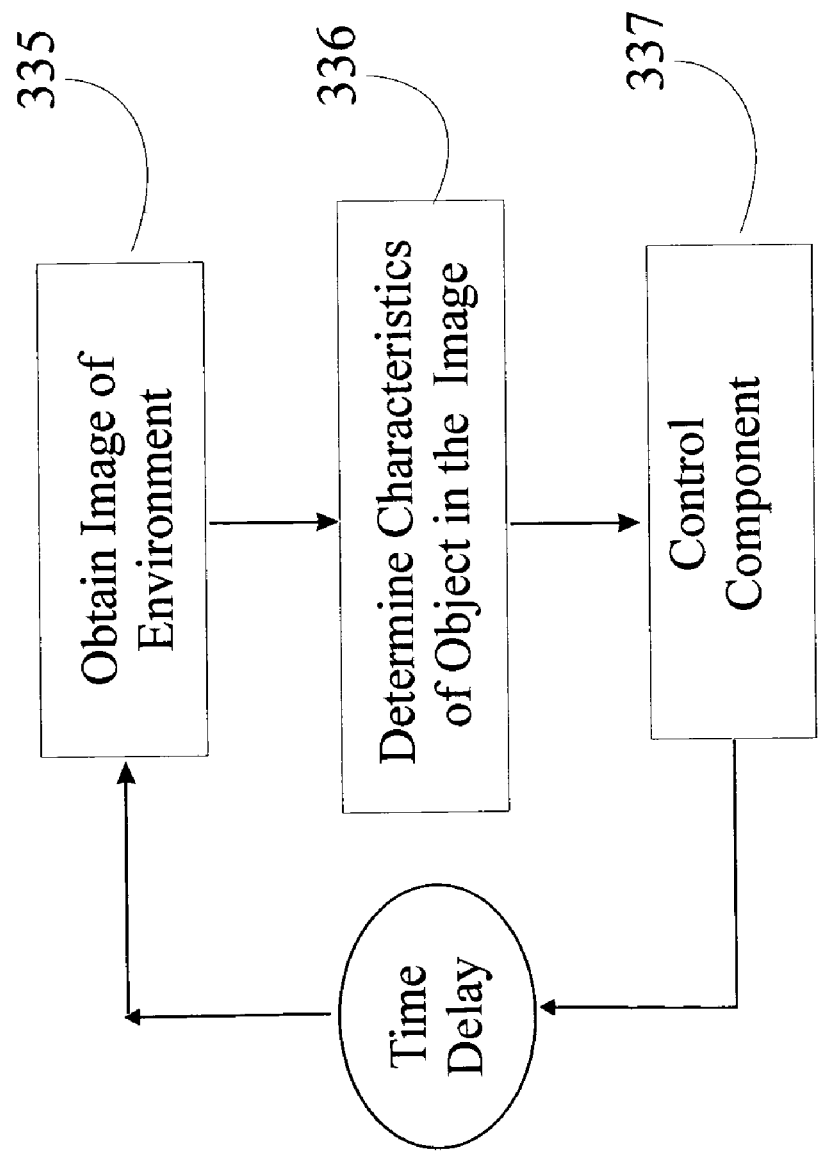
FIG. 31 is a flow chart of the environment monitoring in accordance with the invention.

The apparatus can operate in a manner as illustrated in FIG. 31 wherein as a first step 335, one or more images of the environment are obtained. One or more characteristics of objects in the images are determined at 336, using, for example, pattern recognition techniques, and then one or more components are controlled at 337 based on the determined characteristics. The process of obtaining and processing the images, or the processing of data derived from the images or data representative of the images, is periodically continued at least throughout the operation of the vehicle.

12.1 Control of Passive Restraints

The use of the vehicle interior monitoring system to control the deployment of an airbag is discussed in detail in U.S. Pat. No. 5,653,462 referenced above. In that case, the control is based on the use of a pattern recognition system, such as a neural network, to differentiate between the occupant and his extremities in order to provide an accurate determination of the position of the occupant relative to the airbag. If the occupant is sufficiently close to the airbag module that he is more likely to be injured by the deployment itself than by the accident, the deployment of the airbag is suppressed. This process is carried further by the interior monitoring system described herein in that the nature or identity of the object occupying the vehicle seat is used to contribute to the airbag deployment decision. FIG. 4 shows a side view illustrating schematically the interface between the vehicle interior monitoring system of at least one of the inventions disclosed herein and the vehicle airbag system 44. A similar system can be provided for the passenger as described in U.S. patent application Ser. No. 10/151,615 filed May 20, 2002.

In this embodiment, ultrasonic transducers 8 and 9 transmit bursts of ultrasonic waves that travel to the occupant where they are reflected back to transducers or receptors/receivers 8 and 9. The time period required for the waves to travel from the generator and return is used to determine the distance from the occupant to the airbag as described in the aforementioned U.S. Pat. No. 5,653,462, i.e., and thus may also be used to determine the position or location of the occupant. An optical imager based system would also be appropriate. In the invention, however, the portion of the return signal that represents the occupants' head or chest, has been determined based on pattern recognition techniques such as a neural network. The relative velocity of the occupant toward the airbag can then be determined, by Doppler principles or from successive position measurements, which permits a sufficiently accurate prediction of the time when the occupant would become proximate to the airbag. By comparing the occupant relative velocity to the integral of the crash deceleration pulse, a determination as to whether the occupant is being restrained by a seatbelt can also be made which then can affect the airbag deployment initiation decision. Alternately, the mere knowledge that the occupant has moved a distance that would not be possible if he were wearing a seatbelt gives information that he is not wearing one.

Another method of providing a significant improvement to the problem of determining the position of the occupant during vehicle deceleration is to input the vehicle deceleration directly into the occupant sensing system. This can be done through the use of the airbag crash sensor accelerometer or a dedicated accelerometer can be used. This deceleration or its integral can be entered directly into the neural network or can be integrated through an additional post-processing algorithm. Post processing in general is discussed in section 11.7. One significant advantage of neural networks is their ability to efficiently use information from any source. It is the ultimate "sensor fusion" system.

A more detailed discussion of this process and of the advantages of the various technologies, such as acoustic or electromagnetic, can be found in SAE paper 940527, "Vehicle Occupant Position Sensing" by Breed et al. In this paper, it is demonstrated that the time delay required for acoustic waves to travel to the occupant and return does not prevent the use of acoustics for position measurement of occupants during the crash event. For position measurement and for many pattern recognition applications, ultrasonics is the preferred technology due to the lack of adverse health effects and the low cost of ultrasonic systems compared with either camera, laser or radar based systems. This situation has changed, however, as the cost of imagers has come down. The main limiting feature of ultrasonics is the wavelength, which places a limitation on the size of features that can be discerned. Optical systems, for example, are required when the identification of particular individuals is desired.

Figure 32:
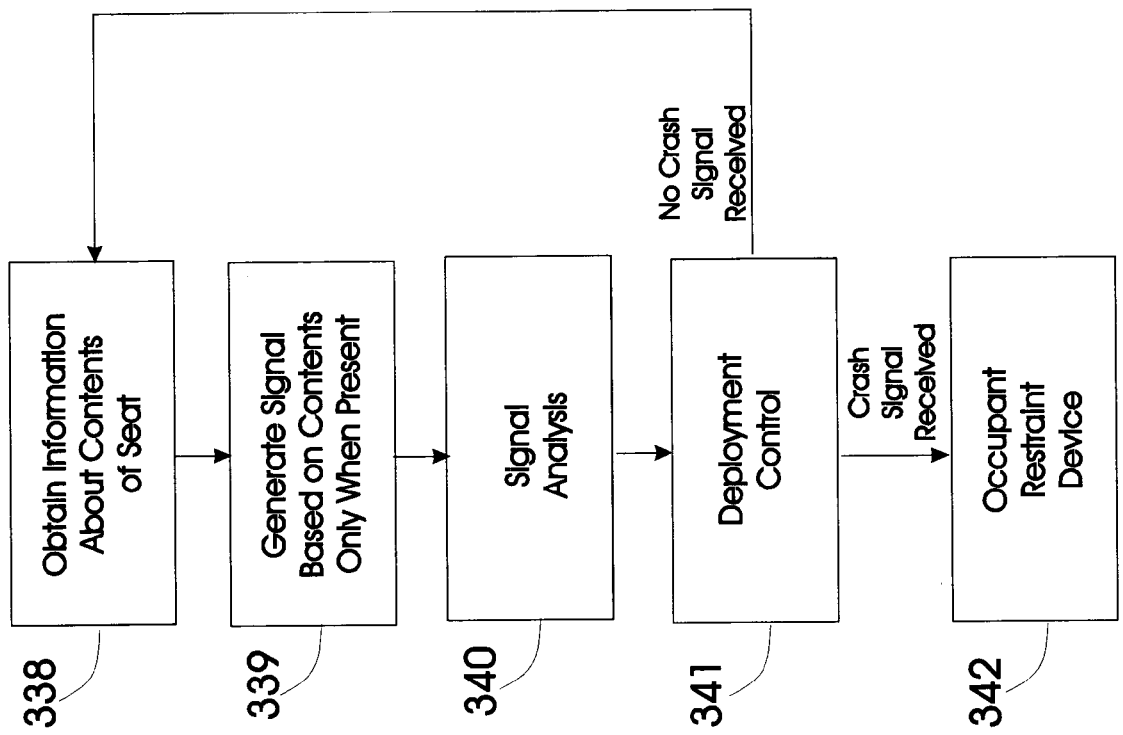
FIG. 32 is a schematic drawing of one embodiment of an occupant restraint device control system in accordance with the invention.

FIG. 32 is a schematic drawing of one embodiment of an occupant restraint device control system in accordance with the invention. The first step is to obtain information about the contents of the seat at step 338, when such contents are present on the seat. To this end, a presence sensor can be employed to activate the system only when the presence of an object, or living being, is detected. Next, at step 339, a signal is generated based on the contents of the seat, with different signals being generated for different contents of the seat. Thus, while a signal for a dog will be different than the signal for a child set, the signals for different child seats will not be that different. Next, at step 340, the signal is analyzed to determine whether a child seat is present, whether a child seat in a particular orientation is present and/or whether a child seat in a particular position is present. Deployment control 341 provides a deployment control signal or command based on the analysis of the signal generated based on the contents of the seat. This signal or command is directed to the occupant protection or restraint device 342 to provide for deployment for that particular content of the seat. The system continually obtains information about the contents of the seat until such time as a deployment signal is received from, e.g., a crash sensor, to initiate deployment of the occupant restraint device.

Figure 33:
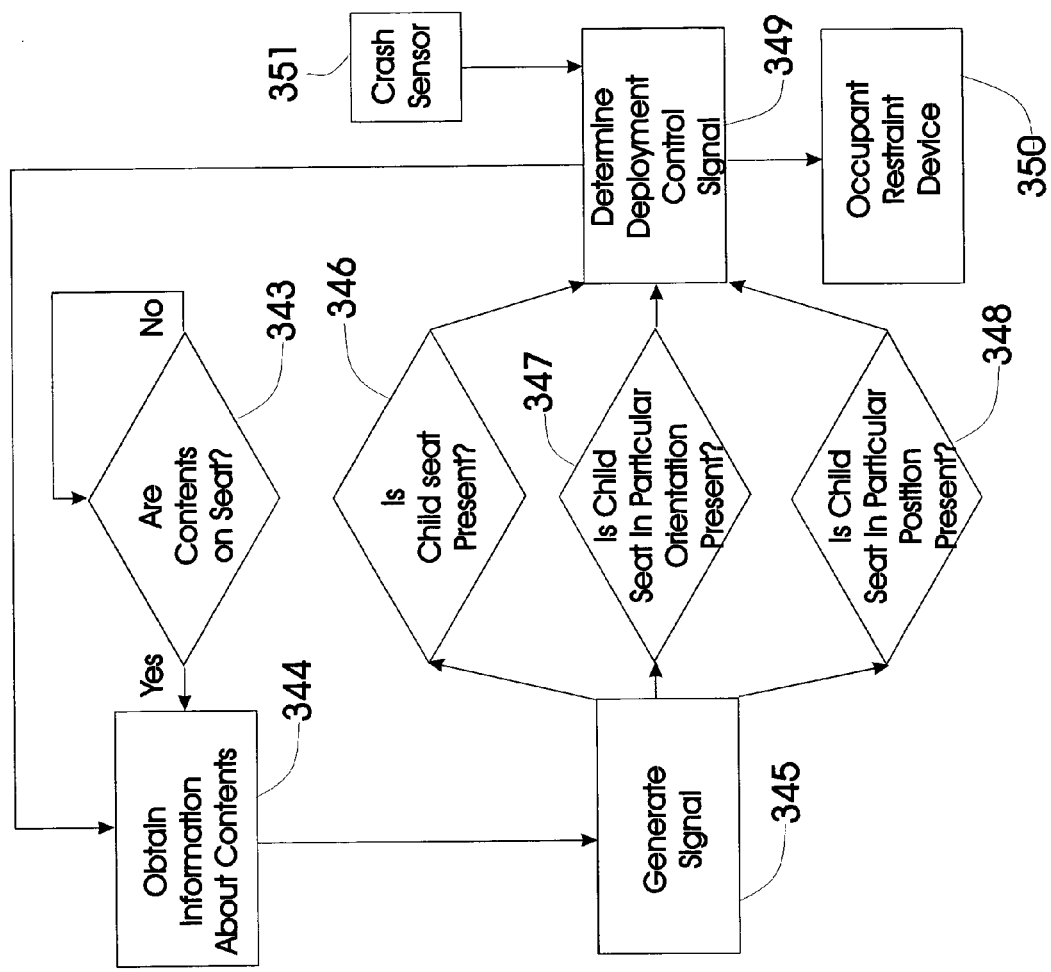
FIG. 33 is a flow chart of the operation of one embodiment of an occupant restraint device control method in accordance with the invention.

FIG. 33 is a flow chart of the operation of one embodiment of an occupant restraint device control method in accordance with the invention. The first step is to determine whether contents are present on the seat at step 910. If so, information is obtained about the contents of the seat at step 344. At step 345, a signal is generated based on the contents of the seat, with different signals being generated for different contents of the seat. The signal is analyzed to determine whether a child seat is present at step 346, whether a child seat in a particular orientation is present at step 347 and/or whether a child seat in a particular position is present at step 348. Deployment control 349 provides a deployment control signal or command based on the analysis of the signal generated based on the contents of the seat. This signal or command is directed to the occupant protection or restraint device 350 to provide for deployment for those particular contents of the seat. The system continually obtains information about the contents of the seat until such time as a deployment signal is received from, e.g., a crash sensor 351, to initiate deployment of the occupant restraint device.

In another implementation, the sensor algorithm may determine the rate that gas is generated to affect the rate that the airbag is inflated. In all of these cases, the position of the occupant is used to affect the deployment of the airbag either as to whether or not it should be deployed at all, the time of deployment and/or the rate of inflation and/or deflation.

Such a system can also be used to positively identify or confirm the presence of a rear facing child seat in the vehicle, if the child seat is equipped with a resonator. In this case, a resonator 18 is placed on the forward most portion of the child seat, or in some other convenient position, as shown in FIG. 1. The resonator 18, or other type of signal generating device, such as an RFID tag, which generates a signal upon excitation, e.g., by a transmitted energy signal, can be used not only to determine the orientation of the child seat but also to determine the position of the child seat (in essentially the same manner as described above with respect to determining the position of the seat and the position of the seatbelt).

The determination of the presence of a child seat can be used to affect another system in the vehicle. Most importantly, deployment of an occupant restraint device can be controlled depending on whether a child seat is present. Control of the occupant restraint device may entail suppression of deployment of the device. If the occupant restraint device is an airbag, e.g., a frontal airbag or a side airbag, control of the airbag deployment may entail not only suppression of the deployment but also depowered deployment, adjustment of the orientation of the airbag, adjustment of the inflation rate or inflation time and/or adjustment of the deflation rate or time.

The weight sensor coupled with the height sensor and the occupant's velocity relative to the vehicle, as determined by the occupant position sensors, provides information as to the amount of energy that the airbag will need to absorb during the impact of the occupant with the airbag. This, along with the location of the occupant relative to the airbag, is then used to determine the amount of gas that is to be injected into the airbag during deployment and the size of the exit orifices that control the rate of energy dissipation as the occupant is interacting with the airbag during the crash. For example, if an occupant is particularly heavy then it is desirable to increase the amount of gas, and thus the initial pressure, in the airbag to accommodate the larger force which will be required to arrest the relative motion of the occupant. Also, the size of the exit orifices should be reduced, since there will be a larger pressure tending to force the gas out of the orifices, in order to prevent the bag from bottoming out before the occupant's relative velocity is arrested. Similarly, for a small occupant the initial pressure would be reduced and the size of the exit orifices increased. If, on the other hand, the occupant is already close to the airbag then the amount of gas injected into the airbag will need to be reduced.

Another and preferred approach is to incorporate an accelerometer into the seatbelt or the airbag surface and to measure the deceleration of the occupant and to control the outflow of gas from the airbag to maintain the occupant's chest acceleration below some maximum value such as 40 Gs. This maximum value can be set based on the forecasted severity of the crash. If the occupant is wearing a seatbelt the outflow from the airbag can be significantly reduced since the seatbelt is taking up most of the load and the airbag then should be used to help spread the load over more of the occupant's chest. Although the pressure in the airbag is one indication of the deceleration being imparted to the occupant it is a relatively crude measure since it does not take into account the mass of the occupant. Since it is acceleration that should be controlled it is better to measure acceleration rather than pressure in the airbag.

There are many ways of varying the amount of gas injected into the airbag some of which are covered in the patent literature and include, for example, inflators where the amount of gas generated and the rate of generation is controllable. For example, in a particular hybrid inflator once manufactured by the Allied Signal Corporation, two pyrotechnic charges are available to heat the stored gas in the inflator. Either or both of the pyrotechnic charges can be ignited and the timing between the ignitions can be controlled to significantly vary the rate of gas flow to the airbag.

The flow of gas out of the airbag is traditionally done through fixed diameter orifices placed in the bag fabric. Some attempts have been made to provide a measure of control through such measures as blowout patches applied to the exterior of the airbag. Other systems were disclosed in U.S. patent application Ser. No. 07/541,464 filed Feb. 9, 1989, now abandoned.

In a like manner, other parameters can also be adjusted, such as the direction of the airbag, by properly positioning the angle and location of the steering wheel relative to the driver. If seatbelt pretensioners are used, the amount of tension in the seatbelt or the force at which the seatbelt spools out, for the case of force limiters, could also be adjusted based on the occupant morphological characteristics determined by the system of at least one of the inventions disclosed herein. The force measured on the seatbelt, if the vehicle deceleration is known, gives a confirmation of the mass of the occupant. This force measurement can also be used to control the chest acceleration given to the occupant to minimize injuries caused by the seatbelt. Naturally, as discussed above, it is better to measure the acceleration of the chest directly.

In the embodiment shown in FIG. 8A, transmitter/receiver assemblies 49, 50, 51 and 54 emit infrared waves that reflect off of the head and chest of the driver and return thereto. Periodically, the device, as commanded by control circuitry 20, transmits a pulse of infrared waves and the reflected signal is detected by the same (i.e. the LEDs and imager are in the same housing) or a different device. The transmitters can either transmit simultaneously or sequentially. An associated electronic circuit and algorithm in control circuitry 20 processes the returned signals as discussed above and determines the location of the occupant in the passenger compartment. This information is then sent to the crash sensor and diagnostic circuitry, which may also be resident in control circuitry 20

(programmed within a control module), which determines if the occupant is close enough to the airbag that a deployment might, by itself, cause injury which exceeds that which might be caused by the accident itself. In such a case, the circuit disables the airbag system and thereby prevents its deployment.

In an alternate case, the sensor algorithm assesses the probability that a crash requiring an airbag is in process and waits until that probability exceeds an amount that is dependent on the position of the occupant. Thus, for example, the sensor might decide to deploy the airbag based on a need probability assessment of 50%, if the decision must be made immediately for an occupant approaching the airbag, but might wait until the probability rises above 95% for a more distant occupant. In the alternative, the crash sensor and diagnostic circuitry optionally resident in control circuitry 20 may tailor the parameters of the deployment (time to initiation of deployment, rate of inflation, rate of deflation, deployment time, etc.) based on the current position and possibly velocity of the occupant, for example a depowered deployment.

In another implementation, the sensor algorithm may determine the rate that gas is generated to affect the rate that the airbag is inflated. One method of controlling the gas generation rate is to control the pressure in the inflator combustion chamber. The higher the internal pressure the faster gas is generated. Once a method of controlling the gas combustion pressure is implemented, the capability exists to significantly reduce the variation in inflator properties with temperature. At lower temperatures the pressure control system would increase the pressure in the combustion chamber and at higher ambient temperatures it would reduce the pressure. In all of these cases, the position of the occupant can be used to affect the deployment of the airbag as to whether or not it should be deployed at all, the time of deployment and/or the rate of inflation.

The applications described herein have been illustrated using the driver and sometimes the passenger of the vehicle. The same systems of determining the position of the occupant relative to the airbag apply to a driver, front and rear seated passengers, sometimes requiring minor modifications. It is likely that the sensor required triggering time based on the position of the occupant will be different for the driver than for the passenger. Current systems are based primarily on the driver with the result that the probability of injury to the passenger is necessarily increased either by deploying the airbag too late or by failing to deploy the airbag when the position of the driver would not warrant it but the passenger's position would. With the use of occupant position sensors for the passenger and driver, the airbag system can be individually optimized for each occupant and result in further significant injury reduction. In particular, either the driver or passenger system can be disabled if either the driver or passenger is out-of-position or if the passenger seat is unoccupied.

There is almost always a driver present in vehicles that are involved in accidents where an airbag is needed. Only about 30% of these vehicles, however, have a passenger. If the passenger is not present, there is usually no need to deploy the passenger side airbag. The occupant monitoring system, when used for the passenger side with proper pattern recognition circuitry, can also ascertain whether or not the seat is occupied, and if not, can disable the deployment of the passenger side airbag and thereby save the cost of its replacement. The same strategy applies also for monitoring the rear seat of the vehicle. Also, a trainable pattern recognition system, as used herein, can distinguish between an occupant and a bag of groceries, for example. Finally, there has been much written about the out-of-position child who is standing or otherwise positioned adjacent to the airbag, perhaps due to pre-crash braking. The occupant position sensor described herein can prevent the deployment of the airbag in this situation as well as in the situation of a rear facing child seat as described above.

Naturally as discussed elsewhere herein, occupant sensors can also be used for monitoring the rear seats of the vehicle for the purpose, among others, of controlling airbag or other restraint deployment.

12.2 Seat, Seatbelt, Steering Wheel and Pedal Adjustment and Resonators

Acoustic or electromagnetic resonators are active or passive devices that resonate at a preset frequency when excited at that frequency. If such a device, which has been tuned to 40 kHz for example, or some other appropriate frequency, is subjected to radiation at 40 kHz it will return a signal that can be stronger than the reflected radiation. Tuned radar antennas, RFID tags and SAW resonators are examples of such devices as is a wine glass.

If such a device is placed at a particular point in the passenger compartment of a vehicle, and irradiated with a signal that contains the resonant frequency, the returned signal can usually be identified as a high magnitude narrow signal at a particular point in time that is proportional to the distance from the resonator to the receiver. Since this device can be identified, it provides a particularly effective method of determining the distance to a particular point in the vehicle passenger compartment (i.e., the distance between the location of the resonator and the detector). If several such resonators are used they can be tuned to slightly different frequencies and therefore separated and identified by the circuitry. If, for example, an ultrasonic signal is transmitted that is slightly off of the resonator frequency then a resonance can still be excited in the resonator and the return signal positively identified by its frequency. Ultrasonic resonators are rare but electromagnetic resonators are common. The distance to a resonator can be more easily determined using ultrasonics, however, due to its lower propagation velocity.

Figure 34:
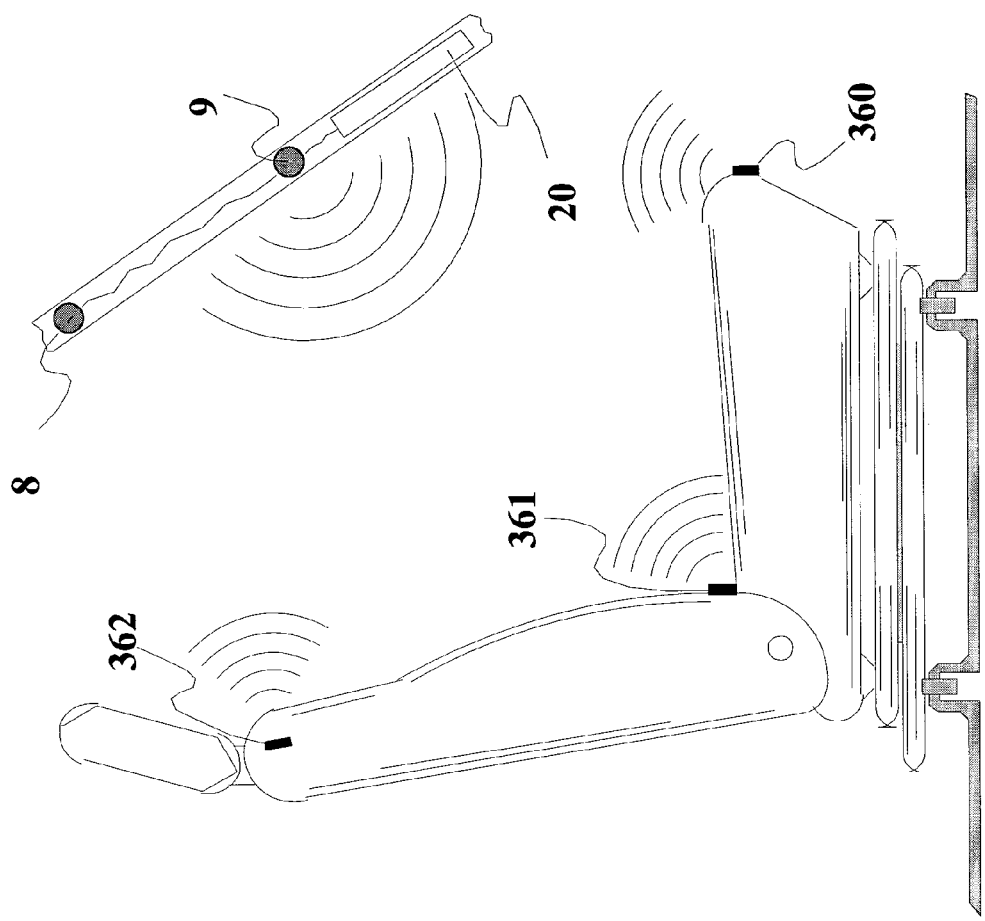
FIG. 34 is a side view with parts cutaway and removed of a seat in the passenger compartment of a vehicle showing the use of resonators or reflectors to determine the position of the seat.

Using such resonators, the positions of various objects in the vehicle can be determined. In FIG. 34, for example, three such resonators are placed on the vehicle seat and used to determine the location of the front and back of the seat portion and the top of the seat back portion. The seat portion is connected to the frame of the vehicle. In this case, transducers 8 and 9, mounted in the A-pillar, are used in conjunction with resonators 360, 361 and 362 to determine the position of the seat. Transducers 8 and 9 constitute both transmitter means for transmitting energy signals at the excitation frequencies of the resonators 360, 361 and 362 and detector means for detecting the return energy signals from the excited resonators. Processor 20 is coupled to the transducers 8 and 9 to analyze the energy signals received by the detectors and provide information about the object with which the resonators are associated, i.e., the position of the seat in this embodiment. This information is then fed to the seat memory and adjustment system, not shown, eliminating the currently used sensors that are placed typically beneath the seat adjacent the seat adjustment motors. In the conventional system, the seat sensors must be wired into the seat adjustment system and are prone to being damaged. By using the vehicle interior monitoring system alone with inexpensive passive resonators, the conventional seat sensors can be eliminated resulting in a cost saving to the vehicle manufacturer. An efficient reflector, such as a parabolic shaped reflector, or in some cases a corner cube reflector (which can be a multiple cube pattern array), can be used in a similar manner as the resonator. Similarly, a surface acoustic wave (SAW) device, RFID, variable resistor, inductor or capacitor device and radio frequency radiation can be used as a resonator or a delay line returning a signal to the interrogator permitting the presence and location of an object to be obtained as described in detail in U.S. Pat. No. 6,662, 642. Optical reflectors such as an array of corner cube reflectors can also be used with infrared. Additionally such an array can comprise a pattern so that there is no doubt that infrared is reflecting off of the reflector. These reflectors can be similar to those found on bicycles, joggers athletic clothes, rear of automobiles, signs, reflective tape on roadways etc.

Resonators or reflectors, of the type described above can be used for making a variety of position measurements in the vehicle. They can be placed on an object such as a child seat 2 (FIG. 1) to permit the direct detection of its presence and, in some cases, its orientation. Optical reflecting tape, for example, could be easily applied to child seats. These resonators are made to resonate at a particular frequency. If the number of resonators increases beyond a reasonable number, dual frequency resonators can be used, or alternately, resonators that return an identification number such as can be done with an RFID or SAW device or a pattern as can be done with optical reflectors. For the dual frequency case, a pair of frequencies is then used to identify a particular location. Alternately, resonators tuned to a particular frequency can be used in combination with special transmitters, which transmit at the tuned frequency, which are designed to work with a particular resonator or group of resonators. The cost of the transducers is sufficiently low to permit special transducers to be used for special purposes. The use of resonators that resonate at different frequencies requires that they be irradiated by radiation containing those frequencies. This can be done with a chirp circuit, for example.

An alternate approach is to make use of secondary emission where the frequency emitted form the device is at a different frequency that the interrogator. Phosphors, for example, convert ultraviolet to visible and devices exist that convert electromagnetic waves to ultrasonic waves. Other devices can return a frequency that is a sub-harmonic of the interrogation frequency. Additionally, an RFID tag can use the incident RF energy to charge up a capacitor and then radiate energy at a different frequency. Additionally, sufficient energy can also be supplied using energy harvesting principles wherein the vibrations associated with vehicle motion can be used to generate electric power which can then be stored in a battery, capacitor or ultracapacitor.

Another application for a resonator of the type described is to determine the location of the seatbelt and therefore determine whether it is in use. If it is known that the occupants are wearing seatbelts, the airbag deployment parameters can be controlled or adjusted based on the knowledge of seatbelt use, e.g., the deployment threshold can be increased since the airbag is not needed in low velocity accidents if the occupants are already restrained by seatbelts. Deployment of other occupant restraint devices could also be effected based on the knowledge of seatbelt use. This will reduce the number of deployments for cases where the airbag provides little or no improvement in safety over the seatbelt. FIG. 2, for example, shows the placement of a resonator 26 on the front surface of the seatbelt where it can be sensed by the transducer 8. Such a system can also be used to positively identify the presence of a rear facing child seat in the vehicle. In this case, a resonator 18 is placed on the forward most portion of the child seat, or in some other convenient position, as shown in FIG. 1. As illustrated and discussed in U.S. Pat. No. 6,662,642, there are various methods of obtaining distance from a resonator, reflector, RFID or SAW device which include measuring the time of flight, using phase measurements, correlation analysis and triangulation.

12.3 Side Impacts

Figure 35:
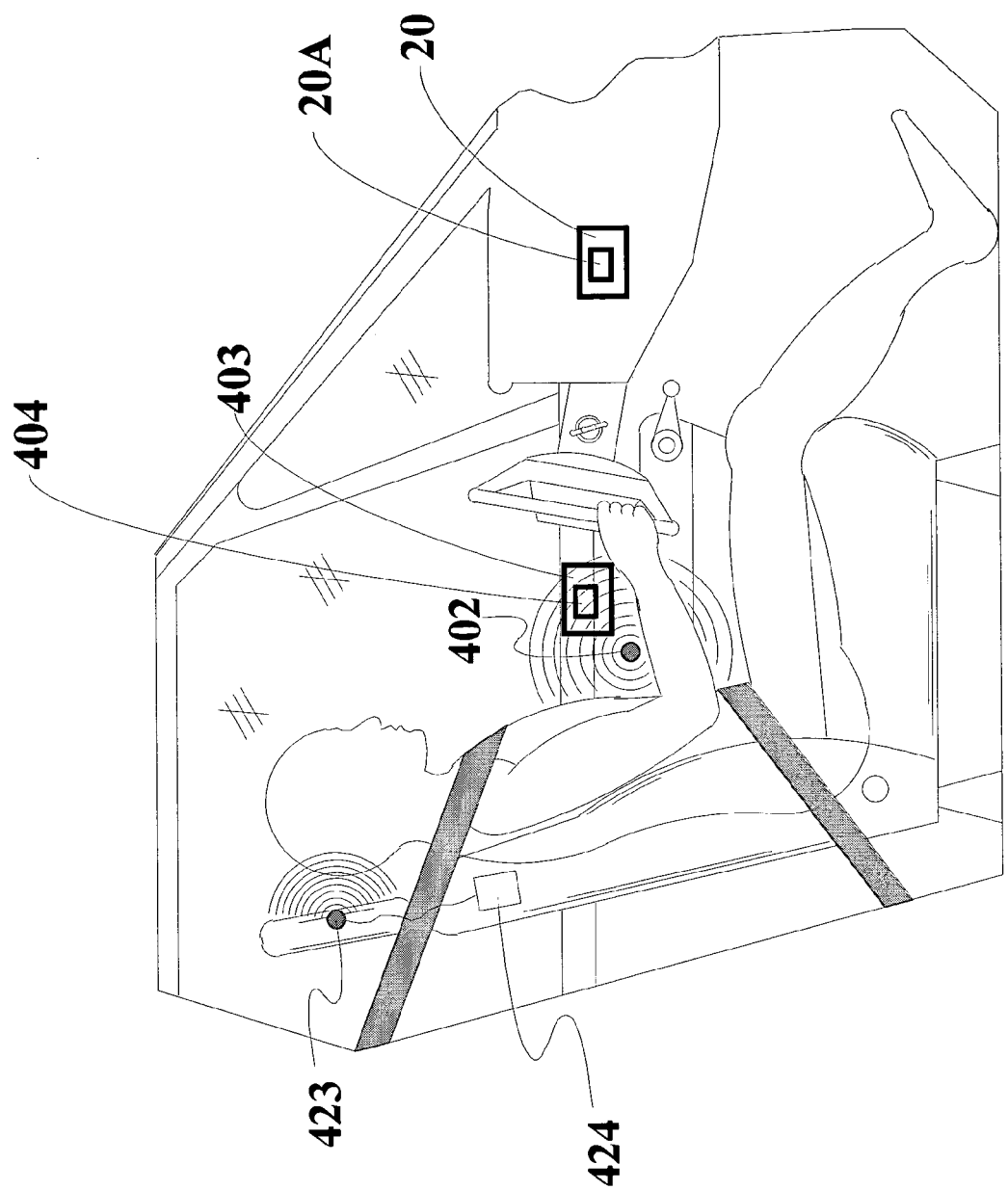
FIG. 35 is a side view with parts cutaway and removed of a vehicle showing the passenger compartment containing a driver and a preferred mounting location for an occupant position sensor for use in side impacts and also of a rear of occupant's head locator for use with a headrest adjustment system to reduce whiplash injuries in rear impact crashes.

Side impact airbags are now used on some vehicles. Some are quite small compared to driver or passenger airbags used for frontal impact protection. Nevertheless, a small child could be injured if he is sleeping with his head against the airbag module when the airbag deploys and a vehicle interior monitoring system is needed to prevent such a deployment. In FIG. 35, a single wave or light-transmitting/receiving transducer 420 is shown mounted in a door adjacent airbag system 403 which houses an airbag 404. This sensor has the particular task of monitoring the space adjacent to the door-mounted airbag. Sensor 402 may also be coupled to control circuitry 20 which can process and use the information provided by sensor 402 in the determination of the location or identity of the occupant or location of a part of the occupant.

Similar to the embodiment in FIG. 4 with reference to U.S. Pat. No. 5,653,462, the airbag system 403 and components of the interior monitoring system, e.g., transducer 402, can also be coupled to a processor 20 including a control circuit 20A for controlling deployment of the airbag 404 based on information obtained by the transducer 402. This device does not have to be used to identify the object that is adjacent the airbag but it can be used to merely measure the position of the object. It can also be used to determine the presence of the object, i.e., the received waves are indicative of the presence or absence of an occupant as well as the position of the occupant or a part thereof. Instead of an ultrasonic transducer, another wave-receiving transducer may be used as described in any of the other embodiments herein, either solely for performing a wave-receiving function or for performing both a wave-receiving function and a wave-transmitting function.

Figure 36:
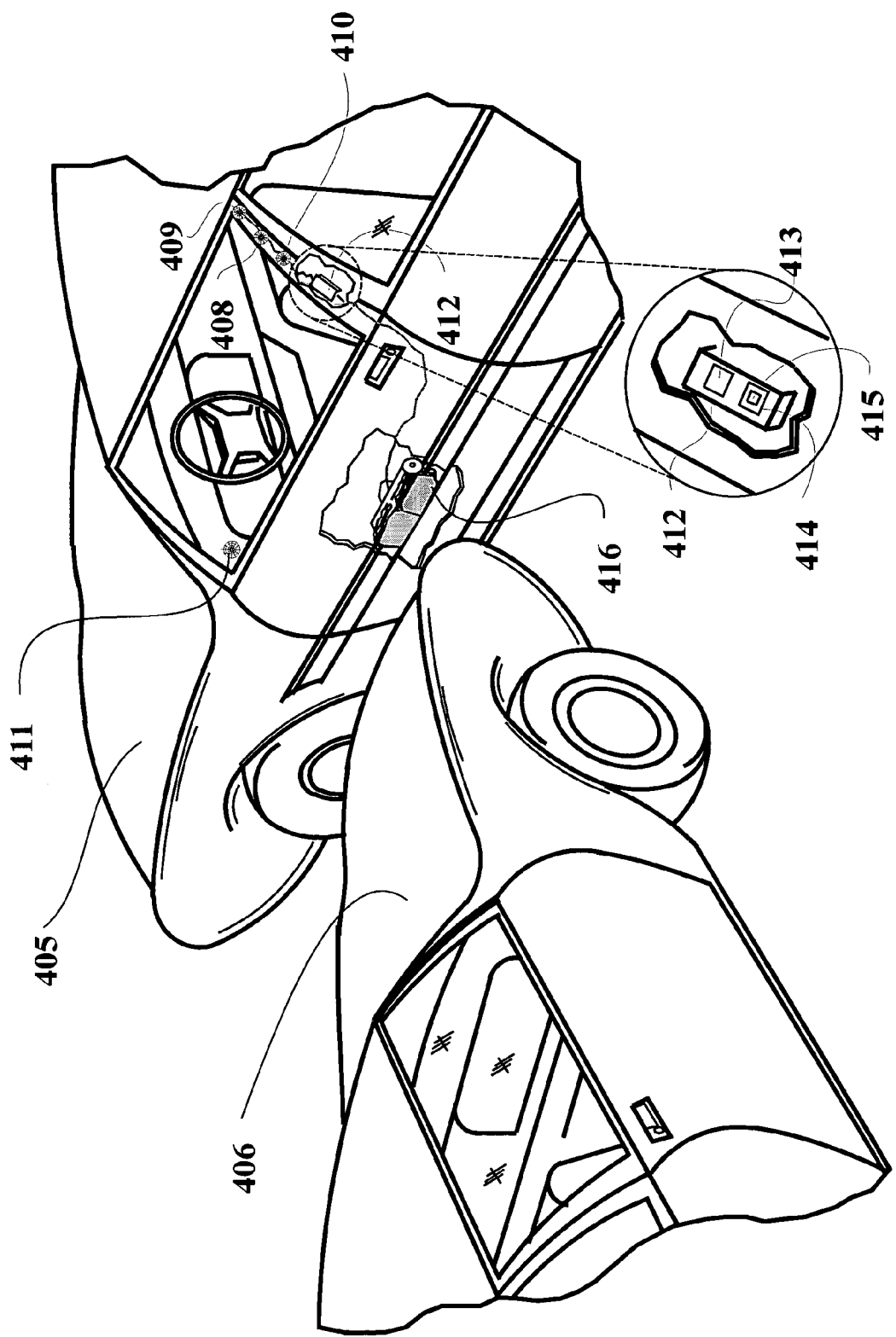
FIG. 36 is a perspective view of a vehicle about to impact the side of another vehicle showing the location of the various parts of the anticipatory sensor system of at least one of the inventions disclosed herein.

FIG. 36 is an angular perspective overhead view of a vehicle 405 about to be impacted in the side by an approaching vehicle 406, where vehicle 405 is equipped with an anticipatory sensor system showing a transmitter 408 transmitting electromagnetic, such as infrared, waves toward vehicle 406. This is one example of many of the uses of the instant invention for exterior monitoring. The transmitter 408 is connected to an electronic module 412. Module 412 contains circuitry 413 to drive transmitter 408 and circuitry 414 to process the returned signals from receivers 409 and 410 which are also coupled to module 412. Circuitry 414 contains a processor such as a neural computer 415 or microprocessor with a pattern recognition algorithm, which performs the pattern recognition determination based on signals from receivers 409 and 410. Receivers 409 and 410 are mounted onto the B-Pillar of the vehicle and are covered with a protective transparent cover. An alternate mounting location is shown as 411 which is in the door window trim panel where the rear view mirror (not shown) is frequently attached. One additional advantage of this system is the ability of infrared to penetrate fog and snow better than visible light which makes this technology particularly applicable for blind spot detection and anticipatory sensing applications. Although it is well known that infrared can be significantly attenuated by both fog and snow, it is less so than visual light depending on the frequency chosen. (See for example L. A. Klein, *Millimeter-Wave and Infrared Multisensor Design and Signal Processing*, Artech House, Inc, Boston 1997, ISBN 0-89006-764-3).

12.4 Children and Animals Left Alone

The various occupant sensing systems described herein can be used to determine if a child or animal has been left alone in a vehicle and the temperature is increasing or decreasing to where the child's or animal's health is at risk.

When such a condition is discovered, the owner or an authority can be summoned for help or, alternately, the vehicle engine can be started and the vehicle warmed or cooled as needed. See section 9.4.

12.5 Vehicle Theft

If a vehicle is stolen then several options are available when the occupant sensing system is installed. Upon command by the owner over a telematics system, a picture of the vehicles interior can be taken and transmitted to the owner. Alternately a continuous flow of pictures can be sent over the telematics system along with the location of the vehicle if a GPS system is available or from the cell phone otherwise to help the owner or authorities determine where the vehicle is.

12.6 Security, Intruder Protection

If the owner has parked the vehicle and is returning, and an intruder has entered and is hiding, that fact can be made known to the owner before he or she opens the vehicle door. This can be accomplished thought a wireless transmission to any of a number of devices that have been programmed for that function such as vehicle remote key fob, cell phones, PDAs etc.

12.7 Entertainment System Control

It is well known among acoustics engineers that the quality of sound coming from an entertainment system can be substantially affected by the characteristics and contents of the space in which it operates and the surfaces surrounding that space. When an engineer is designing a system for an automobile he or she has a great deal of knowledge about that space and of the vehicle surfaces surrounding it. He or she has little knowledge of how many occupants are likely to be in the vehicle on a particular day, however, and therefore the system is a compromise. If the system knew the number and position of the vehicle occupants, and maybe even their size, then adjustments could be made in the system output and the sound quality improved. FIG. 8A, therefore, illustrates schematically the interface between the vehicle interior monitoring system of at least one of the inventions disclosed herein, i.e., transducers 49–52 and 54 and processor 20 which operate as set forth above, and the vehicle entertainment system 99. The particular design of the entertainment system that uses the information provided by the monitoring system can be determined by those skilled in the appropriate art. Perhaps in combination with this system, the quality of the sound system can be measured by the audio system itself either by using the speakers as receiving units also or through the use of special microphones. The quality of the sound can then be adjusted according to the vehicle occupancy and the reflectivity, or absorbtivity, of the vehicle occupants. If, for example, certain frequencies are being reflected, or absorbed, more that others, the audio amplifier can be adjusted to amplify those frequencies to a lesser, or greater, amount than others.

The acoustic frequencies that are practical to use for acoustic imaging in the systems are between 40 to 160 kilohertz (kHz). The wavelength of a 50 kHz acoustic wave is about 0.6 cm which is too coarse to determine the fine features of a person's face, for example. It is well understood by those skilled in the art that features which are smaller than the wavelength of the illuminating radiation cannot be distinguished. Similarly the wave length of common radar systems varies from about 0.9 cm (for 33,000 MHz K band) to 133 cm (for 225 MHz P band) which is also too coarse for person identification systems. In FIG. 4, therefore, the ultrasonic transducers of the previous designs are replaced by laser transducers 8 and 9 which are connected to a microprocessor 20. In all other manners, the system operates similarly. The design of the electronic circuits for this laser system is described in some detail in the U.S. Pat. No. 5,653,462 referenced above and in particular FIG. 8 thereof and the corresponding description. In this case, a pattern recognition system such as a neural network system is employed and uses the demodulated signals from the receptors 8 and 9. The output of processor 20 of the monitoring system is shown connected schematically to a general interface 36 which can be the vehicle ignition enabling system; the entertainment system; the seat, mirror, suspension or other adjustment systems; or any other appropriate vehicle system.

Recent developments in the field of directing sound using hyper-sound (also referred to as hypersonic sound) now make it possible to accurately direct sound to the vicinity of the ears of an occupant so that only that occupant can hear the sound. The system of at least one of the inventions disclosed herein can thus be used to find the proximate direction of the ears of the occupant for this purpose.

Hypersonic sound is described in detail in U.S. Pat. No. 5,885,129 (Norris), U.S. Pat. No. 5,889,870 (Norris) and U.S. Pat. No. 06,016,351 (Raida et al.) and International Publication No. WO 00/18031. By practicing the techniques described in these patents and the publication, in some cases coupled with a mechanical or acoustical steering mechanism, sound can be directed to the location of the ears of a particular vehicle occupant in such a manner that the other occupants can barely hear the sound, if at all. This is particularly the case when the vehicle is operating at high speeds on the highway and a high level of "white" noise is present. In this manner, one occupant can be listening to the news while another is listening to an opera, for example. Naturally, white noise can also be added to the vehicle and generated by the hypersonic sound system if necessary when the vehicle is stopped or traveling in heavy traffic. Thus, several occupants of a vehicle can listen to different programming without the other occupants hearing that programming. This can be accomplished using hypersonic sound without requiring earphones.

In principle, hypersonic sound utilizes the emission of inaudible ultrasonic frequencies that mix in air and result in the generation of new audio frequencies. A hypersonic sound system is a highly efficient converter of electrical energy to acoustical energy. Sound is created in air at any desired point that provides flexibility and allows manipulation of the perceived location of the source of the sound. Speaker enclosures are thus rendered dispensable. The dispersion of the mixing area of the ultrasonic frequencies and thus the area in which the new audio frequencies are audible can be controlled to provide a very narrow or wide area as desired.

The audio mixing area generated by each set of two ultrasonic frequency generators in accordance with the invention could thus be directly in front of the ultrasonic frequency generators in which case the audio frequencies would travel from the mixing area in a narrow straight beam or cone to the occupant. Also, the mixing area can include only a single ear of an occupant (another mixing area being formed by ultrasonic frequencies generated by a set of two other ultrasonic frequency generators at the location of the other ear of the occupant with presumably but not definitely the same new audio frequencies) or be large enough to encompass the head and both ears of the occupant. If so desired, the mixing area could even be controlled to encompass the determined location of the ears of multiple occupants, e.g., occupants seated one behind the other or one next to another.

Vehicle entertainment system 99 may include means for generating and transmitting sound waves at the ears of the occupants, the position of which are detected by transducers 49–52 and 54 and processor 20, as well as means for detecting the presence and direction of unwanted noise. In this manner, appropriate sound waves can be generated and transmitted to the occupant to cancel the unwanted noise and thereby optimize the comfort of the occupant, i.e., the reception of the desired sound from the entertainment system 99.

More particularly, the entertainment system 99 includes sound generating components such as speakers, the output of which can be controlled to enable particular occupants to each listen to a specific musical selection. As such, each occupant can listen to different music, or multiple occupants can listen to the same music while other occupant(s) listen to different music. Control of the speakers to direct sound waves at a particular occupant, i.e., at the ears of the particular occupant located in any of the ways discussed herein, can be enabled by any known manner in the art, for example, speakers having an adjustable position and/or orientation or speakers producing directable sound waves. In this manner, once the occupants are located, the speakers are controlled to direct the sound waves at the occupant, or even more specifically, at the head or ears of the occupants.

12.8 Combined with SDM and Other Systems

The occupant position sensor in any of its various forms is integrated into the airbag system circuitry as shown schematically in FIG. 37. In this example, the occupant position sensors are used as an input to a smart electronic sensor and diagnostic system. The electronic sensor determines whether one or more of the airbags should be deployed based on the vehicle acceleration crash pulse, or crush zone mounted crash sensors, or a combination thereof, and the occupant position sensor determines whether the occupant is too close to any of the airbags and therefore that the deployment should not take place. In FIG. 37, the electronic crash sensor located within the sensor and diagnostic unit determines whether the crash is of such severity as to require deployment of one or more of the airbags. The occupant position sensors determine the location of the vehicle occupants relative to the airbags and provide this information to the sensor and diagnostic unit that then determines whether it is safe to deploy each airbag and/or whether the deployment parameters should be adjusted. The arming sensor, if one is present, also determines whether there is a vehicle crash occurring. In such a case, if the sensor and diagnostic unit and the arming sensor both determine that the vehicle is undergoing a crash requiring one or more airbags and the position sensors determine that the occupants are safely away from the airbag(s), the airbag(s), or inflatable restraint system, is deployed.

The above applications illustrate the wide range of opportunities, which become available if the identity and location of various objects and occupants, and some of their parts, within the vehicle were known. Once the system of at least one of the inventions disclosed herein is operational, integration with the airbag electronic sensor and diagnostics system (SDM) is likely since an interface with the SDM is necessary. This sharing of resources will result in a significant cost saving to the auto manufacturer. For the same reasons, the vehicle interior monitoring system (VIMS) can include the side impact sensor and diagnostic system.

Figure 37A:
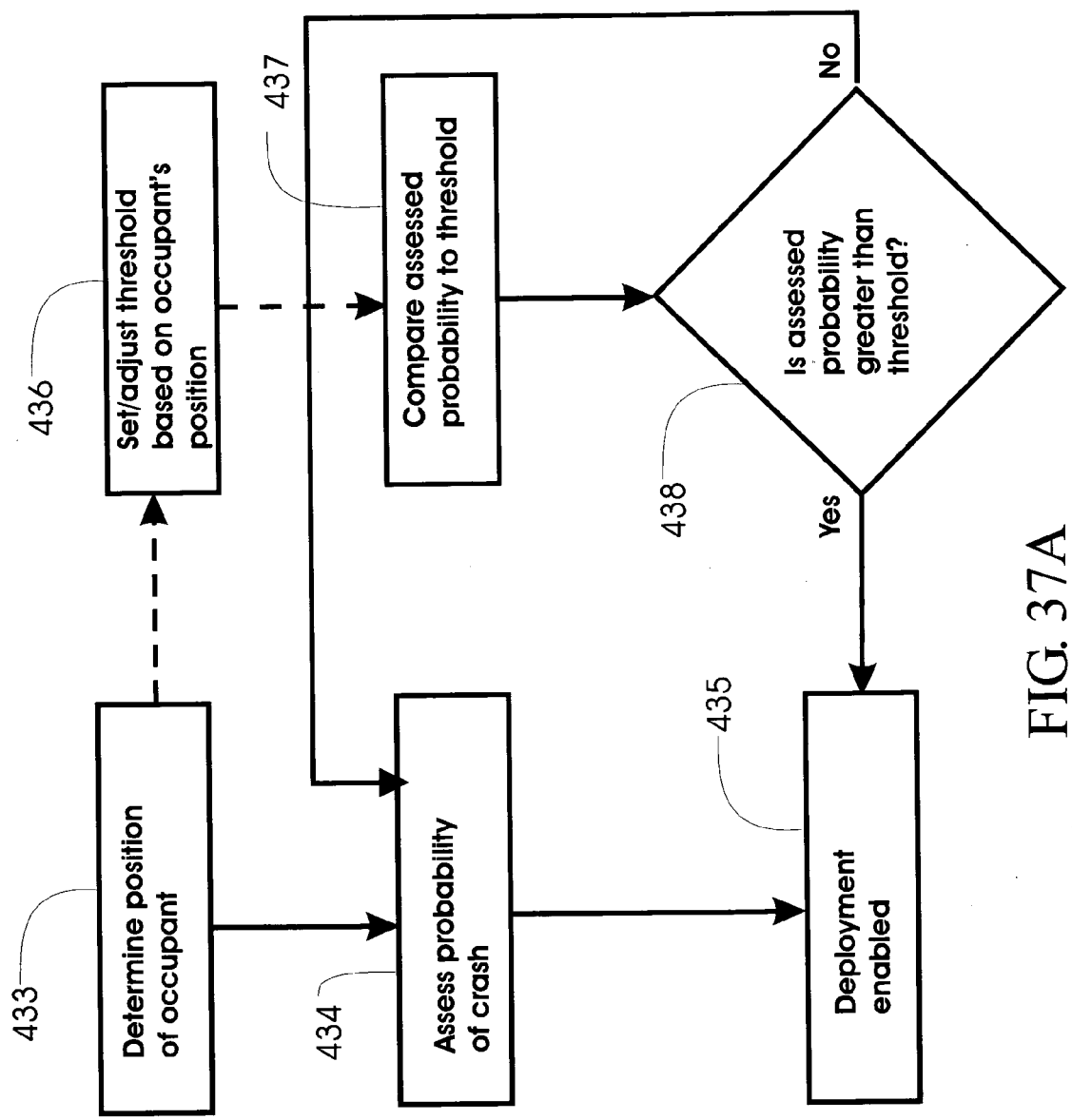
FIG. 37A shows a flowchart of the manner in which an airbag or other occupant restraint or protection device may be controlled based on the position of an occupant.

FIG. 37A shows a flowchart of the manner in which an airbag or other occupant restraint or protection device may be controlled based on the position of an occupant. The position of the occupant is determined at 433 by any one of a variety of different occupant sensing systems including a system designed to receive waves, energy or radiation from a space in a passenger compartment of the vehicle occupied by the occupant, and which also optionally transmit such waves, energy or radiation. A camera or other device for obtaining images, two or three-dimensional, of a passenger compartment of the vehicle occupied by the occupant and analyzing the images may be used. The image device may include a focusing system which focuses the images onto optical arrays and analyzes the focused images. A device which moves a beam of radiation through a passenger compartment of the vehicle occupied by the occupant may also be used, e.g., a scanning type of system. An electric field sensor operative in a seat occupied by the occupant and a capacitance sensor operative in the seat occupied by the occupant may also be used.

The probability of a crash is assessed at 434, e.g., by a crash sensor. Deployment of the airbag is then enabled at 435 in consideration of the determined position of the occupant and the assessed probability that a crash is occurring. A sensor algorithm may be used to receive the input from the crash sensor and occupant position determining system and direct or control deployment of the airbag based thereon. More particularly, in another embodiment, the assessed probability is analyzed, e.g., by the sensor algorithm, relative to a predetermined threshold at 437 whereby a determination is made at 438 if the assessed probability is greater than the threshold. If not, the probability of the crash is again assessed until the probability of a crash is greater than the threshold.

Optionally, the threshold is set or adjusted at 436 based on the determined position of the occupant.

Deployment of the airbag can entail disabling deployment of the airbag when the determined position is too close to the airbag, determining the rate at which the airbag is inflated based on the determined position of the occupant and/or determining the time in which the airbag is deployed based on the determined position of the occupant.

Disclosed above is an airbag system for inflation and deployment of an air bag in front of the passenger during a collision which comprises an air bag, an inflator connected to the air bag and structured and arranged to inflate the air bag with a gas, a passenger sensor system mounted at least partially adjacent to or on the interior roof of the vehicle, and a microprocessor electrically connected to the sensor system and to the inflator. The sensor system continuously senses the position of the passenger and generates electrical output indicative of the position of the passenger. The microprocessor compares and performs an analysis of the electrical output from the sensor system and activates the inflator to inflate and deploy the air bag when the analysis indicates that the vehicle is involved in a collision and that deployment of the air bag would likely reduce a risk of serious injury to the passenger which would exist absent deployment of the air bag and likely would not present an increased risk of injury to the passenger resulting from deployment of the air bag.

The sensor system might be designed to continuously sense position of the passenger relative to the air bag. The sensor system may comprise an array of passenger proximity sensors, each sensing distance from a passenger to the proximity sensor. In this case, the microprocessor determines the passenger's position by determining each of the distances and then triangulating the distances from the passenger to each of the proximity sensors. The microprocessor can include memory in which the positions of the passenger over some interval of time are stored. The sensor system may be particularly sensitive to the position of the head of the passenger.

12.9 Exterior Monitoring

Figure 38:
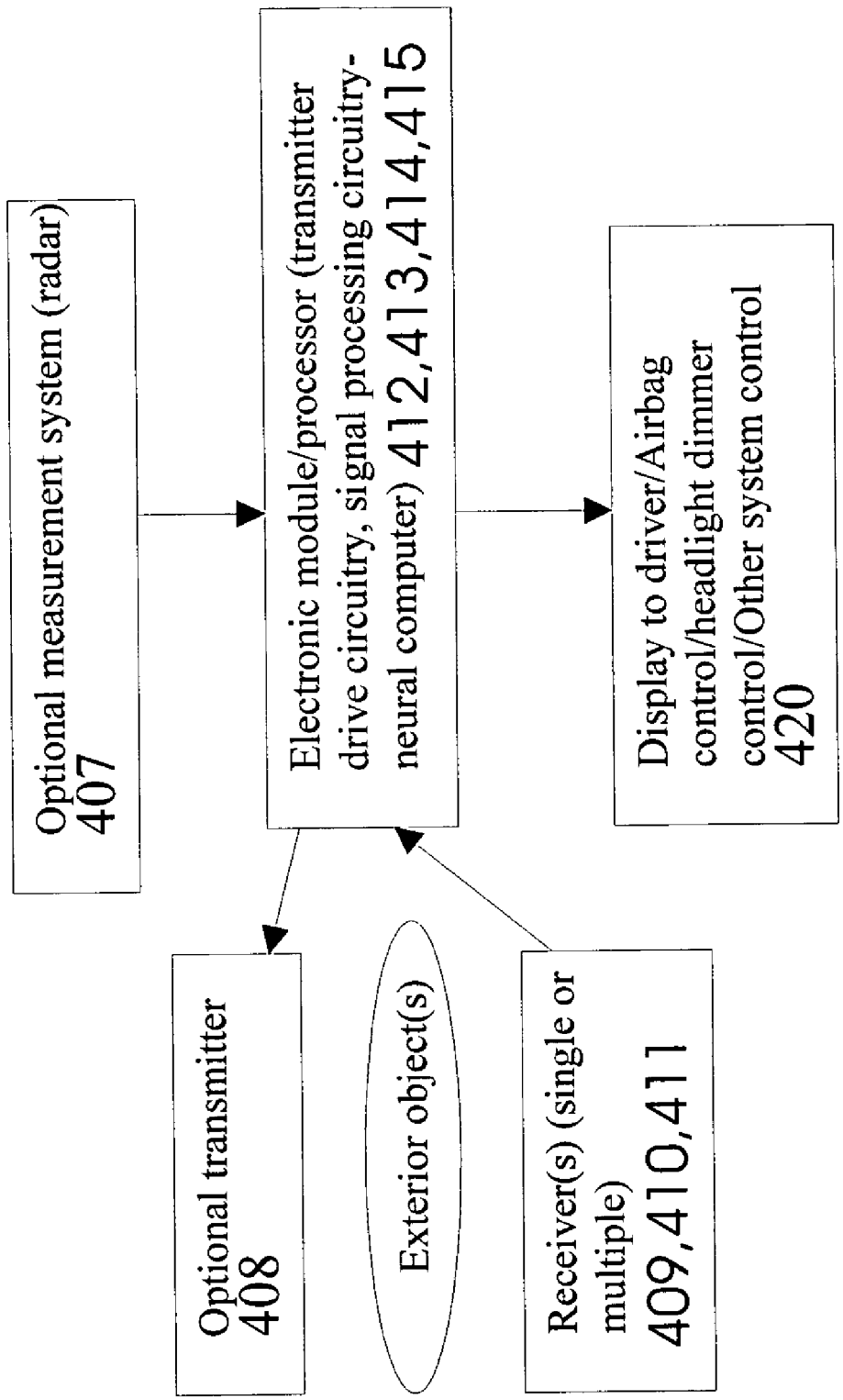
FIG. 38 is a schematic illustration of the exterior monitoring system in accordance with the invention.

Referring now to FIGS. 36 and 38, the same system can also be used for the detection of objects in the blind spots and other areas surrounding the vehicle and the image displayed for the operator to see or a warning system activated, if the operator attempts to change lanes, for example. In this case, the mounting location must be chosen to provide a good view along the side of the vehicle in order to pick up vehicles which are about to pass the subject vehicle 710. Each of the locations 408, 409 and 410 provide sufficient field of view for this application although the space immediately adjacent to the vehicle could be missed. Alternate locations include mounting onto the outside rear view mirror assembly or the addition of a unit in the rear window or C-Pillar, in which case, the contents of areas other than the side of the vehicle would be monitored. Using several receivers in various locations as disclosed above would provide for a monitoring system which monitors all of the areas around the vehicle. The mirror location, however, does leave the device vulnerable to being covered with ice, snow and dirt.

In many cases, neural networks are used to identify objects exterior of the vehicle and then an icon can be displayed on a heads-up display, for example, which provides control over the brightness of the image and permits the driver to more easily recognize the object.

In both cases of the anticipatory sensor and blind spot detector, the infrared transmitter and imager array system provides mainly image information to permit recognition of the object in the vicinity of vehicle 710, whether the object is alongside the vehicle, in a blind spot of the driver, in front of the vehicle or behind the vehicle, the position of the object being detected being dependent on the position and orientation of the receiver(s). To complete the process, distance information is also require as well as velocity information, which can in general be obtained by differentiating the position data or by Doppler analysis. This can be accomplished by any one of the several methods discussed above, such as with a pulsed laser radar system, stereo cameras, focusing system, structured light as well as with a radar system.

Radar systems, which may not be acceptable for use in the interior of the vehicle, are now commonly used in sensing applications exterior to the vehicle, police radar being one well-known example. Miniature radar systems are now available which are inexpensive and fit within the available space. Such systems are disclosed in the McEwan patents described above. Another advantage of radar in this application is that it is easy to get a transmitter with a desirable divergence angle so that the device does not have to be aimed. One particularly advantageous mode of practicing the invention for these cases, therefore, is to use radar and a second advantageous mode is the pulsed laser radar system, along with an imager array, although the use of two such arrays or the acoustical systems are also good choices. The acoustical system has the disadvantage of being slower than the laser radar device and must be mounted outside of the vehicle where it may be affected by the accumulation of deposits onto the active surface. If a radar scanner is not available it is difficult to get an image of objects approaching the vehicle so that the can be identified. Note that the ultimate solution to monitoring of the exterior of the vehicle may lay with SWIR, MWIR and LWIR if the proper frequencies are chosen that are not heavily attenuated by fog, snow and other atmospheric systems. The QWIP system discussed above or equivalent would be a candidate if the cooling requirement can be eliminated or the cost of cooling the imaging chip reduced. Finally, terahertz frequencies (approximately 0.1–5 THz) are beginning to show promise for this application. They can be generated using laser type devices and yet have almost the fog penetration ability of mm wave radar.

Another innovation involves the use of multiple frequencies for interrogating the environment surrounding a vehicle and in particular the space in front of the vehicle. Different frequencies interact differently with different materials. An example given by some to show that all such systems have failure modes is the case of a box that in one case contains a refrigerator while in another case a box of the same size that is empty. It is difficult to imagine how such boxes can reside on a roadway in front of a traveling vehicle but perhaps it fell off of a truck. Using optics it would be difficult if not impossible to make the distinction, however, some frequencies will penetrate a cardboard box exposing the refrigerator. One might ask, what happens if the box is made of metal? So there will always be rare cases where a distinction cannot be made. Nevertheless, a calculation can be made of the cost and benefits to be derived by fielding such a system that might occasionally make a mistake or, better, defaults to no system when it is in doubt.

In a preferred implementation, transmitter 408 is an infrared transmitter and receivers 409, 410 and 411 are CMOS transducers that receive the reflected infrared waves from vehicle 406. In the implementation shown in FIG. 36, an exterior airbag 416 is shown which deploys in the event that a side impact is about to occur as described in U.S. Pat. No. 6,343,810.

Referring now to FIG. 38, a schematic of the use of one or more receivers 409, 410, 411 to affect another system in the vehicle is shown. The general exterior monitoring system, or blind spot monitoring system if the environment exterior of the vehicle is not viewable by the driver in the normal course of driving the vehicle, includes one or more receivers 409, 410, 411 positioned at various locations on the vehicle for the purpose of receiving waves from the exterior environment. Instead of waves, and to the extent different than waves, the receivers 409, 410, 411 could be designed to receiver energy or radiation.

The waves received by receivers 409, 410, 411 contain information about the exterior objects in the environment, such waves either having been generated by or emanating from the exterior objects or reflected from the exterior objects such as is the case when the optional transmitter 408 is used. The electronic module/processor 412 contains the necessary circuitry 413,414 and a trained pattern recognition system (e.g., neural computer 415) to drive the transmitter 408 when present and process the received waves to provide a classification, identification and/or location of the exterior object. The classification, identification and/or location is then used to show an image on a display 420 viewable to the driver. Also, the classification, identification or location of the objects could be used for airbag control, i.e., control of the deployment of the exterior airbag 416 (or any other airbags for that matter), for the control of the headlight dimmers (as discussed elsewhere herein with reference to 74 or in general, for any other system whose operation might be changed based on the presence of exterior objects.

Figure 40:
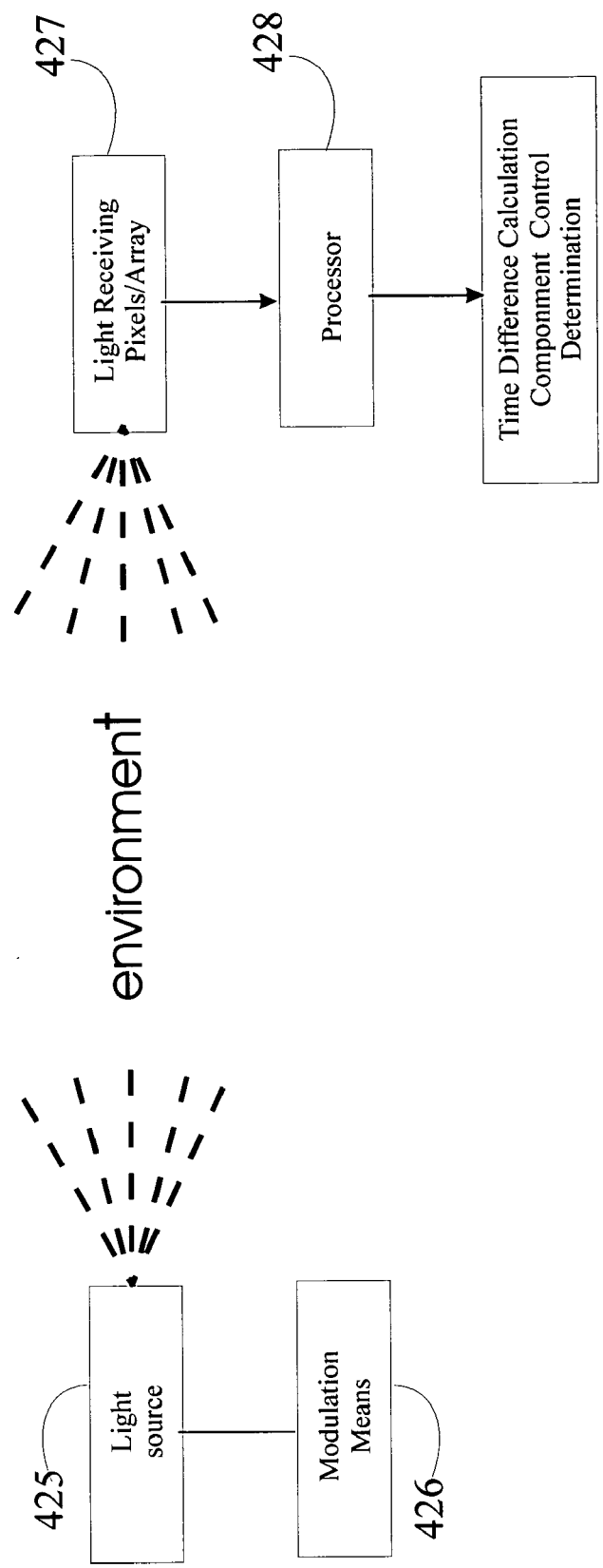
FIG. 40 is a schematic illustration of the position measuring in accordance with the invention.

FIG. 40 shows the components for measuring the position of an object in an environment of or about the vehicle. A light source 425 directs modulated light into the environment and at least one light-receiving pixel or an array of pixels 427 receives the modulated light after reflection by any objects in the environment. A processor 428 determines the distance between any objects from which the modulated light is reflected and the light source based on the reception of the modulated light by the pixel(s) 427. To provide the modulated light, a device or component for modulating a frequency of the light 426 are provided. Also, a device for providing a correlation pattern in a form of code division modulation of the light can be used. The pixel may be a photo diode such as a PIN or avalanche diode.

The processor 428 includes appropriate circuitry to determine the distance between any objects from which any pulse of light is reflected and the light source 425. For example, the processor 428 can determine this distance based on a difference in time between the emission of a pulse of light by the light source 425 and the reception of light by the pixel 427.

Figure 39:
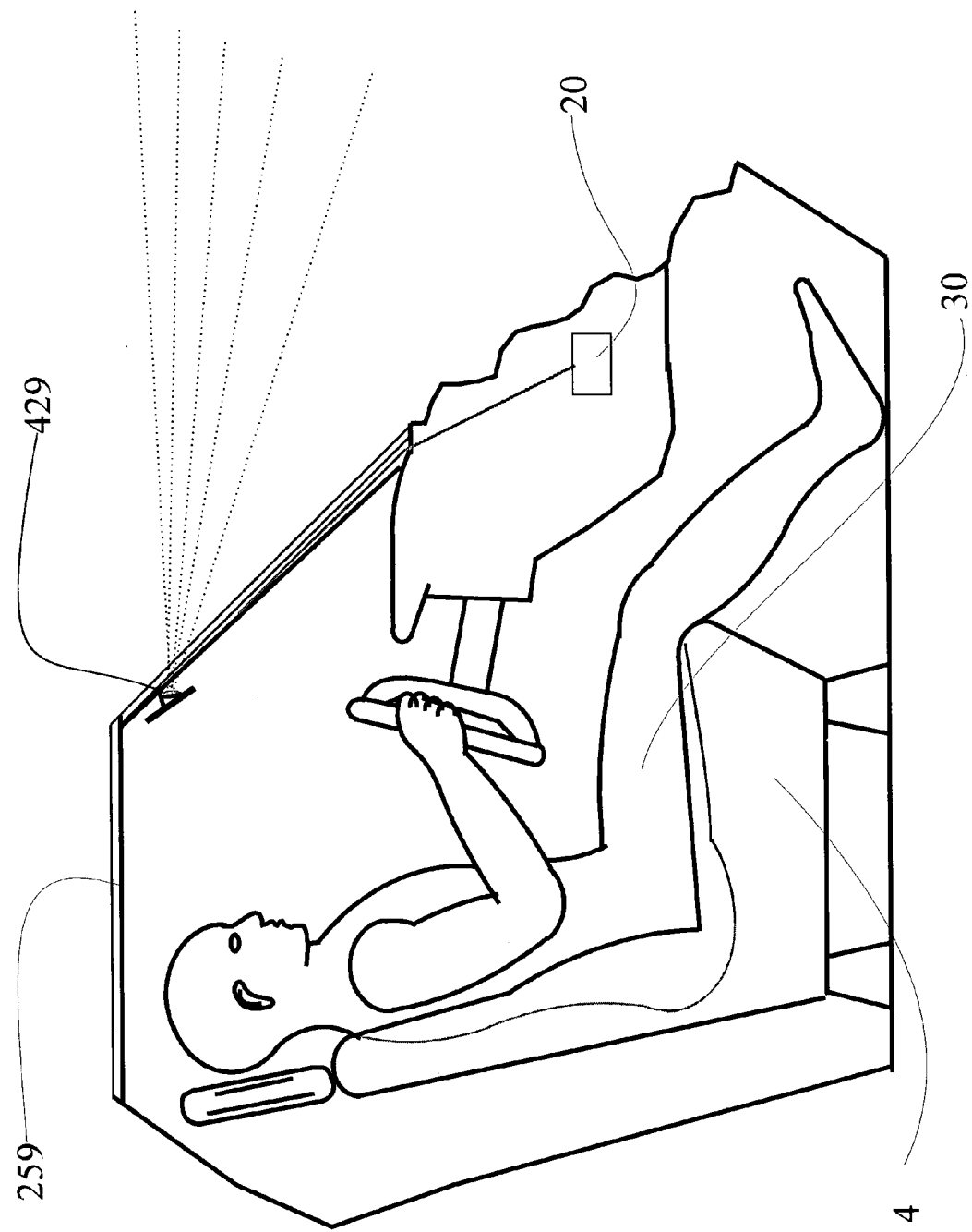
FIG. 39 is a side planar view, with certain portions removed or cut away, of a portion of the passenger compartment illustrating a sensor for sensing the headlights of an oncoming vehicle and/or the taillights of a leading vehicle used in conjunction with an automatic headlight dimming system.

FIG. 39 illustrates the exterior monitoring system for use in detecting the headlights of an oncoming vehicle or the taillights of a vehicle in front of vehicle 259. In this embodiment, the imager array 429 is designed to be sensitive to visible light and a separate source of illumination is not used. Once again for some applications, the key to this technology is the use of trained pattern recognition algorithms and particularly the artificial neural network. Here, as in the other cases above and in the patents and patent applications referenced above, the pattern recognition system is trained to recognize the pattern of the headlights of an oncoming vehicle or the tail lights of a vehicle in front of vehicle 259 and to then dim the headlights when either of these conditions is sensed. It is also trained to not dim the lights for other reflections such as reflections off of a sign post or the roadway. One problem is to differentiate taillights where dimming is desired from distant headlights where dimming is not desired. Three techniques are used: (i) measurement of the spacing of the light sources, (ii) determination of the location of the light sources relative to the vehicle, and (iii) use of a red filter where the brightness of the light source through the filter is compared with the brightness of the unfiltered light. In the case of the taillight, the brightness of the red filtered and unfiltered light is nearly the same while there is a significant difference for the headlight case. In this situation, either two CCD arrays are used, one with a filter, or a filter which can be removed either electrically, such as with a liquid crystal, or mechanically.

The environment surrounding the vehicle can be determined using an interior mounted camera that looks out of the vehicle. The status of the sun (day or night), the presence of rain, fog, snow, etc can thus be determined.

Naturally the information provided by the exterior monitoring system can be combined with the interior monitoring system in order to optimize both systems for the protection of the occupants.

Although several preferred embodiments are illustrated and described above, there are possible combinations using other signals and sensors for the components and different forms of the neural network implementation or different pattern recognition technologies that perform the same functions which can be utilized in accordance with the invention. Also, although the neural network and modular neural networks have been described as an example of one means of pattern recognition, other pattern recognition means exist and still others are being developed which can be used to identify potential component failures by comparing the operation of a component over time with patterns characteristic of normal and abnormal component operation. In addition, with the pattern recognition system described above, the input data to the system may be data which has been pre-processed rather than the raw signal data either through a process called "feature extraction" or by various mathematical transformations. Also, any of the apparatus and methods disclosed herein may be used for diagnosing the state of operation or a plurality of discrete components.

Although several preferred embodiments are illustrated and described above, there are possible combinations using other geometries, sensors, materials and different dimensions for the components that perform the same functions. At least one of the inventions disclosed herein is not limited to the above embodiments and should be determined by the following claims. There are also numerous additional applications in addition to those described above. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the following claims.

The invention claimed is:

1. A method for obtaining information about an occupant in a compartment of a vehicle, comprising:
   mounting a light source in the vehicle;
   projecting structured light into an area of interest in the compartment where the occupant could be located, rays of light forming the structured light originating from the light source, the structured light being a pattern of light including a plurality of light areas and at least one dark area alongside one another;
   detecting reflected light at an image sensor arranged on the vehicle at a position different than the position from which the structured light is projected and at a position from which light reflected from any objects in the area of interest in the compartment is received; and
   analyzing the reflected light relative to the projected structured light to obtain information about the area of interest and the occupant when located in the area of interest.

2. The method of claim 1, wherein the light source is mounted in a dashboard, instrument panel or ceiling of the vehicle such that information about an occupant in a passenger compartment of the vehicle is obtained.

3. The method of claim 1, further comprising imposing a pattern of the light and dark areas in the projected structured light.

4. The method of claim 1, further comprising arranging the image sensor at a different location in the vehicle than the light source such that the structured light originating from the light source is directed into the area of interest in the compartment in a first direction and is reflected to the image sensor by any objects in the area of interest in the compartment in a second direction which is not opposite to the first direction.

5. The method of claim 4, further comprising arranging the image sensor such that a line between the image sensor and the area of interest is at an angle of 20° to 45° to a line between the location from which the structured light is projected and the area of interest.

6. The method of claim 1, further comprising
   projecting at least one structured light pattern from the light source into the area of interest in the compartment; and
   modifying the light pattern to create a virtual light source different than the light source.

7. The method of claim 6, further comprising:
   generating the at least one structured light pattern by interposing a first filter between the light source and the area of interest in the compartment which blocks at least one portion of the light being projected from the light source to thereby create a dark area of the pattern of light; and
   arranging a second filter similar to the first filter between the area of interest and the image sensor.

8. The method of claim 1, wherein the analyzing step comprises determining a distance between the light source and at least a part of an object occupying at least a part of the area of interest.

9. The method of claim 1, wherein the structured light comprises lines of light spaced apart from one another with the lines of light being light areas in the pattern of light and spaces between the lines of light being dark areas of the pattern of light such that light and dark areas alternate with one another in the pattern of light.

10. The method of claim 1, wherein the structured light comprises dots of light spaced apart from one another.

11. The method of claim 1, further comprising forming the structured light by polarizing the rays of light from the light source so that different parts of the area of interest are illuminated with light having different polarization.

12. The method of claim 1, further comprising forming the structured light by imposing spatial patterns on the rays of light from the light source such that the time domain is used to identify particular transmission angles with particular reflections.

13. The method of claim 1, further comprising imposing a pattern of the light and dark areas in the projected structured light.

14. The method of claim 1, further comprising arranging the image sensor at a different location in the vehicle than the light source such that the structured light originating from the light source is directed into the area of interest in the compartment in a first direction and is reflected to the image sensor by any occupying items in the area of interest in the compartment in a second direction which is not opposite to the first direction.

15. The method of claim 14, further comprising arranging the image sensor such that a line between the image sensor and the area of interest is at an angle of about 20° to about 45° to a line between the location from which the structured light is projected and the area of interest.

16. The method of claim 1, further comprising
projecting at least one structured light pattern from the light source into the area of interest in the compartment; and
modifying the light pattern to create a virtual light source different than the light source.

17. The method of claim 16, further comprising:
generating the at least one structured light pattern by interposing a first filter between the light source and the area of interest in the compartment which blocks at least one portion of the light being projected from the light source to thereby create a dark area of the pattern of light; and
arranging a second filter similar to the first filter between the area of interest and the image sensor.

18. The method of claim 1, further comprising:
associating the light source and image sensor with a single occupant seating position in the vehicle such that the structured light projected from the light source is projected only into this occupant seating position and the area of interest in the single occupant seating position;
providing an additional pair of a light source and associated image sensor for each occupant seating position in the vehicle such that the structured light projected from the light source of each additional pair is projected only into a respective occupant seating position; and
obtaining information about any occupants in the compartment in the vehicle based on analysis of light reflected to all of the image sensors.

19. The method of claim 1, wherein the step of analyzing the reflected light relative to the projected structured light to obtain information about the area of interest and the occupant when located in the area of interest comprises analyzing light from a plurality of points on the object reflected at the same time whereby the obtained information is information about a three-dimensional form of the objects between the points from which light was reflected at the same time.

20. The method of claim 1, further comprising arranging the image sensor at a different location in the vehicle than the light source such that an angle greater than zero is defined between the projecting structured light beam impacting the object and the received reflected light arising from that impacting beam of projected structured light.

21. A method for obtaining information about an occupying item in a compartment of a vehicle, comprising:
mounting a light source in the vehicle;
projecting structured light into an area of interest in the compartment where the occupying item could be located, rays of light forming the structured light originating from the light source, the structured light being a pattern of light including a plurality of discrete light areas and at least one discrete dark area alongside one another;
detecting reflected light at an image sensor arranged on the vehicle at a position different than the position from which the structured light is projected and at a position from which light reflected from any occupying items in the area of interest in the compartment is received; and
analyzing the reflected light relative to the projected structured light to obtain information about the area of interest and the occupying item when located in the area of interest.

22. The method of claim 21, wherein the light source is mounted in a dashboard, instrument panel or ceiling of the vehicle such that information about an occupying item in a passenger compartment of the vehicle is obtained.

23. The method of claim 21, wherein the analyzing step comprises determining a distance between the light source and at least a part of an occupying item occupying at least a part of the area of interest.

24. The method of claim 21, wherein the structured light comprises lines of light spaced apart from one another with the lines of light being light areas in the pattern of light and spaces between the lines of light being dark areas of the pattern of light such that light and dark areas alternate with one another in the pattern of light.

25. The method of claim 21, further comprising forming the structured light by imposing spatial patterns on the rays of light from the light source such that the time domain is used to identify particular transmission angles with particular reflections.

26. The method of claim 21, wherein the occupying item is an occupant, further comprising:
associating the light source and image sensor with a single occupant seating position in the vehicle such that the structured light projected from the light source is projected only into this occupant seating position and the area of interest in the single occupant seating position;
providing an additional pair of a light source and associated image sensor for each occupant seating position in the vehicle such that the structured light projected from the light source of each additional pair is projected only into a respective occupant seating position; and
obtaining information about any occupants in the compartment in the vehicle based on analysis of light reflected to all of the image sensors.

27. The method of claim 21, wherein the step of analyzing the reflected light relative to the projected structured light to obtain information about the area of interest and the occupying item when located in the area of interest comprises analyzing light from a plurality of points on the occupying item reflected at the same time whereby the obtained information is information about a three-dimensional form of the occupying items between the points from which light was reflected at the same time.

28. The method of claim 21, further comprising arranging the image sensor at a different location in the vehicle than the light source such that an angle greater than zero is defined between the projecting structured light beam impacting the occupying item and the received reflected light arising from that impacting beam of projected structured light.

* * * * *